US011659392B2

(12) United States Patent
Avetisov et al.

(10) Patent No.: US 11,659,392 B2
(45) Date of Patent: *May 23, 2023

(54) SECURE MOBILE INITIATED AUTHENTICATIONS TO WEB-SERVICES

(71) Applicant: HYPR Corp., New York, NY (US)

(72) Inventors: George Avetisov, New York, NY (US); Roman Kadinsky, New York, NY (US); Bojan Simic, New York, NY (US)

(73) Assignee: HYPR Corp., New York, NY (US)

( * ) Notice: Subject to any disclaimer, the term of this patent is extended or adjusted under 35 U.S.C. 154(b) by 174 days.

This patent is subject to a terminal disclaimer.

(21) Appl. No.: 17/158,898

(22) Filed: Jan. 26, 2021

(65) Prior Publication Data
US 2021/0185531 A1 Jun. 17, 2021

Related U.S. Application Data

(63) Continuation of application No. 17/066,280, filed on Oct. 8, 2020, now Pat. No. 10,939,295, which is a (Continued)

(51) Int. Cl.
*H04W 12/06* (2021.01)
*H04L 9/40* (2022.01)
(Continued)

(52) U.S. Cl.
CPC .......... *H04W 12/068* (2021.01); *G06F 21/45* (2013.01); *H04L 63/062* (2013.01);
(Continued)

(58) Field of Classification Search
CPC ............. H04W 12/068; H04W 12/069; H04W 12/08; H04W 12/108; H04W 12/37;
(Continued)

(56) References Cited

U.S. PATENT DOCUMENTS

| 8,627,438 B1 | 1/2014 | Bhimanaik |
|---|---|---|
| 8,656,482 B1 | 2/2014 | Tosa |

(Continued)

FOREIGN PATENT DOCUMENTS

| KR | 102004005815 A | 1/2004 |
|---|---|---|
| KR | 1020040005815 A | 1/2004 |

OTHER PUBLICATIONS

Notice of Allowance in related U.S. Appl. No. 16/932,605 dated Apr. 26, 2022, pp. 1-7.
(Continued)

*Primary Examiner* — Teshome Hailu
*Assistant Examiner* — Aubrey H Wyszynski
(74) *Attorney, Agent, or Firm* — Pillsbury Winthrop Shaw Pittman, LLP; Joshua L. Tucker

(57) ABSTRACT

Provided is a process for mobile-initiated authentications to web services. Credential values of the user are established within a trusted execution environment of the mobile device and representations are transmitted to a server. The user of the mobile device may authenticate with the mobile device to the server, which may convey access to a web-based service from a relying device. The server may pass credentials corresponding to the web-service received from the mobile device and verified to permit user access to the web-service to the relying device. The relying device presents credentials to the web-service to login, authenticate, or otherwise obtain user-level permission for the user on the relying device. The user of the mobile device may authenticate with the mobile device to the server, and may initiate the authentication process from the mobile device, without inputting credentials corresponding to the web-service on the relying device.

26 Claims, 16 Drawing Sheets

Related U.S. Application Data continuation-in-part of application No. 16/932,605, filed on Jul. 17, 2020, now Pat. No. 11,438,764, which is a continuation of application No. 15/931,461, filed on May 13, 2020, now Pat. No. 10,764,752, which is a continuation-in-part of application No. 16/373,561, filed on Apr. 2, 2019, now Pat. No. 11,057,366, which is a continuation-in-part of application No. 16/270,255, filed on Feb. 7, 2019, now Pat. No. 10,601,828.

(60) Provisional application No. 62/951,945, filed on Dec. 20, 2019, provisional application No. 62/720,609, filed on Aug. 21, 2018, provisional application No. 62/720,590, filed on Aug. 21, 2018.

(51) Int. Cl.
  *G06F 21/45* (2013.01)
  *H04W 12/08* (2021.01)
  *H04W 12/069* (2021.01)

(52) U.S. Cl.
  CPC ........ *H04L 63/083* (2013.01); *H04L 63/0884* (2013.01); *H04L 63/18* (2013.01); *H04L 63/20* (2013.01); *H04W 12/069* (2021.01); *H04W 12/08* (2013.01); *G06F 2221/2149* (2013.01)

(58) Field of Classification Search
  CPC ............... H04W 12/60; G06F 21/45; G06F 2221/2149; G06F 21/64; G06F 21/33; H04L 63/062; H04L 63/083; H04L 63/0884; H04L 63/18; H04L 63/20; H04L 9/0897; H04L 9/321; H04L 9/3218; H04L 2209/80; H04L 9/3239; H04L 9/3247; H04L 9/3263; H04L 9/50; H04L 63/0815
  USPC .......................................................... 726/1
  See application file for complete search history.

(56) References Cited

U.S. PATENT DOCUMENTS

| | | | |
|---|---|---|---|
| 8,931,052 B2 | 1/2015 | Jang | |
| 9,396,376 B1 | 7/2016 | Narayanaswami | |
| 9,998,438 B2 | 6/2018 | Sinha | |
| 10,133,861 B2 | 11/2018 | Guionneau et al. | |
| 10,601,590 B1* | 3/2020 | Chhabra | G06F 21/44 |
| 10,601,828 B2* | 3/2020 | Avetisov | G06F 21/42 |
| 10,764,752 B1* | 9/2020 | Avetisov | H04W 12/08 |
| 10,939,295 B1* | 3/2021 | Avetisov | H04L 9/321 |
| 11,057,366 B2* | 7/2021 | Avetisov | H04L 63/0815 |
| 11,063,930 B1* | 7/2021 | Bose | H04L 63/0428 |
| 11,438,764 B2* | 9/2022 | Avetisov | H04W 12/068 |
| 2002/0012433 A1 | 1/2002 | Haverinen | |
| 2002/0023213 A1 | 2/2002 | Walker | |
| 2002/0087860 A1 | 7/2002 | William Kravitz | |
| 2002/0087892 A1 | 7/2002 | Imazu | |
| 2002/0107804 A1 | 8/2002 | Kravitz | |
| 2003/0212892 A1 | 11/2003 | Oishi | |
| 2004/0193921 A1 | 9/2004 | Byrne | |
| 2010/0058064 A1 | 3/2010 | Kirovski et al. | |
| 2012/0167194 A1 | 6/2012 | Reese | |
| 2012/0311723 A1 | 12/2012 | Britt, Jr. et al. | |
| 2013/0015236 A1 | 1/2013 | Porter et al. | |
| 2013/0191640 A1 | 7/2013 | Bloomer | |
| 2013/0232336 A1 | 9/2013 | Cheung et al. | |
| 2014/0181925 A1 | 6/2014 | Smith | |
| 2014/0223577 A1 | 8/2014 | Lee | |
| 2014/0259115 A1 | 9/2014 | Bakshi | |
| 2015/0007265 A1 | 1/2015 | Aissi | |
| 2015/0072726 A1 | 3/2015 | Stem | |
| 2015/0082024 A1 | 3/2015 | Smith | |
| 2015/0082390 A1 | 3/2015 | Flink | |
| 2015/0095999 A1 | 4/2015 | Toth | |
| 2015/0200936 A1 | 7/2015 | Kim et al. | |
| 2016/0127351 A1 | 5/2016 | Smith | |
| 2016/0191244 A1 | 6/2016 | Claes | |
| 2016/0254918 A1 | 9/2016 | Liu | |
| 2016/0285633 A1 | 9/2016 | Allinson et al. | |
| 2016/0357954 A1 | 12/2016 | Guionneau et al. | |
| 2017/0230361 A1 | 8/2017 | Toth | |
| 2017/0339144 A1 | 11/2017 | Han | |
| 2018/0048462 A1 | 2/2018 | Salmela | |
| 2018/0227128 A1 | 8/2018 | Church et al. | |
| 2018/0375851 A1 | 12/2018 | Aggarwal et al. | |
| 2019/0034621 A1 | 1/2019 | Mondello et al. | |
| 2019/0251293 A1 | 8/2019 | Banerjee | |
| 2019/0372949 A1 | 12/2019 | Sanciangco et al. | |

OTHER PUBLICATIONS

International Preliminary Report on Patentability in related international application PCT/US2020/066228 dated Jun. 30, 2022, pp. 1-6.

International Preliminary Report on Patentability in related international application PCT/US2020/066230 dated Jun. 30, 2022, pp. 1-7.

Notice of Allowance for related U.S. Appl. No. 17/234,737, dated Jul. 14, 2021, 14 pages.

Notice of Allowance in related U.S. Appl. No. 16/373,561 dated Mar. 3, 2021 (14 pages).

International Search Report and Written Opinion in related international application PCT/US2020/066228 (10 pages).

International Search Report and Written Opinion in related international application PCT/US2020/066230 (11 pages).

Non-Final Office Action in related U.S. Appl. No. 16/932,605 dated Dec. 24, 2021.

Notice of Allowance in related U.S. Appl. No. 17/338,394 dated Aug. 19, 2022, pp. 1-13.

Notice of Allowance in related U.S. Appl. No. 17/338,394 dated Aug. 19, 2022, pp. 1-27.

\* cited by examiner

SECURE MOBILE INITIATED AUTHENTICATIONS TO WEB-SERVICES

CROSS-REFERENCE TO RELATED APPLICATIONS

The present application is a continuation of U.S. patent application Ser. No. 17/066,280, filed on 8 Oct. 2020, titled SECURE MOBILE INITIATED AUTHENTICATIONS TO WEB-SERVICES. U.S. patent application Ser. No. 17/066,280 is a continuation-in-part of U.S. patent application Ser. No. 16/932,605, filed on 17 Jul. 2020, titled SECURE MOBILE INITIATED AUTHENTICATION, which is a continuation of U.S. Pat. No. 10,764,752, filed on 13 May 2020, titled SECURE MOBILE INITIATED AUTHENTICATION, which claims the benefit of U.S. Provisional Patent Application 62/951,945, filed on 20 Dec. 2019, titled SECURE MOBILE INITIATED AUTHENTICATION, and U.S. Pat. No. 10,764,752 is a continuation-in-part of U.S. patent application Ser. No. 16/373,561, filed on 2 Apr. 2019, titled FEDERATED IDENTITY MANAGEMENT WITH DECENTRALIZED COMPUTING PLATFORMS, which is a continuation-in-part of U.S. Pat. No. 10,601,828, filed on 7 Feb. 2019, titled OUT-OF-BAND AUTHENTICATION BASED ON SECURE CHANNEL TO TRUSTED EXECUTION ENVIRONMENT ON CLIENT DEVICE, which claims the benefit of U.S. Provisional Patent Application 62/720,609 filed on 21 Aug. 2018, titled OUT-OF-BAND AUTHENTICATION BASED ON SECURE CHANNEL TO TRUSTED EXECUTION ENVIRONMENT ON CLIENT DEVICE, and claims the benefit of U.S. Provisional Patent Application 62/720,590 filed on 21 Aug. 2018, titled FEDERATED IDENTITY MANAGEMENT WITH DECENTRALIZED COMPUTING PLATFORMS. The entirety of each of the above noted patent filings is incorporated herein by reference.

BACKGROUND

1. Field

The present disclosure relates generally to cybersecurity and, more specifically, to identity management techniques leveraging mobile devices of users to initiate authentication.

2. Description of the Related Art

Many computer systems and resources thereon are protected with identity management systems. These systems are designed to ensure that access to computer systems and resources is granted only to the appropriate entities and denied to others. Examples include computer program code in a client/server architecture that verifies that a user submitted password corresponds to an identifier supplied by the user before granting access to resources associated with that user identifier. Other approaches apply federated identity management, such as arrangements between multiple enterprises or another third-party to allow users to use identification data from one platform to obtain access on another platform. For example, an existing user of platform A may use identification data from platform A to obtain access to platform B, and platform A performs the verification. Techniques like those in OAuth 2.0, and related approaches by which a delegated third-party may verify identity on behalf of a constellation of other entities for a given user, may allow the given user to sign into an online forum or native application by logging in via their email provider. In turn, the email provider supplies an authentication token to the server hosting the online forum or exposing an application program interface (API) of the native application for authenticating user access without that server having access to the user's identification data (e.g., the identification data verified by the email provider).

Some approaches include authentication of a user via a different channel from that by which the user seeks to access resources requiring authentication. Examples include out-of-band authentication following a user's attempt to access a website by supplying a username and password to that website. Some authentication systems respond to a user's attempt to submit credentials in this manner by sending a push notification to a previously registered mobile device of the user, like a cell phone (distinct from the device upon which they seek access), and that push notification may prompt the mobile device to confirm the access attempt from the user. In this manner, such systems may supply additional factors by which additional confidence may be obtained regarding a user's identity, as merely compromising a user's username and password would not by itself afford access to secured resources.

These and other existing techniques impose friction on users and are potentially subject to vulnerabilities. For example, in single computing session, a user may be asked to login to several different online services within a short duration of time, for instance, when accessing multiple different accounts hosted by different enterprises. In the aggregate, these repeated requests can be frustrating and, in some cases, expand the attack surface of a user's identity with an excess of authentication sessions that could be potentially compromised. Examples include attacks that compromise the client computing device by which the user supplies the supplemental confirmation of an access attempt in the out-of-band channel. Some existing systems are potentially vulnerable to malicious code executing on the user's mobile device or other device to which the user inputs credentials that, for example, capture user supplied credentials from system memory.

SUMMARY

The following is a non-exhaustive listing of some aspects of the present techniques. These and other aspects are described in the following disclosure.

Some aspects include a process performed by a computing device for authentication of a user to access a web-service from another computing device. In some aspects, a process is executed by a mobile device configured for user initiated authentication on the mobile computing device to access a web-service from another computing device different from the mobile computing device. Some aspects of a process or computer implemented method include: obtaining, by an application executing within a client execution environment of a first computing device, a registration value corresponding to a web-service to be accessed from a second computing device; transmitting, from the first computing device, the registration value over a secure session to a server, the server being different from the second computing device; establishing, by the application, a set of credentials within a secure memory by a co-processor of a trusted execution environment of the first computing device, the co-processor being a different processor from a central processing unit of the first computing device; requesting, by the application, from the trusted execution environment, a first key of a key-pair corresponding to a second key of the key-pair maintained in the secure memory and, for at least one credential in the set of credentials, a representation generated within the trusted execution environment, wherein the representation is indicative of a value of the corresponding credential, and the representation does not reveal the value; transmitting, from the first computing device, the representation and the first key or data corresponding to the representation and the first key over the secure session to the server; requesting, by the application, to the trusted execution environment, storage of an authenticator corresponding a user account with the web-service within the secure memory; receiving, by the application, a user selection to authenticate to the web-service for access by a second computing device; obtaining, by the application, from the trusted execution environment, data signed by the second key, the signed data being indicative of a result of user authentication on the first computing device; and transmitting, from the first computing device, data including the signed data to the server to cause the server to: issue over a user session to the second computing device based on authentication of the signed data, an authentication value for the second computing device to present to the web-service.

Some aspects include a process performed by a computing device for authentication of a user to access a web-service from another computing device. In some aspects, a process is executed by a mobile device configured for user initiated authentication on the mobile computing device to access a web-service from another computing device different from the mobile computing device. Some aspects of a process or computer implemented method include: establishing, by an application executing within a client execution environment of a first computing device, a set of credentials within a secure memory by a co-processor of a trusted execution environment of the first computing device, the co-processor being a different processor from a central processing unit of the first computing device; requesting, by the application, from the trusted execution environment, both: a first key of a key-pair corresponding to a second key of the key-pair maintained in the secure memory, and for at least one credential in a set of credentials by which a user authenticates to the first computing device, a representation generated within the trusted execution environment, wherein the representation is indicative of a value of the corresponding credential, and the representation does not reveal the value; transmitting, from the first computing device, the representation and the first key, or transmitting data corresponding to the representation and the first key, over a secure session to an authentication server to register the first computing device with the authentication server; receiving, by the application, a user selection to register the first computing device to a web-service to be accessed from a second computing device, wherein: the second computing device is different from the first computing device, and the authentication server is configured to identify sessions of the user with the second computing device to convey credentials received from the first computing device to the second computing device for presentation to a server associated with the web-service; obtaining, by the application, a registration value corresponding to the web-service and, from the trusted execution environment, data signed by the second key, the signed data being indicative of a result of user authentication on the first computing device; transmitting, from the first computing device, data including the registration value and the signed data to the authentication server to cause the authentication server to register the first computing device with the web-service based on authentication of the signed data and the registration value; and requesting, by the application, to the trusted execution environment, establishment of a credential value within the trusted execution environment corresponding to the web-service.

Some aspects include a process or computer implemented method for logging in a user include: receiving, with a first application executing on a mobile computing device, a first request to log a user into a network domain with a second application executing on a workstation computer; authenticating, with the first application, the user to an authentication server a first time; logging the user into the workstation with a cryptographic certificate issued by the authentication server to a second application executing on the workstation computer; upon receiving the cryptographic certificate, logging the user into a network domain with the second application and effectuating single-sign on to a plurality of services accessible on the network domain with the workstation computer; after logging the user into the network domain, receiving a second request with the first application executing on the mobile computing device to log the user into a website to be accessed with the workstation computer; authenticating, with the first application, the user to the authentication server a second time; and in response to authenticating the user the second time and the second request, causing, with the authentication server, the second application on the workstation computer to send a uniform resource identifier that authenticates the user on the workstation computer to the web site.

Some aspects include a process performed by a server for supporting authentication of a user of a computing device to access web-service from another computing device. In some aspects, a process is executed by a server-side computing system configured to support user initiated authentication on a mobile computing device to a web-service to be accessed from another computing device different from the mobile computing device. Some aspects of a process or computer implemented method include: registering a mobile computing device having a trusted execution environment, the registering comprising: establishing a user record associated with a user of the mobile computing device, the user permitted to access one or more second computing devices and the user record comprising a user identifier associated with the user; and establishing, in association with the user record, a record of the mobile computing device in response to receiving, from the mobile computing device, a set of representations corresponding to a set of credentials stored within the trusted execution environment on the mobile computing device and a signature verification key corresponding to a private key of the trusted execution environment; receiving, from the mobile computing device, a request to authorize the user to authenticate to a web-service to be accessed from a second computing device and, in association with the request, first data indicative of a registration value; receiving, from the web-service, second data indicative of an identifier generated by the web-service; in response to identifying a correspondence between the value and the identifier, determining whether the user of the mobile computing device is permitted to access the web-service from a second computing device associated with the user based on the user record; in response to determining the user of the mobile computing device is permitted to access the web-service from the second computing device, requesting, from the web-service, an authenticator corresponding to a user account; transmitting the authenticator and a policy associated with the web-service to the mobile computing device; receiving, from the mobile computing device, an authentication request to authenticate to the web-service to be accessed from the second computing device and, in association with the authentication request, authentication data and signed data; verifying the authentication data complies with the policy; verifying the authentication data was generated by the trusted execution environment and corresponds to the signed data based on the signature key; verifying an active user session of the user is issued to the second computing device, and transmitting, to the second computing device, based on the verifying, an authentication value and instructions that cause the second computing device to present to the authentication value to the web-service.

Some aspects include a process performed by a computing device for authentication of a user to access another computing device. In some aspects, a process is executed by a mobile device configured for user initiated authentication on the mobile computing device to access another computing device different from the mobile computing device. Some aspects of a process or computer implemented method include: obtaining, by an application executing within a client execution environment of a first computing device, a registration value corresponding to a second computing device; transmitting, from the first computing device, the registration value over a secure session to a server, the server being different from the second computing device; establishing, by the application, a set of credentials within a secure memory by a co-processor of a trusted execution environment of the first computing device, the co-processor being a different processor from a central processing unit of the first computing device; requesting, by the application, from the trusted execution environment, a first key of a key-pair corresponding to a second key of the key-pair maintained in the secure memory and, for at least one credential in the set of credentials, a representation generated within the trusted execution environment, wherein the representation is indicative of a value of the corresponding credential, and the representation does not reveal the value; transmitting, from the first computing device, the representation and the first key or data corresponding to the representation and the first key over the secure session to the server; requesting, by the application, to the trusted execution environment, storage of a user certificate corresponding to the second computing device within the secure memory; receiving, by the application, a user selection of the second computing device; obtaining, by the application, from the trusted execution environment, data signed by the second key, the signed data being indicative of a result of user authentication on the first computing device; and transmitting, from the first computing device, data including the signed data to the server to cause the server to issue a user session to the second computing device based on authentication of the signed data.

Some aspects include an offline or partial-offline process executed by a mobile computing device that initiates authentication to a relying device. Some aspects of a process or computer implemented method include: obtaining, by an application executing within a client execution environment of a first computing device, a registration value corresponding to a second computing device; transmitting, from the first computing device, the registration value over a secure session to a server, the server being different from the second computing device; establishing, by the application, a set of credentials within a secure memory by a co-processor of a trusted execution environment of the first computing device, the co-processor being a different processor from a central processing unit of the first computing device; requesting, by the application, from the trusted execution environment, a first key of a key-pair corresponding to a second key of the key-pair maintained in the secure memory and, for at least one credential in the set of credentials, a representation generated within the trusted execution environment, wherein the representation is indicative of a value of the corresponding credential, and the representation does not reveal the value; transmitting, from the first computing device, the representation and the first key or data corresponding to the representation and the first key over the secure session to the server; obtaining a policy governing offline access and encrypted data corresponding to offline values, wherein an offline value corresponds to a value by which the second computing device may be accessed when a connection to the server is unavailable based on one or more rules of the policy; and requesting, by the application, from the trusted execution environment, an offline value, wherein the offline value is obtained based on the encrypted data and the second key of the key-pair subject to user authentication based on at least one credential and compliance with the one or more rules specified by the policy.

Some aspects include a process performed by a server for supporting authentication of a user of a computing device to access another computing device. In some aspects, a process is executed by a server-side computing system configured to support user initiated authentication on a mobile computing device to access another computing device different from the mobile computing device. Some aspects of a process or computer implemented method include: registering a mobile computing device having a trusted execution environment, the registering comprising: establishing a user record associated with a user of the mobile computing device, the user permitted to access one or more second computing devices and the user record comprising a user identifier associated with the user; and establishing, in association with the user record, a record of the mobile computing device in response to receiving, from the mobile computing device, a set of representations corresponding to a set of credentials stored within the trusted execution environment on the mobile computing device and a signature verification key corresponding to a private key of the trusted execution environment; receiving, from the mobile computing device, a request to authorize the user to access a second computing device and, in association with the request, first data indicative of a value; receiving, from the second computing device, second data indicative of an identifier generated by the second computing device; in response to identifying a correspondence between the value and the identifier, determining whether the user of the mobile computing device is permitted to access the second computing device based on the user record; in response to determining the user of the mobile computing device is permitted to access the second computing device, requesting, from the second computing device, a user certificate; transmitting the user certificate and a policy associated with the second computing device to the mobile computing device; receiving, from the mobile computing device, an authentication request to access the second computing device and, in association with the authentication request, authentication data and signed data; verifying the authentication data complies with the policy; verifying the authentication data was generated by the trusted execution environment and corresponds to the signed data based on the signature key; and transmitting, to the second computing device, based on the verifying, instructions to permit user access to the second computing device.

Some aspects include a decentralized identity management system that implements zero-knowledge authentication credentials on a blockchain-based computing platform by which authentication of a user to access another computing device may be managed according to the example aspects of methods and processes described herein.

Some aspects include a tangible, non-transitory, machine-readable medium storing instructions that when executed by a data processing apparatus cause the data processing apparatus to perform operations of one or more of the above-mentioned processes and computer-implemented methods.

Some aspects include a system, including: one or more processors; and memory storing instructions that when executed by the processors cause the processors to effectuate operations of one or more of the above-mentioned processes and computer-implemented methods.

BRIEF DESCRIPTION OF THE DRAWINGS

The above-mentioned aspects and other aspects of the present techniques will be better understood when the present application is read in view of the following figures in which like numbers indicate similar or identical elements.

Figure 1A:
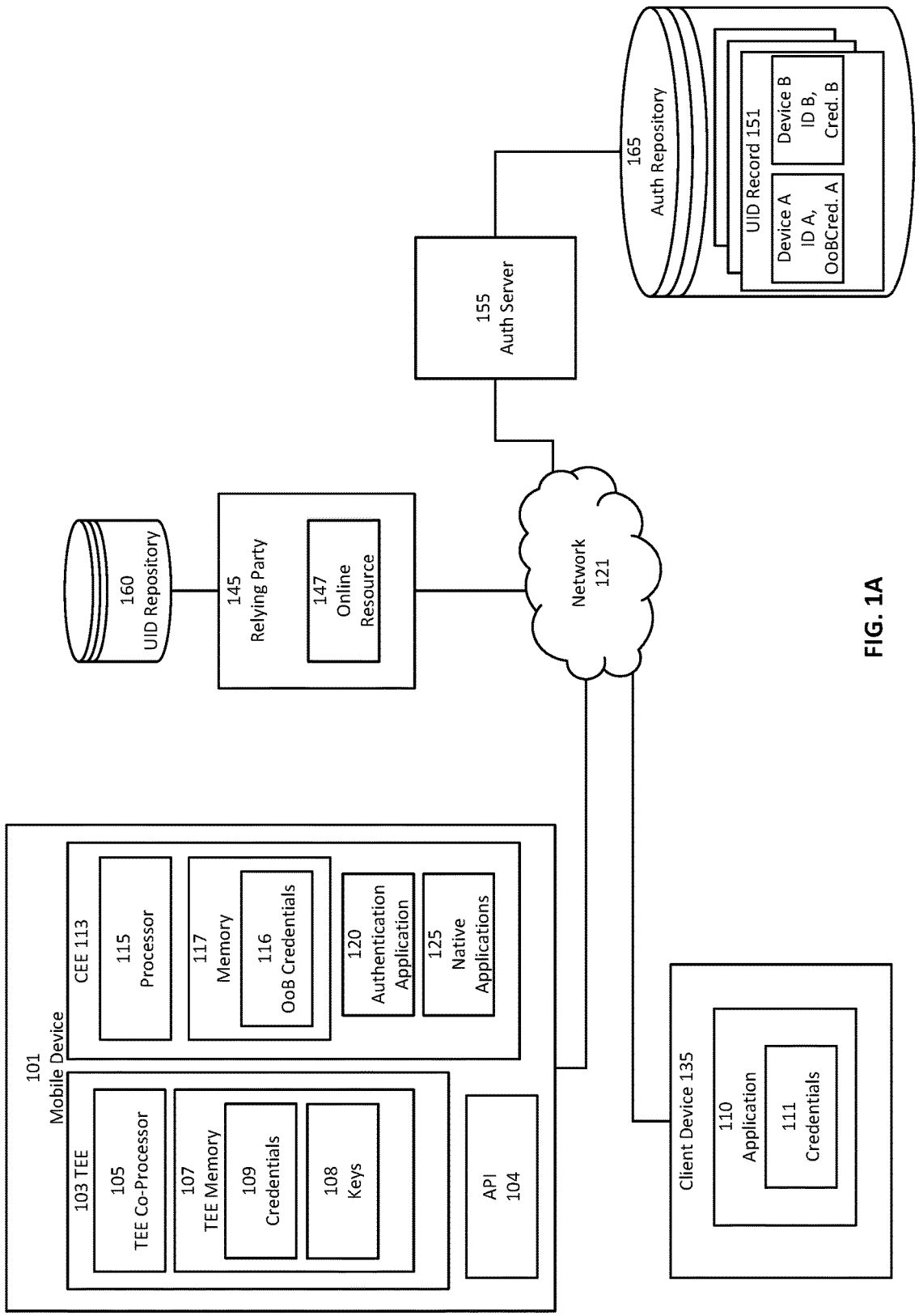
FIG. 1A is a block diagram showing an example of a computing environment by which the present techniques for user authentication may be implemented.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of cybersecurity. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Existing federated identity management techniques impose more friction on users and require more trust of developers than is desirable. Often, in single computing session, a user is asked to login to several different online services within a short duration of time, for instance, when accessing multiple different accounts hosted by different enterprises. In the aggregate, these repeated requests can be frustrating and, in some cases, expand the attack surface of a user's identity with an excess of authentication sessions that could be potentially compromised. Accordingly, various embodiments described herein mitigate such login events through secure access to workstations, or other managed devices, by which users may be conferred access to a variety of services according to policy. In other words, provided a user successfully authenticates a session to access to a workstation or other managed device, access to other services or resources may be conferred.

Further, enterprises hosting federated identity management systems may be un-trusted by other enterprises wishing to authenticate users on such systems. In some cases, the enterprises hosting identity management systems may be competitors of the other enterprises wishing to authenticate users with those types of systems, or developers may be concerned that even if an enterprise is currently trusted, subsequent management may be less reliable. In addition, an enterprise using such systems for authentication services may be unable to receive authentication tokens for authenticating user access in the event of a federated identify management system outage of the hosting enterprise. As a result, user experience associated with an enterprise may be affected by the reliance on third-party user authentication. None of which is to suggest that any technique is disclaimed, merely that there are tradeoffs to keep in mind in view of the following disclosure.

Some approaches include authentication of a user via a different channel from that by which the user seeks to access resources requiring authentication. Examples include out-of-band authentication following a user's attempt to access a website by supplying a username and password to that website. Some authentication systems respond to a user's attempt to submit credentials in this manner by sending a push notification to a previously registered mobile device of the user, like a cell phone (distinct from the device upon which they seek access), and that push notification may prompt the mobile device to confirm the access attempt from the user. In this manner, such systems may supply additional factors by which additional confidence may be obtained regarding a user's identity, as merely compromising a user's username and password would not by itself afford access to secured resources.

These and other existing techniques impose friction on users and are potentially subject to vulnerabilities. For example, in single computing session, a user may be asked to login to several different online services within a short duration of time, for instance, when accessing multiple different accounts hosted by different enterprises. In the aggregate, these repeated requests can be frustrating and, in some cases, expand the attack surface of a user's identity with an excess of authentication sessions that could be potentially compromised. Examples include attacks that compromise the client computing device by which the user supplies the supplemental conformation of an access attempt in the out-of-band channel. Some existing systems are potentially vulnerable to malicious code executing on the user's mobile device or other device to which the user inputs credentials that, for example, capture user supplied credentials from system memory.

Oftentimes, out-of-band authentication is incorporated within federated identity systems. The result being that federated identity systems are further susceptible to those attacks described above that are applicable to out-of-band authentication, and the rewards of a successful attack for attackers are far greater than on an individual account basis. For example, a compromised federated identity may afford an attacker access to a wide range of different entities, accounts, protected assets, or any other information accessible under the umbrella of that federated identity. Thus, there exists a need to reduce friction on users while maintaining security. Again, none of which is to suggest that any technique is disclaimed, merely that there are tradeoffs to keep in mind in view of the following disclosure Disclosed embodiments may provide a mobile initiated login process by which users may access devices or controlled areas or controlled devices. For example, a user may initiate an authentication process via a mobile device to access a relying device (e.g., to which the mobile device is registered). Additionally, embodiments may provide a mobile initiated login process by which user may access one or more web-based services, which may include services and online resources, such as from a relying device to which the user also authenticated. In some embodiments, the mobile initiated login may confer privileges consistent with traditional techniques that impose more friction on users. For example, a user that performs a mobile initiated login to access a workstation or other relying device (which may include a controller configured to actuate another device or cause a device to perform a function) may be afforded the same privileges as if that user physically provided credentials to the relying device (e.g., user name and password) or possessed a key-fob, or code, or key by which the user could access a relying device or controller (e.g., of another device or a door or valve and the like). In some embodiments, a user registers a mobile device (e.g., a personal or work issued mobile device) to a relying device. For example, a user may register the mobile device to a relying device which the user frequently uses, or infrequently uses, while the user is in physical proximity to the relying device (though this need not always be the case). Once the mobile device is registered to the relying device, the user may authenticate with the mobile device to access the relying device, such as prior to, and temporally proximate to, physically reaching the relying device. Thus, a user may access a relying device based on an authentication result of an authentication process which the user initiated on a mobile phone that was registered to the relying device. In other words, a user may initiate an out-of-band authentication process to access a relying device based on an authentication result of that process. Additionally, embodiments may also permit the user to authenticate with the mobile device to one or more web-based services accessible via the relying device, such as where those web-based services are accessed via credentials other than those conferred by virtue of access to the relying device, or which those which may be subject to additional security measures. Example embodiments may implement various access controls to implement security measures that enhance security of such systems while also reducing user friction by enabling a user to initiate an authentication within some threshold time or proximity (or both of a relying device) instead of inconveniently respond to authentication requests, carry around various credentialing or access control devices, and the like.

Authentication of a user that initiates an authentication process on a mobile device may be subject to compliance with one or more policies. A policy may specify one or more rules which users attempting to authenticate must satisfy (e.g., via their mobile device) to successfully authenticate. For example, the mobile device may receive a policy specifying one or more rules with which the user must comply to authenticate and enforce those rules to obtain or generate data for determination of an authentication result (e.g., by the mobile device or other entity, like a server or a relying device). Different relying devices and different web-based service to which a user may authenticate via the mobile device may be subject to different policies. For example, one or more policies may be those of web-based services, which may be governed under a same or different policy than a relying device which may access those web-based services. In some embodiments, policies (e.g., as specified by an administrator for a relying device(s) or web-service(s)) for user authentication may be obtained by a server and provided to one or more other devices or servers for enforcement.

Embodiments may ensure user compliance with a policy in one or more ways, which may include compliance enforcement at one or more of a mobile device level, server level, and relying device level. The different levels may verify compliance with same or different ones of the rules specified by the policy prior to determining an authentication result. In some embodiments, one or more of the rules may be conditioned based, such as to account for different scenarios in which one or more participants are unavailable to participate in a portion of the authentication process. In some cases, meeting such conditions indicates verification to one or more participants of the unavailability of another participant (e.g., if wireless internet access enabled but a server response cannot be obtained) to permit authentication via one or more rules corresponding to the condition (e.g., offline login permitted if the server is unavailable). For example, authentication via the mobile device to a given relying device may be subject to obtaining a signal from a beacon (such as a Bluetooth, NFC, optical, sound wave (which need not be audible), or other beacon technology capable of emitting a signal which may be obtained by a mobile device within a given proximity of the beacon) positioned within proximity of the relying device, or GPS coordinates with a given geofence within proximity of the relying device, or connection to a WiFi network within proximity of the relying device, and the like. Some examples, such as those for authentication to web-based services may rely on availability of the service, such as those providing online-only services (e.g., to a relying device). In some other examples, such as those reliant on some forms of digital rights management (DRM) and where the relying device has access to client-side content, some privileges may be afforded (e.g., like a threshold number of accesses or cumulative access time) prior to a requirement to refresh compliance online. In some cases, the beacon may be operable to receive communications from the mobile device, such as to receive a login request, although the mobile device may transmit such login requests on another protocol. These techniques may incorporate various other technologies, which may include but are not limited to single or reduced sign on and federated identify management techniques to enable seamless access to a variety of relying devices, assets, or services by virtue of authentication via mobile initiated logins.

Disclosed embodiments also improve on deficiencies in prior systems, such as loss of availability of single or reduced sign on or federated identify authenticators. For example, in various disclosed embodiments the mobile device may stored user credentials within a trusted execution environment, and causing the trusted execution environment to divulge such credentials may be particularly difficult. Along with those credentials, the TEE may store policies, which may include offline policies, specifying rules by which offline access to a relying device may be granted in instances where the relying device or mobile device or both are without network access or one or more authenticator services are otherwise unreachable. An offline policy may be similar to an online policy, although an online policy may be enforced at an authenticator service level in addition to or instead of a mobile device side. Offline policies may be configured for enforcement mobile device side in instances when one or more authenticator services are unavailable (e.g., to one or both of the relying device and mobile device). In some cases, policies may be stored within a client execution environment but may be verified by the TEE (e.g., by signature verification) or encrypted with a protocol for which the TEE, but not the CEE, includes a key operable to decrypt the policy according to the protocol. Thus, policies may be strongly enforced on a user mobile device-side, such as to permit user access to a relying device subject to authentication in compliance with an offline policy when an authenticator service is unavailable. An online policy (which may be the same or different from an offline policy) may also function as a request filter to ensure authentication requests generated by a mobile device comply with rules implemented by an authenticator service (e.g., a prompt may instruct the user to enable WiFi or Bluetooth connections). Additionally, the TEE may store offline values, which may be single use credentials, by which a user may access a relying device. For example, the TEE may store a limited number of single use offline values that may be used before an online login process is required, and the offline values may be refreshed upon success of an online login process. An offline value may be returned by the TEE subject to authentication of the user based on credentials and rules in accordance with the policy. Authentication results may be determined within the TEE and thus may convey a high degree of security even in offline login processes. Mobile initiated login may incorporate, be incorporated in, or otherwise function in association with other improvements on credential security and federated identity management systems disclosed herein (which is not to suggest that mobile initiated login processes are not compatible with other identity management and credentialing systems).

Some embodiments implement a computing architecture that mitigates some of the above described challenges with existing identity management computing systems. Some embodiments may expose interfaces by which a user may establish an identity (e.g., create one that did not previously exist within a system), and user access to the identity is predicated on the user proving knowledge (e.g., by a zero-knowledge proof) of secret retained values (which may reside with the user, within a trusted environment of the user device, or both) used to establish the entity. For example, a record of the identity may contain one or more cryptographic keys (e.g., public keys in an asymmetric encryption protocol) or representations of credentials whereby the user may prove knowledge of a corresponding private key and credential values retained in secret by the user. In some embodiments, such provided information may include a data signed within or by a component of a secure environment (e.g., a trusted execution environment) of the device used by the user that is operable to verify that the representations were generated responsive to the user providing actual credential values. Some embodiments may expose interfaces by which a user may associate user accounts (e.g., for federation under the identity), user devices, or other users with the established identity, such as to afford use of the identity (and associated accounts) on those different devices or by those different users. Approval of such associations may be predicated on approval of a request, such as by the user having established the identity confirming the request by a zero-knowledge proof. Access to the established identity by those different devices or users may be governed by similar proofs of knowledge established during the association process, such as by inclusion in a request.

Some embodiments may expose interfaces by which an entity may authenticate user access to an established identity. For example, the entity may request, via one of the interfaces, authentication of the user. The request may include information operable to identify a record of an established identity. The request may also include user supplied proof of secret knowledge for verification of user access to the established identity. In some embodiments, a user, such as via a user device, may request authentication or respond to an authenticate challenge via one of the interfaces (e.g., to provide a proof of identity for physical access, out-of-band authentication, payments, etc.). The interface, in turn, may provide a result for authentication of the user to utilize the identity. In some embodiments, an interface is configured to provide a given result for authentication of a user based upon an earlier authentication result for the same user. In some embodiments, authentication of the user based upon the earlier authentication result may be predicated upon the earlier authentication satisfying criteria for the current authentication request, and that criteria may be specified by an authentication policy. For criteria not satisfied, the user may be requested to provide authentication information. In some embodiments, the entity requesting authentication of the user may be different from an entity for which the earlier authentication result having earlier authenticated that same user, for instance, if within a threshold duration of time. In some embodiments, the subsequent entity may selectively honor earlier authentication decisions based upon whether the earlier authentication applied equal or greater authentication criteria, for instance, if the subsequent entities authentication criteria are a subset of those of the earlier entity, thereby reducing authentication friction for a user relative to systems that request credentials for each entity.

Some of the above-described issues with traditional out-of-band authentication techniques or their incorporation into federated identity management systems are also mitigated by various embodiments described herein. Specifically, various embodiments described herein provide improvements in computer security that mitigate the capture of user supplied credentials from system memory allocated to client-side authentication applications, even in cases where the capture of such credentials is attempted by intercepting inter-process communication on the client device between the client-side authentication application and security infrastructure on the client device. Thus, various embodiments described herein provide improvements in computer security that mitigate highly sophisticated methods for the capture of user supplied credentials, and some of those embodiments incorporate use of and improve upon trusted execution environments, like Secure Enclave, ARM TrustZone, or various other trusted platform modules compliant with ISO/IEC 11889, to provide enhanced client-side security. Moreover, the techniques described in those embodiments for mitigating capture of user supplied credentials on client devices may be implemented in connection with various other embodiments described herein to configure robust identity management systems with authentication processes apt to prevent unauthorized access to identities including federated identities and other secure assets, like protected data, programs, etc., to which those identities are permitted access, even in instances where a nefarious party has access to a device (or multiple devices) of an authorized party.

Embodiments of systems and methods described herein may confer one or more of the aforementioned benefits. Examples of such embodiments may protect user credentials with zero knowledge techniques. For example, some embodiments store or process credential values, private keys, or other data for zero knowledge techniques on a mobile computing device, without that data leaving the mobile computing device. Rather, only representations of credentials, public keys, and the like are transmitted from the mobile computing device for verification or storage by other entities. In some embodiments, credential values, and cryptographic hash values based thereon, or various private cryptographic keys of asymmetric encryption protocols may be stored, for example, exclusively within a trusted execution environment, for instance, in a secure memory of a trusted execution environment implemented with a secure coprocessor that is separate from a central processing unit of the mobile computing device upon which an operating system and native applications of the mobile computing device execute. In some embodiments, the zero knowledge techniques may be applied to prevent even the central processing unit of the mobile computing device from accessing such credentials and keys. In some embodiments, a secure channel (or session) may be established between an application, like an authentication application or other native application (e.g., of a party reliant on user authentication techniques described herein) executing on that central processing unit and the trusted execution environment. In some cases, the secure channel may impede attempts by threat actors to extract cryptographic keys or other credentials by impersonating the trusted execution environment or the authentication application in communications with one or the other of these computational entities. In addition, the secure channel may be a secure session, in that it may be closed (e.g., expire), such as after a predetermined number of communications between the trusted execution environment and the authentication application.

In some embodiments, the mobile computing device is a portable device which a user frequently carries on or near their person throughout the course of their daily activities. Example mobile computing devices may be a smartphone or smartphone-like devices such as phablets or tablets with wireless data access.

Some embodiments may be implemented in a distributed physical architecture that includes client computing devices controlled by diverse entities. In some embodiments, users may operate client computing devices, like a laptop or desktop computer, which a user may use to attempt to log into an online account to access online resources. Other devices may also be suitable for this purpose, such as tablets, netbooks, and the like. A user may input credentials via the client computing device for the online account at a log-in page of a website via a browser or similar log-in interface within a native application. In turn, the client computing device may submit (e.g., in response to a user election to log-in) the credentials (or cryptographic hash values based thereon) to a remote server, which may include, engage, or otherwise participate in an authentication system configured to determine an authentication result indicating whether the user is permitted access to those online resources. For example, the authentication system may verify whether a user can input valid credentials in a zero-knowledge proof governing access to an established identity of the user. Such verification may be provided by a mobile computing device, which may be different from the client computing device, such as by an association of that mobile computing device with an established identity indicated in the access attempt (e.g., for out-of-band authentication). Alternatively, the mobile computing device may attempt access, such as via a native application on the mobile computing device. In either instance, the user may provide proof via the mobile computing device that they have access to one or more secret credential values, private keys, etc. governing access to the established identity without exposing the actual credential values or private keys.

Verification of proof may be achieved by verification of digital signature of data, such as over cryptographic hash values, tokens, etc., with one or more private keys. For example, a private key may be used to sign data and a corresponding public key used to verify the data was signed by the holder of the private key. Further, for example, the data may be a representation of credential values, like a cryptographic hash of credential values, which may be signed within a trusted execution environment of a mobile device (e.g., by a private key retained securely within the environment, which may be a key of a component), and may be verified in a similar fashion. Signing of the data within the trusted execution environment may be indicative of receipt of credential values by a component having an interface with the trusted environment and processing of those values within the trusted environment to determine results, like a representation of the credential values. Signature functions may also use time stamps to indicate a time (e.g., a system time) at which data was signed, such as by including a timestamp in a data string that is signed, or received data to indicate which received data prompted the signature, such as a token value, identifier of a notification, or other data, thereby indicating how recently the signature over a data string was generated or why the signature over a data string was generated. If those credentials are authenticated (i.e., verified), the client computing device is granted access to the online resources provided by the website or the native application. Conversely, if the user inputs invalid credentials, authentication fails (i.e., not verified) and the client computing device or mobile computing device is restricted from access to online resources provided by the website or the native application.

In some embodiments, a remote server engages an authentication service of an authentication system or identity management system. For example, the remote server may transmit the credentials received from the client computing device to an authentication server. Alternatively, in some embodiments, the mobile computing device may transmit credentials to an authentication server. The authentication server may authenticate the credentials, and provide the authentication result (e.g., verified or not verified), such as to the remote server or other requesting entity. The remote server may then grant the client computing device or mobile computing device access to the online resources or restrict access to the online resources based on the result. Thus, in some embodiments, the remote server engages the authenticate service in response to an access attempt, receives a result subsequent to a user authenticating with the authentication service (e.g., with the mobile computing device), and authenticates a mobile device that engages the remote services based on the result. In some embodiments, the remote server may receive a result from the authentication service prior to a first access attempt. For example, a user may pre-authenticate on their mobile computing device with the authentication service. The result may be received by the remote server subsequent to the user authenticating with the authentication service (e.g., with the mobile computing device). Alternatively, in some embodiments where the user initiates the authentication process with the mobile computing device the mobile computing device may receive the result from the authentication service and present the result to the remote server. In some embodiments, a remote device dedicated to authenticating a mobile device based on a result presented by the mobile device or configured to transmit a result presented by the mobile device. Results presented by a mobile device or other computing device may include additional data, signatures of the result, public keys and the like, such as in a given schema for authentication.

In some example embodiments that include configurations where a device requesting authentication, like a mobile computing device engages the authentication server, that device may receive the results from the authentication server, which may be signed by the authentication server. In turn, the mobile computing device may present that results to access a secured asset, whether in an out-of-band authentication process, in-band authentication process, or for other unique applications. For example, the result may be presented by the mobile computing device via a native application, which may be a trusted application within the trusted execution environment, like a wallet-type application configured to provide the result and corresponding identity to which the result pertains to other devices. Examples of those other devices may be door locks, payment terminals, and the like configured for near-field-communications over protocols like Bluetooth, Zigbee, WiFi, etc., and which may be coupled to a network or include a processor, by which such a result received from a mobile computing device may be verified prior to effecting an operation (e.g., unlocking a door, confirming a payment, etc.). In some embodiments, such as those including payment terminals, the results may be structured in a standardized format accepted by those terminals on a given payment service. For example, a user may be authenticated to an account and a result, like a token, corresponding to that account may be provided to the mobile device. Indication of which payment service and the token (an optionally other credentials) may be submitted to the terminal which transmits the data to the payment service for authorization of payment. In some embodiments, token generation may be predicated on account information (e.g., like a credit limit or balance) and confer authorization of payment. Standardized formats for payments include various fields for encrypted data or tokens, such as for one-time-payment authorization, to prevent another transaction being authorized on the same data. In some embodiments, such as those including physical access, the results may be structured in a standardized format for activation of a given mechanism, like an electro-mechanical device, which may include an electromagnet, an electrical motor, a solenoid or other circuit to cause a change in an electromagnetic field to actuate a lock, like driving a pin into or out of a hole, changing a state of an electromagnet adjacent a ferromagnetic plate attached to a door, or the like, (e.g., to access or secure access to an area or receptacle or otherwise interact with a secure asset—like a switch to turn on some device). The electro-mechanical device may include one or more hardware elements like a processor, memory, receiver, transmitter, and the like to receive results for authentication. Some electro-mechanical devices may process the results directly by verification of signature, or transmit the result and receive a response, such as from a server. In either instance, the electro-mechanical device may actuate a mechanism based on a received result.

In some embodiments, an authentication process may occur when a user attempts to access a native application, or more generally, a software asset. In other words, such assets may be secured, and access to those assets may be granted conditionally upon authentication of the user attempting to access the asset. A recent development in an era where network access, such as to the Internet, is prolific, digital rights management (DRM) techniques have been implemented to protect native applications, software assets, and other media from unauthorized access. DRM can include authentication checks that occur at time of access of an asset, periodically (e.g., every few minutes or hours while the asset is being accessed (e.g., read or executed), or continuously such as over a connection with a server while the asset is being accessed, sometime referred to as always-online. Authentication may protect an asset like a native application or feature thereof rather than (or in addition to) a specific online resource. Another example of an asset may be a media file. By way of example, a native application, like a native application for creating 3D models, may require user authentication upon launch (e.g., for a license) to access the application itself (which may require periodic re-authentication), or user authentication may be required for the native application to access an online resource (e.g., a repository of data), like a repository of 3D models. Sometimes both instances of authentication may be required. In either instance, a user may supply credentials (which may differ for each instance) and a remote server (or servers) may determine or receive an authentication result. In the case of the native application requiring user authentication (e.g., upon launch), a remote server may provide the result or data indicative of the result to the native application. In the case where user authentication is required for the native application to access an online resource, a remote server may grant the native application to access the online resource based on the result.

In some embodiments, the authentication process includes one or more authentication steps in addition to verifying the credentials received from the client computing device.

Moreover, in some embodiments, the credentials received from the client computing device need only identify a particular user, identity, account, or other entity. As such, an authentication process may not require any verifying of user credentials received from a specific client computing device. Rather, another client device like a mobile computing device may be prompted to provide credentials (e.g., a zero-knowledge proof). In either instance, based on the received credentials, a server may identify account or user identity information of a user associated with those credentials. In some embodiments, the received credentials include an identifier operable to identify associated user account information or records.

User account information or records may include information about different computing devices used by the user (e.g., including a mobile computing device different from the client computing device attempting to access an online resource). The information about the different computing devices may include one or more identifiers for the respective computing devices. Example of identifiers may include a network address identifier or a monitored address identifier. Example network address identifiers may include one or more of an IMEI number, telephone number, MAC and IP address, or other identifiers suitable to uniquely reference a given computing device. An example of a monitored address identifier may be a location (e.g., on a network) which a given computing device monitors for data published to that location or a key-value pair like a location and an identifier which a given computing device monitors for at that location. In some example embodiments, the monitored address identifier may be an address of a given computing device on a notification network or service, like a push notification network, to which the computing device has registered. In turn, the given computing device may receive data published to that address on the notification service. In some embodiments, a monitored address identifier may be a network address identifier of the computing device.

One or more of the different computing devices, such as a mobile computing device, may have been previously registered with a server via an authentication application. In some embodiments, such a registration process may include the establishment of an identity of a user of the mobile computing device within an identity management system. For example, a mobile computing device may register with the server via an authentication application by downloading the application from the server or an application repository (or application store), executing the application, and performing one or more steps in a registration process (e.g., to establish zero-knowledge proofs). The server may determine which ones of the different computing devices, such as those including the authentication application, are operable to receive a notification of the access attempt to the secure asset. The server may select one of the different computing devices registered with the server and cause a notification, such as a push notification, to be sent to the one of the different computing devices, like a mobile computing device registered as being associated with the user identifier. The server may send a notification such as a push notification over a service like via Firebase Cloud Messaging service, Apple's push notification service, Google Cloud Messaging, or another push notification service to which the different computing device is subscribed. An example of another notification service may be a notification service subscribed to by the authentication application on the different computing device, such as a feed or monitored address, on which the server may push, publish, or otherwise transmit a notification, like a pending transaction indicative of an access attempt. In either instance, the server transmits or otherwise publishes the notification such that one of the different computing devices may receive the notification. In some embodiments, a server or computing node of an authentication system or identity management system performs one or more of these steps in response to receiving credentials operable to identify associated user account information from a remote server or client device. In some embodiments, an authentication service of an authentication system performs one or more of these steps in response to receiving credentials operable to identify associated user account information from the client computing device, such as by a redirection of the client computing device to the authentication server (e.g., by the remote server), or other configuration by which the client computing device may transmit credentials to the authentication server (e.g., via applet or other embedded content, such as within a log-in page, via application, etc.). In some embodiments, an authentication service of an identity management system, such as for federated identities, performs one or more of the above steps, and results of the authentication permitting access to a given secure asset may be applicable to afford access to a variety of other secure assets of different parties (e.g., for a configurable amount of time) to which that user is also permitted to access while authenticated.

In some embodiments, the mobile computing device may execute an authentication application that includes an event handler configured to respond to such a push notification received from a server, such as an authentication server of an authentication system. The event handler of the authentication application may interface with the mobile computing device to present, on the display, one or more user interface elements responsive to the notification. One or more of the user interface elements may be operable to solicit credentials from the user of the mobile computing device, or otherwise execute a process to solicit credentials. For example, the event handler/authentication application may request one or more native applications of the mobile computing device to present user interface elements configured to solicit the additional credentials via one or more interfaces of the mobile computing devices configured to obtain a corresponding credential input from the user. In some embodiments, the native applications selected to solicit credentials are configured to interface with a trusted execution environment of the client computing device, such that those credentials are obtained within the trusted execution environment. Alternatively, or in addition to interfacing with native applications, the authentication application may interface with the trusted execution environment of the mobile computing device to request solicitation of the additional credentials. In either instance, the user may be prompted to provide solicited credentials (or confirm a providing of the credentials) via one or more user interface elements or components and provided credentials may be obtained within the trusted execution environment when supplied by the user. For example, the user may then supply the additional credentials, like a password, pin code, or biometric "print" measurement (like a fingerprint sensor reading, image sensor reading such as a faceprint, an iris reading such as an eyeprint, a voiceprint, or the like). The authentication application may obtain representations of the supplied credentials. Additionally, one or more key-pairs may be generated within the trusted execution environment, private keys generated within the trusted execution environment may be retained securely within the environment while corresponding public keys may be provided as credentials for verification of data signed with the private keys. Additionally, the trusted execution environment or one or more components within the environment may be configured to sign output data (e.g., results) with a private key to indicate that the data was securely collected or processed within the environment. In such instances, corresponding public keys operable to verify those signatures may be provided as credentials. Thus, generally, credentials may include representations of credential values, signatures of data, or public keys operable to verify signatures. Credentials may be output in a data string containing the various signed data, signed data strings, public keys, representations of input credential values, etc. for input into one or more signature verification functions. In turn, the authentication application may transmit the additional credentials obtained from the user to the authentication server of the authentication system.

Thus, for example, access to online resources (or other asset like a native application) from a device may be granted by virtue of a different computing device authenticating with the additional credentials. In practice, for non-nefarious access requests, the user of the computing device is typically the same user as the one requesting access to the online resource with the different computing device, and the supplying of the additional credentials verifies both the user's intent and identity to access the online resources (e.g., such as where access to the online resources is controlled on a per-individual user basis). Other or additional factors may also be considered, examples of which are explained in detail below.

Before or after user input to supply a credential via a mobile device (or other device different from a client computing device requesting access to an online resource), an authentication application may establish a secure channel with a trusted execution environment on the mobile computing device using the techniques described below. The secure channel may be established during a lifetime of a secure session between the authentication application and the trusted execution environment. Should the session expire, such as after a predetermined number of requests or response, a new session may be established to permit communication by secure channel. Supplied credential values, or a cryptographic hash value based thereon, may be obtained within the trusted execution environment. Representations of those credentials may be generated within the trusted execution environment and may be passed through the secure channel to the authentication application. In some embodiments, the trusted execution environment may determine whether supplied credential values match previously obtained credential values stored within the trusted execution environment. For example, the trusted execution environment may determine whether supplied credentials values or a cryptographic hash value corresponding to supplied credential values match a valid credential stored within the trusted execution environment. The valid credentials stored within the trusted execution environment may have been generated during a prior registration process by the authentication application, and representations of the valid credentials may have been provided to the authentication application for transmission to an authentication service or identity management system for establishing an identity during a prior registration process. Representations of valid credentials may be a cryptographic hash or encrypted version of valid credentials or valid credentials and some other value, even though valid credentials may also be cryptographically hashed or encrypted themselves. Only representations may be passed outside of the trusted execution environment such that valid credentials need not be altered to generate new representations (e.g., by changing an encryption key or changing a value operable to alter cryptographic hash output values).

Results may be cryptographically signed with a private encryption key held within the trusted execution environment (e.g. not accessible in the memory address space of the operating system of the mobile computing device in which the authentication and native applications execute, and in some cases not accessible on a memory bus of the central processing unit of the mobile computing device). For example, some embodiments may cryptographically sign (e.g., in the trusted execution environment) various outputs of the trusted execution environment used for authentication (e.g., verification and matching by an authentication system or identity management system). Example outputs may be one or more of a verification results as determined by the mobile device, a representation of a credential value, or other information described herein. For signed data (e.g., a signature of the data using a key, like a private key), the signature may be verified based on the input data and a corresponding key (e.g., the public key corresponding to the private key).

In some embodiments, a server is configured to receive the cryptographically signed data, verify that the cryptographically signed data was signed by an entity (e.g., a specific mobile computing device of a user) with access to a private cryptographic key corresponding to a public cryptographic key associated with the user's account or established identity of the user, and then, determine whether the signed data indicates that the user-supplied credential values match those previously supplied during registration. The server may verify that user-supplied credentials match those previously supplied during registration where the data is a representation of the user-supplied credential (e.g., by virtue of verifying a signature indicative of receipt and processing of credential values corresponding to the representation within the trusted execution environment). In some embodiments, a different cryptographic key pair in an asymmetric encryption protocol, may be applied for each of a plurality of different credentials to generate representations, such as a plurality of different biometric measurements, required by a policy applied in a given authentication process. Alternatively, different representations may be generated using different inputs to a cryptographic hashing function to obfuscate the credential values. In configurations that use credential-specific keys, embodiments may mitigate key distribution issues that arise when an entity (e.g., a company) disables a particular type of credential for accessing an online resource or asset while leaving the others in place. Representations may also be generated in different ways for different ones of parties utilizing an authentication system. Thus, for example, a set of credentials used for a company A may have different representative values than when that same set of credentials are used for a company B. Additionally, in some embodiments, different key may be used for the In some embodiments, a server of an authentication system performs one or more of these steps in response to receiving credentials from a remote server or device of a user to authenticate a same or different device access to a secure asset. In some embodiments, a server of an identity management system performs one or more of these steps in response to receiving credentials from a remote server or device of a user to authenticate a user to an established identity, whereby that identity may be permitted access to a secure asset.

Further, in some cases, embodiments may be implemented with a decentralized computing architecture, for instance, on a blockchain-based computing platform, like Ethereum, Cardano, NEO, hyperledger, or using a similar blockchain-based protocol by which participant entities may be shielded from the risk of a single central authority leveraging a position of power over the computing architecture to their detriment. It should be emphasized that embodiments are not limited to implementations on blockchain-based computing platforms and some embodiments may execute on monolithic, distributed, or non-blockchain-based decentralized physical architectures, none of which is to suggest that any other described feature serves to limit claim scope. In some existing federated authentication systems, the participant entities, i.e., the parties relying on such authentication methods, are to some extent beholden to other participating parties or the authentication system platform, which in some cases may be a single central authority leveraging a position of power (in some cases at the behest of a coalition of other participating entities). Specifically, for example, if party A allows for user account creation based on federated user identities from a party B, at least some aspects governing user of those user accounts is tied to party B's system and continuation of a relationship with party B due to a reliance upon party B for authentication of user access to those accounts. Such configurations can cause issues in instances where party A chooses to discontinue a relationship with party B, or vice versa, because the authentication of at least some user accounts within party A's system is handled by party B. This can also present complications for users. For example, a user may create an account with party B and party B may enable the user to use that account as a federated identity. If the user creates an account with party A utilizing the federated identity supported by party B, this can cause issues in instances where the user chooses to discontinue a relationship with party B, or vice versa, and the user wishes to maintain a relationship with party B because authentication of the user to access the account created with party A may be dependent upon the user maintaining the federated identity with party B that was used for account creation with party A.

In accordance with some example embodiments implemented with a decentralized computing architecture, such as on a blockchain-based computing platform, user identities, authenticating entity identities, and authentication policies thereof, may be committed to a blockchain ledger, in some cases along with time stamped authentication decisions by such entities for such users (e.g., for a given computing device of a user). As a result, authentication decisions may be based on data stored on a blockchain. However, it should be emphasized that embodiments are not limited to implementations on blockchain-based computing platforms and some embodiments may execute on monolithic, distributed, or non-blockchain-based decentralized physical architectures, none of which is to suggest that any other described feature serves to limit claim scope. Those authentication decisions may take into account one or more of the different informational items pertaining to user identifies stored on the blockchain. For example, with respect to a user choosing to discontinue a relationship with some party, information pertaining to the user identity established with that party that is stored on the blockchain may be accessible by other parties. In some cases, the information pertaining to the user identity stored on the blockchain may be operable to authenticate the user even where the user no longer has a relationship a party with which the identify was originally used.

In addition, committing of data to a blockchain may reduce friction for a user utilizing a federated identity, as a prior authentication request or requests and an authentication decision or decisions (along with other data stored in the blockchain) pertaining to the federated identity may be accessible by other parties. For example, in some embodiments, subsequent authentication requests by a user on a recently authenticated computing device (like within the last 15 minutes, an hour, or day) may be serviced by referencing the blockchain ledger to determine whether the computing device was authenticated within a threshold duration of time by another entity with an authentication policy that is equal to, or more stringent than, an authentication policy for the entity receiving the authentication request. Upon determining that these criteria are met, some embodiments may defer to the earlier authentication decision and authenticate the user without requiring the user to resupply at least some authentication credentials. Or in some embodiments, the user may re-authenticate with a subset of authentication criteria, for instance, by supplying a requested biometric authentication factor but not a password authentication factor in virtue of an earlier authentication determination based on a username and password but not based on a biometric measurement.

The re-authentication process may occur in response to a variety of criteria, and that criteria may be defined by the policy specified by an authentication request. For example, considering a given authentication request for an authentication decision subsequent to at least one prior authentication decision, re-authentication may commence for a decision on the given authentication request after a first threshold period corresponding to a prior authentication decision for an authenticated computing device but before a second threshold period of time requiring full authentication, or where one or more prior authentication decisions for an authentication computing device are within a threshold period of time but have less stringent criteria than criteria specified by the given authentication request.

A given authentication request may specify policy for making the authentication decision, which may include criteria such as thresholds for the utilization of prior decisions and criteria for which authentication factors are required. A requested authentication factor may be selected in response to criteria specified by the given authentication request and the criteria associated with the one or more prior authentication decisions. For example, if the criteria specified by the given authentication request specifies some authentication factor not previously provided in association with prior decisions, that factor may be selected. Similarly, an authentication factor may be selected based on that factor not being used in association with prior decisions. Alternatively, if each of the available authentication factors were used previously, the selected authentication factor may be different than at least the authentication factor used in association with the last decision. In some embodiments, selection of an authentication factor for re-authentication may be from a subset of factors that are less intrusive to user experience, like a biometric input or a PIN rather than a lengthy password. In contrast, for an initial or full authentication, a stronger authentication factor (which may be a combination of authentication factors) may be requested, and the stronger authentication factor may optionally be requested along with one or more authentication factors selected from the subset of factors for re-authentication. The criteria and authentication factors of a policy for an authentication decision on a given authentication request may, in some embodiments, be organized into different tiers, e.g., tiers 1-3, where a decision on a tier 1 request may be governed by a policy that is less strict than a policy for a tier 2 request, and so on for the number of tiers used.

In some embodiments, these techniques may be implemented on a distributed and decentralized physical computing architecture. The computing environment may include user computing devices, such as laptop computers, cell phones, wearable computing devices, desktop computers, and the like by which users supply credentials, make request to access resources, and interact with those resources via a network, like the Internet. In some embodiments, these user computing devices may include native applications or web browsers by which the computing resources are accessed. Further, some embodiments may execute a federated identity management client module or application by which different client-side applications coordinate with one another, access authentication-related client-side state, and coordinate with remote computing devices. The computing architecture may further include various collections of servers that expose the various secured resources for which authentication determinations are made.

The computing architecture may also include a collection of computing devices each executing peer compute nodes of a decentralized blockchain-based computing platform that may host a blockchain ledger or other tamper-evident decentralized data structure. In some embodiments, the peer compute nodes may execute a smart contract, for instance, with verifiable computing techniques, for example, by having each computing node execute the code of the script encoding the smart contract and arriving at a consensus (e.g., with Paxos or Raft) regarding a result of the execution. In some embodiments, the smart contract may read and write state on the block chain ledger. In some embodiments, the smart contract may further implement logic by which authentication determinations like those described below are implemented. In some embodiments, the blockchain computing platform may be implemented with the techniques described in whitepapers with the following titles hosted on the hyperleger.org website on the date that the present application is filed: Hyperledger Architecture, Volume 1: Introduction to Hyperledger Business Blockchain Design Philosophy and Consensus; and Hyperledger Architecture, Volume 2: Smart Contracts, each of which is incorporated by reference herein.

In some embodiments, some of authentication credentials may be supplied with zero knowledge techniques, for instance, by which the credential value itself, such as a password or biometric measurement, remains resident on the computing device of the user (i.e., does not leave that computing device) upon being supplied by the user. Some embodiments may input such a credential or value based thereon into a one-way cryptographic function, like a cryptographic hash function, such use SHA 256, and embodiments may supply the output or a value based thereon via a network to a remote computing device that determines whether the user is to be authenticated based on a comparison between the cryptographic hash value and a previously stored cryptographic hash value, for instance, supplied during registration or credential creation based on the same input and hash function. Upon determining that the cryptographic hash values match, the corresponding security criterion may be determined to be have been satisfied by the remote computing device.

FIG. 1A illustrates an example computing environment 100A within which an out-of-band authentication system with a client-side role in out-of-band authentication may be implemented. In some embodiments, the computing environment 100A may include a mobile device 101, a client device 135, a relaying party 145, and an authentication server 155. These components may communicate with one another via a network 121, such as the Internet and various other local area networks. In addition, embodiments of the example computing environment 100A may include a mobile computing client device, such as mobile device 101, that supports client-side out-of-band authentication based on a secure channel to a trusted execution environment.

In some embodiments, the techniques described herein may be implemented within the computing environment 100A (e.g., including each of the illustrated components) shown in FIG. 1A by executing processes described below with reference to FIGS. 3 and 7-11 upon computing devices like those described below with reference to FIG. 12. In some embodiments, computing devices like those described with reference to FIG. 12 may include additional or other components specific to configurations discussed herein. For example, a mobile computing device 101 may include components similar to those described with reference to FIG. 12 that support the client execution environment 113 and additional components supporting a trusted execution environment 103, which may include a subset of like components (e.g., processor, memory, bus, etc.) configured to perform operations of the trusted execution environment. Similarly, client devices 135, server 145, 155, and repositories 160, 165 may include some additional or other components than those illustrated in FIG. 12. However, each of these devices may operate in accordance with principles similar to those discussed below and with reference to FIG. 12, such as by loading instructions and other data into a memory and executing those instructions by a processor to perform various operations.

The mobile device 101 may be a mobile computing client device to which a user has access to and may use to authenticate a request to access a secure asset like online resources. Notably, as is often the case, the request to access online resources may not originate from the mobile device 101. Rather, the mobile device 101 serves a client-side role in an out-of-band authentication process for that request to access online resources. By way of example, the request to access online resources may originate from a different client device, such as client device 135. A common context for the above scenario might include an employee using a work or personal computer (e.g., a laptop or desktop computer), represented by client device 135, to request access to online resources (e.g., a web application) hosted on a server by their employer, and using a work or personal mobile device (e.g., a smartphone or tablet), represented by mobile device 101, to provide data used to authenticate the request to access the online resources.

Accordingly, while the mobile device 101 may be any client device, the mobile device may optionally include a trusted execution environment which, in some cases, may be an external, portable device capable of being coupled via a bus, like USB, to any client device including a suitable interface. Example devices including highly portable smartphones and tablet type devices carried by users during their day-to-day activities are common representative embodiments. Moreover, smartphone and tablet type devices, given their portability, are more likely to include integration of trusted execution environments for purposes beyond out-of-band authentication, such as for secure payments, digital currency wallets, and the like. The above should not be construed to rule out other portable mobile computing devices, such as wearables, like watches or bracelets, that as they become more prevalent may be as equally suited as a smartphone or tablet device to collect credentials from users. For example, some of those wearable devices are operable to collect different user credential inputs which may be used for authentication processes. In fact, devices such as wearables, may be suitable to reduce intrusion on users while providing robust out-of-band authentication.

Generally, embodiments of a trusted execution environment 103 may include any isolated execution environment, which may run in parallel with a client execution environment 113 (CEE). Compared to a user-facing client execution environment 113, which may execute the mobile device operating system and most user-facing mobile applications, the trusted execution environment 103 is more secure and may execute a subset of specific applications (e.g., applications, services, or software modules) on the mobile device, like trusted applications or modules for authentication operations, which may include user authentication, payments, digital rights management, and the like. Some of those authentication operations may be performed in an out-of-band authentication process, such as for granting user access to online resources and other assets, payments, digital rights management, and the like. Additionally, the trusted execution environment 103 may store within or cryptographically sign data associated with those applications or modules within the trusted execution environment, such as to protect the data from being tampered with, read, or modified by an unauthorized entity.

In some embodiments, the trusted execution environment 103 may perform one or more operations responsive to requests received at an interface by which one or more applications within a user-facing client execution environment 113 may request data from or provide data to the trusted execution environment, such as to use one or more of the modules within the trusted execution environment 103 for authentication operations. Thus, in some embodiments, a client execution environment 113 may include an application programming interface (API) by which those requests are communicated from the CEE 113 to the TEE 103, and responses thereto are communicated from the TEE 103 to the CEE 113. In some embodiments, the TEE 103 may include an API like that above for facilitating the above communication of data, or may additionally include another API (e.g., in addition to either aforementioned API) or secure operating system for facilitating communication of data between elements within the TEE 103. Thus, for example, once the TEE 103 receives a request or other data for processing, that data can be processed exclusively within the TEE. The structure of the trusted execution environment 103 may be logical, implemented in hardware, or a mix of both.

Some embodiments of the trusted execution environment 103 may include a TEE co-processor 105 and TEE memory 107, which may be physically separate from the processor 115 and memory 117 of the client execution environment. For example, some implementation of the TEE memory 107 may include a physically distinct memory address bus from the main processor 115, but which is coupled to the TEE co-processor 105 to support secure communications between them. This is not to suggest that both the co-processor 105/processor 115 or TEE memory 107/memory 117 may not be incorporated in a same package or die or that the co-processor 105 or TEE memory 107 cannot make use of at least some or all of the capabilities of the processor 115 or memory 117 in a secure fashion. In some examples, embodiments of the trusted execution environment 103 may include a TEE co-processor 105 or TEE memory 107 which can be physically separate from but have available the full processing power of the processor 115 or memory 117 of the client execution environment 113. In some embodiments, the TEE co-processor 105 or TEE memory 107 are partially or wholly logically separate, such as by way of a reserved or additional processing core or reserved address space. For example, embodiments of the trusted execution environment 103 may include a TEE co-processor 105 or TEE memory 107, which are logically separated from the processor 115 and memory 117 of the client execution environment, such as by cryptographic isolation of one or more processes, threads, processing cores, or address space, or as secure elements within respective components. Within the trusted execution environment 103, the different trusted applications or modules may also be isolated from one another, such as by cryptographic isolation or other software isolation techniques.

Oftentimes, the trusted execution environment 103 includes at least one keyed hardware component. Keyed hardware components can include a unique cryptographic key or keys for isolating trusted applications or data within the trusted execution environment or to otherwise prevent tampering from the client execution environment 113 or other entity. Keyed hardware components can be substantially tamperproof. For example, the design of the keyed hardware component can be immune to software attacks, and an attacker might have to go to exceptional lengths in physically examining the keyed hardware component (e.g., with highly specialized tools) to even possibly be able to read the key. In some cases, the key may even be stored in a memory configured such that attempts to read the key of the hardware component is destructive to the memory (e.g., causes stored values to change or the memory to change stored values). Thus, under even the most extreme of circumstances, the keyed hardware components can be configured to prevent divulging of their key or keys.

In some embodiments, one or more components operable to solicit credentials from a user may be configured to communicate with the TEE co-processor 105 or memory 117 in ways similar to those described above to provide enhanced security. For example, one or more of the components operable to solicit credentials may be logically or physically isolated from the CEE 113 to support secure communications with the TEE 103. For example, one or more of those components may be physically isolated by couplings through a system bus different from a main system bus. The isolation may also be logical, such as by cryptographic isolation, which may use keys associated with those hardware components operable to solicit credentials. Accordingly, data communications by one or more of those components that is secured by one or more cryptographic keys may, in some configurations, logically flow through or be accessible from the CEE 113 and still be considered isolated as the TEE 103 securely stores a key operable to decrypt the data and that key is not accessible by the CEE 113. As an example, the memory 117 of the TEE 103 may securely store one or more keys operable to decrypt information received from the respective components. In some cases, isolation of one or more components may only be partial, such as where the component also serves a function with the CEE 113. For example, a given component may communicate securely via a separate system bus, cryptographic isolation, or in another secure way (e.g., on a request/response path between the TEE and component) described herein for communications pertaining to the TEE 103 and in an unsecured fashion via a main system bus or without encryption for communications pertaining to the CEE 113.

In some embodiments, the trusted execution environment 103, with the TEE co-processor 105, may execute a process to generate or otherwise store one or more encryption keys 108, which may include one or more keys from a key-pair, such as a pairing of a private encryption key and a public encryption key. One or more generated keys 108, such as generated private keys, may be protected within the trusted execution environment, such as within the TEE memory 107. For example, generated private keys may be isolated from trusted applications within the trusted execution environment by cryptographic isolation. In some embodiments, generated private keys may be encrypted (e.g., for storage) based a cryptographic key of a hardware component, such as a key of one of the TEE co-processor 105 or component associated with the TEE co-processor 104, so that only the TEE co-processor 105 can use a generated private key. For example, a process of the TEE co-processor 105 may access an encrypted version of the generated private key stored within the TEE memory 107 and then decrypt the encrypted version of the generated private key based on a cryptographic key of the hardware component prior to another process utilizing the private key). In this way, a generated private key may be afforded a substantially similar degree of security as that of a cryptograph key of the hardware component. In other words, a malicious actor must cause the hardware component to divulge a key for decrypting an encrypted version of the generated private key prior to being able to use the generated private key (e.g., for a signature). Similarly, the TEE co-processor 105 may encrypt other data stored within the trusted execution environment, either with a generated key, received key, a cryptographic key of a hardware component, or combination thereof. Likewise, the TEE co-processor 105 may decrypt other data, such by decrypting that data with a generated key, received key, a cryptographic key of a hardware component, or combination thereof (such as in instances where some data is encrypted based on a generated private key and stored subsequent to further encryption based on a cryptographic key of a hardware component).

In some embodiments, the TEE 103 may be configured to isolate different data within the TEE 103. For example, some embodiments of the TEE 103 may encrypt different data (e.g., different keys or other data associated with different applications or modules) based on a function that takes as input a cryptographic key, such as a key 108 in TEE memory 107, (which may be a generated key, hardware key, or other stored key) and a value that is altered for the different data. Alternatively, the cryptographic key itself may differ for different data, for example, a function may take as input a cryptographic key of a hardware component and a value that is altered to generate different cryptographic keys for different data. In turn, a function may use different cryptographic keys to encrypt different data within the TEE 103. The value that is altered may be altered deterministically, selected deterministically, generated randomly, output from a linear shift register, or by other method, and the alteration of the value ensures that one module or application within the TEE 103 cannot use a key or data stored within the TEE memory 107 to which it is not authorized.

In contrast to a generated private key of a key pair, which may be maintained solely within the trusted execution environment 103, a public key of the key pair may be shared by the trusted execution environment 103 with the client execution environment 113. Elements outside the trusted execution environment 103 may use the public key of the key pair to encrypt data, which can then only be decrypted with the private key stored within the TEE 103. Similarly, the TEE may sign results or other data output with a function utilizing a private key of a key pair, stored within the TEE 103, and an element outside the TEE 103 may use a disseminated public key of the key pair to verify the signature, and thus verify that the result or other data output was generated by the TEE 103. Thus, for example, the trusted execution environment 103 may execute a process to sign some data with a private encryption key, and a disseminated public encryption key can used to verify that the trusted execution environment 103 signed the data. In the context of authentication, the data may be a credential value or a cryptographic hash value of the credential value and representative of a user authenticating a request to access online resources.

In some embodiments, the TEE 103 and CEE 113 communicate information by way of one or more application programming interfaces, such as an API 104. Some embodiments of the API 104 are implemented in or by firmware stored to non-volatile memory of the mobile device 101, which can sometimes be a memory space separate from the TEE Memory 107 or Memory 117 and specify underlying functions available to the CEE 113 for communicating with the TEE 103 (e.g., like a Basic Input/Output System "BIOS"). Some embodiments of the API 104 may include one or more drivers to facilitate communications with hardware components, such as of the CEE 113 or TEE 103. In some embodiments, the API 104 and drivers may be considered separate, but may be layered, like in a stack, whereby the API 104 provides higher level functions and the drivers facilitate operations associated with those functions. Different configurations may include the example API 104 or other elements supporting API functionality, like drivers, in different locations. Some embodiments may include the API 104 within the CEE 113, within the TEE 103, within an element having a physical interface with the TEE 103 or CEE 113, in firmware of the mobile device 101 (e.g., in a BIOS), or combination thereof. Some embodiments of the TEE 103 may include a monitor to monitor a system bus for requests from an API 104 (or driver). Oftentimes, the location of the API 104, drivers, or other elements depends on the physical or logical structure of the TEE and CEE, which can vary between different implementations. However, regardless of the specific implementation, an API 104 may be configured to provide an interface by which at least some data or results determined within the TEE 103 may be passed to the CEE 113 and by which at least some functions performed within the TEE 103 may be requested by the CEE 113. Further, requests for at least some of those functions may include data or arguments for performing at least some of those functions on the data.

An example API, such as API 104, may be configured to receive requests from elements (e.g., a given application, module or interface) within the CEE 113 and communicate those requests to an appropriate element (e.g., a given application, module, or interface) within the TEE 103. In some embodiments, the API 104 translates a received request from a schema compatible with the CEE 113 to a schema compatible with the TEE 103. In some cases, that may include translating a request in one schema into multiple lower-level requests in another schema. In some embodiments, the API 104 may communicate one or more requests in a schema compatible with the TEE 103 over a system bus, which the TEE 103 may include an interface or monitor to detect those requests for processing within the TEE 103. Example requests may include a request to generate a cryptographic key or key pair, solicit credentials, verify credentials, or otherwise perform a function provided within the TEE 103, such as the various operations of the TEE described herein. In turn, one or more elements within the TEE 103 may process a request and optionally return a result of processing the request to the API 104. In some embodiments, the TEE 103 processes a received request in a schema compatible with the TEE 103 and returns result according to that schema. For example, the TEE 103 may include an interface or monitor to provide results back to the API 104, such as over a system bus. The API 104 may translate results received from the TEE 103 into a schema compatible with the CEE 113. In some cases, that may include receiving multiple results from the TEE 103, some of which may be used in subsequent requests to the TEE 103, prior to returning a result in a schema compatible with the CEE 113 in response to a request received from the CEE. The API 104, in turn, may communicate a result to an element having initiated a request or other specified element.

In some embodiments, one or more elements within the TEE 103 may communicate with one or more elements within the CEE 113 via the API 104 over a secure channel. In some embodiments, the secure channel substantially protects communication sessions between the authentication application 120 and the TEE 103. More specifically, a secure channel prevents other applications, like native applications 125, from accessing data communicated between the authentication application 120 and the TEE 103 in a communication session. In some embodiments, different ones of the native applications 125 may also communication with the TEE 103 over a secure channel such that other applications cannot access the communicated data. In some embodiments, the secure channel extends to communication sessions within the TEE 103. For example, the secure channel may protect communications between a trusted application or module within the TEE 103 and the API 104 such that other trusted applications or modules within the TEE 103 are prevented from accessing data communicated between the authentication application 120 and the trusted application or module which the communication session was established via the API 104.

Cryptographic systems (like those discussed above for encrypting data) generally rely on cryptographic algorithms based on mathematic problems for which there currently exist no efficient solution. The use of asymmetric encryption algorithms, like those utilizing key exchanges, can afford secure communications without requiring a secure channel. One example of such an asymmetric encryption algorithm generates a key-pair for an entity, where a first key of the key-pair is a private key (e.g., held securely by the entity) operable to decrypt data encrypted with a second key of the key-pair and the second key is a public key made available to other entities for encrypting data to be transmitted to the entity having the private key. However, such asymmetric encryption algorithms are computationally intensive and inefficient for high frequency communications or communications of increasing data size. Thus, in many instances, it is preferable to communicate securely, but also efficiently, such as over a secure channel, using symmetric encryption algorithms that are less computationally intensive than asymmetric ones. The secure channel may be initiated utilizing asymmetric encryption to encrypt and pass an identifier or session key that may subsequently be used as a symmetric key or basis therefor in asymmetric encryption algorithms. In some embodiments, an asymmetric key, like a public key, may be used to encrypt an identifier (e.g., by a first entity). The encrypted identifier, in turn, can be decrypted with a private key (e.g., by a second entity) corresponding to the public key and the second entity may return a secure channel to the first entity for a communication session utilizing a shared (e.g., symmetric) encryption key. Additionally, the secure channel may be bound to the identifier such that keys or data created in sessions over the secure channel are not accessible from other application sessions.

In addition to the trusted execution environment 103, the mobile device 101 includes a client execution environment 113. The client execution environment 113 may include a processer 115 and memory 117 configured to perform operations within the client execution environment. For example, the client execution environment 113 may include an operating system (not shown) and one or more applications. Some of the applications may be native applications 125, which generally, are developed for use on a particular platform or device, such as the mobile device 101. Thus, for example, a native application 125 may be loaded into memory 117 and executed by the processor 115 within the client execution environment 113.

One or more of these native applications 125 may be configured to provide services such as notification services, and optionally generate elements within a user interface on the mobile device 101 in response to the receipt of a notification. In addition, some of these native applications 125 may detect, collect, or otherwise support user inputs, such as a selection of a user interface element, and cause an operation corresponding to the selection. In some cases, a native application 125 may prompt the user to provide a specific input in response to the receipt of a notification. In other cases, a native application 125 may evaluate continuously provided inputs (such as from a biometric sensor) in response to the receipt of a notification. In some example embodiments, a native application 125 may evaluate, prompt, or otherwise obtain multiple different user inputs. In either case, example native applications 125 may interface with (or provide an interface on) one or more different components of the mobile device 101 or communicatively coupled devices, such as fingerprint sensors, image sensors, display of software or interface with hardware keyboards, etc. as well as other types of components or biometric sensor devices operable to obtain corresponding user input types. In some embodiments, the TEE 103 may interface via an API with such native applications 135 to securely collect input credentials.

Examples of user input can include selection of one or more characters or digits on a keyboard (e.g., displayed within an interface on a screen of the device or coupled to the device) and receipt of selected characters or digits, which may correspond to a personal identification number, password, or other keyed input. Other similar examples may include input/selection of a pattern or other combination of user interface elements on a screen. Further examples of user input can include selection of a user interface element to capture an external input indicated by the element, such as inputs pertaining to the user, which may include image data from an image sensor or other sensor, like a finger print sensor, or other biometric sensor operable to collect biometric input pertaining to the user when the user interacts with the sensor. User input may not be explicit, but rather involve detection of and capturing the input, such as by requesting the user position their face or component performing facial recognition in a position that enables capture of the input. In some embodiments, a native application 125 may communicate with one or more external devices to capture external input, like a wearable device comprising one or more biometric sensors operable to collect biometric input pertaining to the user when the user interacts with the sensor. In some embodiments, some types of biometric input (e.g., heart rhythm, blood pressure, body temperature, etc.) may be evaluated on a continual basis or for a trailing duration of time from a current time of notification where those biometric inputs may be individually or a collection thereof indicative of a particular user after a sufficient period of time; and other types of biometric input (e.g., facial image, fingerprint, eyeprint, etc.) may be evaluated upon receiving particular sensor input requested from the user that are indicative of a particular user at time of collection.

Some example native applications 125 may interface, via the API 104, with the TEE 103 to securely collect and subsequently store, in the TEE 103, various ones of valid representations of user credentials 109 for authenticating user input received from the various ones of the native applications. In some embodiments, the secure collection includes one or more secure communications between the TEE 103 and a component operable to collect the credential, and that process may be initiated by a native application 125 through a request to the API 104. In turn, a user may establish valid representations of different user credentials 109 when setting up their mobile device 101 upon purchase, activation, or update thereof, such as by inputting a password, setting up a faceprint, fingerprint, eyeprint, etc. or otherwise setting up or permitting different types of credentials for protecting data on the mobile device 101. In many cases, an operating system of the mobile device 101 or various ones of the native applications 125 request that a user input various credentials during set-up the device or upon installation or use of the application. Accordingly, one or more valid representations of user credentials 109 may be established or updated within the TEE 103. As described above, the user credentials 109 as they pertain to different applications may be isolated within the TEE 103. Thus, storage of a valid credential may be specific to a given application (e.g., by encryption with a key different from other keys for other applications), even where the credential itself may be the same for some other applications.

Similarly, a native application 125 or operating system of the mobile device 101 may interface, via the API 104, with the TEE 103 to securely authenticate a user based on the user providing input that matches a valid representation of a corresponding credential 109. In some embodiments, the authentication includes one or more secure communications between the TEE 103 and a component operable to collect the credential to receive user input for the credential within the TEE, and that process may be initiated by a native application 125 through a request to the API 104. The received user input may be processed within the TEE 103 for a comparison to a valid representation of the corresponding credential 109 and the native application 125, via the API 104, may receive a result indicating whether the user was authenticated based on the user input. As described above, the user credentials 109 as they pertain to different applications may be isolated within the TEE 103. Thus, authentication of user input with a valid credential may be specific to a given application (e.g., by encryption with a key different from other keys for other applications), even where the credential itself may be the same for some other applications.

In some embodiments, use of one or more of those credentials may be subject to policies implemented by an authorization server 155 providing authentication services or relying party 145 providing access to secured assets, such as online resources, subject to authentication by the authentication service. For example, the authentication server 155 or relying party 145 may accept or deny use of the different ones of the user credentials 109 or specify requirements for acceptance of different ones of the user credentials 109 for authentication for different secure assets. As an example, passwords not meeting certain criteria (e.g., length, randomness, number of unique characters, etc.) specified by a policy to access a given secure asset may be denied. As a result, the user may choose to establish new credentials 109 meeting the policy or a different credential 109 (e.g., of a different type) that meets criteria of the policy may be used. In another specific example, a policy for accessing a given secure asset may dictate that facial recognition credentials may be denied for a subset of mobile device 101 models, brands, or operating systems that are determined to provide insufficient results in securing the device against attack methods (e.g., are easily thwarted by a printed picture or model of a user's face). As a result, for users of devices belonging to that subset of mobile devices, different credentials 109 that meet criteria of the policy may be used.

In some embodiments, an example native application 125 provides a native notification service configured to post or store received notifications (e.g., to a location in memory 117) such that other applications may detect receipt of a notification to which that application pertains. For example, a native notification application may post a received notification (e.g., in a location in memory) such that an authentication application 120 may automatically detect and subsequently access the notification. The native application may generate a user interface element alerting the user of receipt of the notification. In turn, selection of the user interface element may call or launch the authentication application 120, which may then access the notification. Alternatively, the authentication application 120 may detect or otherwise receive the notification and generate a user interface element alerting the user of receipt of the notification. Specific implementation may vary depending on mobile device 101 capabilities, such as by operating system version or type, available notification services, and the like.

In some embodiments, a native application 125 providing a notification service, such as Firebase Cloud Messaging service, Apple's push notification service, Google Cloud Messaging, etc., may receive a notification on the service, such as push notification, and post the notification to a location in memory 117. One or more other applications (either within the client execution environment 113 or the trusted execution environment 103) may monitor that location in memory 117 for posted notifications. The one or more applications may be configured to identify posted notification to which they pertain, and in turn, perform one or more actions in response to the notification and any data which the notification includes. In some embodiments, a notification service posts notifications for different ones of the applications to different locations in memory 117, such as to different locations specified for the different ones of the applications or different locations specified by the different ones of the applications. In some embodiments, a notification service, in response to receiving a notification, passes the notification or a location in memory 117 of the notification to the application to which the notification pertains.

In some embodiments, a native application 125, like an authentication application 120, may include a module, like an event handler, configured to provide notification service capability when executed on the mobile device 101. In some embodiments, the module may be provided separately, such as in a lightweight companion application to the authentication application 120, depending on the configuration on the client execution environment 113. In either instance, the module may be configured to provide notification service capability when loaded into memory 117 and executed by the processor 115 as a background service or process within the client execution environment 113. In turn, the module configured to provide notification service capability may receive notifications from the network 121 by subscription of the module or mobile device 101 to a notification service. For example, the module may monitor a port of the mobile device 101 configured to receive data from the network 121 and identify notifications received at the port, such as based on header information (e.g., sender/recipient information) of one or more data packets containing notification data. In response to identifying a notification, the module may post the notification to a location in memory 117 or otherwise provide the notification to the authentication application 120 by a process like one of the processes described above in terms of a native notification service. Similarly, a native notification service may monitor a port of the mobile device 101 to identify notifications received at the port from the network in a fashion similar to that described above.

Different embodiments may rely on one or more of the different example notification service implementations described herein. For example, in some embodiments, a native notification service executing on the mobile device 101 may receive a push notification pertaining to the authentication application 120 on a notification service to which the mobile device 101 or notification service are subscribed and post the push notification to a location in memory 117. The authentication application 120 may monitor the location in memory 117 for posted notifications that pertain to the authentication application and, in turn, access the push notification posted by the notification service. In some embodiments, the authentication application 120 includes a module configured to monitor for posted notifications. In some embodiments, the module may be provided separately, such as in a lightweight companion application to the authentication application 120, depending on the configuration on the client execution environment 113. In either instance, the module may be configured to monitor for posted notifications pertaining to the authentication application 120 when the module is loaded into memory 117 and executed by the processor 115 as a background service or process within the client execution environment 113. In another example, in some embodiments, the native notification service may receive a push notification pertaining to the authentication application 120 on a notification service to which the mobile device 101 or notification service are subscribed and pass the notification, or information indicative of a location in memory 117 thereof, to the authentication application 120. The authentication application 120, in turn, may receive the notification or retrieve the notification.

Depending on the embodiment, the mobile device 101 may receive push notifications pertaining to an authentication application 120 following one or more of a user's attempt to access a secure asset. For example, a user may attempt to access (e.g., log on to) an internal website by supplying a username (and optionally a password) to that website, access an online or installed application with another device, make a payment with a credit card or other means, attempt a firmware/software update (e.g., code signing), access other accounts and resources (e.g., consumer across banking, finance, shared credential use, etc.), access shared employee solutions like payment portals, stock or other market trading, etc., download a secured file or other data, open a secured program or file therewith, and the like. More generally, a push notification pertaining to the authentication application 120 may be received by the mobile device 101 following a user's attempt to access or modify a secured asset (e.g., an online resource) via a client computing device. Often, such access attempts are performed with a client computing device other than the mobile device 101 and, as such, the notification causes authentication application 120 to prompt the user of the mobile device 101 to provide credentials for out-of-band authentication of the access attempt. Notably, the secured asset need not be an online resource or necessarily correspond to an access attempt from a client computing device different from the mobile device 101. For example, the secured asset may be a secured program or file on either another client computing device or the mobile computing device. In implementations where the secured asset is a resource that may be accessed offline, there may exist a reasonable expectation that devices that typically access the asset include or can obtain network 121 access such that an authenticating entity may be notified of a user's attempt to access the asset, like a secured program of file stored on the device. In some cases, the secured asset may not require authentication upon every access attempt, but rather require authentication when a network connection 121 exists or require authentication after a period of time, like 1-30 days. In the case of a device accessing secured assets that correspond to online resources, e.g., over a network 121, such access is inherent.

The authentication application 120 may be an application, like a native application 125, configured to execute within the CEE 113. The authentication application 120, like other native application applications 125, may be downloaded to the mobile device 101 and subsequently installed, such as by a user of the mobile device 101. Alternatively, the authentication application and one or more other applications, like some other native applications 125, may be preloaded on the mobile device 101 or included in an operating system of the mobile device.

Once installed on the mobile device 101, the authentication application 120 may be loaded into memory 117 and executed by the processer 115 within the client execution environment 113 to perform one or more of the operations described herein. In some embodiments, the authentication application 120, when executed by the processor 115, includes a registration process that is executed to register the authentication application 120 with a server (e.g., server 145 or server 155). During the registration process, the authentication application 120 may communicate or otherwise establish identifying information about the user and the mobile device 101 with the server. Example communicated information and data may include one or more keys 108, a digital signature of data based on a key 108, cryptographic hashes of credentials 109 or other user or device 101 specific information and data stored within the TEE 103. Example communicated information may also include information about notification services available to the authentication application 120 for receiving notifications pertaining to requests for authentication of a user through the authentication application. Example communicated information may further include one or more preferences or setting pertaining to credentials the mobile device 101 is operable to or configured to obtain (e.g., directly or from a wearable or other device) or credentials the user is willing to use (e.g., password, faceprint, fingerprint, etc.). Example communicated information may further include policy information governing use of different credentials and properties thereof. Policy information may be stored on the mobile device 101 or the server. Policy information may be updated for different secured assets.

In some embodiments the authentication application 120 includes one or more modules, such as an event handler, which may be loaded into memory 117 and executed by the processor 115 as a background service. In some embodiments one or more of those modules, such as the event handler, or other functions ascribed to the authentication application 120, may be included in or as separate companion applications that are executed (e.g., as background services) to provide similar functionality.

The authentication application 120, as described above, may be configured to detect or otherwise receive notifications pertaining to a user's attempt to access a secured asset, such as an online resource. In many cases, the access attempt is initiated from a device different from the mobile device 101, such as via a client device 135.

In response to such a notification, the authentication application 120 may be configured to interface with the TEE 103, such as via the API 104. The authentication application 120 may also be configured to interface with one or more native applications 125. For example, the authentication application 120 may query the API 104 or a native application 125 to solicit or otherwise collect a credential input from a user. In turn, the authentication application 120 interfaces with the TEE 103 to obtain a result for the credential input by the user. The credential input, whether biometric, pin, alphanumeric password or other, is processed within the TEE 103 to determine a result. The TEE 103 may process the credential input responsive to one or more requests or commands received from the authentication application 120 via the API 104. to the TEE of the mobile device. In some cases, the result may include an indication of whether the input credential matches a stored valid representation of the credential 109 or does not match the stored credential. If the input credential matches the valid representation within the TEE 103, the result may be cryptographically signed within the TEE 103 and transmitted to the server. In turn, the server may verify the result responsive to the signature indicating the user authenticated with the device 101. In some cases, the result may include a cryptographically signed input credential or hash (which may be a cryptographic hash) thereof for remote matching and verification by the server. For example, the TEE 103 may sign a cryptographic hash of the input credential within the TEE 103. The TEE 103 may output data, such as a representation of the input credential and identifying data for the notification for which the credential was collected, and signed data, where the signed data may be a signature of a data string comprising the input credential and the identifying information for the notification. The server may receive the result and may compare a cryptographically hashed input credential from the output data to a valid representation of the credential, where the valid representation of the credential was hashed with a same cryptographic hash function, in addition to verifying a signature, such as with a public key received in a prior registration process. Thus, the authentication application 120 may transmit a given result received from the TEE 103 to a server in accordance with the different implementations described herein. In cases where the input credential does not match the stored credential, solicitation or collection of credential input may be performed again, as described above. In the case of remote verification failure, a subsequent notification may be received and processed by the authentication application 120.

The authentication application 120 may be configured to establish a session defining a secure channel with the TEE 103 to protect data communications between the authentication application and the TEE. For example, the authentication application 120 may be configured to generate an identifier and provide the identifier to the TEE 103, such as via the API 104. The identifier may be tied to the authentication application 120, determined at random, selected deterministically (e.g., based on a register value, system time, etc.), or a combination thereof, such as concatenation of an identifier tied to the authentication application 120 and a current system time. Further, the identifier may be determined by a processing of the data described above, such as by input of the data into a cryptographic hashing function or key generation algorithm to generate the identifier. In turn, the TEE 103 may return a session bound to the identifier such that other applications cannot access data transmitted between the authentication application 120 and the TEE 103, which can include data created during the session. The data created and transmitted during the session may include one or more keys, results, or other requests and responses generated during the session. For example, during a session, the user may establish one or more credentials 109 in TEE memory 107 for use with the authentication application 120. The established credentials 109 may include cryptographic hashes or other ciphertext of credential values whether biometric or alphanumeric, such that those representations may be passed to a sever, like authentication server 155, for authentication operations without divulging actual credential values. In addition, or alternatively, the established credentials 109 may include unique signature information from the TEE 103 (such as a public key) that is passed to the authentication server 155 such that signed data (with a corresponding private key) output by the TEE can be verified as originating from the TEE.

The authentication application 120 may receive credentials 116 (e.g., public keys and representations of credentials) like those described above from the TEE 103 for out-of-band authentication operations. Those credentials 116 received by the authentication application 120 may be stored in memory 117 within the CEE 113 and transmitted to a server without divulging actual credential values, as they are representative of credential values protected within the TEE. The authentication application 120 may verify they originated from the TEE (e.g., verification of signed data output by the TEE), and pass the credentials to a server, like the authentication server 155. One or more of the credentials may be passed in a registration process with a server, like authentication server 155, or in response to a received notification. For example, in a registration process, the authentication application 120 may be configured to pass signature information to the server such that received data can be verified as originating from the TEE 103 and one or more representations of credentials for different credential input options may also be passed. During an authentication process, such as in response to receipt of a notification requesting the user to authenticate via one or more different credential input options, the authentication application 120 may pass data and signed data received from the TEE 103 to the server for verification. In some embodiments, the authentication application 120 may request the TEE 103 output signed data with a timestamp or include identifying information associated with a particular notification such that signed data may be considered valid for a particular notification or at a particular point in time to prohibit reuse. In other words, the server may check that 1) a timestamp or other identifying information associated with a notification matches a transmitted notification, 2) a representation of a credential in output data matches a stored representation (e.g., one stored by the server during a registration process), and 3) signed data, which may be a signature of an output data string of (1) and (2), e.g., {representation, notification ID or timestamp}, is verifiable by a public key provided by the TEE during a registration process. The verification process indicating that (1) and (2) were provided by the TEE 103 as only the TEE stores the private key operable to generate signed data verifiable by the data, organized into the string, and the corresponding public key. In some embodiments, the identifying information for a particular notification may include a particular location or address (e.g., IP address and port number, identifier on a notification service, etc.) to which the authentication application 120 should transmit output data and signed data. In some embodiments, the location or address may be specific to the notification and the authentication application 120 may request signed output data including the location or address specified by the notification to further inhibit possible reuse.

In some embodiments, a session received by the authentication application 120 from the TEE 103 may be in a state that requires registration, such as upon initially executing the authentication application as described above, or a state to continue communications. In the state to continue communications, establishment of the secure channel may be predicated upon the user (and optionally the authentication application itself) successfully authenticating based upon past credentials or deterministic values.

In the registration state, the authentication application 120 may be configured to execute a key exchange process with the TEE 103 to initialize a session. For example, the authentication application 120 may provide an identifier to the TEE 103, and the TEE may return a shared key by which the authentication application 120 and TEE 103 can securely exchange data over a channel for the duration of the session. In some embodiments, the shared key generated by the TEE 103 is based on the identifier. The authentication application 120 may be configured to verify that the shared key was generated within the TEE 103, such as by verifying a signature of the TEE. In another example, the authentication application 120 may request a public key of a key pair from the TEE 103. The authentication application 120 may be configured to verify that the public key was generated within the TEE 103, such as by verifying a signature provided by the TEE. In turn, the authentication application 120 may encrypt information with the public key for transmission to the TEE 103. For example, the authentication application 120 may provide the identifier encrypted with the public key in a transmission to the TEE 103, and the identifier may serve as a shared key for encrypted data transmitted during the session. In some embodiments, the identifier may be a public key of a key pair, and the TEE 103 may return a shared key to the authentication application 120, encrypted with the identifier (public key), and the authentication application may decrypt the shared key with the corresponding private key of the key pair to determine the shared key value. The authentication application 120 may determine that any keys or other data received from the TEE 103 were generated within the TEE by the verification of a signature of the data received from the TEE 103. With a shared key established, the authentication application 120 may transmit data to the TEE 103 either by encryption with a public key provided by the TEE 103 or by a shared key.

In some embodiments, the authentication application 120 is configured to interface with the TEE 103 to establish one or more valid credentials 109 for the user within the TEE. The process may occur subsequent to the establishment of a secure channel with the TEE. Some of those credentials 109 may already exist within the TEE 103, such as those previously established by the user, and which the TEE may store for authentication of the user when utilizing the authentication application 120. Those credentials stored for utilization with the authentication application 120 may be encrypted or cryptographically hashed to produce representative values. The representations may even differ for different relying parties utilizing the authentication system. For example, the authentication application 120 may be configured to register for different ones of the relying parties by a process similar to the registration process described above, such as by using different identifiers, and notifications may indicate to which relying party they pertain such that corresponding representations may be requested from the TEE 103 as output. A user may authenticate via input of one or more of the credentials to configure those credentials for use with the authentication application 120. As described previously, the TEE 103 may encrypt representations of those credentials 109 for use in association with the authentication application 120. In some embodiments, different ones of the credentials selected for use in association with the authentication application 120 may be checked against a policy. Credentials not conforming to the policy, whether by strength, length, or security, may be rejected and the use optionally permitted to resubmit credentials for storage within the TEE as applicable. In addition, with a secure channel established with the TEE 103, a user may update one or more credentials. In some embodiments, any updating or establishing of credentials is subject to authentication of the user, such by the user providing one or more input credentials that match valid representations of credentials 109 stored within the TEE 103. For example, in order for the authentication application 120 to instruct the TEE co-processor 105 to execute one or more tasks within the TEE, such as read/write operations within the TEE memory 107, via the API 104, authentication of the user may be required.

In some embodiments, the authentication application 120 is configured to increment a counter associated with communications received from the TEE 103. Specifically, the TEE 103 may provide a counter value that the authentication application 120 must increment and include in a response to or a next communication with the TEE 103 for the TEE to consider the response valid. The TEE 103 may consider the response valid when the incremented count value returned by the authentication application 120 matches an expected value. In addition, for each valid response, the TEE 103 may compare the counter value to a threshold. If the counter value (or a tracked number of increments) exceeds a threshold, the TEE 103 may request the authentication application 120 repeat the previously described key-exchange process to refresh the secure channel and reset the count. In some embodiments, the TEE 103 may refresh the secure channel dependent on whether the user can provide a requested credential that matches a valid representation of credential 109 stored within the TEE, as described above.

The counter value (or values) may be a numerical value or alphanumerical value, like a hash of a numerical value, or some other value. Examples of other values may be a value output by a linear shift register, an identifier of a linear shift register to increment, a location in memory, or other value that may be incremented by the authentication application 120 for a comparison to an expected value, and by which the TEE 103 can track a number of increments performed (e.g., a count). In some embodiments, the incrementing is performed deterministically, for example, the authentication application 120 may increment a counter value provided by the TEE 103 based on a value output from incrementing a given linear shift register or from a provided location in memory. TEE 103 may determine a count from a number of increments (e.g., inputs) provided to a liner shift register or to another functional component (or function) and verify the output value provided by the authentication application 120. Regardless of the specific implementation, verification of the incremented value with an expected value within the TEE 103 ensures that the communication from the authentication application 120 is legitimate and without any attempted injection by an outside actor.

An example client device 135 is illustrated in FIG. 1A and may include access to the network 121. In many instances the network 121 includes the public or private networks and may include the Internet, telephonic data communications, etc., and the example client device 135 is a computing device like a laptop, desktop, or workstation operated with network access in a home, office, or field environment. In some embodiments, an example client device 135 may be a terminal device or otherwise configured to provide a user interface for terminal access to one or more computing devices or virtual machines that may include or provide access to a secure asset or be a secure asset themselves. In some cases, the client device 135 may operate on an internal network (not shown) and may or may not have public network access (e.g., network 121) but include a connection on the internal network to one or more of servers 145, 155 or other server that may have or afford public network access. Some configurations may allow tunneling into an internal network from another network (e.g., a public network) via secure connection such as VPN or other encrypted communication protocol.

In some cases, an example internal network may be wholly internal, such as a private network within a corporation, and supports communications between the client device 135 and server 145 or server 155. Example implementations of the client device 135 in such instances may be a terminal or workstation within a secure environment (e.g., a server room). In such cases, the mobile device 101 may only gain access to that example network while on site (e.g., within range of a wireless connection or while coupled to a wired connection of the internal network) and notifications may be forced to flow through the internal network to afford enhanced security.

Different example client devices 135 may be configured to access different secured assets in a variety of different ways. For example, a client device 135 may attempt to access a secured asset such as an online resource 147 on or via one or more servers 145. In some embodiments, the client device 135 may attempt to access the online resource 147 on or via one or more servers 145 using an application 110 installed to the client device 135. In another example, a client device 135 may attempt to access a secured asset such as an application 110 executed on the client device. In some embodiments, the application 110 may also be configured to access an online resource 147 on or via one or more servers 145.

In association with a given access attempt of a secure asset, a user of the client device 135 may supply credentials 111 for accessing the secured asset. Those credentials 111 may be supplied in different ways, several examples of which are outlined below. In one example, the secure asset is an online resource 147 on or accessible via one or more servers 145. The online resource 147 may be a server hosted application, application programming interface, user account, virtual machine, or other data or interface accessible by the client device 135 via the server 145. In some embodiments, the client device 135 may include an application 110 configured to access the online resource 147. For example, the application 110 may be a web browser configured to request data on and receive data from the server 145 for presentation on a display of the client device 135. Accordingly, the application 110 may be configured to retrieve data from the server 145 and present the data received from the server to the user. In some cases, the server 145 may redirect the application 110 to retrieve some or all data from one or more other servers, like server 155. The retrieved data, when executed or processed, may cause the application 110 to present on the display of the client device 135 a log-in page or other user interface including one or more fields or other user interface elements configured to receive user credential 111 input for accessing the online resource 147. In turn, the application 110 may transmit data corresponding to the credentials 111 input by the user, which may be a user name, password, or selection of one of more user interface elements, to a given server (e.g., at least one of server 145 or server 155) specified in the retrieved data for authentication. In some embodiments, the application 110 may transmit data corresponding to the credentials 111 without direct user input of the credentials, such as where the user has configured the application 110 to populate fields with or automatically submit stored credentials. In some embodiments, when executed or processed, the retrieved data may cause the application 110 to automatically collect or transmit other identifying data corresponding to the user or client device 135 with the credentials 111. For example, the application 110 may collect or generate identifying data about the user-client device 135 combination in the form of cookie, log, token, or other data. In addition, or alternatively, the application 110 may collect identifying data about the user-client device combination, such as by querying the runtime environment on the client device. All or a subset of the above information may be transmitted to one or more of servers 145 or 155.

In another example, the secure asset may be an application 110 executed by the client device 135 and configured to prompt the user to supply credentials 111 when the user attempts to use the application or a feature thereof. Similarly, in another example, the secure asset may be an online resource 147 accessible by the application 110 and the application may be configured to prompt the user to supply credentials 111 in response to the user attempting to use the application 110 to access the protected asset via the server 145. The application 110 may transmit received credentials to the server 145 or server 155 for authentication. In some embodiments, the application 110 and online resource 147 may both be secure assets, and the user may be prompted to provide same or different credentials when attempting to access different secure assets. In some embodiments, the application 110 may be configured to automatically collect or store previously supplied credentials and automatically transmit the collected or previously supplied credentials to the server 145 or server 155 without prompting the user. The application 110 may similarly collect identifying data about the user-client device combination as described previously for transmission to a server.

In some embodiments, a secure session is established between the client device 135 and one or more of server 145 or 155 for the transmitting of credentials or the exchange of user-client device data. The secure session may be HTTP over TLS/SSL, SSH or other secure connection type by which the client device 135 (or applications thereon) can exchange data with a server (or application applications thereon). The secure session may be held open by the server for a pre-configured amount of time (e.g., 1-180 seconds) before timing out to allow enough time for a user to authenticate with the authentication server 155. Once authenticated, the client device 135 may be permitted to access the secure asset. In some embodiments, based on the credentials 111 or user-client device information, a server may generate a token tied to that information and transmit that token to the client device 135. In turn, the client device 135 may present the token within a set period of time (e.g., 10-9999 ms or 1-180 seconds) after authentication to access the secure asset.

Tokening of the client may occur in addition to or separate from the secure session. For example, when attempting to access a secure asset on server 145, the client may 135 may be redirected (e.g., via HTTP request) to establish a secure session with server 155 and provide credentials 111 or user-client device information to the server 155. When the server 155 authenticates the client device 135, it may pass a token in a redirect (e.g., via HTTP request) that directs the client device 135 back to the server 145 to access the asset.

Some embodiments may include a relying party server 145, which may host or otherwise include a secure asset, like an online resource 147, accessible by devices over a network, such as by the client device 135 over the network 121. Examples of online resources 147 may include a user account, web applications, and other data as described herein. The relying party server 145 is configured to provide access to such resources 147 for authenticated users of client devices 135.

In some embodiments of the relying party 145 may include a user identification repository 160, which may store information about users and clients. For example, the UID repository 160 may store identifying information including one or more of user identifiers, device identifiers, identifying tokens for user or devices, locations of devices on a network, and the like. The UID repository 160 may also store associations between one or more identifiers, for example, a user identifier may be associated with one or more device identifiers to which that user is permitted access or otherwise uses to access the server. In some embodiments, the UID repository 160 may further store credentials associated with the identifying information for users and clients, though it need not be required to.

In response to an attempt by a client device 135 to access the relying party server 145 and thus the example online resource 147, the relying party sever 145 may respond in variety of ways. For example, the server 145 may request credential information from the client device 135, such as by directing an application 110 on the client device 135 to a log-in page or other interface for the submission of credentials, requesting the application direct the user to input credentials, requesting the application provide credential information already input by the user, or requesting the application provide identifying information about the client device or user (e.g., cookies, logs, tokens, etc. or values thereof). In some embodiments, the replaying party server 145 may collect information about the user or client device 135, such as a network address, location associated with the network address, information about the application 110 or client device such as version, runtime environment, etc. or other information. Credential information may include a user identifier, such as an email, employee ID, active user account, username, etc., hash thereof or other identifying information about the user and optionally a password. Information about the client device 135 or application 110 may include a device identifier, which may be a combination or hash of information determined about the client device or application. An example device identifier may account for information such as a MAC address, IMEI number, identifiers of one or more other hardware components of the device, etc., or may include information indicative of the runtime environment like operating system version and type, application version, screen size or resolution, or other factor or combination of factors relatively unique to a given device. Accordingly, the device identifier may serve to accurately identify a given client device from other client devices at least for a relatively long period of time (e.g., hours, days, months, or even the lifetime of the device).

In some embodiments, the relying party server 145 may compare information about or received from the client device 135 with information stored in the UID repository 160 to determine which user or device is attempting to access a given secure asset, such as the online resource 147. For example, the relying party server 145 may identify a user identifier or a device identifier stored within the UID repository 160 corresponding to the access attempt. In response to determining which user or device is attempting to access the secure asset, such as by determining one or more identifiers stored within the UID repository 160 corresponding to the access attempt, the relying party server 145 may transmit information about access attempt to the authentication server 155. The forwarded information may include the one or more identifiers determined from the UID repository 160 to correspond to the access attempt, in addition to information received from, or determined about, the client device 135. In turn, the relying party server 145 may receive an authentication result from the authentication server 155. The authentication result indicates whether the user of the client device 135 successfully authenticated with the authentication server 155 (e.g., via the mobile device 101). Based on the authentication result received from the authentication server 155, the relying party server 145 grants (in response to successful authentication) or denies (in response to unsuccessful authentication) the access attempt by the client device 135. If a result is not received within a threshold period of time, the server 145 may deny the access attempt (e.g., by timing out a connection).

In some embodiments, the relying party server 145 performs one or more preliminary verification tasks prior to passing information about the access attempt to the authentication server 155. For example, the server 145 may determine whether the user or client device is permitted to access the given secure asset. In such cases, the UID repository 160 may store associations between user or device identifiers and different assets to which a user or device is permitted access. In some embodiments, the relying party server 1345 may also determine whether a password or other credential received from the client device 135 matches a corresponding credential stored in association with a user identifier or device identifier within the UID repository 160.

As described above, in response to an attempt by a client device 135 to access the relying party server 145 and thus the example online resource 147, the relying party sever 145 may respond in variety of ways. For example, in some embodiments, the server 145 may pass information received from the client device 135 to the authorization server 155 without performing some or all of the previously described operations within the UID repository 160. In turn, the server 145 may wait for an authentication result from the authentication server 155 and grant or deny the client device access based on the received result or time out the access attempt if not result is received within a threshold amount of time.

In some embodiments, the server 145 may redirect the client device 135 to the authentication server 155. In turn, the server 145 may wait for an authentication result from the authentication server 155 and grant or deny the client device access based on the received result or time out the access attempt if not result is received within a threshold amount of time. In some embodiments, the authentication result may be a token for one or more associated identifiers, and the server 145 may store the token within the UID repository 160 in association with one or more identifiers. One example might be a token and a device identifier for a given device and optionally a user account to which that device identifier corresponds. The token may include an associated timestamp or time-stamps that indicate when the token was created or when it expires. In either instance, the server 145 may determine from a time stamp whether a token associated with a given identifier is inactive or active. In accordance with the above example, the server 145 may receive, from the client device 135 during an access attempt, a token in addition to information previously described. The server 145 may determine, from information stored within the UID repository 160 in response to receiving a token from the client device 135, whether the received token matches a valid token received from the authentication server 155. The server 145 may also determine, from an association between the valid token and an identifier within the UID repository 160, whether information received from or determined about the client device corresponds to the identifier stored within the UID repository 160. For example, the authentication server 155 may be configured to cryptographically hash a specific set (and optionally order) of determinable information received from or about the client device 135 to create an identifier. Similarly, the relying party server 145 may be configured to execute a process in a similar manner to determine an identifier for a client device attempting to access a secured asset. As the identifier can uniquely identify the client device 135 from other client devices, the relying party server 145 can determine to grant the client device 135 access if the token presented by the client device matches a valid token in the repository 160 and an identifier determined for the client device matches the identifier associated with the valid token in the repository 160.

The set of determinable data and order of the determinable data used to create an identifier may be held secret by the relying party 155 and the authentication server 155 and optionally may change over time or be based on a function dependent on one or more determinable factors. Accordingly, the authorization server 155 may push information about valid tokens and associated identifiers to the relying party server 145 for authenticated clients such that the relying party server 145 may quickly determine whether a client device is permitted to access a given secure asset. For example, a function in a process for creating an identifier may use one or more token values as input to determine the set and order of data of determinable data to cryptographically hash for an identifier.

Thus, as described above, the relying party 145 relies on the authentication server 155 to perform one or more operations in the authentication process, and permits or denies a client device 135 access to a secure asset, such as online resource 147, in response to authentication results received from the authentication server 155. Operations of the authentication server 155 are described in more detail below.

The authentication server 155 performs operations to authenticate users and provides authentication results that indicate whether a user was authenticated. The authentication results may be used by other parties, such as a relying party 145, to determine whether a given client device 135 should be granted or denied access to a secure asset. User authentication operations performed by the authentication server 155 may be performed out-of-band from attempts by client devices 135 to access secure assets. Namely, user authentication operations may involve a device different from the client device 135, such as a mobile device 101.

The mobile device 101, as described previously, is typically a device under control of the user the authentication server 155 seeks to authenticate and is operable to store credentials specific to that user in a secure fashion. For example, the mobile device 101 may include a TEE 103 to store credentials 109 in a secure fashion. Further, the TEE 103 may be operable to generate representations of credential values such that those representations can be passed by the TEE to the CEE 113, and by the CEE 113 to the authentication server 155 without divulging actual credential values. In some embodiments, the representations of credential values may be refreshed or updated within the TEE 103 without requiring a change in credential values. For example, representations of credential values may be dependent on one or more key values or function values used as input in a cryptographic hashing function or encryption algorithm to generate the representations. In turn, the key values or function values may be updated within the TEE 103 to generated refreshed representations, rather than requiring a user to provide a new credential values, which is particularly beneficial in instances where a user may be unable to change a credential value (e.g., for a specific biometric input). As a result, the authentication server 155 receives and stores only the representations of credential values and any data breach cannot disclose user specific credential values. Moreover, in response to any data breach, divulged representations of credential values may simply be discarded and replaced with refreshed or updated representations of credential values. Thus, attackers are limited to targeting individual users. However, in order to ascertain credential values for an individual user, an attacker would need to breach the TEE 103 of the mobile device 101 storing those values. Such a process is time consuming, rarely successful, and would require physical access to a device of the individual storing credential values. Furthermore, because representations are used for user authentication, even if an attacker was successful in obtaining credential values from the TEE of a device, they would only be operable if the attacker knew the current schema for generating a representation thereof after a user reports the device missing or stolen. The end result in view of these mounting difficulties for would be attackers is a highly secure authentication system that mitigates the effectiveness of both specific user targeted and wide scale attacks.

The authentication server 155 may store data for authentication operations in an authorization repository 165. The authorization repository 165 may include a vast number of UID Records 151. A UID Record 151 may include information associated with a particular user and the devices associated with that user. In some embodiments, a UID Record 151 for a particular user may be created for a particular relying party or used across multiple relying parties. For example, a given user may have a different UID Record 151 associated with the different relying parties utilizing the authentication system and which the user engages. One relying party may be an employer of the user, another relying party may be a financial institution used by the user, and yet another relying party may be an application developer from which the user has purchased an application for personal use. The different UID Records for a same user may have some same information, such as if the user uses the same mobile device 101 for authentication with each party, device information for the mobile device 101 may remain the same across the different UID Records. However, the different UID Records for different relying parties may be segmented within the repository 165 for a variety of different reasons, such as compliance with relying party requirements, government regulations, or user privacy in general.

Information associated with a particular user in a UID Record 151 may include one or more user identifiers that user uses with a relying party, such as a username, email address, employee ID, etc. The user identifiers may also be representations of user identifies, such as cryptographic hashes of user identifiers, and the cryptographic hashing function may be specific to a given relying party. UID Records 151 may be created by the authorization server 155 when a given user elects to use an authentication application for user authentication to access assets of the relying party. Alternatively, UID Records 151 may be created by the authentication server 155 upon request by a relying party. The request may include user provided account information for generation of a UID Record. In some embodiments, the authentication server 155 may handle user registration for the relying party and receive and process some or all of the user provided information directly to generate a UID Record 151 for the user. A relying party administrator may also provide or otherwise create specified account information for generation of a UID Record, such as when an administrator of the relying party creates an employee account.

The UID Record 151 may include a plurality of constituent device records for devices associated with that user that may be used for authentication or accessing a secure asset. For example, a user having UID record 151 may use a device A for user authentication and a device B for accessing secure assets of a relying party.

By way of example, Device A record may be mobile device 101 registered with the authorization server 155 for user authentication to access secure assets of the relying party. During a registration process, such as one performed through an authentication application 120, initial information about the mobile device 101 may be collected and stored within the device A record. The initial information may include information operable to identify the device and transmit notifications to the device. In some cases, that identifier may be used by the authentication server 155 to transmit notifications. Some of the information about the mobile device 101 may also be updated over time based on information about the device provided to the authentication server 155 by the authentication application 120 on the mobile device. The Device A record for the mobile device 101 may also contrail the out-of-band credentials A for authentication of a user of the mobile device. For example, the OoB Credentials A may include representations of various different credentials provided in a registration process of Device A and a public key for verifying signed data received from Device A.

Device B record may correspond to a client device 135 used by the user. Depending on the relying party, there may be multiple device records corresponding to different client devices used by the user over time. Client devices need not be registered, and records for client devices may be created over time as a user uses different client devices to access secure assets. However, in some cases, the client device 135 may optionally be registered with the authorization server 155 for use by a particular user or to access secure assets of the relying party. A Device B record for a client device like client device 135 may contain an identifier or other identifying information for the device and optionally credentials B, where those credentials may be in-band credentials (e.g., account/password/token, etc.) for applicable embodiments. Some of those in-band credentials may alternatively be stored under the UID Record 151 for client devices 135 in general rather than for a specific client device. However, some credentials may be preferable to store in a device specific fashion, such as which device is currently using a given license (e.g., a product key) for some secure asset.

In some embodiments, permissions may be specified for a UID Record 151 or for a given device. Permissions for a UID Record 151, generally, may define which assets the user (associated with the UID Record) may access and how the user may access those assets. Permission for a client device (e.g., one registered by an administrator associated with the relying party), generally, may define which users may access the device and optionally what assets that device is permitted to access, which may differ from assets the user (associated with the UID Record 151 of the user utilizing the device) is permitted to access.

For example, in a business environment context, the client device 135 may be assigned to a particular employee by an administrator of the relying party and Device B record may be stored under the UID Record of the employee. In some embodiments, an administrator may register the client device with specific permissions to restrict use to a specified subset of users or such that only registered devices may access secure assets.

In another example context, the relying party (e.g., globally or per secure asset) may specify permissions governing amounts or types of devices allowed under a UID Record 151. As described above, the UID Record 151 may contain a user identifier tied to a particular user/account. When a given client device (e.g., client device 135) attempts to access a secure asset in association with that user identifier, the authentication server 155 may create a device record (e.g., Device B) corresponding to the given client device under the UID Record 151 for that user identifier. Permissions may specify a number of client devices which may be active under a given UID Record 151, such as to restrict use of a secure asset to a given number of devices overall, or to restrict use of a secure asset to a given number of devices at a particular time. For example, if the protected asset is a web application, permissions may be a license agreement that prohibits the use of multiple client devices (or over a threshold number of client devices) at the same time under a same UID Record 151. Similarly, if the protected asset is an application installed to a client device, permissions may be a license agreement restricting use and installation of the application to a single client. Tracking client devices in this manner may also be used for security purposes, such as to detect when an unknown or new client device attempts to access an asset or if multiple unknown or new client devices attempt to access an asset, and whether or not those access attempts are successful. For example, which devices are authenticated by which credential provided by the mobile device 101 may be tracked and additional or multiple credentials may be requested for new or additional client devices attempting to access a same asset.

Some or all of the information stored within the UID repository 160 or representations thereof may be stored within the authorization repository 165 in UID Records 151. In some embodiments, the auth repository 165 is also configured to store data to perform one or more of the functions ascribed the UID repository 160. For example, rather than the relying party server 145 use the UID repository 160, it may instead use the auth repository 165. In such a configuration, the auth repository 165 may be configured to respond to queries to return, store, or otherwise provide data in a similar fashion as the UID repository 160. The data structure of the auth repository 165 may differ from that of the UID repository 160, but one or more queries received at the auth repository 165 from the relying party server 145 may be operable to return and store similar data from the data structure of the auth repository 165. Benefits of such configurations may reduce overhead for relying parties 145 as they can significantly offload authentication burden and reduce storage of user specific data in addition to increasing security. For example, in the previously described example utilizing tokens, the process may continue in much of the same fashion, but rather than the relying party server 145 determining whether the token-identifier combination corresponds to an authenticated client, the relying party server 145 need only query the auth repository 165 or the authentication server 155 with the token, identifier, or information on used for the identifier. In an example embodiment, the relying party server 145 may query the auth repository 165 with a token and an identifier determined for the client device that presented the token and the auth repository may provide an authentication result. In some example embodiments, the queries may flow through the authentication server 155 such that, for example, the authentication server 155 may process the information to determine the identifier (e.g., such that only the authentication server 155 houses the logic for the determination) and return a result.

Figure 1B:
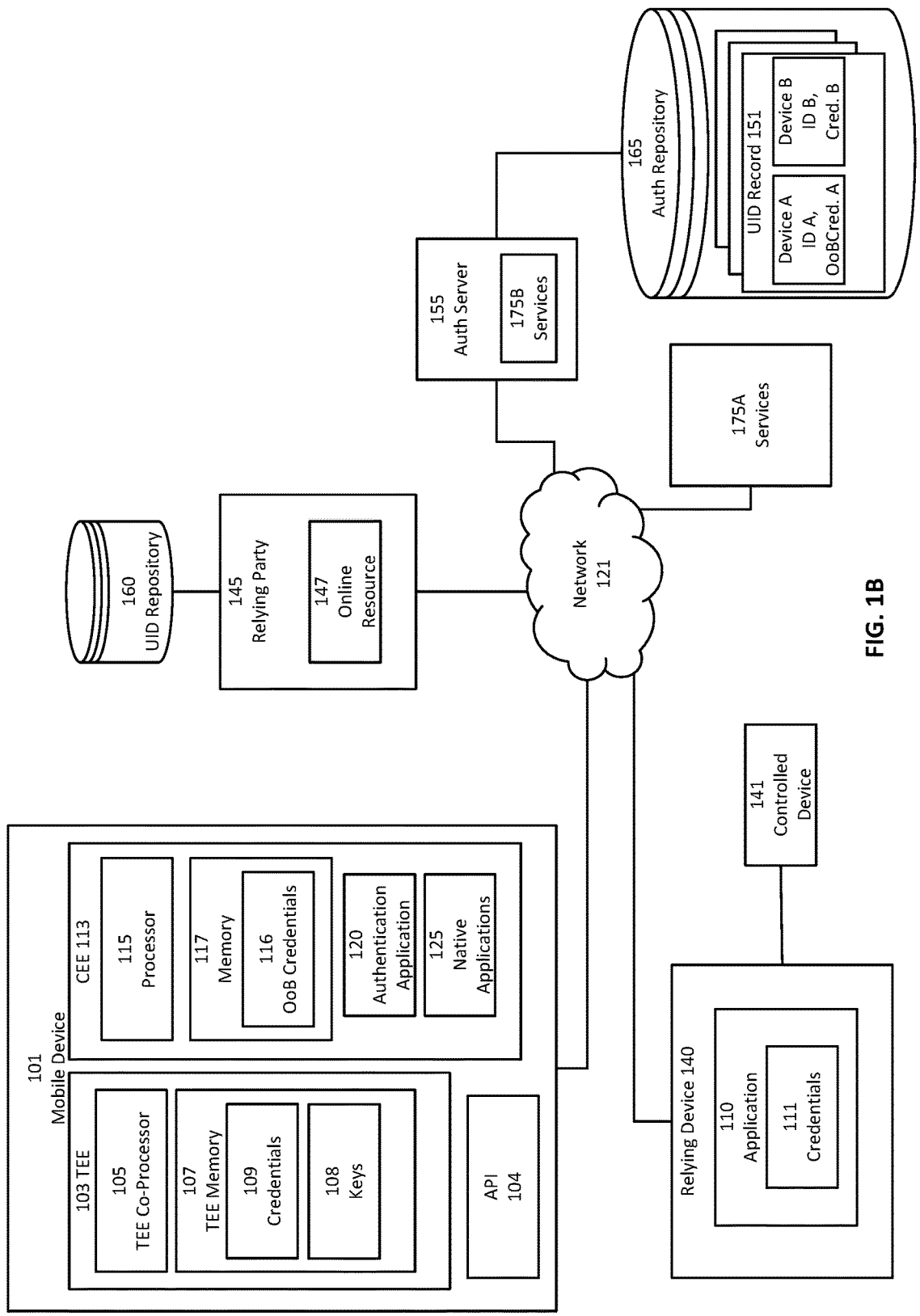
FIG. 1B is a block diagram showing an example of a computing environment by which the present techniques for user authentication may be implemented.
Figure 2:
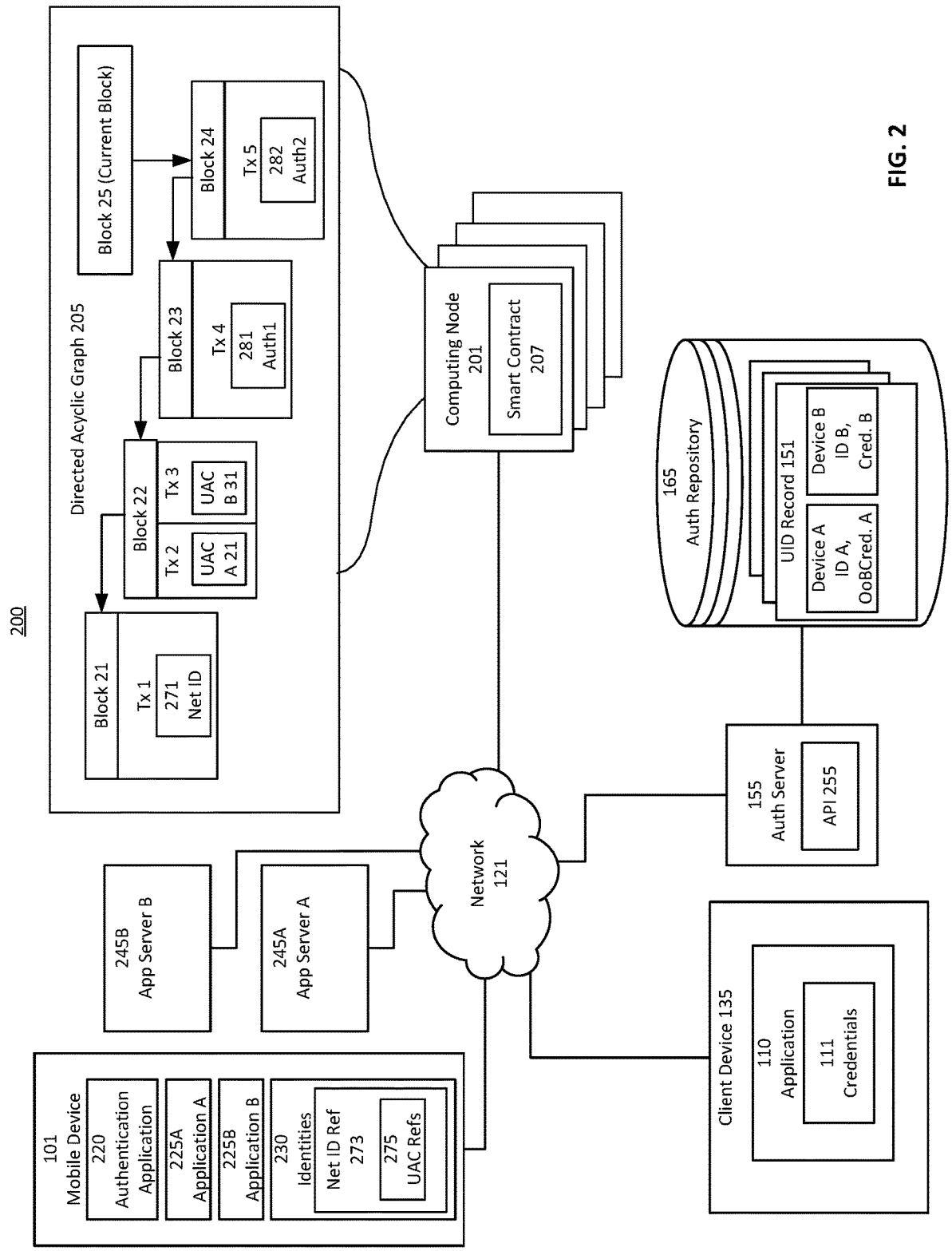
FIG. 2 is a block diagram showing an example of a computing environment by which the present techniques for identity management on a decentralized computing platform may be implemented.

With reference to the environment 100A of FIG. 1A, the environment 100B of FIG. 1B, and the environment 200 of FIG. 2, disclosed embodiments may provide a mobile initiated login process by which users authenticate to access devices or resources, which may be various computing devices like workstations or servers or clients or controllers that govern access to controlled areas or controlled devices. Thus, in some cases, a relying device 140 may a client device, like a client device 135, which may be a device managed by a relying party 145, like a workstation or terminal for accessing a server of a relying party (which is not to suggest that a relying device 140 cannot function as a client in some instances, a workstation in some instances, a server in some instances, a terminal in some instances, provide a service in some instances, or one or more at once). Additionally, a relying device 140 may be configured to control another device, such as an electrically controlled mechanism, like a relay or motor or servo or other mechanism which may distribute or cause the distribution of an electrical signal or electrical power, such as to engage a lock, a valve, or the like.

In various examples discussed herein, such as those discussed with reference to FIG. 1A, a request to access an online resource 147 of a relying party 145 may not originate from the mobile device 101, but rather another client device. In turn, the mobile device 101 serves a client-side role in an out-of-band authentication process for that request. By way of example, a request to access an online resource 147 may originate from a different device, such as relying device 140 (e.g., a relying device having a configuration similar to a client device 135), and the user authenticates to access request via the mobile device 101 (e.g., by authenticating in response to a notification received by the mobile device). A common context for the above scenario might include an employee using a work or personal computer (e.g., a laptop or desktop computer), represented by the relying device 140, to request access to online resources (e.g., a web application) hosted on a server by their employer, and using a work or personal mobile device (e.g., a smartphone or tablet), represented by mobile device 101, to provide data used to authenticate the request to access the online resources. In some cases, an employee enters a username and password on the relying device 140 to gain primary access to the relying device 140 (e.g., login to a user account on the relying device). Examples of such access may include login to an operating system of the relying device 140, login to some other user, administrative, or system level account of a server, or login to a terminal by which other devices may be accessed.

In such systems, access to a device or other asset is often governed by an attempt-authentication-result approach whereby users provide input, like a username and password, to a device, which is authenticated by the device and authentication thereof permits user access. Similarly, for networked devices or user accounts or online resources, a user attempts access with a device by providing credentials in association with the attempt via that same device. Various techniques improve upon security of such approaches, such as with out-of-band authentication approaches discussed herein. Additionally, various techniques improve upon the breadth of services to which an authentication result may confer access, such as with federated identity approaches discussed herein.

Mobile initiated authentication may provide additional or alternative functionality in association with, instead of, or over such techniques, such as by enabling users to initiate and complete authentication on a device different from a relying device the user is attempting to access or on a device different from the relying device by which the user is attempting to access an online resources or other asset of a relying party. In some embodiments, such as by federated identify management techniques discussed herein, authentication of user access to a relying device as disclosed herein may confer additional access to an online resource of a relying party. For example, authentication of the user via a device, like via a mobile device, may permit the user to access to the relying device which may also be authenticated to access an online resource of a relying party. Not all online resources may be afforded this benefit. Some online resources may be provided by other (e.g., $3^{rd}$) parties or access thereto subject to authentication via other services or subject to addition authentication. Additionally, various embodiments may purge (e.g., user) credentials from relying devices such as to minimize attack surface to those credentials, and various embodiments may not permit relying devices (or images utilized thereon) to retain credentials for online resources. Relying devices may also utilize various additional services beyond those which authenticated access of a user to the relying device may initially grant, and authentication to such additional resources may be treated in a similar to those online resources which relying devices are not granted (or cannot be granted) access to by virtue of user authentication to access the relying device alone. In some embodiments, a user may initiate and complete and authentication, for a relying device to access an online resource (or utilize a service), with a device that is different from the relying device. In some embodiments, such authentication steps may coincide with, or occur after, an authentication with the device to the relying device. By virtue of knowing the relying device to which the user is authenticated, additional authentications may be initiated for various online resources (or services) and credentials by which the relying device is permitted to access those online resources (or services) may be passed to the relying device. In some embodiments, the relying device may automatically obtain access an online resource (or service) in response to receiving those credentials. In some cases, such access may be obtained prior to the user physically accessing the relying device. These techniques may incorporate various other technologies, which may include but are not limited to single or reduced sign on and federated identify management techniques to enable seamless access to a variety of assets by virtue of authentication via mobile initiated authentication.

FIG. 1B illustrates an example computing environment 100B within which mobile initiated authentication may be implemented. In some embodiments, mobile initiated authentication services may be provided within an out-of-band authentication system like that described with reference to FIG. 1A. FIG. 1B illustrates additional and renamed elements for clarity of discussion related to mobile initiated authentication. As previously described, a user may authenticate on an out-of-band device, like a mobile device (or other device), in response to a notification received in response to an attempt to access a relying device or resources. In contrast to a reactive authentication process, in a mobile initiated authentication process a user may initiate an authentication via a mobile device prior to an attempt to access a relying device or resource. In turn, the user may be authenticated to access the relying device or resource, such as prior to the user attempting to access the relying device or resource, as is described in greater detail in the example embodiments below.

In some embodiments, the computing environment 100B may include a mobile device 101, a relying device 140, a relying party 145, an authentication server 155, and one or more service 175. These components may communicate with one another via a network 121, such as the Internet and various other local area networks. In addition, embodiments of the example computing environment 100B may include a mobile computing client device, such as mobile device 101, that supports client-side authentication based on a secure channel to a trusted execution environment.

In various example embodiments, a mobile initiated authentication may occur prior to an access attempt by a user. Specifically, a user may pre-authenticate to a given relying device 140 prior to accessing the given relying device or pre-authenticate to a given relying party 145 prior to accessing an online resource 147 provided by the relying party 145. In some embodiments, pre-authentication to a given relying device 140 may include one or more authentication processes by which the user having pre-authenticated to the relying device 140 is further authenticated to a web-service, like an online resource 147 of a relying party 145 (or one or more services 175), which may include authentication of the relying device 140 to access to the online resource or services (e.g., via an application 110, for which credentials 111 may differ from those to access the relying device 140). For example, a user may pre-authenticate in a mobile initiated authentication via the mobile device 101 prior to accessing a relying device 140, optionally pre-authenticate to one or more web-services, and access the relying device 140 which may be permitted access to those web-services to which the user authenticated to via the mobile device 101. In another example, a user may pre-authenticate to a web-service, like a relying party or service 175, in a mobile initiated authentication via the mobile device 101 after accessing (or authenticating to access) a relying device 140 (e.g., whether by traditional login (e.g., username and password, out of band login techniques, or mobile initiated login). In either case, the user may engage in the authentication process via their mobile device 101 and the relying device 140 (e.g., like a client device) may be conferred privileges to the web-service based on the result.

In one illustrative example, a user may arrive at their office building, initiate and complete authentication to their workstation (e.g., a relying device 140) on their mobile device (such as prior to arriving at the workstation), and subsequently access the relying device without additional credential input. Further, in some embodiments, authentication of user access to the relying device 140, may including additional credentialing, which may occur over the same or a different service, such as to permit the relying device 140 (e.g., via an application 110) to access other resources such as web-services, like an online resource 147 (which may optionally rely on different credentials 111 that may be passed to the relying device 140). In some cases, one or more of the additional credentialing processes may be initiated via the mobile device 101 to those web-services, and specifically in cases where authentication to a web-service relies on credentials other than those conferred to the relying device 140 by user access (e.g., under an account of the user on the relying device 140 which the user utilizes on the relying device).

Extending upon examples like those above for a user physically accessing a device, user access to a lab may be governed in a similar fashion in instances where a lock of a door to the lab, like a controlled device 141, may be electro-mechanically actuated by a controller (e.g., a relying device 140) coupled to a network 121. In some cases, a grouping of relying devices may be configured, and a mobile initiated authentication to the group may permit sequential access, or collective access. For example, a workstation A may be in a lab A and both placed in a group A, and a mobile initiated authentication to group A may confer user access to lab A and workstation A, or one or more workstations within lab A. For example, some embodiments may include a UID repository 160 or auth repository 165 within which records about relying devices and which users may access which relying devices may be stored, among other data described herein. Various policy rules may be implemented to regulate security parameters, some of which may be based on obtained data or responsive to feedback, and may be enforced on the mobile device (and in some cases via other devices, such as by authentication servers and relying devices).

In some examples, a mobile initiated authentication may occur proximate to an access attempt by a user, such as for online resources 147 accessed by a relying device 140, in accordance with the principles disclosed herein. In some example embodiments, an online resource 147 may be a virtual desktop, and the relying party 145 may provide virtual desktop infrastructure. Additionally, in some example embodiments, an online resource 147 may be a container or virtualized application, and the relying party 145 may provide virtualized application infrastructure—which may be provided separate from or in association with other virtualization infrastructure. For example, the relying party 145 may be a server or collection of servers on which virtual machines are provisioned. The server or collection of servers may provision numerous instances of a virtual machine (which is not to suggest that all virtual machines are the same, as resources allocated and other aspects may differ). The virtual machines may execute operating systems, applications, or other programs. For example, a virtual machine may execute a desktop image, which may contain an operation system and one or more applications, like virtualized desktop environment, which a user client device may access over a network to view the desktop and perform tasks (e.g., much like the user would within a traditional, local OS, but over a network). In another example, a virtual machine may execute a container or other file to virtualize an application without providing a desktop environment, which a user client device may access over a network to view the application (such as via a browser window or other terminal window) or to receive application data (such as via an application which displays or updates data within one or more panes of an interface based on the received data).

In some examples, an instance of a virtual machine may provide a virtual desktop to a relying device 140 (e.g., via a session facilitated by the relying party 145), such as based on an image of an operating system which the virtual machine executes. Thus, for example, the relying party 145 server, which may be a cloud-based distributed computing system within which virtual machines are provisioned, may provide (e.g., as an OS of) a relying device 140 a session to a virtual desktop executed by a virtual machine. A virtual desktop may be persistent (e.g., a user is allocated a desktop image within which user preferences, files, applications, and the like configured during a session are retained-like a traditional OS) or non-persistent (e.g., a desktop image is selected from a pool and user preferences, files, etc. generated during a session are not retained). Additionally, an instance of a virtual machine may provide application virtualization to a relying device 140 (e.g., via a session facilitated by the relying party 145), such as based on a container or other image or executable, which the virtual machine executes. Thus, for example, the relying party 145 server may provide an application of a relying device 140 or the relying device 140 with a session to a virtualized application executed by a virtual machine.

In some examples, such as in cases where a user utilizes their mobile device 101 to authenticate to one or more web-services, there may exist multiple different relying parties 145, which are respectively associated with different online resources 147, and similarly, different services 175. Accordingly, in some cases, a user may utilize one or more mobile initiated logins via the mobile device 101, e.g., to access a relying device 140, which may include accessing a virtual desktop as described above via the relying device 140, and may also include authenticating to one or more other web-services which may be accessed via the virtual desktop—similar to examples where the relying device 140 utilizes a local desktop image. Thus, in either case, mobile initiated authentication to a web-service may authenticate a user to access one or more online resources 147 or services 175 via a relying device 140 (e.g., which the user is authenticated on, which may be an authentication to a virtual desktop access by the relying device 140).

In some embodiments, the techniques described herein may be implemented within the computing environment 100B (e.g., including one or more of the illustrated components) shown in FIG. 1B (or the computing environment 100A shown in FIG. 1A) by executing processes described below with reference to FIGS. 3, and 7-11 upon computing devices like those described below with reference to FIG. 12. In some embodiments, the techniques described herein may be implemented within the computing environment 200 (e.g., including one or more of the illustrated components) shown in FIG. 2 by executing processes described below with reference to FIGS. 3 and 5-9 upon computing devices like those described below with reference to FIG. 12. In some embodiments, computing devices like those described with reference to FIG. 12 may include additional or other components specific to configurations discussed herein. For example, a mobile computing device 101 may include components similar to those described with reference to FIG. 12 that support the client execution environment 113 and additional components supporting a trusted execution environment 103, which may include a subset of like components (e.g., processor, memory, bus, etc.) configured to perform operations of the trusted execution environment. Similarly, relying devices 140, servers 145, 155, services 175, and repositories 160, 165 may include some additional or other components than those illustrated in FIG. 12. However, each of these devices may operate in accordance with principles similar to those discussed below and with reference to FIG. 12, such as by loading instructions and other data into a memory and executing those instructions by a processor to perform various operations.

The mobile device 101 may be a mobile computing client device to which a user has access to and may use to authenticate a request to access a relying device 140, and authentication may occur prior to physical user access of the relying device 140. In some cases, the relying device 140 may be configured to access one or more secure assets like online resources, or other assets, which may be local to the relying device or which the relying device may interface with, like one or more controlled devices 141, and access to the relying device 140, such as via a user account or other access control measure, may confer access to the relying device and, optionally, other assets. In some embodiments, the mobile device may authenticate a request to access an online resource 147, and authentication may occur prior to another device requesting to access the online resource. In some embodiments, subsequent to authentication of a request to access a relying device 140, the mobile device 101 may authenticate one or more requests to access web-services, and in some cases the requests may be user initiated via the mobile device 101 and transpire prior to user access to a relying device 140 or attempt to access the web-service with a relying device. In other words, in both instances, a mobile initiated authentication may occur by which access is conferred to a relying device or web-service (e.g., from a relying device) prior to the user attempting access directly (e.g., via login to the relying device 140 or via login to the web-service from the relying device).

Example embodiments of a mobile device 101 include, but are not limited to, portable smartphones and tablet type devices carried by users during their day-to-day activities, among other example mobile devices described herein. The above should not be construed to rule out other portable mobile computing devices, such as wearables, like watches or bracelets, that as they become more prevalent may be as equally suited as a smartphone or tablet device to collect credentials from users as well as perform other options disclosed with reference to mobile devices. For example, various smart watches may include trusted execution environments or other secure hardware elements, execute applications, such as an authentication application or other native applications, and collect user credentials and other data described herein. For example, various wearable devices are operable to collect at least some user credential inputs which may be used for authentication processes. In fact, devices such as wearables, may be suitable to reduce intrusion on users while meeting robust authentication policies like those disclosed herein. Additionally, embodiments contemplate wearable devices as companion devices to other types of mobile devices 101, and may collectively participate in some disclosed authentication processes (e.g., a wearable device may provide user input or other credentials to a mobile device of the user which may authenticate the user based on the credentials received from the wearable device rather than require the user to input same or different credentials via the mobile device). Further, disclosed examples contemplate wearable devices as standalone devices which may operate a subset of mobile device functionality suitable for user authentication in at least some embodiments.

In various disclosed embodiments the mobile device 101 may store user credentials within a TEE 103, and causing the TEE to divulge such credentials may be particularly difficult. In addition to the above-mentioned credentials, other credentials, like authenticators for relying devices may be established during registration of a mobile device 101 of a user to a given relying device 140 in accordance with one or more protocols governing access to the relying device. For example, certificates may be established, and may be protected by other credentials. In turn, the authentication server 155 may verify such information provided by the mobile device 101 in a mobile initiated authentication process and, in response, issue a session to a relying device by which some or all of the information may be passed to the relying device. In turn, the relying device 140 utilize some or all of the information to log the user into the relying device via one or more services which may also convey user access to online resources 147 of other relying parties 145.

In addition to the above-mentioned authenticators for relying devices, other authenticators for web-services may be established during (or after) registration of a mobile device 101 of a user to a given relying device 140 in accordance with one or more protocols governing access to the web-services. Specifically, authenticators for web-service which a user may desire to access via a relying device 140 may be established, and the user may utilize their mobile device 101 to authenticate the relying device to access those web-services. For example, certificates may be established, and may be protected by other credentials for mobile devices 101 and relying devices 140. Additionally, in the context of some web-services, the authentication server 155 may establish one or more certificates with a web-service provider (e.g., a relying party 145 or services 175A provider), and the authentication server 155 may provide an identity service 175B trusted by the web-service provider. In turn, the authentication server 155 may verify information provided by the mobile device 101 in a mobile initiated authentication process and a web-service may trust an authentication result (e.g., by signature verification). Some embodiments may issue a session to a relying device 140 by which some or all of the information may be passed to the relying device. The relying device 140 may utilize information received via the session to access a given web-service which a user authenticated to on their mobile device 101. For example, the relying device 140 utilize some or all of the information to log the user into the web-service on the relying device, whether automatically (and optionally launching an application associated with access to the web-service) or upon the user launching an application and attempting to access the web-service (e.g., without requiring at least some credential input by user that would otherwise be required).

Along with credentials like those outlined above and elsewhere herein, the TEE 103 may store other data. In some embodiments, this may include a policy, rules of a policy, or other instructions by which a policy may be enforced. For example, the TEE 103 may store one or more policies by which a user authenticates with an authentication server 155 to access a relying device 140 or web-service. Alternatively, the TEE 103 may store data, like a cryptographic hash, of a policy or rule or instruction by which corresponding data within the CEE 113 may be verified based on processing performed within the TEE 103. Other configurations may also be implemented to verify a policy and compliance therewith. In the case of online authentications, verification of compliance with policy may ensure an access request generated by a mobile device 101 includes the required authentication information by which an authentication server 155 verifies the request to permit user access. In some embodiments, compliance may alternatively comprise a request-response structure, such as by the mobile device 101 transmitting a request with some initial information, like an identifier, such as of a given relying device, or a web-service to which the user of the mobile device is requesting to authenticate to and the authentication server 155 may transmit a response including, or based on a policy, instructing the mobile device 101 to provide indicated authentication information. An online policy may function as a request filter to ensure authentication requests generated by a mobile device 101 comply with rules enforced by an authenticator service (e.g., a prompt may instruct the user to enable WiFi or Bluetooth connections, such as to obtain one or more signals) prior to transmission of an access request.

For offline authentication, a mobile device 101 may store an offline policy specifying rules by which offline access to a relying device may be granted in instances where online authentication is unavailable. For example, the relying device or mobile device or both may experience a loss of network access or one or more authentication services, like an authentication server 155 or one or more services 175 may by otherwise unreachable. An offline policy may be similar to an online policy, although an online policy may be enforced at an authenticator service level in addition to or instead of a mobile device 101 side. Offline policies may be configured for enforcement at the mobile device 101 side in instances when one or more authenticator services are unavailable (e.g., to one or both of the relying device and mobile device). The offline policy may enforce compliance with rules beyond user authentication on the mobile device 101 in instances where networked services are unavailable. In some cases, the rules may specify compliant configurations for wireless interfaces of the mobile device 101 such as to prevent users from bypassing online authentication processes. In some cases, policies may be stored within a CEE 113 but may be verified by the TEE 103 (e.g., by signature verification) or encrypted with a protocol for which the TEE, but not the CEE, includes a key operable to decrypt the policy according to the protocol. Thus, offline policies may be strongly enforced on a mobile device-side, such as to permit user access to a relying device subject to authentication in compliance with an offline policy when an authentication service is unavailable.

The TEE 103 may store offline values, which may be single use credentials, by which a user may access a relying device. Additionally, in some embodiments, offline values may be utilized to permit access DRM protected content or applications local to a relying device 140. For example, the TEE 103 may store a limited number of single use offline values that may be used before an online login process is required, and the offline values may be refreshed upon success of an online login process. The TEE 103 may provide (e.g., to the CEE 113) an offline value for display or transmission. For example, the TEE 103 may decrypt, access, or otherwise return a result to the CEE 113 indicative of the offline value. For example, the TEE 103 may decrypt, access, or otherwise return a result to the CEE 113 indicative of the offline value (which could be or include the offline value itself, e.g., in plaintext form). In some cases, the TEE 103 may receive data corresponding to an offline value or set of offline values in encrypted form from the CEE 113, such as where an application, like an authentication application executed by the mobile device 101, stores data corresponding to one or more offline values in encrypted form within the CEE, but for which the TEE (and not the CEE) maintains a key by which data in the encrypted form can be decrypted. In turn, the TEE 103 may decrypt received data corresponding to an offline value, and may return a result to the CEE 113 indicative of the offline value. In some cases, the TEE 103 may cause the display of or provide results, values, or data indicative of a result or value to another interface. An offline value may be displayed, returned, or provided by the TEE 103 subject to authentication of the user based on one or more credentials and compliance with rules of a policy governing use of the offline values. The TEE 103, as previously described, may store within or cryptographically sign data associated with applications, or modules within the trusted execution environment, such as to protect data from being tampered with, read, or modified by an unauthorized entity, and the TEE 103 may release only representations or certain credentials (e.g., offline values or certificates) or decrypt certain data (e.g., offline values or certificates) or sign certain data (e.g., certificates or representations of credentials) subject to user authentication results determined within the TEE 103 and, in some cases, verification of compliance with policy. In some cases, some data, such as one or more certificates or offline values or policies may be stored (e.g., by an application, like an authentication application) within the CEE 113, but in encrypted form, as such data may be updated more frequently than other data, such as credentials established within the TEE 103. Additionally, because certificates, offline values, policies, or other data may be received (e.g., in encrypted form) by the CEE 113 (which is not to suggest that embodiments preclude the TEE 103 from receiving such data without it flowing through the CEE) prior to being passed to the TEE 103, storage of the encrypted data within the CEE may pose minimal risk (e.g., when a key by which the encrypted data may be decrypted is maintained with the secure memory of the TEE and not a memory of the CEE). In other words, in some cases, embodiments may store some data within the CEE in encrypted form (e.g., as received from another entity, such as encrypted by a public key for which the TEE maintains a private key of the key-pair) and request the TEE process the encrypted data for which the TEE (and not the CEE) maintains the key or keys by which the encrypted data may be decrypted when processing of the data is required. Accordingly, authentication results may be determined within the TEE 103 and thus may convey a high degree of security even in offline authentication processes. Mobile initiated authentications may incorporate, be incorporated in, or otherwise function in association with other improvements on credential security and federated identity management systems disclosed herein (which is not to suggest that mobile initiated login processes are not compatible with other identity management and credentialing systems).

In some embodiments, a mobile device 101 may include an authentication application, such as authentication application 120 or 220 or other application 225 configured to perform operations like those discussed with reference to FIGS. 7-11, among others (e.g., one or more operations disclosed in FIG. 3 or 5-6). Embodiments of an authentication application 120 or 220 may be configured to receive an indication to initiate authentication of the user with the mobile device 101 of the user. Prior to such a request, the authentication application 120 may be configured to establish credentials and receive relying device information in association with a process by which the mobile device is registered with a relying device. In turn, an authentication result provided by the authentication application 120, and which may be verified by an authentication server 155, may permit user access to the relying device 140 based on that authentication result and verification.

In some embodiments, an authentication application 120 or 220 may be configured to receive an indication to initiate authentication of the user with the mobile device 101 of the user to a web-service. Prior to such a request, the authentication application 120 may be configured to establish credentials and receive web-service information in association with a process by which the mobile device 101 resisters for mobile initiated authentication with the web-service. In some cases, a web-service access may be authorized for some relying devices but not others, or depend on relying device information (e.g., the device from which the web-service will be accessed). In such cases, prior to such a request, the authentication application 120 may be configured to establish credentials and receive relying device information in association with a process by which the mobile device is registered with a relying device from which the user accesses the web-service. In turn, the authentication application 120 or 220 may be configured to indicate to which web-services the user may establish credentials for mobile initiated authentication. In turn, an authentication result provided by the authentication application 120, and which may be verified by an authentication server 155, may permit user access to a given web-service from the relying device 140 based on that authentication result and verification.

In some embodiments, the authentication application 120 may receive policy information governing access to a relying device 140 (or web-service like a server providing online resources 147 or services 175A or other assets). Policy information may include one or more rules by which an access request must comply for authentication. In some embodiments, policy information may be processed by the mobile device 101. For example, one or more rules specified by a policy may be processed to obtain data for constructing a valid access request. Some embodiments may process one or more rules and associated data within a TEE 103 of the mobile device 101. Some embodiments may process one or more rules and associated data within a CEE 113 of the mobile device 101. Some embodiments may process some rules and associated data within the TEE 103 and other rules and associated data within the CEE 113, and some embodiments may process some data within the CEE 113 and the TEE 103 may verify the processing or a result of the processing. For example, the TEE 103 may cryptographically sign a result or other data indicative of a result of processed data with a key of the TEE 103. In some embodiments, the authentication application 120 may obtain data in compliance with the policy, such as by generating one or more requests to the TEE 103 to securely obtain a portion of data in compliance with the policy. For example, the authentication application 120 may request the TEE 103 prompt the user to securely provide one or more credentials for authentication. The TEE 103 may provide an authentication result to the authentication application 120. In turn, the authentication application 120 may cause the mobile device 101 to transmit an access request including authentication results (e.g., those determined at the mobile device 101) to a server or service for verification (e.g., such as authentication server 155). The server or service may verify the received authentication results (e.g., based on policy) and permit or deny the access request. Embodiments may also perform a similar process in a request-response (e.g., like a challenge) framework by which the authentication application 120 transmits a request to the authentication server 155 which issues ones or more challenges (e.g., in accordance with a policy), the authentication application 120 process the challenge(s), which may include obtaining user credentials or other information which may be processed and signed (e.g., within the TEE 103) and transmitted to the authentication server by which the authentication result is determined. Thus, in some cases, one or both of the authentication application 120 and authentication server 155 may enforce policy in addition to verifying data for authentication based on policy. In other words, here, when network 121 connectivity is available to the various participants, an authority (e.g., like an authentication server or service) may permit or deny user access based on information included in an access request (or provided in response to one or more issued challenges), and an authentication application 120 may generate the access request (or provide challenge responses) in compliance with the policy.

In some cases, however, one or more networked services or servers may be unavailable to a mobile device 101 or relying device 140 (or a relying party) by which access (e.g., in accordance with an online authentication process) is granted. Accordingly, in some embodiments, upon registration, or upon (e.g., each) online authentication, in which a user of a mobile device 101 is permitted to access a relying device 140, the mobile device 101 may receive data by which the user may access the relying device in accordance with an offline authentication process. For example, the mobile device 101 may receive data corresponding to one or more offline values, instructions for determining one or more offline values, or a combination thereof. An offline value may permit user access to a relying device 140 in instances when one or more networked services or servers are unavailable. The data (e.g., an offline value) obtained by the mobile device 101 for offline authentication, in response an online authentication (or registration) to access a given relying device 140, may correspond to data obtained by the relying device 140 by which the data obtained by the mobile device 101 can be verified for offline authentication. For example, one or more authentication values, or instructions for authenticating one or more offline values, or a combination thereof by which an offline value or other data received from a user or mobile device may be authenticated in an offline authentication process may be provided to (or determined by) a relying device 140 upon registration or upon an online authentication. In some embodiments, a server or service may push data for offline authentication to the mobile device 101. In some embodiments, a server or service may generate data for offline authentication and push first data to the mobile device 101 and second data (e.g., by which the first data may be verified) to the relying device 140. In some embodiments, the relying device 140 may generate all or some of the first data or the second data, the first data may be pushed to the mobile device 101.

Some embodiments may establish offline values for DRM protected content or applications, such as those local to a relying device 140, but for which access thereto is permitted responsive to online authentication. Such content and application may be distinguished from non-local content and web-services for which networked services are required for operation, like where local data is not retained by the relying device 140 or within an internal (e.g., private network) that the relying device 140 is connected. As an example, a user may utilize an offline value to launch a photo-editing application locally installed to the relying device 140 or virtual desktop accessed by the relying device where external network access is unavailable, and locally cached (or stored) data may be accessed, but other online services or assets may be unavailable. Another example might be a game with a local component which a user may access and utilize without a network connection, but which may still be governed by online-DRM checks. Refreshed offline values, which may be generated in association which an online-authentication may be passed to the authentication application 120 for storage as offline values, and these values may be generated by the relying device 140 as permitted by a policy governing the content (or obtained by the relying device 140 from a relying party 145 or service 175 upon authenticated access in association with DRM compliance) and passed to the mobile device. In turn, those offline values may permit a limited number of offline-authentications, such as by inputting an offline value to the relying device 140 when attempting to access DRM protected content in the absence of networked access to perform an online-DRM check.

Accordingly, in some embodiments, policy verification, or verification of authentication results in accordance with a policy, may be performed on the mobile device 101 (e.g., with or by the TEE 103) in association with determination of an authentication result. For example, an offline policy may govern access to a relying device 140 or other resource in instances when an authentication server or service is unavailable (e.g., due to a loss of connection to a network 121 or other type of outage affecting one or more devices, servers, or services). In some embodiments, verification of compliance with an offline access policy may permit the release of an offline value by which a relying device 140 or other resource may be accessed during an outage. For example, based on the verification of compliance with the offline access policy, the TEE 103 may release (e.g., from a secure memory 107 of the TEE 103) an offline value by which a relying device 140 or other resource may be accessed during an outage. In another example, based on verification of compliance with the offline access policy, the TEE 103 may decrypt (e.g., within the TEE 103 by a key stored within the secure memory 107) an offline value (e.g., which may be encrypted and stored within memory 117 or the secure memory 107) by which a relying device 140 or other resource may be accessed during an outage.

In some embodiments, a mobile device 101 may be provided with a limited number of offline values, such as single use offline values, like a set of offline values (e.g., to which a corresponding relying device 140 is responsive) that are accepted (e.g., by the corresponding relying device 140) once each, and optionally must be presented sequentially. In some embodiments, a mobile device 101 may be provided with an offline value which must be concatenated with some other value (e.g., value corresponding to number of uses, or a value indicative of a count) to obtain an offline value in the set or a next offline value in the set. In some embodiments, after obtaining an offline value, the user may input a modifying value (e.g., displayed to the user by a relying device 140 based on a processing of the offline value) by which a next offline value may be obtained. In some embodiments, a mobile device 101 may be provided with an offline value (e.g., to which a corresponding relying device 140 is responsive) which may only be accepted a limited number of times. For example, a relying device 140 or other party accepting the offline value may increment a counter or value indicative of a use count for the offline value to accept the offline value only a limited number of times.

Thus, authentication may be subject to one or more policies, which may specify one or more rules by which users may successfully authenticate, whether online or offline (and where offline authentication rules may differ based on various factors). For example, a policy may specify one or more rules by which a mobile device 101 obtains one or more signals for authentication. An online policy component may specify one or more rules by which a mobile device may be authenticated, and authentication may be subject to verification of one or more signals from a set of signals obtained by the mobile device. An offline policy component may specify one or more rules by which a mobile device may be authenticated if one or more of the signals from a set of signals cannot be obtained (e.g., a network 121 connection via one or more wireless interfaces). For example, the offline policy may include one or more rules pertaining to wireless signal receiving interfaces of the mobile device 101 to prevent a user from bypassing an online policy by disabling such interfaces or routing communications on an interface through a proxy or other filter configured to prevent communications associated with authentication (e.g., to prevent collection of a signal or attempt to cause an offline authentication process). In some embodiments, policy rules may permit the mobile device 101 to utilize either an online authentication mode or offline authentication mode (e.g., based on locally stored policy rules) in normal use. In other words, a user may be permitted to elect to authenticate in accordance with an offline policy when online authentication is otherwise available. Thus, for example, the user may access a workstation or server (e.g., based on offline values released based on authentication in accordance with offline policy) which does not have network access. Additional configurations are disclosed herein which may implement detection and force utilization of one or more online authentication processes when available to the mobile device 101 based on an offline policy. These different policy configurations need not be mutually exclusive with respect to other disclosed aspects herein as access to different relying devices, like different workstations or servers or an issued workstation for a given user, by different users, may be governed by one or more policies (e.g., per relying device, per collection of relying devices, per user, per groups of users, or one or more combinations thereof). In various ones of the cases, the offline policy to which a given user (and in some embodiments the mobile device) is subject to for authentication to access a given relying device may be stored, e.g., cached, on the mobile device 101 of the given user and applied when the user elects to authenticate to the given relying device in an offline, or partial offline, authentication. For online authentication, in some cases, the mobile device 101 of the user may also store, e.g., cache, a policy for an online authentication process, which may indicate to which authentication rules or criteria the user (and in some embodiments the mobile device) is subject to for accessing a given relying device, such that a request to authenticate may be generated and include information (e.g., credentials) for authentication. In another online authentication example, the mobile device 101 may request a policy for a relying device in an online authentication process, such as by indicating in or by the request which relying device the user is attempting to access to obtain the policy for the relying device and sub Information for authentication may in turn be provided in response to one or more challenges, an indication of which policy rules or criteria the user or mobile device must meet to authenticate, or in accordance with one or more of the techniques described above and herein in combination.

In some example embodiments, authentication initiated via the mobile device 101 to permit user access to a given relying device 140 may be subject to obtaining a signal from a beacon (such as a Bluetooth, NFC, optical, sound wave (which need not be audible), or other beacon technology capable of emitting a signal which may be obtained by a mobile device within a given proximity of the beacon) positioned within proximity of (or otherwise associated with) the relying device, or GPS coordinates with a given geofence within proximity of the relying device, or connection to a WiFi network available within proximity of the relying device, and the like. In some embodiments, the mobile device 101 may obtain data conveyed by a signal, like a value or data encoded via the signal, or which the signal itself is indicative. For example, a signal may convey an identifier, like an alphanumeric identifier, a sequence of identifiers, or the like that is indicative of the relying device 140 or user being proximate to a relying device 140. In some cases, a wireless protocol utilized by a relying device or beacon associated with a relying device may be operable to receive communications from the mobile device, such as to receive a value pertaining to an access request, such as an offline value in an offline authentication process, although the relying device may receive such values via other interfaces, such as by user input.

In another example, a signal may comprise wireless connectivity, such as whether the mobile device 101 is connected to a wireless network, such as a WiFi network, like an internal WiFi network or other access point provided within proximity of the relying device 140. Connection information may indicate an access point, such as by an identifier of a networking device through which communications of the mobile device 101 are passing, like a particular router, or server, or other networking device which is proximate to the relying device 140. In some cases, access requests may be transmitted over such a wireless connection, such as to indicate that the mobile device 101 obtained wireless connectivity (e.g., to a network 121) within proximity of the relying device 140 to which the user is requesting access. Alternatively, the mobile device 101 may collect information about which wireless access points are available within the proximity of the mobile device 101 and communicate information about those access points in association with an access request over another communication channel. For example, the mobile device 101 may determine information about one or more WiFi access point(s) and communicate that information in association with an access request transmitted over a wireless connection (e.g., 3G, 4G, 5G, etc.) through a wireless service provider. In either case, a mobile device 101 may obtain other signals conveying other information for transmission in association with an access request over a WiFi, wireless provider, or other wireless network. For example, the mobile device 101 may obtain GPS co-ordinates from a global positioning satellite or via triangulation based on other signal sources, or a value from a beacon (e.g., as described above).

As noted above, a policy may include one or more rules, and those rules may specify which signals should be obtained, which communication interfaces should be active to obtain one or more signals, and also by which communication interface(s) a mobile device 101 may be permitted to transmit an access request. For example, the communication interface(s) a mobile device 101 may be permitted to transmit an access request in accordance with online authentication policy (e.g., to a server) may generally include those communication interfaces which are configured to exchange data over a network 121, like via WiFi access points or via wireless providers, but these examples should not be read to exclude other bi-direction wireless communication protocols or non-wireless communication interfaces like Ethernet. In an offline authentication process, a relying device 140, as noted previously, may be configured to receive an offline value via user input, but disclosed embodiments are not so limited. For example, in accordance with an offline authentication policy, a mobile device 101 may be permitted to transmit an access request (e.g., by conveying an offline value or other data) to a relying device or device associated with the relying device via one or more communication interface(s) in instances where those devices include a corresponding interface (e.g., instead of the user inputting the data). Example communication interfaces applicable to offline access policy may generally include those communication interfaces which are configured to exchange data between devices proximate to each other (e.g., directly in some cases), like via Bluetooth, NFC, and other near-field wireless communication protocols, such as to facilitate the conveyance of an offline value or other data pertaining to offline access.

In the context of prior processes discussed herein, the relying device 140 may be permitted to access resources of a relying party, such as various web-based applications or DRM protected applications and the like, and user access of the workstation under an account of the user (such as a federated account) may permit access to a suite of those online applications based on credentials (such as various certificates) associated with the federated account. For example, various single login/sign on techniques may be utilized to confer authentication results on credentials by which the user was permitted access to the workstation to online applications and other resources, or a company network, and the like. In some cases, accessing the relying device 140 may not automatically confer access to one or more web-services (or web-serviced applications and other controlled content via DRM) like those described above. For example, once a user access the relying device 140 the user may be required to authenticate to one or more web-services or relying parties 145 to access web-services like online resources 147, services 175A, such as via an application 110. As noted above, a user may utilize a mobile device 101 in a mobile initiated authentication to confer access to the relying device 140 on one or more of the web-services, which may including the passing of credentials 111 to the relying device 140 for, or by which, an application 110 may access web-services of a relying party 145 or services 175A. In some embodiments, policies (or frameworks) may prohibit the relying device 140 from retaining at least some credentials, such as the case with various virtual desktop applications or other polies that govern the retaining of credentials in a persistent cache or disabling of options to retain such credentials (e.g., a user may be required to provide credentials to a single login/sign on service after accessing a relying device or otherwise to access one or more applications 110, online resources 147, or other services 175A). Accordingly, in some embodiments, a relying device 140 may be a device of a relying party 145, such as within a corporate environment, though not need be limited to such configurations. For example, a relying device 140 may a user client device with a persistent or wake-able wireless connection to a network 121, such as within a home, and which may periodically report to the authentication server 155 in response to obtaining network connectivity or in response to a change in network conditions such that the authentication server may issue a session to the relying device 140 (e.g., which may include waking the relying device via a network interface of the relying device).

In some embodiments, a relying device 140 may be a controller or communicatively coupled to a controller which governs physical user access to areas or functions (e.g., valves or machinery or panels) via electrical signals. Such relying devices may thus control physical access or a function by activation of a given mechanism, like an electro-mechanical device, which may include an electromagnet, an electrical motor, a solenoid or other circuit to cause a change in an electromagnetic field to actuate a lock, like driving a pin into or out of a hole, changing a state of an electromagnet adjacent a ferromagnetic plate attached to a door, or the like (e.g., to access or secure access to an area or receptacle or otherwise interact with a secure asset—like a switch to turn on some device). The electro-mechanical device may include one or more hardware elements like a processor, memory, receiver, transmitter, and the like to receive results for authentication. Some electro-mechanical devices may process the results directly by verification of signature, or transmit the result and receive a response, such as from a server. In either instance, the electro-mechanical device may actuate a mechanism based on a received result. In other words, a relying device 140 may be a device within a relatively diverse set of devices, but may generally be a device which users physically access (e.g., in person) or controls physical access of the user (e.g., to a room, area, etc.).

The relying device 140 may have a connection to a network by which data may be transmitted to and received from various online entities, such as authentication server 155 and other services 175, in addition to relying parties 145 to access online resources 147. In some cases, an authentication server 155 may provide one or more additional services 175 (e.g., like a set of services 175B and other services 175A may be provided by other entities) discussed herein, though there exists no requirement thereof. Additionally, in some cases, the relying device 140 may control or facilitate control of other devices on a network, which may include the internet or be a local network or physical access infrastructure. For example, in some cases, the relying device 140 may be communicatively coupled to various controllers, or include such functionality, configured to generate electrical signals by which solenoids or other actuators (e.g., controlled device 141) are controlled, such as to unlock or lock a door or valve or other mechanical elements.

Thus, in some example embodiments, a relying device 140, may be a client-like device, or other device which a user physically accesses (e.g., like a terminal by which a server is accessed) or controls physical user access via a controlled device 141. In some embodiments, a user that performs a mobile initiated authentication to access a relying device 140 (which may include a controller configured to actuate another device like a controlled device 141 or cause a device to perform a function) may be afforded the same privileges as if that user physically provided credentials to the relying device or possessed a key-fob, or code, or key by which the user could access controller (e.g., of another device or a door or valve and the like). The relying device 140 may rely on one or more services 175, like authentication services, and user access to the relying device and other resources (e.g., via the relying device or controlled by the relying device) may be permitted in accordance with protocols of one or more of those services.

In some embodiments, the relying device 140 may communicate with one or more of the services 175 in response to information received via a session, such as a session initiated by a computing device performing example operations described with reference to the authentication server 155. For example, the relying device 140 may receive one or more authenticators from the authentication sever 155, which in some cases may be provided to the authentication server by a mobile device 101 in a mobile initiated authentication process. For example, a mobile device 101 may store the authenticators by which user access is granted to the relying device 140, thereby limiting consolidation of authenticators stored by an authentication server 155. Additionally, a mobile device 101 may store the authenticators by which the relying device 140 is granted access (or authenticated) to one or more web-services likes online resources 147 provided by a relying party 145, or services 175A which may include DRM permissions for applications 110 or content local to the relying device 140 or identity management services (e.g., those not managed by the authentication server 155), thereby limiting consolidation of authenticators stored by an authentication server 155. Further—at least in some cases—such techniques may limit consolidation of authenticators stored on a relying device 140 (e.g., to increase security) and permit storage of authenticators on a mobile device 101 for reducing user friction when authenticators are not retained on a relying device (e.g., to increase security).

In other words, like the authenticators by which a user accesses a relying device 140, authenticators for web-services may be stored on the mobile device for mobile initiated authentication operations to enable the user to authenticate the relying device 140 to access web-services via the mobile device 101 without waiting for a prompt. For example, credentials 111 for an application 110 or by which the application or relying device 140 may otherwise access online resources 147 or services 175A may be pushed to the relying device, such as over a session with authentication server 155 (which may receive and verify authenticators received from a mobile device 101). As the mobile device 101 may be registered to a relying device 140 (or otherwise known to the authentication server 155 by registration of an authentication application 120), and the authentication server 155 issues sessions to a relying device 140 to which the mobile device is registered (and receives indication of active user sessions with relying devices), the authentication server 155 can identify which relying device to push authenticators for web-services to which a user authenticates via the mobile device (e.g., by virtue of a request to mobile initiate an authentication to the relying device or by the user otherwise accessing the relying device which reports a user session for the user).

In some embodiments, such as where the user is authenticated to access the relying device 140 via mobile initiated authentication, relying device 140 may be authenticated to access one or more web-services to which the user also authenticates to access via the mobile device 101 with the authentication application 120, and the authenticators may be pushed to the relying device by the authentication server prior to the user physically accessing the relying device. The user, alternatively, may initiate an authentication to a web-service with the mobile device 101 after having accessed the relying device 140. In either case, in some embodiments, the authentication server 155 may push instructions, like a script, in association with one or more authenticators, which may cause the relying device 140 to launch an application 110 based on, or which may utilize, an authenticator to access (or authenticate to) a relying party 145 or service 175A. For example, the instructions may cause the relying device 140 to launch an application 110, like a web browser, navigate to a web portal via the web browser, and submit one or more authenticators as credentials 111 to access the web portal, which may be displayed within a browser window or tab. In another example, the instructions may cause the relying device 140 to launch an application requiring a user login and provide the authenticators as credentials 111 for performing the user login to the application (e.g., which may be transmitted to a relying party 145 providing online resources to the application 147 or service 175A utilized by the application). In another example, the instructions may cause the relying device 140 to authenticate on a service 175A with the authenticators, like a federated identity or single login/sign on provider which may confer access to online resources 147 of one or more relying parties 145, other services 175A, and the like.

In various embodiments, an authentication server 155 may verify access requests received from a mobile device 101, such as by verifying whether the access request complies with a policy, and which may include verification of representations of credentials stored by the user device, or other data, like certificates, such as by signature verification, where data is signed by a private key, or signature key, maintained within a TEE 103 of the mobile device 101 of the user. The authenticators, like representations, certificates, public key or signature verification key by which data signed with a corresponding private key stored within a TEE 103 may be verified, and the like, may be established during a registration process and may comply with techniques implemented by the authentication server to protect such authenticators in addition to compliance with one or more other services corresponding to the relying device.

In some embodiments, an authentication server 155 may be configured to perform operations like those discussed with reference to FIGS. 7-11, among others (e.g., one or more operations disclosed in FIG. 3 or 5-6). Additionally, the authentication server 155 or other server may provide one or more services 175 which may be utilized in connection with the disclosed techniques. In some cases, services 175B include those services provided by the authentication server 155, but may also include third party services 175A, such as to facilitate integration of mobile initiated sign on processes across different platforms. Embodiments of relying party servers 147 and services 175A may incorporate the functionality of the authentication server 155 or vice versa, which is to say functions disclosed herein may be consolidated or distributed among one or more computing devices in a variety of ways. Example services 175 may include services like those discussed below, which may be implemented by the authentication server 155 or other server in a first party or third-party capacity.

Some embodiments may include a ticketing service by which devices communicating over a network exchange identify proofs (e.g., credentials) in a secure manner. An example of a ticketing service may include a Kerberos based service. Example embodiments may include a mobile device 101 executing an authentication application 120 configured to cause the mobile device to establish and supply credentials to a server or service, which may be representations of credentials as discussed herein, and may include a certificate or representation of a certificate for issuance of a session to a relying device 140. Authentication of those credentials by a server or service may be subject to a policy including one or more rules. The authentication application 120 may be configured to generate, based on the policy, an access request which the mobile device 101 transmits to a server or service in a mobile initiated authentication process for authentication. The server or service may verify credential information provided by the mobile device 101 and verify compliance with a policy, and issue a session to a relying device 140 if the user is deemed authenticated based on the verification. In example embodiments of a ticketing service, a ticket, like a token, may be obtained by a relying device 140, like a workstation, responsive to a determination to issue a session by a server or service. In some embodiments, a session may be issued to the relying device 140 by an authentication server 155 for an authenticated user, like the user of a mobile device 101 having successfully authenticated with the server. The ticket may be obtained by the relying device 140 in accordance with an authentication or login process with the ticketing service, such as a Kerberos based service. In some embodiments, such as within a client-server environment, where the relying device 140 is a client type device (or includes at least some client computing device capabilities), an authentication server 155 may issue a session that causes the relying device 140 to fetch the ticket, either from a ticking service 175B of the authentication server 155 or other ticketing service 175A.

In some example embodiments, such as within a windows-based computing environment of a relying device 140, an authentication server 155 may issue a session that causes the relying device 140 to fetch a ticket, either from a ticking service 175B of the authentication server 155 or other ticketing service 175A. The relying device 140, such as via an active-directory, provides login services to permit user access to an account based on the ticket. Active directory-aware applications (e.g., applications 110) may fetch service tickets, so the user to which the session was issued is not prompted to authenticate or re-authenticate (e.g., provide credentials 111) for one or more applications. In some embodiments, those applications 110 to which the user is credentialed via service tickets may access online resources 147 provided by various relying parties 145 which may be the same or different from the party managing the relying device 140 (e.g., the applications 110 may be automatically credentialed to access internal resources among others, like $3^{rd}$ party resources). In other words, the ticket obtained by the relying device 140 in response to issuance of the session may persist user access to the relying device and various software applications 110 requiring authentication of the user without prompting the user to re-enter credentials on the relying device.

In some embodiments, such as within a Unix or Linux-based computing environment of a relying device 140, an authentication module, like a pluggable authentication module (PAM module) may provide login services responsive to a session issued by the authentication server 155. Thus, for example, the relying device 140, such as via a PAM module, provides login services to permit user access to an account based on the ticket. The PAM modules or other PAM modules may permit user access to other applications 110 based on the ticket so the user is not prompted to authenticate or re-authenticate (e.g., provide credentials 111) for one or more applications.

In some example embodiments, a ticket or token, like those described above, may be issued for granting user access to a relying device 140, such as after a mobile initiated authentication requesting user access to a given relying device 140. A ticket or token may also be issued for granting user access to a relying device 140 when the user otherwise accesses a given relying device 140, such as by inputting credentials directly to request access. Additional tickets or tokens may be issued to the relying device 140 for granting the relying device 140 access to web-services, and those tickets or tokens may be issued in association with a mobile initiated authentication to a web-service. In various embodiments of mobile initiated authentications to web-services, one or more of the those additional tickets or tokens may be issued to a given relying device 140 (e.g., the relying device to which the requested access to in a mobile initiated authentication) before the user physically accesses the device in a user session, or they may be issued after the user physically accesses the given relying device (e.g., a user session is active) either after a mobile initiated authentication or the user otherwise beginning a user session with a given relying device 140. As described herein, the authentication server 155 may issue user sessions to relying devices participant in the authentication system, and the mobile devices 101 of respective users are registered with the authentication system (and may additionally be registered with one or more participant relying devices). The authentication server 155 may thus identify a given participant relying device 140 to which requests from a mobile device 101 of a user for mobile initiated authentications to web-services pertain, either by identifying an active user session of the user with the relying device, or session issued to the relying device as a result of processing a mobile initiated authentication request from the mobile device 101 of the user to access the relying device. In turn, results of authentications to one or more web-services initiated via the mobile device 101 associated with the user (and which may be registered with the relying device) may be passed by the authentication server 155 to the relying device 140 for which the user has an active user session with or has requested (and was granted) access to which the authentication server issued a session. In some embodiments, the results may include one or more of those additional tickets or tokens may be issued to the relying device 140 in response to a user initiating via their mobile device 101 a mobile initiated authentication to one or more web-services. Those additional tickets or tokens, like those described above, or other authenticators that may be passed by the authentication server 155 over a session to the relying device 140, along with any instructions, like a script, which the relying device may process to automatically present the ticket or token to the corresponding web-service like a relying party or other service (or otherwise utilize the credential) to obtain access (or authenticate) to the web-service.

A token, or ticket, like that described above may be a Ticket Granting Ticket or Ticket to Get Tickets (TGT), which may be an encrypted identification file with a limited validity period (e.g., like a certificate having a limited validity period). After authentication, the encrypted identification file, or TGT, may be granted to a user for data traffic protection by a key distribution center (KDC) subsystem of an authentication service (e.g., 175A or 175B), such as according to a Kerberos protocol. The TGT file, such as for user account access (e.g., the user to which a session was granted), may contain a session key, expiration date, and an IP address (e.g., of the relying device) which protects from man-in-the-middle attacks. Once obtained by the relying device 140, the TGT may be used to obtain one or more service tickets from Ticket Granting Service (TGS), which grant user-level access to network devices or web-services. As described above, the authentication server may issue a session to a relying device 140 based on authenticators provided to the authentication server by a mobile device in accordance with a mobile initiated authentication process. Verification of authenticators, like representations of credentials and any user certification or other data may be performed by the authentication server 155 or services 175B thereof, which then issues a session (which may include issuance of a token or ticket) to the relying device 140. In some embodiments, issuance of a token or ticket to the relying device 140 cause the device to permit user access to the device 140 or, optionally, a controlled device 141. In some embodiments, a token or ticket provided to the relying device 140, which may be provided with instructions for utilizing the token (or the relying device 140 may determine which instructions stored on the relying device to utilize based on the token), may be utilized by the relying device to access or authenticate on a web-service. The relying device 140 may utilize an issued token or ticket to perform one or more corresponding logins with the service 175B or other services 175A, such as by the obtaining of a service tickets, which may provide user-level access to other resources on a network, such as via one or more applications 110. In some embodiments, a service ticket may permit user access to a controlled device 141. Accordingly, the user which the authentication service verified based on authenticators received from the mobile device 101 may be logged into the relying device 140 with a ticketing service and service tickets on the service may be obtained to permit user-level access (e.g., user account privileges) to other resources. In some cases, one or more service tickets on the ticketing service (or services tickets on multiple different ticketing services) may be issued based on mobile initiated authentications to web-services that may be performed in addition to, or in connection with, a mobile initiated authentication or after the user has physically accessed the relying device 140 in an active user-session. In some embodiments, a session may include issuance of a session key, such as a single-use symmetric key for protecting messages via encryption during a given communication session, and which may mitigate man in the middle attacks which may attempt to insert themselves between the authentication server 155 or service and relying device 140. In some embodiments, the authentication server 155 may utilize a single session to exchange data with the relying device 140, or the authentication server 155 may utilize multiple different sessions protected by different session keys for respective web-services or login services.

Other example services 175 may include, but are not limited to Integrated Windows Authentication protocols, which may include SPNEGO and NTLMSSP authentication protocols, in addition to Kerberos based or other ticketing based protocols. Similar techniques to those that utilize windows based Active Directory integration extend to Unix and GNU/Linux systems and the like. Moreover, functions or other devices, like controlled devices 141, which a relying device 140 may be configured to control may be automated based on rules or scripts to provide predefined functionality responsive to commands received from an authentication server or request-response results based on identifiers (e.g., for controlled devices 141) conveyed over corresponding sessions. Additional example services 175 may include services responsive to Security Assertion Markup Language (SAML) or other exchange techniques, and devices may be configured in accordance with such protocols as relying devices. For example, SAML is an XML-based language for exchanging user security information between an SAML identity provider (e.g., an authentication server 155 or service 175) and a SAML serviced device (e.g., relying devices 145 or other relying parties 145) or services 175. For example, mobile initiated authentication services provided by an authentication server 155 or service (e.g., 175B) may be configured to provide user access to a relying device 140 protected by a SAML and facilitate credential exchange (or authentication) of the relaying device 140 to access other relying party resources 147 with applications 110 or utilize other services (e.g., 175A).

The authentication server 155 may store data for authentication operations in an authorization repository 165. The authorization repository 165 may include a vast number of UID Records 151. A UID Record 151 may include information associated with a particular user and the devices associated with that user. In some embodiments, a UID Record 151 for a particular user may be created for a particular relying device or relying party or used across multiple relying devices or relying parties. For example, a given user may have a different UID Record 151 associated with the different relying devices or relying parties utilizing the authentication system and which the user engages. One relying party may be an employer of the user and others may be one or more providers of software or services to the employer, and others may be providers or software or services to a user, for example, another relying party may be a financial institution used by the user, and yet another relying party may be an application developer from which the user has purchased an application for personal use. A relying party, such as an employer, may include within the workplace, issue to employees, or otherwise utilize various relying devices. A user may also engage a consumer-based service to operate a personal relying device, like a personal computer, or other networked device. Thus, for example, a relying device may be associated with a relying party governing user access of different user accounts to the device (e.g., like an employer) or alternatively with a user account in a consumer-based service (e.g., like a home or small business account) and the relying device may utilize web-services provided by other relying parties (e.g., such as authentication services to access an application or other DRM controlled content, access online resources hosted by a relying party, like web applications or other services 175A, and the like). A UID record 151 associated with a relying device for a user may indicate (e.g., in addition to an employer or consumer-account governing user authentication for access to the relying device) one or more web-services to which the user is permitted to initiate authentication to, via their mobile device, to confer access to the relying device. The different UID Records for a same user may have some same information, such as whether a given mobile device 101 is permitted to authenticate the user to access a given relying device or with a given relying party (e.g., across one or more relying devices), and device information for a mobile device 101 of a user may remain the same across the different UID Records. Different UID Records, such as for different relying devices (or parties managing the different relying devices), may indicate whether a given relying device to which the user registers a mobile device is permitted to access a given relying party (e.g., like a set of permitted web-services the user may authenticate to via their mobile device to access from the given relying device) but not another. Different UID Records for different relying parties may be segmented within the repository 165 for a variety of different reasons, such as compliance with relying party requirements, government regulations, or user privacy in general.

Information associated with a particular user in a UID Record 151 may include one or more user identifiers that user uses with a relying party, such as a username, email address, employee ID, etc. The user identifiers may also be representations of user identifiers, such as cryptographic hashes of user identifiers, and the cryptographic hashing function may be specific to a given relying party. UID Records 151 may be created by the authorization server 155 when a given user elects to use an authentication application for user authentication to access assets of the relying party. Alternatively, UID Records 151 may be created by the authentication server 155 upon request by a relying party. The request may include user provided account information for generation of a UID Record. In some embodiments, the authentication server 155 may handle user registration for the relying party and receive and process some or all of the user provided information directly to generate a UID Record 151 for the user. A relying party administrator may also provide or otherwise create specified account information for generation of a UID Record, such as when an administrator of the relying party creates an employee account.

A UID Record 151 may include a plurality of constituent device records for devices associated with that user that may be used for authentication or accessing a secure asset or resource. For example, a user having UID record 151 may use a device A for user authentication and a device B for accessing secure assets of a relying party. In some embodiments, device A information may be associated with the UID record 151 when the user registers their mobile device 101 with the authentication server 155. In some embodiments, device B information may be associated with the UID record 151 when the user registers their mobile device 101 with a relying device 140 to permit mobile initiated authentication. In some cases, all or some of the device B information may be associated with the UID record 151 by an administrator, like a party (which may be a relying party) that determines user (e.g., the user to which the UID record 151 corresponds) privileges. For example, the UID record 151 may indicate to which relying devices the user is permitted to access, whether the user (or users) are permitted to access a given relying device (or a given relying party) by mobile initiated authentication, register with the relying device, and the like. In some cases, a user may be permitted to access a plurality a relying devices and which devices the user is permitted to access may be reflected by identifiers for those devices or a collection of devices within the UID record 151.

In some cases, a relying device (or devices) may be devices with which the user is permitted to register for mobile initiated authentications or which the user may be pre-authorized to access via mobile initiated authentications (e.g., embodiments contemplate a process by which a user may be registered to one or more devices, like a set of devices, during registration or by administrator authorization instead of individually in a piecemeal fashion). In some embodiments, a user device, like a mobile device 101, associated with a UID Record 151 may request (e.g., based on a policy associated with a given relying device) to enable mobile initiated authentications via the mobile device to one or more web-services (e.g., relying parties) the given relying device is permitted to access. In some embodiments, when a user device is registered with a given relying device one or more web-services of relying parties for which mobile initiated authentications have been established may be enabled (e.g., selectively based on policy) for the given relying device.

By way of example, Device A record may correspond to a mobile device 101 registered with the authorization server 155 for user authentication to access relying devices or online resources. During a registration process, such as one performed through an authentication application 120, initial information about the mobile device 101 may be collected and stored within the device A record. The initial information may include information operable to identify the device, such as in response to an access request. In some cases, that identifier may be used by the authentication server 155 to identify access requests received from the mobile device. Some of the information about the mobile device 101 may also be updated over time based on information about the device provided to the authentication server 155 by the authentication application 120 on the mobile device. The Device A record for the mobile device 101 may also contain out-of-band credentials A for authentication of a user of the mobile device, such as based on an access request. For example, the OoB Credentials A may include representations of various different credentials provided in a registration process of Device A and a public key for verifying signed data received from Device A.

Device B record may correspond to a relying device 140 to which the user registers via their mobile device 101 for mobile initiated authentications, or which the user is otherwise permitted to access. Depending on the relying party, there may be multiple device records corresponding to different relying devices used by the user over time. A Device B record for a relying device may be created when a relying device is configured by a system administrator (e.g., of the relying party). In some cases, the Device B may be assigned to a specific user, such as by a UID Record 151. Alternatively, one or more users may be permitted to register with a Device B (e.g., in which case the Device B may be associated with their respective UID Records 151) and different Device B records may be established in association with the UID records of the users. The repository 165 may also store information such as which users are permitted to register with or otherwise access which relying devices and the like. A UID record 151 may include additional or different Device B records (e.g., multiple) over time as a user is permitted to access different relying devices or different sets thereof.

In some cases, a relying device 140 may optionally be registered with the authentication server 155 for use by a particular user or to access secure assets of the relying party. A Device B record for a relying device 140, like a client-type device, may contain an identifier or other identifying information for the device and optionally credentials B, where those credentials may be in-band credentials (e.g., account/password/token/keys, etc.), representations thereof, or various authenticators for applicable embodiments. In some cases, the ID B may be an address of the Device B, like a network address, by which information may be transmitted to the Device B, such as to initiate a session for a user during a mobile initiated authentication. In some cases the credentials B may include data by which authenticators corresponding to the Device B may be verified. For example, a certificate may be valid when signed, and credentials B may include a public key and the certificate by which the signature may be verified (and an access request may include a timestamp or other value associated with the signature, which may be incorporated within the signed data such that the mobile device proves possession of the private key corresponding to the public key by signature over specific data in a zero-knowledge proof). Some of those credentials (or representations or authenticators) may alternatively be stored under the UID Record 151 for relying device 140 in general rather than for a specific relying device. However, some credentials (or representations or authenticators) may be preferable to store in a device specific fashion, such for each relying device which the user registers with for mobile initiated authentication or is otherwise permitted to access, to increase the difficulty of an attack to obtain access to a relying device. Additionally, specific relying device records may provide management oversight where different devices are utilized to access different assets (e.g., with a given license (e.g., a product key) for some secure asset) or are configured to manage different controlled devices 141.

In some embodiments, permissions, or policy, may be specified for a UID Record 151 or for a given device. Permissions for a UID Record 151 may, generally, may define which assets the user (associated with the UID Record) may access and how the user may access those assets. Permission for a client device (e.g., one registered by an administrator associated with a relying party), generally, may define which users may access the device and optionally what assets that device is permitted to access, which may differ from assets the user (associated with the UID Record 151 of the user utilizing the device) is permitted to access. Similarly, policy information may be stored. For example, policy information may be specified for mobile initiated authentication of users to Device B. The policy information may include the one or more rules by which an access request must comply to verify the request and permit access to Device B, such as by issuing a session to the Device B for the user of the UID Record 151 which requested the access. Policy information may also be specified for mobile initiated authentication of users to web-services of various relying parties for which access thereto is conferred to Device B. The policy information may include the one or more rules by which an access request must comply to verify the request and permit access to the web-service by Device B, such as by passing authenticators over a session issued to the Device B for the user of the UID Record 151 which requested the access.

For example, in a business environment context, a relying device 140 may be assigned to a particular employee by an administrator of the relying party and Device B record may be stored under the UID Record of the employee. In other instances, a relying device 140 may be used by multiple employees and a record thereof may be associated with different ones of the UID Records, such as when a user corresponding to a one of the UID Records registers to access a given one of the relying devices. Alternatively, in some embodiments, an administrator may register one or more relying devices to one or more UID Records with specific permissions to restrict use of those relying devices to that specified subset of users or such that only registered devices may access secure assets.

In another example context, a party managing a number of relying devices may specify permissions governing amounts or types of devices allowed under a UID Record 151. As described above, the UID Record 151 may contain a user identifier tied to a particular user/account. When a given mobile device 101 attempts to register a relying device 140 in association with that user identifier, the authentication server 155 may create a device record (e.g., Device B) corresponding to the given relying device under the UID Record 151 for that user identifier. Thus, which relying devices 140 are associated with which users may be tracked via UID records. Permissions may specify a number of relying devices which may be active under a given UID Record 151, such as to limit the number of relying devices to which a user may register. Tracking relying devices in this manner may also be used for security purposes, such as to detect when a user attempts to register with over a threshold number of relying devices, whether or not those access attempts are successful, and whether the user is permitted to register with those relying devices. Additionally, thresholds may be established for the number of relying device 140 which a user may register to within a given amount of time or additional, different, or multiple credentials may be requested during a registration process for additional relying devices.

The auth repository 165 may be configured to respond to queries to return, store, or otherwise provide data corresponding to UID Records 151, such as to the authentication server 155 in association with a registration or authentication process. Some or all of the information stored within the auth repository 165 or representations thereof may be stored within the UID repository 160, such as where a relying party 145 manages a number of relying devices 140, and may implement authentication server functions or services as an internal rather than external service. A relying party 145 may also specify information for records within a UID Repository 160 and those records or data corresponding to those records may be passed to an authentication sever 155 for managing authentication operations associated with those relying devices. Benefits of such configurations including an authentication server 155 (e.g., as a third-party service) may reduce overhead for relying parties 145 managing relying devices 140 and relying parties 145 providing online resources 147 or services 175A as they can significantly offload authentication burden and reduce storage of user specific data in addition to increasing security. However, such configurations are not limiting, as a relying party 145 may implement an authentication server 155 for management of relying devices and online resources of the relying party (among access of other relying party resources by managed relying devices), such as within a corporate environment.

FIG. 2 illustrates an example computing environment 200 within which an identity management system may be implemented. The computing environment 200 may include a computing platform by which the identity management system may be implemented. In some embodiments, the identity management system manages federated identities. In some embodiments, the identity management system implements zero-knowledge authentication credentials within a decentralized computing platform. In some embodiments, the identity management system supports authentication for federated identities within a decentralized physical computing architecture or platform. In some embodiments, out-of-band authentication is supported for established identities and federated identities. In some embodiments, the identity management system manages payments or physical access, each of which may be authenticated based on credentials stored within a decentralized computing platform. Thus, example embodiments of the identity management system within the computing environment 200 may incorporate or otherwise use various ones of the principles and processes described herein with respect to user authentication and out-of-band authentication techniques of FIG. 1A and FIG. 1B, which may include but is not limited to the establishment of zero-knowledge credentials, authentication of user to use a secure asset, like an identity, and the like. Moreover, those principles and processes may confer similar benefits when so incorporated within the identity management system.

As noted above, the computing platform on which the identify management system is implemented may include a decentralized computing platform. The decentralized computing platform may be a blockchain-based computing platform, though embodiments are not limited to implementations on blockchain-based computing platforms and some embodiments may execute on monolithic, distributed, or non-blockchain-based decentralized physical architectures, none of which is to suggest that any other described feature serves to limit claim scope. The decentralized computing platform, when implemented, such as within the example computing environment 200, may have a distributed and decentralized physical computing architecture. The computing platform may include some or all of the aforementioned aspects and is described in greater detail below.

Within the computing environment 200 of FIG. 2 various entities are depicted and those various entities may interact within the computing environment in at least some example embodiments. For example, FIG. 2 depicts a mobile device 101, client device 135, application servers 245, and authentication server 155. Over the example computing environments of FIG. 1A and FIG. 1B, the computing environment 200 includes a plurality of computing nodes 201 of a decentralized physical computing architecture or platform. These example entities may communicate amongst each other and with other entities, and those communications may occur directly or indirectly over the network 121 through the exchange of data (e.g., by way of one or more requests and responses on various protocols over the network). For example, servers 245 or 155 may communicate with a computing node 201 and one or more other entities over the network 121 to perform operations to determine, store, or receive results within the identity management system. Similarly, a computing node 201 may communicate with one or more other computing nodes and one or more other entities over the network 121 to also perform operations within the identity management system, and so forth for the other illustrated entities. In some embodiments, the network 121 includes the public Internet and a plurality of different local area networks.

In accordance with at least some embodiments, the computing environment 200 includes a plurality of computing nodes 201 of a blockchain-based computing platform. In some embodiments, an authority, like the entity operating the authentication server 155, may operate some or all of the computing nodes 201. For example, in some embodiments the identity management system may be a private identity management system implemented by a company and used by employees to access internal company assets and resources. Alternatively, in some embodiments, the identity management system may be an identity management system offered as a service, such as by an authority operating the authentication server 155, to multiple companies. In either instance, a company may use the service for private identity management (e.g., for managing employee access to internal company assets and resources) or for public identity management (e.g., for managing customer access to external company assets and resources or authentication operations).

A given entity within the computing environment 200 need not be required to communicate with each other entity. For example, applications servers 245A, 245B need not communicate with each other or even a same computing node 201, and not all computing nodes may communicate directly with each other but rather indirectly by communicating with at least some other computing nodes. In some embodiments, one or more of servers 245, 155 may operate as computing nodes 201 or include at least some computing node functionality. In some embodiments, a collection of computing nodes 201 may include one or more servers of parties that participate in the identity management system, like parties managing application servers 245A, 245B. For example, a party A managing application server 245A may configure application server 245A with computing node functionality or instantiate another server with computing node functionality. Further, one or more of the computing nodes 201 may include various servers, like authentication server 155, or otherwise instantiated by a similar entity (e.g., an entity having at least some role in instantiating, managing, or otherwise participating in the identity management system). Thus, in some embodiments, the authority may operate one or more computing nodes 201 and a company utilizing identity management service may also operate one or more computing nodes 201.

Depending on the embodiment, such as according to the various configurations outlined above, the entity having instantiated and managing the identity management system (e.g., the entity managing the authentication server 155) may exert a varying degree of control over the distributed and decentralized nature of the identity management system. For example, some functionality may be reserved for the authentication server 155, such as publication of an authorized user identity record for a user or addition/removal of keys, accounts, users or credentials under a user's user identity record. Other functionality may not be reserved, such as authentication of a user to a user identity, thereby allowing that user to access an online resource. In some embodiments, functions are performed, based at least in part, on one or more transactions committed to a decentralized data store. Some functions may include a transaction storing data to a transaction record within the decentralized data store (and the stored data may be based in part on one or more prior transaction records), some functions may include accessing one or more transaction records within the decentralized data store to determine a result based on the accessed transaction records, and some functions may include a transaction storing data based on the result to the decentralized data store (and the stored data may be based in part on one or more prior transaction records). Some functionality may be governed by one or more smart contracts 207 residing on the computing nodes 201. For example, a smart contract 207 may specify a schema by which entities may perform one or more functions within the decentralized data store. Thus, example embodiments of the identity management system within the computing environment 200 may incorporate or otherwise use various ones of the principles and processes described herein with respect to user authentication and out-of-band authentication techniques of FIG. 1A and FIG. 1B and those principles and processes may confer similar benefits when so incorporated within the identity management system. For example, one or more authentication functions for in-band or out-of-band authentication may be implemented via an executable smart contract 207, authentication server 155, or other entity (e.g., a corresponding application server 245) and operate on data stored within the decentralized data store (e.g., rather than in some other data repository, although that is not to suggest that one or more repositories may not be operated in parallel and retain some data exclusively or redundantly).

As described above, the decentralized physical computing architecture or platform of the computing environment 200 may include a decentralized data store, which may be a blockchain-based decentralized data store. For example, FIG. 2 illustrates an example of a decentralized data store as a directed acyclic graph 205. The example directed acyclic graph 205 may include a number of blocks, e.g., blocks 21-25, where each next block references a prior block so as to form a chain of blocks or "blockchain." Each block may include a number of transaction records. Although not shown, transaction records within a block may be stored within one or more nodes. Conceptually, those nodes storing transaction records may be visualized as leaf nodes within a tree-like structure, like a binary tree, or binary Merkle tree, having a root node and a plurality of intermediate parent nodes, whereby each leaf node may be referenced to the root node via a plurality of references through intermediate parent nodes. In some embodiments, references are pointers indicative of a location of some data stored within the decentralized data store. In some embodiments, references are associated with a hash, like a cryptographic hash, based on previously stored data to afford a tamper-evident storage scheme. In some embodiments, references are hash pointers, which may be cryptographic hash pointers, and the references themselves may afford a temper-evident storage scheme. Examples are discussed in greater detail below.

In some embodiments, the computing node 201 is a computing node of a decentralized computing platform comprising many computing nodes. While only one computing node 201 is shown in detail, embodiments may include many more computing nodes, for instance, numbering in the dozens, hundreds, or thousands or more. In some embodiments, one or more of the computing nodes 201 may be rack-mounted computing devices in a data center, for instance, in a public or private cloud data center. In some embodiments, various ones of the computing nodes 201 may be geographically remote from one another, for instance, in different data centers. In some embodiments, personal computing devices, whether a mobile computing device, client, or server device in user homes, may also function as computing nodes. Thus, in some embodiments, the computing platform that the computing nodes instantiate may be relatively to very decentralized where at least some of the computing nodes are operated by various different parties and may also perform other functions for various different purposes. For example, although only two application servers 245A and 245B and one authentication server 155 are shown, 10's, 100's, or 1000's of other parties may operate other application servers or different servers for different purposes, and those servers may number in the 10's, 100's, or 1000's and be geographically distributed along with computing nodes operated by those parties. However, that is not to say that in some embodiments a computing node 201 or nodes may be collocated (or in some cases, all be deployed within a single computer cluster).

In example embodiments where computing nodes 201 are part of a decentralized computing platform comprising many computing nodes it should be recognized that a computing device participating within the identity management system need not communicate with any one specific node. Rather, each may communicate with a different one/multiple of the computing nodes of the decentralized computing platform and also may communicate with different ones of the nodes at different times. Further, in some embodiments, one or more of the application servers 245 or authentication server 155 may be a computing node or incorporate all or some computing node functionality, thereby operating as part of the decentralized computing platform or configured to communicate with at least some of the nodes (e.g., to submit or retrieve data, not substantially process data).

In some embodiments, computing nodes, like example computing node 201, may operate upon various types of information stored within the decentralized data store of the computing platform. Examples include a directed acyclic graph 205 of cryptographic hash pointers, such as a blockchain or other tamper-evident, immutable, decentralized data stores. Other examples include various scripts in a scripting language executable by the computing node 201, for instance with verifiable computing, such that no single computing node 201 needs to be trusted. In some embodiments, these scripts or programs may be referred to as smart contracts 207, a term which should not be confused with a contract or agreement in law, finance, or other similar instrument. Rather, smart contracts 207 refer to programs executable by computing nodes to perform one or more functions within decentralized computing platform in a consistent manner, and those programs in some cases may be tamper-evident, immutable decentralized programs. As a result, a given smart contract may be executed by any one computing node and execution of that smart contract should provide a same result for given inputs as some other computing node (and thus, in some embodiments, affording verification of that result by one or more (e.g., in a consensus) of the other computing nodes). For example, a smart contract 207 may be stored within the decentralized data store, loaded by a computing node 201 into a memory of the computing node, and executed to perform one or more functions according to the script or program defined by the smart contract. For example, the authentication server 155 may publish a smart contract 207 to the computing platform such that computing node 201 (or other nodes) may process information stored in the directed acyclic graph 205, or other information, to perform one or more functions according to one or more operations enumerated in the smart contract.

In a more specific example, the authentication server 155 may publish a smart contract 207 by which a computing node 201 may execute a process to authenticate a user based in part on information stored within the decentralized data store, and the result of the authentication may govern whether a given action requested by the user (e.g., to log-in to an account, access a resource, make a payment, etc., as described herein) is permitted within the computing platform. A smart contract 207 can be a contract in the sense that the logic of the smart contract is immutable in some implementations once stored within the decentralized data store or loaded to the decentralized computing platform and thus serves as a form of a commitment to a particular body of logic.

The term "immutable" should not be read to require that immutable data be written to a form of physical media that prevents subsequent writes (e.g., a ROM or write-once optical media). Rather, the term "immutable" refers to a data structure that does not support modifications to data once written. In some cases, this feature is afforded by making the data structure tamper evident, e.g., computationally infeasible to modify committed data without rendering the data structure internally inconsistent. In some cases, the data structure computational infeasibility of undetectable modifications may be afforded by chaining the above-described cryptographic hash values, such that verification of tampering consumes less than $100,000^{th}$ of the computing resources (e.g., in time or memory complexity) of computing resources needed to modify the data structure to be consistent with a modified previously written record.

In some embodiments, a smart contract such as smart contract 207 may be stored in the directed acyclic graph 205 or otherwise published to the decentralized data store, or in some cases, the smart contracts may be stored in a different tamper-evident, immutable, decentralized data store from that of the data upon which the smart contracts operate. One example smart contract 207 is shown, but it should be emphasized that there may be, and in some commercial implementations likely will be, multiple instances smart contracts with variations to implement new or different logic. For example, different smart contracts may be configured to perform different functions or similar functions based on different criteria, which may be specific to a given party participating within the system. In a specific example, a party A might authenticate a user based on different criteria than a party B, and those authentication processes may be enumerated in different smart contracts. However, that is not to say a smart contract cannot include logic to accommodate those different criteria. For example, in some cases, the smart contracts may be composed of or reference other smart contracts or invoke or draw upon logic implemented outside of the decentralized computing platform. For example, a smart contract for performing a process like that in FIG. 3B (e.g., for authentication of a user) may in some instances call to another smart contract to perform a process like that in FIG. 6 (e.g., for authentication of a user based on records or verification of authentication as publishing of a record of that authentication). Similarly, a smart contract or contracts may perform processes like those described in FIGS. 3 and 5-9 and implement other processes (e.g., like one or more processes performed by a server) discussed with reference to FIG. 1A, FIG. 1B, or FIG. 2. Some smart contracts may interface with the outside world relative to the decentralized computing platform, such as via authentication server 155 or other entity specified in the contract.

In some embodiments, smart contracts, like smart contract 207, may be callable by the various entities within the computing environment 200. Additionally, an entity, like the authentication server 155, may publish new smart contracts callable by the authentication servicer or other entities (e.g., application servers 245). For example, the authentication server 155, application servers 245 or other servers operated by additional parties participating in the identity management system in commercial scale embodiments, may execute a peer client application of the decentralized computing platform or otherwise send messages to application program interfaces for performing operations within the decentralized computing platform to call the smart contracts and receive results. In some embodiments, the smart contracts may have an address, for instance, in a data storage address space of the decentralized computing platform, like an address corresponding to a cryptographic hash of program code of the smart contracts. In some embodiments, the smart contracts may accept arguments, such as various variables or criteria that may be passed to the smart contract and which may be operated upon by logic of the smart contract. Examples of arguments and their variables may include references, like an address, to data within the decentralized computing platform, data for storage within the decentralized computing platform, or other criteria described herein for determining a result. In some cases, each smart contract may have a respective application program interface (API) with a schema defined in the corresponding smart contract that enumerates arguments that are required, arguments that are optional, default values for arguments, types of those arguments, and the like. Such smart contracts may be implemented on computing nodes 207 participating on a protocol corresponding to the decentralized data store, such as an Ethereum blockchain protocol for an Ethereum based block-chain data store. Other blockchain-based (or distributed computing architecture) protocols may be utilized, and it should be emphasized that embodiments are not limited to implementations on blockchain-based computing platforms and some embodiments may execute on monolithic, distributed, or non-blockchain-based decentralized physical architectures, none of which is to suggest that any other described feature serves to limit claim scope.

In some embodiments, an address of a smart contract 207 may be called with an API call (i.e., a request) including request parameters such as the address and one or more values for arguments defined in the schema of the smart contract. In some embodiments, the smart contract may respond to the API call by executing a process to perform a function within the identity management system, and the function may include storing a transaction record on the blockchain that records the request or results to the blockchain. This, in some cases, may include calculating a cryptographic hash value (or values) based on the request or the results and a cryptographic hash value of one or more other transaction records in the blockchain by which the results were determined. In some cases, a new entry (e.g., a new transaction record) created by the smart contract 207 may include this cryptographic hash value and pointers to those other nodes. In some cases, such as for the other transactions records in the blockchain by which the results were determined, the transaction record may include in association with the cryptographic hash value or pointer an indication of which arguments or other criteria were satisfied according to that transaction record to arrive at the results.

In some embodiments, a plurality of the computing nodes (which may include at least a majority of the computing nodes) executing a decentralized application implementing the block chain may execute a routine specified by the smart contract, and some embodiments may implement a consensus algorithm among those computing nodes, like Paxos or Raft, to reach a consensus as to a result of executing the smart contract. The result may be stored in the block chain and this process may be repeated for subsequent requests process by the smart contract. Some embodiments may interrogate these records, and those functions may also be enumerated in smart contracts. For example, one smart contract may perform the function of creating records of user identities within the identity management system. Another smart contract may perform the function of creating records that associate accounts of a user with a user identity within the identity management system. Another smart contract may authenticate a user as the owner of an identity and call another smart contract or include operations to authenticate that user to access to an account associated with that user identity based on a verification of those records (e.g., by recreating the calculation of the cryptographic hash values along each link in a chain of cryptographic hash pointers and comparing the recalculated values to the values in the chain to confirm (in virtue of matches) that the records are authentic). In some embodiments, the smart contract may store a record of the results of the authentication based on the successful verification to the blockchain. In turn, in some embodiments, the record of the authentication may be referenced in a subsequent authentication request to reduce friction on the user. These, and other configurations of smart contracts within the identity management system, are discussed in greater detail below.

In some embodiments, the directed acyclic graph 205 comprises cryptographic hash pointers to provide a tamper-evident, immutable, decentralized data store to which the smart contracts are stored and to which transaction records accessed by the smart contracts are stored, which in some cases may include results determined by the smart contracts as well as requests and their arguments to the smart contracts. In some embodiments, storing a transaction or smart contract to the directed acyclic graph 205 may include storing a record all of the information of that transaction or smart contract (e.g., the program code of the logic of the smart contract that is executed by the computing nodes 201 (e.g., in a virtual-machine) of the decentralized computing platform corresponding to a target of byte code into which smart contracts are interpreted) in content of nodes (e.g., a node in a tree of nodes, like a Merkle tree, and a given tree may be stored in a block) of the directed acyclic graph of cryptographic hash pointers. Cryptographic hash pointers pointing to those nodes include cryptographic hash values (as part of node content of the node that is pointing) that are based on node content (of the node to which is pointed) that includes the record of stored information (e.g., transaction information or smart contract information), thereby defining a chain of cryptographic hash pointers that becomes increasingly computationally expensive to modify (while remaining internally consistent) in the event of attempted tampering as the chain increases in length or tree increases in size. In some embodiments, a plurality of different directed acyclic graphs of cryptographic hash pointers may store different subsets of the information, may store replicated instances of the information, or in some cases a single directed acyclic graph of cryptographic hash pointers may store all of this information. In some cases, the directed acyclic graph is a sub-graph of a larger graph with a cycle, and in some cases the directed acyclic graph includes unconnected subgraphs. For example, different types of transactions or smart contracts may be stored in different sub-graphs of the directed acyclic graph.

In some embodiments, recording of information like a transaction to the directed acyclic graph 205 of cryptographic hash pointers is achieved by storing a cryptographic hash digest of the information in node content of the directed acyclic graph of cryptographic hash pointers. The cryptographic hashes in the hash digest may be operable to identify (e.g., other transactions in other nodes by cryptographic hash pointer) or verify information (e.g., on-chain or off-chain information by cryptographic hash) associated with the transaction. In some embodiments, node content may be a transaction for storing data, like a sstore or Txdata function, which may also include transaction fees for the transaction to store the data. In some embodiments, recording of information like a smart contract to the directed acyclic graph 205 of cryptographic hash pointers is achieved by storing the smart contract in node content of the directed acyclic graph of cryptographic of hash pointer by a transaction for storing data, like a sstore or Txdata function. In some embodiments, a cryptographic hash digest of the smart contract is stored in node content, where the cryptographic hash digest may include cryptographic hashes operable to identify previous versions of the smart contract (e.g., stored in other nodes by cryptographic hash pointer), identify other smart contracts to be called during execution of the smart contract (e.g., stored in other nodes by cryptographic hash pointer), or verify information (e.g., on-chain or off-chain information by cryptographic hash) such that the smart contract or other information access by the smart contract whether stored on-chain or off-chain can verified by the cryptographic hash digest.

In some embodiments, a transaction for data storage may include representations of credentials, public keys, user account identifiers, or other information stored outside of the directed acyclic graph 205 of cryptographic hash pointers. In some embodiments, a public key may be considered a representation of a credential (e.g., a private key) because it is representative of some other knowledge (the private key) held in confidence by a user or entity without being exposed. Rather, signed data is exposed for signature verification as proof that the user or entity has access to the private key. In some embodiments, a public key may be a user account identifier or an identifier of an entity, as that public key corresponds to a private key retained by a given user or entity. Representations of some or all of that data may be cryptographic hashes included in a hash digest. For example, values corresponding to the above data may be cryptographically hashed (e.g., by execution of a smart contract for performing the function of storing that data) and stored in the hash digest. Some or all of that data may also be stored directly, as some or all of that data may be cryptographically hashed, encrypted or otherwise determined (e.g., by a mobile device, such as within a trusted execution environment of the mobile device, application server 245, or authentication server 155) prior to input (e.g., as a value or values of an argument) for a smart contract. Those cryptographic hash values (or other hash digest) may be stored as node content of the directed acyclic graph 205 of cryptographic hash pointers. The information stored outside of the graph 205 may then be verified as having been untampered with or authenticated by recalculating the cryptographic hash value based on the asserted address, time, and transaction information and comparing the recalculated cryptographic hash value to the cryptographic hash value stored by the transaction in the directed acyclic graph of cryptographic hash pointers. Upon determining that the hash values match, the credentials, user account identifiers, or other information may be determined to have not been subject to tampering (e.g., can be authenticated), or upon determining that the values do not match, it may be determined to have been tampered with (e.g., cannot be authenticated). Further, to verify that the cryptographic hash value in the directed acyclic graph has not been tampered with, some embodiments may recalculate cryptographic hash values along a chain of cryptographic hash pointers to confirm that the recalculated values match those in the directed acyclic graph (e.g., can be authenticated), thereby indicating the absence of tampering (or upon detecting a mismatch, indicating the presence of tampering and cannot be authenticated).

In some cases, a transaction for data storage includes one or more keys, like one or more public keys, operable to verify a data signed with corresponding private keys of a key-pair. For example, a user might claim ownership of an existing user identity enumerated within the identity management system in a transaction record in the directed acyclic graph 205 by supplying an address of the transaction record, a representation of a credential, and a signature of the credential with a private key as arguments to a smart contract. The smart contract may verify the ownership claim by accessing the transaction record based on the address, identifying corresponding credential information associated with the transaction record (e.g., stored in the hash digest), and verify the signature with a public key associated with the transaction record. Verification of the signature indicates user ownership of the user identity enumerated in the transaction record by virtue of the user proving ownership of the private key. In practice, such as for an authentication function performed by a smart contract, the representation of the credential may be provided in a string that includes other or different data, like a time stamp or a randomly generated identifier, like a token, supplied to the user device, according to a schema of the smart contract. The signature by the private key may be performed over the whole string such that the resulting verification confirms one or more of temporal proximity of signing to verification of the signature or generation of the token (and also ownership of the token). The transaction record may also be verified as being untampered with, such as by a process for recalculating values along a chain of cryptographic hash pointers from a node storing the transaction record to a root node of a block, and then for the block in blockchain, etc., thus indicating that the transaction record can be authenticated along with the user claim to ownership of the transaction record. Where the transaction record includes cryptographic hash pointers to other transaction records in a hash digest, those other transaction records may also be verified. Thus, for example, when an ownership claim by a user to a given transaction record is authenticated, that authentication may also confirm ownership to one or more additional transaction records included in the hash digest.

In some embodiments, on-chain information may be stored according to a data structure specified by a unified schema, and the unified schema may be implemented in a smart contract. Different smart contracts for different functions may have different unified schemas, but each different schema may be considered unified for a given type of transaction record (e.g., according to function within the identity management system). For example, a transaction record corresponding to the enumeration of a user identity within the identity management system may have a different unified schema than a transaction record corresponding to the association of a user account with a user identity within the identity management system. Further, a transaction record corresponding to the authentication of a user based on a transaction record corresponding to a user identity or one or more associated transaction records for user accounts may have a different unified schema. Alternatively, the unified schema may be consistent across the different types of transaction records and unused data fields or values left null, blank, or omitted within node content having the data structure specified by the unified schema. Information having a data structure specified by a unified schema may be stored as node content by one or more transactions and may include a machine-readable portion, such as a portion of key-value pairs in dictionaries encoded as a hierarchical data serialization format, like JavaScript™ object notation (JSON) or extensible markup language (XML). In some embodiments, the off-chain portion may be a human-readable format including unstructured natural language text or clear-text that describes in prose information in the transaction. For example, an off-chain portion may describe different authentication criteria, different credential types (e.g., password, biometric, pin, etc.), and other factors that may be represented by values or ranges of values within the machine-readable portion. Or in some embodiments, this allocation may be reversed, intermingled, or otherwise differently arranged, which is not to suggest that any other feature herein is not also amenable to variation relative to the arrangements described.

In some embodiments, user identity records, authentication records, and other information in the unified schema may be stored into a data structure, which may be specified by the unified schema, that may be stored on the blockchain. In some cases, user identity records may conform to one unified schema while authentication records may conform to a different unified schema. For example, a unified schema may be operable to codify user identity information or authentication results in a unified schema for respective records in the data structure. In some embodiments, the data structure includes both XML or JSON code or vectors, for example, a value of a key-value pair may be a vector comprising an ordering of identity information or authentication result values, like a one or more public keys or credential representations or indication of criteria by which a user authenticated and the credentials provided to satisfy that criteria. In some embodiments, the unified schema specifies a translation between XML or JSON code and a vector such that a vector may represent a compact version of the XML or JSON code. For example, a key of a key-value pair within XML or JSON code may be a location within the vector and the value of the key-value pair may be represented by a same or different value at that location, each of which may be specified by the unified schema. In turn, that vector may be translated back into XML or JSON code according to the unified schema. Thus, for example, a vector may comprise a string of data comprising a plurality of values pertaining to a user identity record, authentication records, or a request asserting of ownership an identity record for user authentication based on one or more user identity records or authentications.

In some embodiments, a transaction fee, or amount of gas, that will be needed to effect a transaction in the blockchain, such as establishing a user identity record or authenticating a user to a user identity record. The calculation, in some embodiments, will result in a total gas amount. This amount, in some embodiments, may then be multiplied by the price of gas desired and used to buy ether, if necessary, to increase an amount of ether in a wallet (e.g., of the entity requesting the transaction). After enough ether has been purchased to complete the transaction, in some embodiments, the process will send the request and gas to an Ethereum™ contract to store the corresponding record on the chain. Other blockchain-based (or distributed computing architecture) protocols may be utilized, and it should be emphasized that embodiments are not limited to implementations on blockchain-based computing platforms and some embodiments may execute on monolithic, distributed, or non-blockchain-based decentralized physical architectures, none of which is to suggest that any other described feature serves to limit claim scope.

In some embodiments, this process may tie a user identity record or authentication records to an Ethereum™ wallet of the user identity record owner, or other wallet corresponding to a user within the context of other blockchain-based protocols or other implementations. Thus, for example, a request for authentication initiated by the user or response by the user to an authentication notification may be structured or determined based on identity information stored within the wallet. In some embodiments, an authorized party may manage or have access to the wallet of the user identity owner, such as by a transaction to associate an authorized user or device with the user identity record. In some embodiments, some transactions, like those for establishing user identity records, federating accounts under those under identity records, and authorizing additional users and devices to identity record or federated account access may be processed through an authority, like a authentication server 155, which reputably establishes identity records. Other entities may be permitted access to the identity records. Transactions occurring with higher frequency, such as for authentication of a user to a user identity record, may not flow through the authority. The decentralization of the process and immutability of data stored in blockchains means that a complete history or ledger of the changes made to a user account records can be chained back to its initial entry into the blockchain. The data structure being used, in some embodiments, to store a user identity records will either be an establishment of a user identity record entry or modification/updating of an existing user identity records entry. If it is based on an existing entry, in some embodiments, the data structure may include a cryptographic hash linking to the previous edition of the user account record for simplicity of finding one or more past iterations of the user account record. Similarly, such linking may simplify the identification of one or more prior authentication records (and the user identity record to which it pertains) to be considered in a current authentication request. Verification can still occur based on verification back to the entry in blockchain to irrefutably demonstrate no intervening changes of privileges conferred by the user identity records. However, linking can simplify review (e.g., by an interested party) prior to verification.

In some embodiments, content of nodes of the directed acyclic graph 205 of cryptographic hash pointers may be verified as having not been subject to tampering by determining whether that content is consistent with one or more chains, or other associative data structures (e.g., trees), of cryptographic hash pointers of the directed acyclic graph. In some embodiments, nodes of the directed acyclic graph of cryptographic hash pointers may include as node content a node identifier (e.g., an address in the graph) that distinguishes a node from other nodes of the graph, identifiers or one or more other nodes of the graph to which a cryptographic hash pointer of that node points, and an associated cryptographic hash values based on node content of those other identified nodes to which the cryptographic hash pointers point (in some cases, the pointing is from one and only one node to one and only one node for adjacent nodes). As additional nodes are appended to the directed acyclic graph, a chain of cryptographic hash pointers may be formed such that each subsequent node includes as node content one or more cryptographic hash values based upon some, and in some cases all of the previously published information published to the directed acyclic graph of cryptographic hash pointers. In some embodiments, following these pointers may be requested by a sload function which verifies that stored transaction records have not be tampered with or subject to other transactions such as to verify user ownership of a user identity, one or more user accounts, or an authentication decision based thereon.

The directed acyclic graph 205 of cryptographic hash pointers need not be referred to as a graph, or as having nodes or edges, in program code to constitute a graph, provided that a data structure affords the same or similar functionality, even if that data structure bears different labels. Similar qualifications apply to transaction records and the information they store or represent as described herein. For instance, graphs may be encoded in objects in object-oriented programming environment, key-value pairs, entries in a relational database, documents encoded in a hierarchical data serialization format, or combinations thereof, without being labeled as graphs.

In some embodiments, to expedite write operations (and in some cases, afford faster reads or verifications of reads), some embodiments may consolidate writes to the directed acyclic graph 205 of cryptographic hash pointers. For instance, some embodiments may form sub-graphs of directed acyclic graphs of cryptographic hash pointers that are collectively appended to an extant, larger directed acyclic graph of cryptographic hash pointers. In some embodiments, the directed acyclic graph 205 of cryptographic hash pointers may include a linked list, tree, or skip list of the sub-graphs. In some embodiments, the sub-graphs may be referred to as blocks, e.g., example blocks 21-25 as shown, with block 25 being current and blocks 21-14 storing one or more transactions pertinent to the examples described herein, and each may include 2, 4, 8, 16, 32, 64, 128, 256, 512, 1028, (e.g., 2^nth power of nodes) or more or less nodes, and one or more of those nodes may include node content, such as one or more of the various transaction records described herein.

In some embodiments, the appended sub-graphs may be implemented with a particular type of directed acyclic graph that affords relatively fast verification in addressing of published information. In some embodiments, the sub-graphs that are collectively appended may be binary trees, quad trees, radix trees, or the like. In some embodiments, the sub-graphs are Merkel trees, such as Patricia trees (lists herein should not be read as necessarily specifying mutually exclusive categories). In some embodiments, transaction records may be stored as node content of leaf nodes of a binary tree data structure that is collectively appended to the directed acyclic graph of cryptographic hash pointers upon completion of the tree data structure (e.g., achieving a threshold number of nodes, such 2^nth power of nodes to include in the tree data structure). Or in some cases, intermediate nodes of the tree data structure may include nodes having content in which published information is stored.

In some cases, those transactions may use the ERC 721 standard, which is incorporated by reference herein. ERC 721 defines a standard for tokens, which can be used in transactional exchanges, and held in an ether wallet, like a wallet for identities. Tokens may be unique, and thus, a token may be created and include transaction record information in the data structure specified by the unified schema for a type of transaction. In some embodiments, some aspects, like aspects of authentication results in the data structure, may be conferred to other tokens. The ERC 721 standard defines, for tokens, functions such as: name, symbol, totalSupply, balanceOf, ownerOf, approve, takeOwnership, transfer, tokenOfOwnerByIndex, and tokenMetadata. It also defines events, such as: Transfer and Approval.

In some embodiments, a smart contract may generate a token in association with one or more of the functions described herein. For example, a smart contract may generate a token representative of authentication results, and those results may also be stored in a transaction record in node content on-chain. The generated token may serve to provide representation of authentication results predicated on proving ownership of a user identity or user account transaction records and by which criteria the user proved ownership, by way of a user having a token representative of a successful authentication according to that criteria. Ownership of that token (e.g., within a wallet of the user) may confer a certain level of assurance (which may be tiered based on the criteria by which the user proved ownership) to the different parties participating in the identity management system, such as those operating application servers 245A, 245B, such that criteria by which the user must meet to prove ownership in a subsequent authentication decision are reduced or met by virtue of the token.

In some embodiments, a smart contract may receive as an argument a token indicative of a prior successful authentication and consume (e.g., destroy, modify, update, or otherwise receive and alter) that token during a subsequent authentication function, which may include generating a new (or modified) token indicative of transaction information for the authentication results of the subsequent authentication where that new token includes cumulative results (e.g., the different criteria by which the user authenticated for each authentication decision). In some embodiments, the different criteria satisfied by the user for each authentication decision may be associated with timestamps corresponding to the different authentication decisions and included in the token or corresponding transaction record. Thus, for example, honoring of previously satisfied criteria, which criteria a user has not satisfied or recently satisfied, and how recently a user authenticated and by which criteria may all be evaluated (e.g., by a smart contract according to criteria for authenticating the user) in one or more subsequent authentication decisions.

While tokens may be used in the above manner and afford convenient storage in a wallet to represent results of an authentication decision, the above should not suggest that a token must be used as a transaction record may as a transaction record of authentication results may also be referenced by its address and that transaction record may include (or reference other prior transaction records by way of cryptographic hash pointer that include) cryptographic hashes or associated keys (e.g., a public key for verification of a signature), by which the user may prove they effected the transaction by providing a signature (e.g., a representation of a credential signed with a private key) verifiable by the public key.

Thus, as described above, computing nodes 201 may execute smart contracts 207 to implement functions of the identity management system within the example computing environment 200. A computing node 201 may load and execute a given smart contract 207 in response to a request received via an API, and the request may include an address of or otherwise reference the given smart contract 207 (e.g., a location of the executable logic or computer program code, like a script, corresponding to the smart contract stored within the directed acyclic graph 205) to load and execute. The request may also include input values or strings according to a schema of the smart contract 207. Accordingly, those input values or strings may be provided in arguments in the schema of the smart contract 207 and the computing node 201 processes the input data according to the executable computer program code of the smart contract. Results of the processing may be published for recording in the directed acyclic graph 205 as a transaction record in node content. The computing node 201 may propagate the received request to one or more other computing nodes, and each of those computing nodes may propagate the received request to a further one or more other computing nodes. Results of the processing may be propagated in a similar fashion. Each node receiving the request may process the input data according to the executable code of the same smart contract by loading and executing the smart contract reference by the request to independently determine or verify results. In turn, the plurality of computing nodes may arrive at a consensus of the result of the processing and by virtue of the consensus collectively commit to publication of a transaction record of the determined results in the directed acyclic graph 205. In some embodiments, a smart contract may be configured to generate a token, and thus, that token may be representative of the results in the transaction record stored to the directed acyclic graph 205.

In accordance with one or more of the above described embodiments of the distributed and decentralized computing platform implementing an identity management system within the example computing environment 200, various ones of the other entities, such as one or more of mobile devices 101, client devices 135, application servers 245, and authentication server 155 illustrated in FIG. 2, may participate within the identity management system as described in greater detail below.

In some embodiments, the computing environment 200 may include a mobile device 101, a client device 135 (e.g. a primary device in a device pair used in an authentication session by a user), relying party computing systems like application servers 245, and an authentication server 155. These components may communicate with one another via a network 121, such as the Internet and various other local area networks. In addition, embodiments of the example computing environment 200 may include a mobile computing client device, such as mobile device 101, that supports client-side out-of-band authentication based on a secure channel to a trusted execution environment as described with reference to FIG. 1A or FIG. 1B. Some or all of the benefits of such a configuration may be conferred to and implemented within the identity management system by committing information, like some or all of the information stored within the authentication repository 165 or representations of that information like cryptographic hashes of the information, to the directed acyclic graph 205 in the form of a transaction record. For example, the authentication server 155 may publish a smart contract configured to cause computing nodes to process a request to store some or all of the information from a UID record 151 in a transaction record. For example, existing UID Record 151 may be implemented within the directed acyclic graph 205 by way of one or more transaction records stored as node content within a blockchain. Similarly, some or all of the different functions ascribed to the authentication server 155 with reference to FIG. 1A or FIG. 1B may be implemented by smart contracts 207 which may process on-block data stored by the decentralized computing platform rather than in a relatively centralized repository 165.

In some embodiments, the techniques described herein may be implemented within the computing environment 200 (e.g., including each of the illustrated components) shown in FIG. 2 by executing processes described below with reference to FIGS. 3-9 upon computing devices like those described below with reference to FIG. 12. In some embodiments, computing devices like those described with reference to FIG. 12 may include additional or other components specific to configurations discussed herein. For example, a mobile computing device 101 may include components similar to those described with reference to FIG. 12 that support a client execution environment and additional components supporting a trusted execution environment, which may include a subset of like components (e.g., processor, memory, bus, etc.) configured to perform operations of the trusted execution environment. Similarly, client devices 135, servers 145, 155, and computing nodes 201 may include some additional or other components than those illustrated in FIG. 12. However, each of these devices may operate in accordance with principles similar to those discussed below and with reference to FIG. 12, such as by loading instructions and other data into a memory and executing those instructions by a processor to perform various operations.

One pair of mobile device and client device is shown, but embodiments are expected to include substantially more, e.g., more than 10 or more than 100 concurrently participating in the identity management system in one or more of the ways described herein. For example, multiple mobile or client devices may concurrently participate in a registration process with the identity management system while other registered mobile or client devices participate in an authentication process or other processes described herein. Similarly, while only two application servers 245 of relying parties are shown, embodiments are expected to include substantially more, e.g., more than 10 or more than 100 concurrently participating in the identity management system in one or more of the ways described herein. For example, multiple different applications servers 245 may currently participate in registration processes, authentication process, or other process described herein.

The mobile device 101 may be a mobile computing client device to which a user has access to and may use to register a user identity with the identity management system. Once registered with the identity management system, the user may use the mobile device 101 to perform one or more different functions such as adding user accounts to the user identity, authenticating requests to access secure assets, like online resources, based on those user accounts or the user identity, effect payments, support a client-side role in out-of-band authentication process for those user accounts or the user identity, or other functions described herein. Although not shown, the mobile device 101 may be configured similar to, perform some or all of the functions of, or have an architecture similar to the mobile device 101 described with reference to FIG. 1A or FIG. 1B, such as by including means for securely storing and processing credentials, keys, and other device or user specification information, means for receiving and processing notifications, means for soliciting credentials, means for transmitting credentials, means for establishing a secure channel between a TEE and a CEE, means for managing communication sessions over a secure channel, etc. as described herein. For example, identity information 230 for various identities may be maintained by the mobile device 101 some of which may be maintained within the trusted execution environment, like within a wallet, or otherwise encrypted and stored within the trusted execution environment, and some identifiers may be retained within the CEE such that notifications pertaining to those identities may be received and identified, and communication of information pertaining to those identities may occur over a secure channel established between the TEE and CEE.

For example, the mobile device 101 may include an example authentication application 220 (or other applications 225 such as by including features provided in a standard development kit, or SDK, for operability with the identity management system), and those applications may include a module, like an event handler, configured to provide notification service capability when executed on the mobile device 101. In some embodiments, the module may be provided separately, such as in a lightweight companion application to the authentication application 220, depending on the configuration of a client execution environment of the mobile device 101. In either instance, the module may be configured to provide notification service capability when loaded into a memory and executed by a processor of the mobile device 101 as a background service or process within the client execution environment. In turn, the module configured to provide notification service capability may receive notifications from the network 121 by subscription of the module or mobile device 101 to a notification service. For example, the module may monitor a port of the mobile device 101 configured to receive data from the network 121 and identify notifications received at the port, such as based on header information (e.g., sender/recipient information) of one or more data packets containing notification data.

Those notifications may be received from one or more entities within the computing environment 200, such as from an application server 245, authentication server 155, or a computing node 201. Thus, for example, the mobile device 101 may receive and process one or more notifications received from various entities within the computing environment 200 to return requested data or signed data like representations of credentials, notification data (e.g., signature of notification identifier), tokens, public keys, etc. for verification. Such requested data may be zero-knowledge proofs based on credential values, private keys, or other information maintained or input as described herein within a TEE of the mobile device 101. In response to identifying a notification, the module may post the notification to a location in memory or otherwise provide the notification to the authentication application 220 by a process like one of the processes described with reference to FIG. 1A or FIG. 3B in terms of a native notification service. Similarly, a native notification service of the mobile device 101 may monitor a port to identify notifications received at the port from the network in a fashion similar to that described above and those notifications may be passed to or identified by the authentication application 220.

The client device 135 may be a computing device having a configuration similar to the client device 135 described with reference to FIG. 1A or FIG. 1B. Thus, an example client device 135 may be a computing device like a laptop, desktop, or workstation operated with network access in a home, office, or field environment, a terminal device or otherwise configured to provide a user interface for terminal access to one or more computing devices or virtual machines that may include or provide access to a secure asset or be a secure asset themselves. Different example client devices 135 may be configured to access different secured assets in a variety of different ways. For example, a client device 135 may attempt to access a secured asset such as an online resource on or via one or more application servers 245. In some embodiments, the client device 135 may attempt to access the online resource on or via one or more application servers 245 using an application 110 installed to the client device 135. In another example, a client device 135 may attempt to access a secured asset such as an application 110 executed on the client device. In some embodiments, the application 110 may also be configured to access an online resource on or via one or more servers 245, such as via an API of an application server 245 configured to support application 110 functionality.

Some embodiments may include a plurality of relying party application servers 245, which each may have a configuration similar to the relying party server 145 described with reference to FIG. 1A or FIG. 1B. Thus, an example application server 245 may host or otherwise include online resources such as a secure asset, support client device 135 applications 110, support mobile device 101 applications 225, or otherwise process secure assets, like payment information, for which user access thereto is managed. Examples of online resources may include a user account, web applications, APIs supporting example applications 225 or 110, and other data as described herein. Generally, an application server 245 is configured to provide access to such resources for users (e.g., of a client mobile device 101 or client device 135) authenticated to access them while restricting other access attempts that cannot be authenticated. In some embodiments, an application server 245 may include a user identification repository (not shown), which may store information about users and clients. Like the authentication repository 165, some or all of that information in a user identification repository (not shown) associated with an application server 245 or representations thereof may be committed to the directed acyclic graph 205 for storage in one or more transaction records. For example, a relying party A operating an application server 245A may elect to participate in the identity management system and migrate some or all of the data (or representations thereof) stored within the user identification repository (not shown) to transaction records stored within the directed acyclic graph 205. In another example, a relying party B operating an application server 245B may elect to participate in the identity management and honor account registration based on information stored within the directed acyclic graph 205 or commit some or all of the data (or representations) pertaining to a user also having chosen to participate in the identity management system to transaction records stored within the directed acyclic graph 205.

In some embodiments, a relying party, such as by the application server 245 interfacing with a computing node 201 or the authentication server 245 may publish a smart contract to the directed acyclic graph 205 such that one or more of the computing nodes may load and execute the smart contract. For example, the smart contract may be configured to output results pertaining to authentication of a user requesting access to online resources of the application server 245. In some embodiments, the smart contract is executed by a computing node responsive to the computing node receiving a request to authenticate a user based on one or more transaction records stored within the directed acyclic graph 205. The transaction records may contain user account information corresponding to user account registered with the application server 245. Additionally, in some embodiments, one or more of the transaction records may include hash digests containing information about online resources that user account is permitted to access, or other information, but such information may also be maintained with a data store by the application server.

In some embodiments, the authentication server 155 performs one or more management operations in the identity management system. For example, the authentication server 155 may publish a smart contract 207 for registering a user to the identity management system. Additionally, the authentication server 155 may publish a smart contract 207 for authenticating a user on the identity management system. In some embodiments, application servers 245 may incorporate such functionality and perform one or more of these operations.

Headings are provided below to enumerate various examples or embodiments consistent with a given process (which may include a plurality of constituent processes performed by different entities) that can be implemented on the identity management system. The headings are provided for readability and should not be read to suggest that the different processes are mutually exclusive. In fact, they may be comingled, executed in parallel on same or different computing nodes or executed by different computing nodes at different times such as due to the various computing nodes receiving requests in respective queues for processing in different orders and at different times. Examples of queues for processing requests by computing nodes may be based on order of request receipt (e.g., first in, first out), timestamp of a request (e.g., priority queue where older requests have a higher priority than newer request), etc. and the decentralized and distributed nature of the computing platform results in different nodes processing same requests at different times according to network 121 factors, like latency or throughput, that affect communications between different computing nodes in different locals.

Example User Identity Creation

In some embodiments, a user may generate a user identity on a blockchain, like in the directed acyclic graph 205. For example, in block 21, a transaction record, Tx1, is shown to include a user identity, Net ID 271. Thus, for example, transaction record Tx 1 may be a user identity record establishing a user identity, or Net ID 271 of the user, within a directed acyclic graph 205. In order to use the Net ID 271, the user must prove ownership of the user identity. To that end, the user might retain some secret knowledge, like a private key, not shared with other users. The private key may be a first encryption key of a key-pair, a second encryption key of the key-pair being a public key not kept secret by the user. Thus, for example, the user may sign data, like some other key, certificate, credentials, identifier or any other data, with the private key to create a signature (e.g., the output of a signature function taking as input the data and the private key) and the public key is operable to verify the signature (e.g., the output of a corresponding signature verification function taking as input the signature, the data, and the public key). Thus, a signature verification function provides a verification result that the user who signed the data possesses the private key. Accordingly, the Net ID 271 information for a user may include a User ID Key, which may be a public key, and a User ID, whereby the user can prove ownership of the Net ID 271 by signing the User ID with the private key (e.g., for verification based on the signature, the public key, and the User ID). The User ID can be some data, like a file or digital certificate, cryptographic hash value, key, or other unique identifier.

In some embodiments, the Net ID 271 includes a digital certificate, like a X.509 type certificate, which may be a User ID itself or include a User ID (e.g., an ID bound to a public key of a user), and can include a public key for a user for signature verification. Thus, for example the user may generate a key-pair including a private key and a public key and sign a request for a certificate with the private key. In some embodiments, the request also includes one or more other credentials and identity proofs, which the user may establish in association with the Net ID 271 for proving ownership (which should not be taken to suggest that users cannot establish different or other credentials later on). In some embodiments, the authentication server 155 acts as a certificate authority and generates certificates for users. For example, the authentication server 155 may store a root certificate (e.g., a self-signed public key certificate supporting X.590-based public key infrastructure) and generate user digital certificates responsive to requests for distribution based in part on the root certificate. Thus, for example, a user digital certificate may be considered valid by virtue of its generation by the authentication server 155 for use within the identity management system and a user providing ownership of a Net ID 271 also proves ownership of a valid digital certificate authorizing the user to use the system.

Some embodiments of the authentication server 155 generate and encrypt a key that it stores to afford recovery of a Net ID 271 (e.g., should a user lose access to their private key). The authentication server 155 may transmit information, like a digital certificate, including a representation based at least in part on the key to serve as a User ID. In other words, the real value backing an operable User ID need not be exposed. Should a user lose access to a private key, ownership of a Net ID 271 may be reestablished through the authentication server 155, such as through generation of a new certificate in response to a request including a new private key of the user and that information may be stored to the directed acyclic graph 205 in a new transaction record.

As transaction record information stored within the directed acyclic graph 205 is tamper-evident, the new transaction record recording this information, i.e., ownership of the Net ID 271, may be operable as a new Net ID by showing ownership of the prior Net ID 271. Accordingly, a User ID may differ between those Net IDs as any prior User ID/Net ID may be referenced through one or more cryptographic hash pointers to prior transaction records (e.g., having established a prior Net ID 271 with prior User ID in example record Tx1). As only those digital certificates generated by the authentication server 155 may be considered valid, ownership of the prior Net ID 271. In other words, the prior User ID/Net ID may remain operable, but only through the new Net ID (e.g., because the user no longer has access to the private key for Net ID 271), subject to the user proving verified of ownership of the new Net ID (e.g., stored in a later transaction record).

Reestablishment of ownership may be predicated on a user submission of established credentials (e.g., like one or more cryptographic hash values output from a cryptographic hashing function) for verification. Depending on the embodiment of authentication server 155 or the decentralized data store, e.g., whether it is private, semi-private, or generally public, established credentials may be handled in different ways. For example, the authentication server 155 may retain in confidence some cryptographic hash values by which a user may reestablish ownership of a Net ID, such as by receipt of credential values or credential hash values from the user over a secure session with a mobile device 101, store that information in an off-block data store or obfuscate credential values to generate zero-knowledge proofs for on-block storage. A cryptographic hashing function may obfuscate one or more inputs in a way to provide a zero-knowledge proof, in which case those credentials may be stored within a transaction record, e.g., the transaction record containing the Net ID 271 information. For example, the key or other information stored by the authentication server 155 or on-block information may be concatenated with a user reproducible credential hash value (e.g., one generated within a trusted execution environment of the mobile device) and the concatenated string may be input to a cryptographic hash function (e.g., by the authentication server 155) to generate a cryptographic hash value representative of the credential for storage. As the actual credential values are obfuscated by the TEE (e.g., according to a first cryptographic hash function), and the stored value is further obfuscated by the authentication server 155 (e.g., according to a second cryptographic hash function) prior to on-block storage, actual credential values are not divulged. One or more of those cryptograph hash functions may take additional inputs, which may be held in secret, and outputs may be digitally signed according to a signature algorithm or one or more trusted components that verifies user credential value inputs were legitimately provided and any cryptographic hash based thereon legitimate generated so as to afford a zero-knowledge proof of ownership at a later date.

Configuration of an authentication server 155, another entity, or smart contracts for storing data within the identity management system in accordance with one or more of the above examples can reduce friction on users by affording Net ID recovery with high security. In various embodiments, the authentication server 155 may act as an authority within the identity management system for Net ID generation such as by generation of digital certificates based on a root certificate or optional storage of data for Net ID recovery. All or some of that information may be stored within the authentication repository 165 and may be encrypted (in which case it may be backed-up or stored within the directed acyclic graph 205 as node content within transaction records).

As shown in FIG. 2, embodiments of the mobile device 101 may include an authentication application 220. The authentication application 220 may include all or some of the features described with reference to authentication application 120 in FIG. 1A or FIG. 1B. For example, the authentication application 220 may be an application, like a native application, configured to execute within a CEE of the mobile device 101. The authentication application 220, like other native application applications (such as example relying party applications 225A, 225B), may be downloaded to the mobile device 101 and subsequently installed, such as by a user of the mobile device 101. Alternatively, the authentication application and one or more other applications, like some other native applications, may be preloaded on the mobile device 101 or included in an operating system of the mobile device.

Once installed on the mobile device 101, the authentication application 220 may be loaded into a memory and executed by a processer (e.g., within the CEE) to perform one or more of the operations described herein. In some embodiments, the authentication application 220, when executed by the processor, includes a registration process that is executed to register the user/mobile device 101 with the identity management system. For example, the registration process may include the generation of a Net ID 271 (e.g., a user identity record) corresponding to the user within the directed acyclic graph 205. In addition, the registration process may include the establishment of identity information 230 on the mobile device 101, like one or more identity proofs or credential values, private keys, etc. as described herein within a TEE of the mobile device. Other identity information 230, like an address of a Net ID 271, User ID, public keys, representations of credentials, or other on-block information, may be stored within the CEE of the mobile device 101.

During the registration process, the authentication application 220 may communicate or otherwise establish identifying information about the mobile device 101 (and optionally the user) with a server, like the authentication server 155. For example, the authentication server 155 may include an API 255 by which the mobile device 101 may communicate data to the authentication server and the authentication server may provide results based on the communicated data. The identifying information may include all or some of the information described above, like a User ID and a User ID Key of the Net ID 271. Example communicated information and data may include one or more keys (e.g., public keys), a digital signature of data such as a digital certificate or request for digital certificate with a private key, cryptographic hashes of credentials, identifiers, or other user or mobile device 101 information or representations of data stored within a TEE of the mobile device. The authentication application 220 may communicate this information to the authentication server 155 through the API 255, such as by including the information in a request transmitted to the API 255 for establishing a Net ID 271. In turn, the authentication server 155 may process the received information and provide results of the processing to the authentication application 220 via the API 255.

In some embodiments, the authentication server 155 may process some or all of the received information by executing a smart contract 207 (e.g., where the authentication server 155 includes some or all of computing node functionality) or may request a computing node 201 execute a smart contract 207 to process the information. In either instance, information and results of processing the information may be committed to the directed acyclic graph 205, such as by the authentication server 155 structuring received and generated data according to a schema of a smart contract for establishing a Net ID and executing the smart contract or by transmitting a request including the data structure according to the schema to an API of a computing node 201 configured to load and execute the smart contract. Alternatively, the mobile device 101 may structure the request according to the schema of the smart contract and transmit that request to an API of a computing node 201. As described above, a computing node 201 may load and execute a given smart contract in response to a request, publish the request or results for verification by other computing nodes, and reach consensus with a plurality of other computing nodes to publish a transaction record enumerating the inputs or results within the directed acyclic graph 205. In some embodiments, Net ID reference information 273 for one or more transaction records (e.g., Tx1) corresponding to the establishment of the Net ID 271 may be returned to the mobile device 101. For example, the Net ID reference information 273 may include one or more of an address, like a cryptographic hash pointer, published ID, ID key, digital certificate, representations of credentials, etc. The authentication application 220 may store the received information as identity information 230 on the mobile device 101. In some embodiments, the authentication application 220 stores the identity information 230 within a cryptocurrency wallet or other wallet accessible to other applications on the mobile device such that the user of the mobile device may use the Net ID in association with those other applications on the mobile device.

As described above, the user retains some information, like private keys and actual credential values (as opposed to representations of those credentials) in secret, like within the TEE such that other users or nefarious actors cannot access that data (and thus cannot prove ownership of the Net ID of the user). Example communicated information may also include information about notification services available to the authentication application 220 for receiving notifications pertaining to requests for authentication of a user through the authentication application. Example communicated information may further include one or more preferences or setting pertaining to credentials the mobile device 101 is operable to or configured to obtain (e.g., directly or from a wearable or other device) or credentials the user is willing to use (e.g., password, faceprint, fingerprint, etc.). Example communicated information may further include policy information governing use of different credentials and properties thereof. Policy information may be stored on the mobile device 101 and set requirements, such as minimum entropy values, for collected user credential values processed within the TEE. Policy information may be updated for different secured assets or authentication functions within the identity management system.

In some embodiments, additional authorized users or devices may be added to a Net ID 271. For example, a user that uses multiple devices may submit a request (e.g., to the authentication server 155 via API 255) from another device to add an additional authorized mobile device. For example, to add another device, a request may include all or some of the information collected for the establishment or reestablishment of a Net ID 271. In some embodiments, the process occurs in a fashion similar to that described above for reestablishing a Net ID 271 and results in the generation of a transaction record that references the original Net ID 271. However, the original Net ID 271 may remain in use (e.g., because the user can still prove ownership of the original Net ID 271). Publication of such a transaction record may be predicated on the user of the additional device proving knowledge of one or more of the secret values established on the mobile device 101 for the generation of the original Net ID 271.

As an alternative to, or in addition that proof of knowledge, the authentication server 155 may transmit a notification of the request received from the additional device to the mobile device 101. The authentication server 155 may also transmit a similar notification in response to a request received from a different user to be added as an authorized user of the Net ID 271 (e.g., with their own device). In response to the notification, the authentication application 220 on the mobile device 101 of the user having previously established the Net ID 271 may be configured to prompt the user of the mobile device 101 to authorize the request, such as by signature of data (e.g., notification, request, Net ID, or other data indicating approval) within the TEE of the mobile device with the private key corresponding to the public key associated with the Net ID 271.

The authentication application 220 may return the signed data indicative of approval of the request to the authentication server 155, which may verify the signature, and publish a transaction record indicative of the authorized use of the original Net ID 271 by the other user or device responsive to the verification of the signature. That transaction record may contain a cryptographic hash pointer reference to the original Net ID 271 and may also data like representations of credentials, public keys, etc., by which a user or device may prove ownership of the transaction record to use the referenced Net ID.

In some embodiments, creation of new transaction records to include reference to existing Net IDs 271 is discussed. In addition to the reference, like a cryptographic hash pointer, those transactions may also include all or some of the information published in the prior transaction. For example, a Net ID 271 may be republished to include cryptographic hash pointers to other transaction records (e.g., additional user transactions, additional device transactions, etc.) or to include some or all of the information from those other transactions directly—in which case the transaction for the republication may serve as the transaction and only include a cryptographic hash pointer to the prior Net ID record. For example, an updated Net ID record may be published and include the additional authorized user or device information (or other new information such as for a reestablishment of ownership) and include a cryptographic hash pointer to the prior version of the Net ID record (which in turn points to any prior version and so on back to the transaction record originally establishing the Net ID).

Figure 4C:
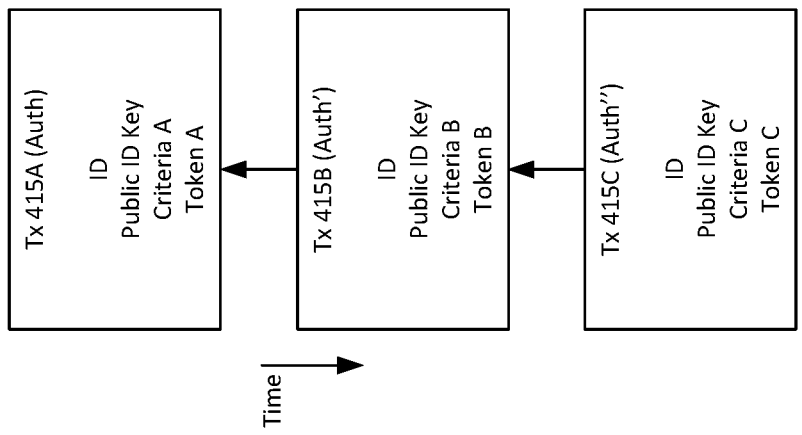
FIG. 4A, FIG. 4B, and FIG. 4C are diagrams showing example transactions recorded on a decentralized computing platform according to processes described in the present application.
Figure 4B:
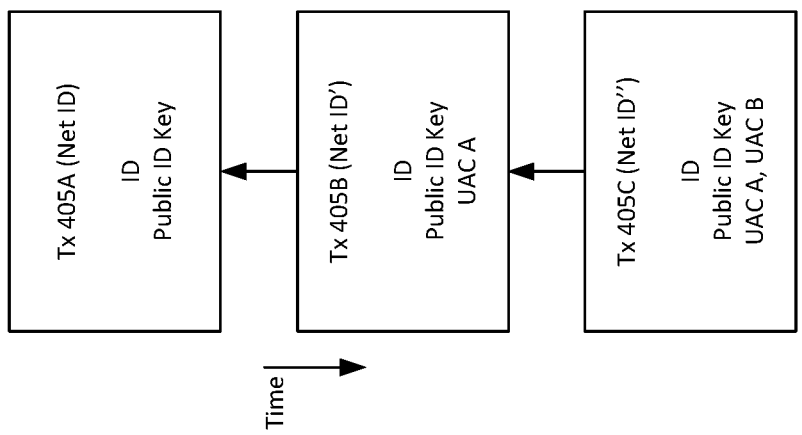
Figure 4A:
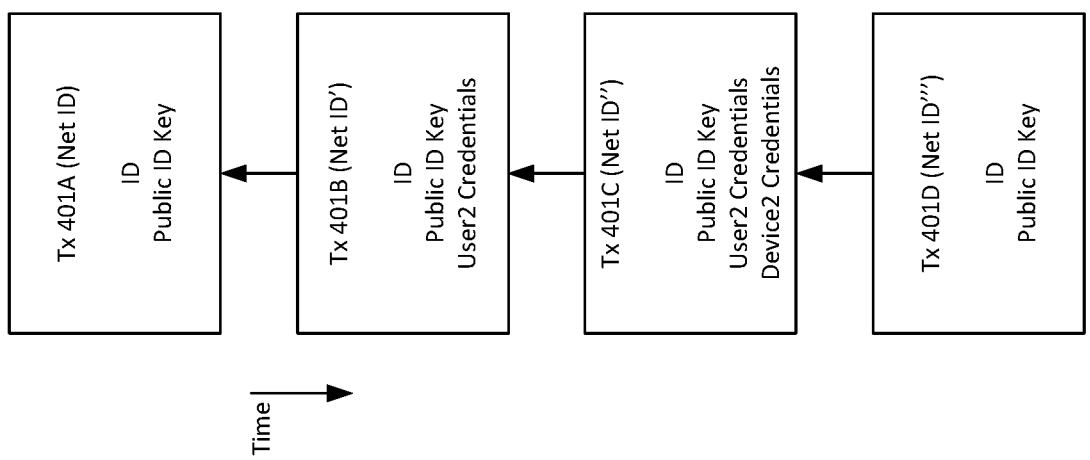

Turning briefly to FIG. 4A, an illustrative example embodiment is shown. Example transaction Tx 401A may establish a Net ID record that includes an ID and a Public ID Key and that transaction is published to the blockchain (e.g., as node content within a block within a directed acyclic graph). As described above, a transaction record like transaction Tx 401A may be published on the blockchain in association with a user registration process within the identity management system.

Subsequently, the user having established the Net ID record may authorize another user, user2, to use the Net ID. For example, user2 may request via their user device authorization to use the Net ID corresponding to Tx 401A. If the request is authenticated (e.g., by the user who established the Net ID record or by user2 proving access to secret knowledge), a transaction Tx 401B may establish a Net ID' (e.g., modified Net ID) record including User2 credentials for user2. User2 credentials may be representations of credential values unique to User2, such as one or more cryptographic hash value representative of credential values, a Public Key, etc. by which User2 may authenticate. For example, User2 may establish credential values and a private key for signing data on their device, like within a TEE of a mobile device of user2, which are retained in confidence for providing a zero-knowledge proof of access to the Net ID record through transaction 401B that established a Net ID' record including the User2 Credentials and a reference (e.g., a cryptographic hash pointer represented by the arrow) to transaction 401A.

Subsequently, the user having established the Net ID record may authorize another device, Device2, to use the Net ID, such as within a wallet on Device2. For example, the user may request via Device2 authorization to use the Net ID corresponding to Tx 401A on Device2. If the request is authenticated (e.g., by the user through confirmation on the device that established the Net ID record or by the user proving access to secret knowledge via Device2), a transaction Tx 401C may establish a Net ID" (e.g., modified Net ID) record including Device2 Credentials. Device2 credentials may be representations of credential values unique to the user or Device2, such as one or more cryptographic hash value representative of credential values, a Public Key, etc. by which the user may authenticate using the Device2. For example, the user may establish credential values and a private key for signing data on Device2, like within a TEE of a second mobile device of the user (e.g., a tablet, personal computer, etc.), which are retained in confidence for providing a zero-knowledge proof of access to the Net ID record through transaction 401C that established a Net ID" record including the Device2 Credentials and a reference (e.g., a cryptographic hash pointer) to transaction 401A. In some embodiment, transaction 401C may include any preceding transaction information, like that of transaction 401B, and reference the preceding transaction (e.g., a cryptographic hash pointer represented by the arrow), such that a most recently modified Net ID (e.g., Net ID") indicates all active user (e.g., user2) or device (e.g., device2) permissions for a given Net ID.

In some embodiments, Device2 Credentials may differ from those previously established by the user for the Net ID because a signature of a TEE may be required as verification of processing of credential values within the TEE and different TEEs may use or generate different unique private keys, use different cryptographic hash functions, establish different credential values for biometrics and so on. Similarly, because a user2 may use a different device than the user having established the Net ID (and User2 also inherently has different biometrics), those credentials values may also differ because a signature of a TEE of the device of user2 may be required as verification of processing of credential values within the TEE.

Moreover, the provided verification of a proof of ownership claim of a Net ID required for generation of a modified record (e.g., Net ID' or Net ID") authorizing a User2 or Device2 to use the Net ID, no additional burden exists on the system to support different credentials for authentication by different devices or different users other than the recording of the transactions authorizing those activities. In some embodiments, however, a user may prefer to use a same private key across the different ones of their devices such as to provide a zero-knowledge proof of ownership of the base Net ID (e.g., as established by Transaction 401A) as opposed to permitted access.

Further, a showing of ownership of the base Net ID may provide additional options unavailable to permitted users or devices, such as the option to remove user or device access or an option to establish new or updated credentials. For example, a user proving ownership of the Net ID may request revocation of access to the Net ID by Device2 and User2. If the request is authenticated (e.g., by the user through confirmation on the device that established the Net ID record or by the user proving access to secret knowledge via the requesting device), a transaction Tx 401D may establish a Net ID'" (e.g., modified Net ID) record that revokes the User2 Credentials and Device2 Credentials from the most recently modified Net ID record. Accordingly, in some embodiments, an authentication function may take as input a transaction record address of a Net ID, access the record to identity the ID, and verify whether the accessed record is most current (e.g., by performing a search within published transaction records for the ID to identity any later record) prior to authentication. In some embodiments, a record of current transaction record addresses and associated IDs may be maintained by an authentication server and updated responsive to published transactions. In some embodiments, transaction record addresses referenced in pending or recently published transactions may be flagged pending a determination of whether the transaction is authoritative (e.g., whether by consensus, publication in a block, or publication in a block N where N is more than a threshold number of block older than a current block) or the transactions would not impact authentication (e.g., a pending transaction for removal of Device2 while User2 attempts to authentication).

In some embodiments, transaction records establishing Net IDs and transaction records pertaining to ownership or use of Net IDs are stored in a sub-graph, like a sub-graph of cryptographic hash pointers within a directed acyclic graph, such that Net ID records may be interrogated within a smaller search space than the entire body of on-block transactions. Thus, for example, records like those shown in FIG. 4A may be stored within a sub-graph and other types of transaction records (e.g., for authentication operations) may be stored within a different sub-graph.

Example User Account Association

Turning back to FIG. 2, in some embodiments, a user may associate user accounts with a user identity established on a blockchain. For example, a user may associate one or more user accounts (e.g., UAC A 21, UAC B 31) with a Net ID 271 of the user established within a directed acyclic graph 205. For example, in block 22, a transaction record, Tx2, is shown to include user account A, UAC A 21, and a transaction record, Tx3, is shown to include user account B, UAC B 31. The respective transaction records may associate those user accounts with the Net ID 271. As such, those user accounts may be considered federated under the Net ID 271 based on the respective transaction records, all of which are examples of user identity records according to some embodiments.

The example user accounts may correspond to existing user accounts with relying parties participating within the identity management systems, such as existing user accounts with application server 245A and 245B, respectively. Thus, for example, the user may access a user account managed by an application server by supplying credentials (e.g., username and password) corresponding to the account, with the application server authenticating those credentials. Subsequently, such as while logged into the user account, the user may request federation of the account under a Net ID. In some embodiments, the application server may process the request to associate the user account with the Net ID subject to authentication of a proof of ownership claim of the Net ID by the user.

As before, in order to use or otherwise modify the Net ID 271, the user must prove ownership of the user identity. To that end, the user may prove knowledge of the retained secret knowledge, like a private key or other credentials not shared with other users, that was used to establish the Net ID 271. A relying party, like application server 245A, may verify such a claim based on the Net ID 271 information stored by transaction record Tx1 on the blockchain. For example, the application server 245A may obtain transaction record Tx1, such as by requesting the record based on an address (e.g., cryptographic hash pointer) of the transaction record provided by the user. Alternatively, other identifying information provided by the user, like a public key or identifier of the Net ID 271 by which the directed acyclic graph 205 may searched to obtain a transaction record corresponding to the Net ID 271. Accordingly, the user may transmit their claim to the application server 245A, and the application server may verify the claim based on the Net ID 271 information stored by the transaction record Tx1. For example, by signature verification or one or more representations of credentials supplied by the user matching those enumerated in the stored Net ID information. If the claim is verified, the application server 245A may sign the result (e.g., with a private key of the relying party) and submit information such as the verification result of the user for the Net ID, signed result, public key, a user account identifier (e.g., a cryptographic hash, token, or other value which need not be username), one or more representations of credentials, or other data for publication on the blockchain. For example, the application server 245A may structure the above data according to a schema of a smart contract for associating a user account with a Net ID and submit the information as arguments to the smart contract. In turn, a computing node 201 may process the received information by execution of the smart contract, and publish the results and indication of the association of user account A 21 with Net ID 271 in a transaction record, such as transaction record Tx2 as illustrated.

In various embodiments, an application server need not verify the claim directly, rather verification of the claim may be based on a result returned by a smart contract configured to authenticate user ownership of the Net ID 271. For example, a user may request to federate a user account B 31 and provide proof of knowledge information for authentication in association with the request to application server 245B. The application server 245B, in turn, may structure the received proof of knowledge information according to a schema of a smart contract for authenticating user ownership of a Net ID and submit the received information as arguments to the smart contract to receive an authentication result verifying the ownership claim. In turn, the application server 245B may sign the results and submit information to another smart contract to publish the association, e.g., by transaction record Tx3. In some embodiments, the smart contract may combine these functions, such as by taking as input a signature of the application server 245B over the submitted information (e.g., rather than a verification result) and any information corresponding to the user account B 31 for publication. Thus, for example, the smart contract may verify ownership and, responsive to verification of ownership, publish the results of the association of user account B 31 with the Net ID 271 in a transaction record, such as transaction record Tx3 as illustrated.

Alternatively, in another example, in response to a user request to federate the user account B 31, the application server 245B may provide a response to the user, and the response may include a uniquely generated token or request ID. In turn, the user may sign the response or unique information therein with a private key corresponding to a public key of the user's Net ID 271, thereby the user proves access to secret knowledge (e.g., private key) and intent to associate the account (e.g., by virtue of signing the response). In turn, the user may structure that information according to a schema of a smart contract and transmit the information in the schema to a comping node (which may be application server 245B or another computing node) for processing and publication to indicate the results (e.g., verification of ownership of the Net ID 271 and signature of the response) and association, such as by transaction Tx3 indicating association of the user account B 31 with the Net ID. The smart contract having processed the information may be considered authoritative by the relying party operating the application server 245B such that the application server 245B honors the results of the transaction record Tx3.

Thus, as described above, a variety of embodiments and smart contract configurations are applicable to publish verifiable transaction records, e.g., Tx2 or Tx3, indicating associations of user accounts of a user with an established Net ID 271 of the user to federate those user accounts under the Net ID. As smart contracts may be tamper-evident and stored within the directed acyclic graph 205, a relying party operating an application server 245 may agree to a particular body of logic implemented by smart contract for federating user accounts under Net IDs. In some embodiments, access to such smart contracts may be restricted to an authentication server 155 or application server 245, such as by verification of the requesting entity, like verification of a signature of an entity by way of a public key. For example, a given smart contract may access or include one or more public keys for signature verification of requests. Thus, for example, an application server 245 may sign a request or other information indicative of approval of a request to associate a user account with a Net ID and a smart contract or authentication server 155 may verify as a condition for publication of a transaction record of the association.

In instances where a user does not have an existing account with an application server 245, application servers may include in a registration process for a user account an option to use a Net ID. In turn, a transaction record (e.g., like a transaction record Tx 2 or Tx 3) may be indicative of an application server 245 establishing the Net ID as a user account in-kind where Net ID information serves as accepted user account information. Alternatively, user account information, like a user account name or ID (or other account details), may be generated by an application server 245 for association with the Net ID in a similar fashion to existing user accounts.

Configuration of an authentication server 155, another entity, or smart contracts for storing data within the identity management system in accordance with one or more of the above examples can reduce friction on users by affording federation of user accounts held or create with relying parties participating within the identity management system under a Net ID. Once a user account association with a Net ID is recorded, such as within the directed acyclic graph 205, cryptographic hash pointers or transaction record information enumerating those associations serve to afford account access under the Net ID. For example, a user providing proof of ownership of a Net ID 271 for which there exists associations to federated user accounts A 21 and B 31, application servers 245A and 245B, respectively, may permit access to those accounts responsive to verifying the ownership claim.

As shown in FIG. 2, embodiments of the mobile device 101 may include applications 225. Those applications 225 may be configured to interface with corresponding relying party application servers 245. Similarly, a client device 135 may include an application 110 configured to interface with one or more relying party application servers 245. The example applications 110, 225 may be loaded into memory on the respective devices 135, 101 and executed by one or more processors on the respective devices.

Those applications 110, 225 or the application servers 245 may govern access to assets based on user accounts. Thus, for example, a user may use an application 110 on a client device 135 and provide credentials 111 applicable to access their user account or other assets of a given application server. Similarly, a user may launch an application 225A on a mobile device 101 and provide credentials for their user account with the application server 245A to access application 225A features or access assets provided by the application server 245A. Example applications 110, 225 may be operable to display user interfaces, such as a user account options interface. Such an interface may include an option for a user to elect to federate the user account under a Net ID, e.g., Net ID 271, such as by providing an identifier of their Net ID, like an address of the Net ID or a public key corresponding to the Net ID, and submitting a request to federate the user account. Alternatively, for users without a user account, an application or application server may provide an interface by which a user may request to use their Net ID to register an account. In either instance, example embodiments of interfaces may be operable to receive proof of ownership corresponding to the Net ID. Alternatively, an application server may generate a notification or request generation of a notification responsive to a request including an identifier of an established Net ID, the notification being transmitted to or obtained, for example, by a mobile device 101.

In some embodiments, an authentication application 220 may receive or obtain the notification. In some embodiments, an application 225 of a relying party may receive or obtain the notification, such as by including one or more modules, functions, or otherwise utilizing services similar to those discussed with reference to the authentication application 220 (or 120). For example, an application 225 may include various functionalities of an authentication application (e.g., 110 or 120) as provided in a standard development kit (i.e., SDK). An example SDK may be used by application 225 developers to incorporate functionality (e.g., similar to that of an authentication application) affording interoperability with the identity management system within the application. Such functionality may include one or more modules or computer program code for exchanging data with a TEE of a mobile device 101 over a secure channel, exchanging data with an authentication server 155 via API 255, or exchanging data with a computing node such as by structuring data according to a schema of a smart contract and transmitting a request including the data structure for processing by a computing node with the smart contract. Thus, a given application 225 may perform one or more operations similar to those performed by an authentication application as discussed herein.

An authentication application 220 (or application 225) may be loaded into a memory and executed by a processor (e.g., within the CEE) to perform one or more of the operations described herein. In some embodiments, the authentication application 220, when executed by the processor, receives or identifies a notification pertaining to identity information 230 used on or by the mobile device 101. For example, a notification may include a Net ID reference 273 and request for proof of ownership of the corresponding Net ID (e.g., Net ID 271). The Net ID reference 273 may be any one of identity information 230 stored for different identities, like an address of a Net ID 271, User ID, public keys, representations of credentials, or other on-block information stored within the CEE of the mobile device 101. The authentication application 220 may interface with a TEE of the mobile device 101 (e.g., over a secure channel) to request proof of ownership of the Net ID 271 and may request one or more signatures of the notification or identifying information within the notification, like a token or notification ID, be performed within the TEE. In turn, the user may be prompted to authenticate with the mobile device 101, such as by providing user credential values processed within the TEE to determine an authentication result for the user within the TEE. If the user successfully authenticates with the mobile device 101 and permits (e.g., by selection within an interface) processing of the notification, the TEE may process the request such as by signing, within the TEE, with one or more private keys corresponding to public keys of the Net ID 271, one or more representations of credentials to prove ownership of the Net ID 271 or notification information confirming approval of the association or registration of a federated user account indicated by the notification. The results of the processing within the TEE, such as one or more signatures, data that was signed, or public keys are output by the TEE (e.g., over the secure channel) for transmission by the authentication application 220.

Depending on the embodiments, the authentication application 220 may transmit the results to an application server, computing node, or authentication server for verification and publication. One or more of those entities may verify the results, such as by verifying one or more credentials or signatures supporting the user's proof of ownership claim of the Net ID 271 or confirmation of the request to register or associate a user account with the Net ID 271, or verifying signature of the application server 245 to which the user account pertains. In some embodiments, verification of the results is performed by a smart contract executed by a computing node. For example, the authentication application 220 may return the signed data indicative of approval of the request to the corresponding application server, which may verify one or more signatures, and include computing node functionality to publish a transaction record indicative of the approval to federate a user account under the Net ID 271. That transaction record may contain a cryptographic hash pointer reference to the Net ID 271 and user account identifier corresponding to the federated user account, and may also include data like representations of credentials, public keys, etc., by which a user or device may prove ownership of the transaction record by way of Net ID credential information to use the user account. Example verified results may be published to the directed acyclic graph 205, as indicated by example transaction records Tx 2 and Tx 3 that federate user accounts under Net ID 271. In some embodiments, references, like addresses or identifiers pertaining to those transaction records or federated user accounts are returned to the mobile device 101, such as by a notification. In turn, the authentication application 220 or other application may store those user account references 275 for federated user accounts within the identity information 230, like within a wallet, such as in association with a Net ID reference 273 corresponding to the Net ID 271 under which those user accounts were federated. In some embodiments, Net ID reference 273 information may be updated to include reference to a transaction record enumerating Net ID association with to one or more federated user accounts.

In some embodiments, creation of new transaction records to include reference to existing Net IDs 271 is discussed. In addition to the reference, like a cryptographic hash pointer, those transactions may also include all or some of the information published in the prior transaction. For example, a Net ID 271 may be republished to include cryptographic hash pointers to other transaction records (e.g., one or more user account associations, etc.) or to include some or all of the information from those other transactions directly—in which case the transaction for the republication may serve as the transaction and only include a cryptographic hash pointer to the prior Net ID record. For example, an updated Net ID record may be published and include the additional identifiers, credentials or other information pertaining to one or more federated user accounts and include a cryptographic hash pointer to the prior version of the Net ID record (which in turn points to any prior version and so on back to the transaction record originally establishing the Net ID).

Turning briefly to FIG. 4B, an illustrative example embodiment is shown. Example transaction Tx 405A may establish a Net ID record that includes an ID and a Public ID Key and that transaction is published to the blockchain (e.g., as node content within a block within a directed acyclic graph). As described above, a transaction record like transaction Tx 405A may be published on the blockchain in association with a user registration process within the identity management system.

Subsequently, the user having established the Net ID record may federate a user account with some other party participating within the identity management system under the Net ID. For example, the user may request via their user device authorization to use the Net ID corresponding to Tx 405A to access a user account A with a relying party A. In other words, the user may request the option to authenticate with the relying party A based on their Net ID rather than some other user account with party A. If the request is authenticated (e.g., by the user who established the Net ID record proving access to secret knowledge), a transaction Tx 405B may establish a Net ID' (e.g., modified Net ID) record including user account A information, like one or more identifiers operable to identify or authenticate federation of a UAC A, like a user account identifier, public key corresponding to the party A, or a signature of the user account identifier by party A. The user account A information may also include one or more representations of credential values, such as one or more cryptographic hash values representative of credential values, a Public Key, etc. by which the party A may require the user to authenticate over proof of ownership of the Net ID. For example, party A may be a medical or financial service provider and require authentication by input of a social security number, and a representative credential may be a cryptographic hash value based in part on the social security number of the user. Actual credential values like one or more other values used by a cryptographic hash function to obfuscate social security number values and a private key for signing data on the device, like within a TEE of a mobile device of the user, are retained in confidence for providing one or more zero-knowledge proofs. For example, a signature with a private key may establish ownership of the Net ID record through transaction 405B that established a Net ID' record including the federate account information and a reference (e.g., a cryptographic hash pointer represented by the arrow) to transaction 405A. Further, a signature may be of another zero-knowledge proof, like generation of a representation of a credential within the TEE, where that representation of a credential may be additional credential values governing access to user account A.

Subsequently, the user having established the Net ID record may request to federate another user account, such as a user account B. For example, the user may request via their user device authorization to use the Net ID corresponding to Tx 405 A to access a user account B with a relying party B. In other words, the user may request the option to authenticate with the relying party B based on their Net ID rather than some other user account with party B. If the request is authenticated (e.g., by the user who established the Net ID record proving access to secret knowledge), a transaction Tx 405C may establish a Net ID" (e.g., modified Net ID) record including user account B information, like one or more identifiers operable to identify or authenticate federation of a UAC B, like a user account identifier, public key corresponding to the party B, a signature of the user account identifier by party B, or any additional representations of credentials (which may differ from those for other user accounts).

In some embodiment, transaction 405C may include any preceding transaction information, like that of transaction 405B, and reference the preceding transaction (e.g., a cryptographic hash pointer represented by the arrow), such that a most recently modified Net ID (e.g., Net ID") indicates all active federated identities under the Net ID. Verification of a proof of ownership claim of a Net ID in connection with relying party approval required for generation of a modified record (e.g., Net ID' or Net ID") enumerating federation of a UAC A or UAC B under the Net ID permits in-kind use of those user accounts by virtue of authentication on the Net ID. However, in some embodiments, a relying party to which a federated user account pertains may require specific authentication criteria for some user activities. As a result, representations of additional credentials may be stored such that a user may authenticate by those additional criteria, such as by generation of a representation within a TEE of their mobile device.

A showing of ownership of the base Net ID record 405A may permit a request for removal of a user account or an option to establish new or updated credentials. For example, a user proving ownership of the Net ID may request revocation of federation of a given user account without any impact on the existing account. If the request is authenticated (e.g., by the user through confirmation on the device that established the Net ID record or by the user proving access to secret knowledge via the requesting device), a transaction Tx establish a new modified Net ID (not shown) record that revokes given user account information from that most recently modified Net ID record. Accordingly, in some embodiments, an authentication function may take as input a transaction record address of a Net ID, access the record to identify a federated UAC, and verify whether the accessed record is most current (e.g., by performing a search within published transaction records for the ID to identity any later record) prior to authentication. In some embodiments, a record of current transaction record addresses and associated IDs may be maintained by an authentication server and updated responsive to published transactions. In some embodiments, transaction record addresses referenced in pending or recently published transactions may be flagged pending a determination of whether the transaction is authoritative (e.g., whether by consensus, publication in a block, or publication in a block N where N is more than a threshold number of block older than a current block) or the transactions would not impact authentication (e.g., a pending transaction for removal of a UAC A while the user attempts authenticate access to an asset associated with UAC B).

In some embodiments, transaction records establishing Net IDs and transaction records pertaining to ownership or use of Net IDs are stored in a sub-graph, like a sub-graph of cryptographic hash pointers within a directed acyclic graph, such that Net ID records may be interrogated within a smaller search space than the entire body of on-block transactions. Thus, for example, records like those shown in FIG. 4B may be stored within a sub-graph and other types of transaction records (e.g., for authentication operations) may be stored within a different sub-graph. In some embodiments, the example transactions 405B, 405C in FIG. 4B may also include information from one or more of transactions 401B-C of FIG. 4A and be stored in a same sub-graph. Further, in some embodiments, a record combining that information may indicate which devices or users are permitted to access which user account, such as by one or more associations (e.g., key-value pairs) between a user account and additional user/device credentials operable to authenticate on the Net ID for use of the user account.

Example Net ID Authentication

Turning back to FIG. 2, in some embodiments, a user may authenticate to a user identity established on a blockchain. Authentication to a user identity, such as Net ID 271, may also confer authentication in-kind to one or more federated user accounts (e.g., UAC A 21, UAC B 31) associated with the Net ID 271. The Net ID 271 and associations with federated user accounts may be established by one or more transactions, e.g., transactions Tx 1-3, within a directed acyclic graph 205. For example, in block 21, a transaction record Tx 1 may establish a Net ID 271 for the user, and in block 22, one or more transaction records Tx 2, Tx, 3, establish associations between user accounts of the user and the Net ID to federate access to those user accounts. Transaction records Tx 1, Tx 2, and Tx 3 are examples of user identity records according to some embodiments.

Subsequently, a user may desire the use the Net ID 271 to access assets governed by the Net ID 271 or one or more of the federated user accounts. Thus, for example, the user may submit a zero-knowledge proof of ownership of the Net ID 271 for authentication, such as to an authentication server 155, computing node 201, or application server 245. In the case of submission to an authentication server 155 or application server 245, those example entities may perform one or more steps in a verification process to authenticate user ownership of the Net-ID 271. Those example entities may also include computing node functionality to publish results for recording in the directed acyclic graph 205. In various embodiments, a verification process may be substantially executed on a computing node 201 according to a smart contract 207, and authentication servers 155 or various application server 245 may be a computing node or include computing node functionality to execute a smart contract. The above example configurations are not mutually exclusive as different process and functionality may be distributed among different smart contracts or entities. For example, some smart contracts may be configured to determine results and publish results (e.g., substantially perform the operations to authenticate user ownership of a Net ID), other smart contracts may be configured to verify and publish results (e.g., perform operations to verify results determined by an authentication server, application server, or other computing node), and some other smart contracts may be configured to publish results (e.g., results received from an authentication server or application server) where those results are independently verifiable.

In the context of the identity management system, the first two configurations may provide increased benefit for one or more authentication operations as the results of those records stored in the directed acyclic graph 205 may be considered authoritative by virtue of determining whether the transaction records corresponding to those results are unmodified (e.g., by computing one or more cryptographic hashes) because a majority of the computing nodes reached consensus on verification of the results for publication according to a given smart contract. Accordingly, the results need not necessarily be re-verified in instances where an entity agrees to the body of logic in the given smart contract. In the latter configuration, verification of both the legitimacy of a transaction record within the graph 205 and the results therein (e.g., by computation of inputs and corresponding signature verification) may be necessary for an entity to consider the results authoritative, such verification operations may be performed by smart contract or through interrogation of transaction records (e.g., such as where the entity operates a computing node).

In some embodiments, a user uses a client device, like mobile device 101, to submit a zero-knowledge proof of ownership of a Net ID 271 for authentication. In some embodiments, a user may voluntarily submit proof of ownership. For example, the user may use an application, like authentication application 220 or a relying party application 225, to transmit those credentials to an authentication server 155, computing node 201, or relying party application server 245 for authentication. If authenticated, the results may be published to the immutable data stored and honored by at least the party the user desired to authenticate. In some embodiments, the mobile device 101 may receive an indication of the result, like a token, identifier of the transaction, or other data which the mobile device 101 may present as proof of authentication. Some results may be signed in a way (e.g., by private key of an authoritative party like the authentication server or server of a relying party) such that they may be considered authoritative for a given function based on signature verification. Thus, for example, the mobile device may present the results to a terminal or electro-mechanical device for payment authorization or physical access. In some examples, results output by smart contract (e.g., token, authorized function, public key of client device, etc.) may be signed by the authority and results and signed results may be provided to the mobile device. The mobile device may sign at least some of the result data (e.g., the token or signed data string) with the same private key and provide to the terminal or electro-mechanical device the received results, received signed results, and the signature generated by the mobile device. The terminal or electro-mechanical device may in turn input that data received from the mobile device into a signature verification function that outputs whether that input data is verified or unverified. If the input data is verified, the terminal or the electro-mechanical device may perform a function based on the result, such as authorizing a payment or actuating a mechanism for physical access.

In some embodiments, a user may be prompted to submit proof of ownership, such as in response to a notification received or otherwise obtained by the mobile device 101. In some embodiments, a notification is received in response to a client device different from the mobile device 1101, like a client device 135, attempting to access a secure asset as described herein. Thus, the notification may be received in association with an out-of-band authentication process in which the user uses the mobile device 101 to authenticate the access attempt by the client device 135. In some embodiments, a notification is received in response to the user attempting to access a secure asset on the mobile device 101, like executing an example application 225A which may also be configured to retrieve assets from an example application server 225A. In some embodiments, a notification is received in response to the user attempting to otherwise access a secure asset on example application server 225B, like a web application, account, file, etc., where the example application 225B may be a web browsing application.

In some embodiments, an example application, like an authentication application 220 or a relying party application 225, is configured to receive or otherwise obtain notifications. For example, such applications may register or subscribe to a notification service to receive notifications, monitor a location in memory on the mobile device to obtain notifications, or monitor a port of the mobile device or address on a network to obtain notifications for processing. In response to obtaining a notification for processing, an authentication application 220 may interface with a TEE of the mobile device 101 to prompt the user to authenticate with the mobile device 101, such as by biometric authentication or entering credential values like a passcode, pin, or other values. In some embodiments, a notification may request authentication by one or more specific credential values or biometrics, which the user may supply for processing within the TEE. As described previously, credential values may reside with the user or within the TEE. For example, when the user authenticates on the mobile device 101 via a biometric value, the TEE may analyze the biometric values supplied by the user to determine whether the supplied biometric values are indicative of the user who established representations of those values within the TEE. A result of that processing may be a representation of the credential values, like a cryptographic hash value, or other determined representation of the result of the processing, which may be signed within the TEE, such by one or more signature functions, and the result and signature may be output by the TEE. In other words, the results that are signed are not actual credential values, but rather representative credentials corresponding to cryptographic hash values of credential values or results indicative of a user authenticating by one or more credential values such that those representative credentials may be passed outside of the TEE (e.g., to an application executing within the CEE of the mobile device by secure channel) without compromising actual credential values. Thus, for example, the TEE may sign a representative credential with a private key of the TEE to allow verification that credential values corresponding to the representation were securely collected and processed within the TEE. The TEE may also sign results or other data (e.g., ID of a Net ID, token, notification data, etc.) with a private key stored within the TEE, such as private key of the user that corresponds to the public key associated with the Net ID to allow verification of proof of secret knowledge. In some embodiments, the private keys may be the same. In some embodiments, verification of TEE signature for different representations of credentials associated with a Net ID may satisfy some authentication criteria while verification of a signature by the private key corresponding to the public key associated with the Net ID may satisfy some other more stringent authentication criteria. Signature functions may also take as input a time stamp or other identifier (e.g., identifier corresponding to the notification or other received value, like a token) such that a verification process may take into account timeliness of signature generation or to which notification or authentication request the signature pertains to. Thus, for example, an otherwise valid signature may be considered invalid if not received within a threshold time or were not generated responsive to or based on an expected value like an identifier of notification or token.

In some embodiments, an example application, like an authentication application 220 or a relying party application 225, receives results including one or more verifiable zero-knowledge proofs from the TEE of the mobile device 101 and transmits the results to an entity for authentication. For example, the authentication application 220 may transmit the results to the authentication server 155, a relying party application server 245, or a computing node 201 for verification. In some embodiments, the application transmits the results to an entity specified by the notification, an entity associated with the notification, or a default location (e.g., an authentication server, application server, or a given computing node). For example, an application 225A may process notifications received from or identifying an application server 245A and transmit the results to application server 245A. In some embodiments, the results may be transmitted over a secure session, such as via an HTTPS connection established between the mobile device and a remote server or computing node within the identity management system. Thus, for example, exposure to man-in-the-middle and other types of attacks may be mitigated (e.g., a timely theft of results and representation of those results).

The entity receiving the results including one or more zero-knowledge proofs from the mobile device 101 may verify the received information based on transaction records stored within the directed acyclic graph 205. For example, the entity may be a computing node or include computing node functionality and execute a smart contract to process the received information. In some cases, the entity may structure the results according to a schema of a smart contract and transmit a request to computing node including the data structure for processing by the smart contract. In some cases, the entity may access one or more transaction records, process the results received from the mobile device 101 to determine an authentication decision, and transmit a request to a computing node or other computing nodes to execute a smart contract configured to verify and publish the results of the authentication decision. An example smart contract 207 may determine an authentication result, verify an authentication decision, or publish an authentication decision. For example, a computing node 201 executing example smart contract 207 may receive a zero-knowledge proof of ownership for Net ID 271, access transaction record Tx 1, determine an authentication result based on the zero-knowledge proof and the Net ID 271 information, and publish those results, such as in an example transaction including Auth1 results 281. In some embodiments, the example smart contract 207 may generate a token, which may be included in the published transaction and provided as a confirmation of the processing (e.g., returned to the mobile device or requesting entity). In some embodiments, the smart contract 207 may be configured to cause the executing computing node 201 to return results of the processing, e.g., a transaction ID, token, etc., indicative of the authentication decision to the requesting entity such as an application server 245, mobile device 101, or authentication server 155. Other computing nodes may execute the same smart contract 207 to verify the Auth1 results 281 of a published transaction by consensus, thereby agreeing upon an authoritative transaction record Tx4 including the Auth1 results 281 as shown in block 23.

Different entities may choose to honor authentication results at different times and may optionally choose to verify or independently determine authentication results. For example, if auth1 results 281 pertain to application 225A requesting access to application server 245A, and application server 245A requests processing by a computing node operated by relying party A, or the application server 245A includes computing node functionality (or is a computing node) to determine or verify auth1 results 281, application server 145A may accept auth1 results 281 as valid prior to consensus or authoritative publication of transaction record Tx 4. Other entities, such as authentication server 155 or other relying parties such as application server 245B, may honor the auth1 results 281 only after authoritative publication of transaction Tx 4 or based on independent verification (such as by including computing node functionality to verify the results or receiving verification of results from a trusted computing node). For example, if the user attempts to access a secure asset managed by application server 245B with their mobile device 101, the application server 245B may authorize the attempt based in part on the prior auth1 result 281.

In some embodiments, a relying party different from a prior party with which the user authenticated may specify criteria for authentication of a user based on prior authentication results, e.g., auth1 results. For example, application server 245B may specify criteria for honoring the auth1 results, and a user providing proof of knowledge in association with an access attempt may be verified based in part on the Auth1 results 281 in a recent transaction Tx4, rather than by a full verification of ownership of the Net ID. In some embodiments, where one or more of those criteria are not met, such as one or more different credentials required by application server 245B for authentication not being previously supplied, a notification may be generated and transmitted to the mobile device 101 of the user. The notification may specify which additional credentials the user must supply to satisfy the criteria. The credentials corresponding to criteria already satisfied as indicated in the auth1 results 281 may not be requested. A smart contract 207 may access the transaction Tx4, receive the additional representations of credentials to satisfy criteria not met by the prior authentication results, and determine whether the prior authentication results combined with the additional representations satisfy all criteria. If the prior auth1 results 281 for authentication of user ownership of the Net ID 281 and the additional representations satisfy all criteria as indicated by an authentication result determined by the smart contract, the application server 245A may authorize the access attempt. In instances where additional credentials are supplied, a smart contract may publish a transaction Tx5 including auth2 results 282 indicative of the authentication result based on the prior auth1 results and the additional credentials. Similar to transaction Tx4, a plurality of computing nodes may verify the auth2 results 282 and reach consensus on the publication of transaction record Tx5, e.g., in block 24, within the directed acyclic graph 205. Thus, for example, yet another relying party or an access attempt to a more restricted asset or function subject to more stringent criteria with application server 245A or 245B may authenticate based on or based in part on the auth2 results 282 in a similar fashion as described above. In some embodiments, the criteria may include a threshold time for authenticating based on any prior transaction record or a threshold number of prior authentication records to accept authentication results enumerated therein such that previously supplied credentials or transaction records are not considered indefinitely.

In some embodiments, authentication results include a unique token. For example, the computing node 201 executing a smart contract 207 to determine an authentication result may generate a token in association with successful authentication results. The token may be returned to the entity requesting the authentication or to a client device, like mobile device 101, for storage in association with identity information 230. In some embodiments, an entity like the authentication server 155 or a relying party server 155 may receive and sign the token. The token and the signature may be transmitted to the mobile device 101 such that the mobile device 101 may present the token and signature verifiable by public key of the signing entity as proof of verified identity.

In some embodiments, the token may be signed within a TEE of the mobile device 101, such as by a private key corresponding to a public key associated with a Net ID 271. The auth1 results 281 may include an identifier, public key, or other information corresponding to the Net ID 271 or reference, like a cryptographic hash pointer to the transaction record Tx 1 establishing the Net ID 271. Thus, for example, the transaction record Tx4 may be accessed to identify a token value and public key associated with the Net ID 271 to which the Auth1 results 281 correspond. Accordingly, in response to a notification to authenticate or a user attempt to authenticate, the mobile device 101 may transmit the signed token as results for a zero-knowledge proof as the signature may be verified based on the corresponding public key associated with the Net ID 271. Thus, for example, a smart contract may verify a signature of a token in a process to determine an authentication result of user proof of ownership of a Net ID.

Turning briefly to FIG. 4C, an illustrative example embodiment is shown. Example transaction Tx 415A may correspond to authentication results of verified proof of ownership of a Net ID record. The authentication results may include an ID and a Public ID Key of the Net ID for which the proof of ownership claim was authenticated (or, alternatively, a cryptographic hash pointer to a transaction record of the Net ID), criteria A, and optionally a token A. The transaction Tx 415 including the authentication results is published to the blockchain (e.g., as node content within a block within a directed acyclic graph). As described above, a transaction record like transaction Tx 415A may be published on the blockchain in association with a user authentication process within the identity management system. The criteria A may include representations of credential values the user satisfied for successful authentication of proof of ownership of a Net ID. The token A may be a unique, randomly generated value determined during authentication of the proof of ownership of the Net ID.

Those prior authentication results represented by transaction Tx 415A may be relied upon for subsequent user authentication to the Net ID. In some cases, an entity may accept the criteria A by which the user previously authenticated and authenticate the user based on a zero-knowledge proof verifiable by the authentication results in transaction Tx 415A. For example, the entity may accept a signed token A (e.g., signed with the private key corresponding to the public ID key), subject to signature verification, as proof of ownership based on the transaction Tx 415A within a configurable amount of time after the transaction Tx 415A is published or recorded on the blockchain. In some embodiments, that token may satisfy some criteria B of a relying party B for authentication of the user based on the prior record of transaction Tx 415A. For example, criteria B may require same or equivalent credentials as criteria A, but require presentation of the signed token. A transaction, like transaction Tx 415B, may be published indicating that criteria by which the relying party B authenticated the user. For example, a smart contract may take as input the Tx 415A and the signed token and determine an authentication result based on the signed token being verified as signed by a private key corresponding to a public key (e.g., public ID key) in the Tx 415A information. Determination of the authentication result may be additionally based on confirmation that one or more timestamps corresponding to the transaction Tx 415A (e.g., time of publication) or signature of the token are within a threshold period of time. The authentication results may be published as indicated by transaction Tx 415B, which indicates the ID and public ID key corresponding to the Net ID the authentication results were determined for and the criteria B by which the user was authenticated. In some embodiments, the transaction 415B may include a new token, like token B, generated by the smart contract having determined the authentication results. In turn, that token B, rather than token A, might be required for a subsequent authentication based on the authentication results indicated in transaction Tx 415B.

In some cases, an entity may have more stringent or specific criteria by which they require a user to authenticate prior to granting the user access to an asset. For example, an entity, like a relying party C, may require user authentication by different criteria C than the criteria B indicated in the transaction record Tx 415B corresponding to a previous authentication of the user. Yet, the relying party C may consider the transaction record 415B authoritative, i.e., by virtue of confirmation on the blockchain that the user proved ownership of the Net ID as indicated in a record of transaction Tx 415B by the criteria B. As a result, rather than require the user to authenticate by all the criteria C and proof of ownership of a Net ID, the relying party C may accept the criteria B and the proof of ownership claim such that the user only need to provide a subset of criteria C not met by the record of transaction Tx 415B. For example, the criteria C may specify a type of biometric measurement or other user specific information different than those previously supplied by the user to meet criteria B (or criteria A). The criteria C may also indicate that if a prior authentication record 415B is used to satisfy some portion of criteria, a signed token, e.g., token B, from the prior transaction Tx 415B must be provided along with one or more additional representations of credentials, which may also be signed. For example, the token B and representations of the additional credentials required to meet criteria B may be signed by a private key of the user corresponding to a public key corresponding to the Net ID. For example, the token B and representations of credentials may be signed by a private key corresponding to the Public ID Key of the Net ID indicated in the authentication results of the prior transaction Tx 415B. As with the prior example, signed credentials may be authenticated by signature verification, such as by a signature verification function that takes as input signed data (e.g., the signature), the data, and the corresponding public key. Thus, the user may authenticate by providing zero-knowledge proofs relative to those additional credentials required by criteria C not met by one or more prior transactions (e.g., Tx 415B or Tx 415A). The one or more credentials previously supplied for user authentication may not be requested for authentication based on criteria C as the prior criteria (e.g., criteria B or criteria A) may be accepted as satisfying that portion of the criteria C.

A transaction, like transaction Tx 415C, may be published indicating that criteria by which the relying party C authenticated the user. For example, a smart contract may take as input the Tx 415B, the signed token B, and additional signed credentials (which may be provided with the data string that was signed in instances where the data string includes one or more representations of credentials, a time stamp, token, or other value), and determine an authentication result based on the signed token being verified as signed by a private key corresponding to a public key (e.g., public ID key) in the Tx 415B information and the requested signed credentials being verified as signed by the private key and the representations of the credentials having been verified as matching established representations of credentials associated with the Net ID. Determination of the authentication result may be additionally based on confirmation that one or more timestamps corresponding to the transaction Tx 415B or transaction Tx 415A (e.g., time of publication), signature of token, or other credentials are within a threshold period of time. The authentication results may be published as indicated by transaction Tx 415C, which indicates the ID and public ID key corresponding to the Net ID the authentication results were determined for and the criteria C by which the user was authenticated. In some embodiments, the transaction 415C may include a new token, like token C, generated by the smart contract having determined the authentication results. In turn, that token C, rather than a prior token, might be required for a subsequent authentication based on the prior authentication results. In some embodiments, authentication based on prior authentication results may only consider a threshold number of prior transactions, and acceptance of a prior transaction may also expire based on a threshold period of time.

In some embodiments, transaction records including authentication results for Net IDs are stored in a sub-graph, like a sub-graph of cryptographic hash pointers within a directed acyclic graph, such that authentication results records may be interrogated within a smaller search space than the entire body of on-block transactions. For example, because prior authentication transactions may be accepted in subsequent authentication transactions for a relatively short threshold period of time (e.g., minutes, hours, or days), storing such transactions within a sub-graph may avoid searches through older authentication transactions for other types of transactions storing relatively static content (e.g., Net ID records, smart contracts, etc.). In other words, the normal search space for active authentication transactions may be on the order of a relatively small number of blocks compared to the entire chain of blocks. In contrast, the search space for Net ID records may span the entire chain of blocks including such records as a transaction record establishing a Net ID may remain valid indefinitely, or until updated or otherwise modified, which may occur with much less frequency than user authentication on the Net ID.

Thus, for example, records like those shown in FIG. 4C may be stored within a sub-graph and other types of transaction records (e.g., for Net ID records like those illustrated in FIGS. 4A and 4B) may be stored within a different sub-graph. In some embodiments, the example transactions 415 in FIG. 4C may also include some or all of the information from one or more of transactions 401, 405 of FIG. 4A or FIG. 4B. For example, an authentication transaction 415 combining that information may indicate which devices or users authenticated to which Net ID and which user account of a Net ID, such as by one or more associations (e.g., key-value pairs) between a user account or additional user/device credentials to which criteria were satisfied for authentication on the Net ID.

Figure 3A:
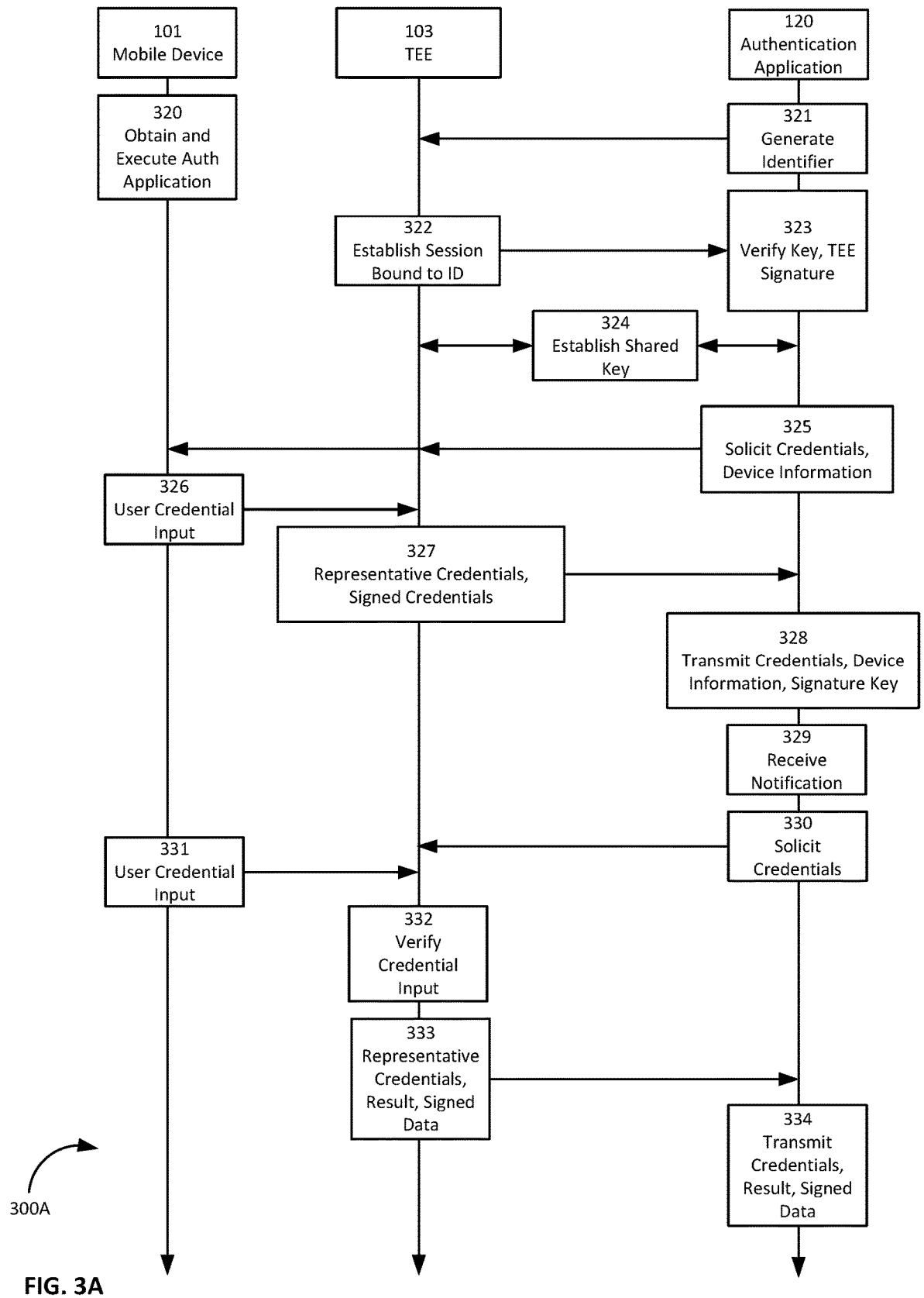
FIG. 3A is a diagram showing an example of a process for authentication of a user within example computing environments described in the present application.

Example Process for Credential Establishment and Collection for Authentication of a User FIG. 3A is a diagram showing an example of a process 300A for authentication of a user. The process 300A may occur within an example computing environment, such as the example computing environment 100A illustrated in FIG. 1A, the example computing environment 100B illustrated in FIG. 1B, or the example computing environment 200 illustrated in FIG. 2.

The process 300A of FIG. 3A illustrates operations performed by a device, such as a mobile device 101 including a trusted execution environment 103 and authentication application (e.g., an authentication application 120 or 220), according to at least one embodiment described herein. While example authentication application 120 is shown in FIG. 3A by reference, example authentication application 220 may be configured to perform all or some of the illustrated operations described below. Accordingly, reference to authentication application 120 should be not construed as limiting. As described previously, example mobile devices 101 may include a trusted execution environment 103 and execute an authentication application 120 (or authentication application 220). As such, the separation of the blocks 101, 103, 120 may be considered illustrative as each of the operations may be performed on a mobile device 101.

The process 300A may begin with the obtaining 320 of an authentication application on the mobile device 101. Examples of obtaining the authentication application on the mobile device may include a preloading of the authentication application on the mobile device 101 or downloading of the authentication application to the mobile device from an application repository. Further, step 320 may include executing the authentication application on the mobile device 101, which may include loading the authentication application in a memory of the mobile device and executing the authentication application by a processor of the mobile device. The memory and processor of the mobile device 101 may be configured for the execution of applications within a client execution environment (CEE), which may be isolated from a trusted execution environment 103 (TEE) of the mobile device. The TEE 103 may include a secure memory and co-processor not accessible by applications within the CEE.

Example authentication application 120 is configured to interface with the TEE 103 of the mobile device 101, such as via an application programming interface (API) configured to exchange data between the CEE and the TEE. The exchange of data via the API may occur by way of one or more requests and responses, each of which may contain data. In some embodiments, to increase security of communications between the TEE and the authentication application 120 within the CEE, the authentication application 120 is configured to establish a secure session, e.g., a secure channel of communications, with the TEE 103. The secure session may be considered secure by way of encryption of data communicated between the authentication application 120 and the TEE 103.

Once executed, such as within the CEE, the authentication application 120 perform one or more operations in a registration process, which may correspond to steps 321-328. Starting with operation 321, the authentication application 120 may generate an identifier and pass the identifier to the TEE 103. For example, the authentication application 120 may pass the identifier to the TEE 103 in association with one or more requests for establishing a secure session.

The TEE 103 may also perform operations to establish a secure session. The TEE 103 may also bind a secure session to an identifier received from the authentication application. For example, the TEE 103 may generate one or more keys, and one or more of those keys may be bound to a received identifier. The TEE 103 may generate a public key and a private key of a key pair, which may be bound to the received identifier. Additionally, the TEE 103 may generate a shared key, which may be bound to the received identifier. The binding may be logical, such as by an association in memory, or one or more of those keys may be generated based on the identifier. For example, in response to a request for a secure session, the TEE 103 may generate a private and public key, and pass the public key to the authentication application 120 by which the application 120 may encrypt a generated identifier 221 to pass to the TEE 103. In turn, a shared key may be bound to or based on the generated identifier. Alternatively, the TEE 103 may sign the identifier or other data with a private signature key and pass the signed identifier or other data with the public signature key to the TEE 103 for verification. In either instance, a public key may be provided in a response to the authentication application 120, by which the authentication application may verify 323 that data was generated by the TEE.

Thus, the TEE 103 may establish 322 a session bound to the identifier generated by the authentication application 120 and output data for establishing the session to the authentication application. In addition, the TEE 103 may sign data corresponding to output data in the response, and provide a key (e.g., a public key) of the TEE 103, in association with the response. The signed data and the signature may be provided in a same response as a key or by one or more different responses.

The authentication application 120 receives responses from the TEE 103. The responses may include data, signed data, or a key for verifying signed data. The key may be a public key for verifying 323 a signature of the TEE 103 using a corresponding private key, such that the data may be verified as being generated by the TEE 103 based on the signed data and signature key. For example, a verification function may take as input the data, signed data, and signature key, and return a result indicating that the data corresponds to the signed data. In some embodiments, the data may be organized in a string for signing and verification. Example string values may correspond to data values or hashes of data values.

Once the authentication application 120 verifies that the TEE 103 generated data, the authentication application 120 and TEE 103 may establish a shared key 324. For example, the authentication application 120 may encrypt data (e.g., identifier or other data) corresponding to a shared key using a public key provided by the TEE 103. In turn, using a private key, the TEE 103 may decrypt the data to obtain the shared key. Alternatively, the process may occur in the other direction with the authentication application 120 providing a public key to the TEE 103, by which the TEE 103 can encrypt and return a shared key. The shared key may be used by the TEE 103 and the authentication application 120 to exchange data using symmetric encryption. In either instance, the shared key may be bound to an identifier generated by the authentication application 120.

In some embodiments, establishment 322 of the secure session further comprises an initialization of a count within the TEE 103. The TEE 103 may also provide a current count in responses to the TEE 103. The TEE 103 may respond to only those requests received from the authentication application 120 which increment the count. As such, the authentication application 120 may be configured to, in generating a request to the TEE 103, increment a current count last received from the TEE 103 in an immediately prior response to the generated request. Thus, in receiving a request from the authentication application 120, the TEE 103 may verify whether the incremented count was incremented in an appropriate manner (various examples of which are described herein, such as with reference to FIG. 1A). The TEE 103 may also verify whether the number of increments or a value of the count exceeds a threshold representative of a number of requests allowed for a given session. Upon determining the threshold has been reached, the TEE 103 may request the authentication application 120 refresh the sessions, such as by performing one or more of steps 321-324, which may include authentication of the use according to one or more credentials stored within the trusted execution environment 103.

With the shared key established, the authentication application 120 may solicit 325 credentials and device information from the TEE 103 or mobile device 101. Device information may include a device identifier solicited from the TEE 103 or mobile device 101 that is operable to receive a notification for authentication of the user of the mobile device. User input credentials 326 via the mobile device 101 may be obtained with the TEE 103. The TEE 103 may generate 327 representations of those credentials for transmission outside of the TEE without divulging actual credential values. The TEE 103 may sign output data corresponding to the representations and output the representations and the signed data. The TEE 103 may also output one or more public keys corresponding to one or more private keys used to generate signed data if different than a prior key provided to the authentication application 120.

The authentication application 120 receives data output from the TEE 103, which may include representations of credentials, signed data corresponding to those representations, and signature key (e.g., a public key) for verifying signed data output by the TEE 103. As described above, the authentication application 120 may verify data was generated by the TEE 103 based on the signed data, correspond public key, and data. The authentication application 120 transmits 328 data, including the data output from the TEE 103, and device information of the mobile device 101, to a server to complete a registration. The data transmitted to the server many further include user account information (e.g., for a given relying party) to which the registration pertains. The server stores the information for later use to authenticate a user to access secure assets of the relying party.

After registration of the mobile device 101 by the authentication application 120, the authentication application may receive a notification 329 corresponding to an access attempt to access a secure asset (e.g., of a relying party) or attempt to use an established identity or federated user account associated with an established identity. The notification 329 may request solicitation of one or more user credential inputs, such as one or more of the different credentials established during the registration process. In response to the notification, the authentication 120 interfaces with the TEE 103 to solicit 330 the credentials requested by the notification.

The user may be prompted or otherwise request to input 331 one or more credentials. The input credentials are obtained within the TEE 103, and the TEE 103 may verify 332 credential input. Representations of the input credentials may be generated, or stored representations of the input credentials the TEE 103 verified 332 according to the input credentials may be output by the TEE 103. In some embodiments, the TEE 103 also provides a result of the verification. In some embodiments, the TEE 103 generates signed data corresponding to one or more of the output data and outputs the signed data. The signed data may also include inputs such as one or more timestamps or other identifying information describing when or what the signed data was generated for. For example, the signed data may take as input a representation of a credential and other information, such as a timestamp or other identification information for the notification. The other inputs may be included in the output data or selected from information also known to a server based on the last notification transmitted to the mobile device (which may select same other data in a verification of signed data). The data and signed data are provided to the authentication application 120, which transmits the data and signed data to a server for authentication. A signature key previously provided to the server in a registration process can be used to verify the signed data in accordance with the data (and optionally other data, such as notification information).

Example Process for Out-of-Band Authentication

Figure 3B:
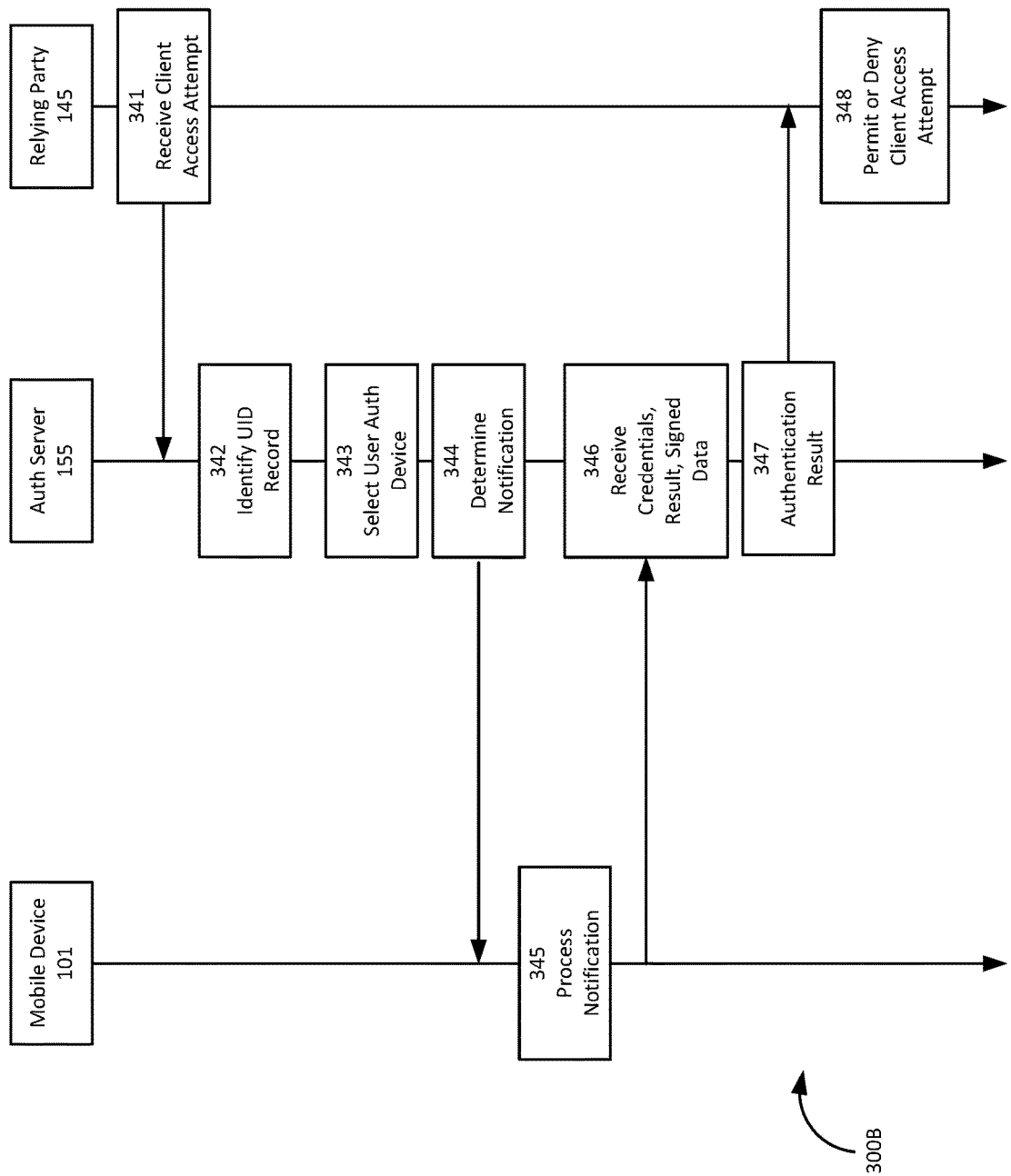
FIG. 3B is a diagram showing an example of a process for authentication of a device within example computing environments described in the present application.

FIG. 3B is a diagram showing an example of a process 300B for authentication of a device with another device in an out-of-band authentication process. The process 300B may occur within an example computing environment, such as the example computing environment 100A illustrated in FIG. 1A, the example computing environment 100B illustrated in FIG. 1B, or the example computing environment 200 illustrated in FIG. 2. The process 300B of FIG. 3B illustrates example operations performed by various devices, such as a mobile device 101 including a trusted execution environment 103, an authentication server 155, and a relying party server 145 according to at least one embodiment described herein. In some embodiments, such as in accordance with embodiments described with reference to the computing environment of FIG. 2, an application server 245 may be an instance of a relying party server 145, and one or more of the application server 245 and the authentication server 155 may optionally include all or some computing node functionality or be a computing node 201. Thus, for example, one or more of the operations illustrated as being performed by the authentication server 155 may alternatively be performed by a computing node, such as by the computing node loading and execution of a smart contract configured to perform one or more of the illustrated operations. Accordingly, reference to the authentication server 155 should be not construed as limiting, as a computing node of a decentralized computing platform for identity management may perform all or some of the illustrated process, and that computing node need not be a specific computing node controlled by a specific entity, but rather any computing node in a collection of computing nodes participating within the computing environment 200 of FIG. 2.

As shown, the process 300B begins with an access attempt by a client device at the relying party 145. The access attempt may be to a secure asset of the relying party 145, such as an online resource accessible by client devices over a network. The relying party 145 may pass information about the access attempt to the authentication server 155. The information passed to the authentication server 155 may include information such as user account information or device information associated with the access attempt. For example, the relying party 145 may receive a user account identifier at block 341 and pass the user account identifier to the authentication server 155.

The authentication server 155, based on the user account identifier, may identify a UID Record 342, such as within a repository storing various UID Records corresponding to different users or accounts. The UID record may be associated with or otherwise include the user account identifier for identification by the authentication server 155 based on information about an access attempt by a client device. The UID record identified by the authentication server 155 may include records or a listing of one or more devices registered with the authentication server 155 for user authentication. The authentication server 155 may select 343 a device according to a device record stored for the different ones of the registered devices. In some embodiments, the authentication server 155 selects a device different from the device attempting to access the asset when multiple devices are registered with the authentication server 155 under the UID Record. The selected device may also be determined by the authentication server 155 to have a trusted execution environment, such as by the registration of the device using an authentication application in accordance with various steps described with reference to FIG. 3A. The registration of the device and creation of the device record may further include the receipt of credential information for the user from the device.

With a device selected based on the device record, the authentication server 155 may determine 344 a notification for transmission to the device. The notification may be determined responsive to information stored in the device record. For example, the device record may include a device identifier applicable to transmit the notification to the selected device. Similarly, the device record may store information about the different credentials which a user of the device may provide to authenticate with the authorization server using that device. The notification 344 determined by the authentication server 155 may identify one or more of the different credentials the user must provide.

The device, which may be a mobile device 101 having a trusted execution environment and previously registered with the authentication server 155, may receive the notification from the authentication server 155. In turn, such as by various steps described with reference to FIG. 3A, the mobile device 101 may process 345 the notification within the trusted execution environment. The result of the processing 345 by the mobile device 101 may include various data transmitted to the authentication server 155 for authentication of the user of the mobile device.

For example, the authentication server 155 may receive a response to the notification from the mobile device that includes data corresponding to representations of requested credentials input by the user or results of any verifications performed within the TEE. The response may also include signed data for verification of the data. For example, the authentication server 155 may use a public key for signature verification previously received from the mobile device 101 in a registration process to verify the data was generated by the mobile device having the corresponding private key. In turn, the authentication server 155 may also verify whether the data (e.g., determined to have originated from the mobile device based on the signature) matches stored data. For example, the authentication server 155 may determine whether a received representation of the credential matches a previously stored representation of the credential. Further, the authentication server 155 may determine whether the received data corresponds to a notification 344 requesting that data. For example, the received data or verification process (e.g., using signed data) may include a timestamp or other identifying information for a notification (e.g., the notification from step 344) such that authentication server 155 can determine that the response was generated for a specific notification that requested it.

Based on the processing of the data and signed data received from the mobile device 110 for the notification transmitted to the mobile device at step 344, the authentication server 155 determines an authentication result. For example, if the data can verified as originating from the mobile device 101 the data was requested from based on the signed data and a stored key for the verifying, which may include verification of whether the data is responsive to the particular notification from step 344, and the received representation of a credential matches the stored representation of the credential that was requested, the authentication server 155 determines the user successfully authenticated.

Alternatively, the authentication server 155 may determine that the user did not successfully authenticate, such as if one of the verification steps fails due to a lack of a match, credential different than that requested, or unable to verify data based on signed data, etc. The authentication server 155 transmits an authentication result to the relying party, for example the authentication result may indicate that the user was authenticated and the access attempt by the client should be granted or indicate that the user was not authenticated and the access attempt should be denied. In some embodiments, the result includes identifying information for the client device attempting to access the relying party based on the information previously received from the relying party 145 in association with the access attempt such that the attempt is granted or denied only for that particular device.

The relying party 145 receives the authentication result for the access attempt of step 341 from the authentication server 155. In turn, the relying party permits or denies 348 the access attempt by the client device based, at least in part, on the result. Accordingly, the access attempt by the client device from step 341 may be authenticated, at least in part, by involvement of a different device including a trusted execution environment, such as mobile device 101, that is operable to authenticate a user permitted to access the secure asset by additional factors for increased security of the asset.

Example Process for Establishing a User Identity

Figure 5:
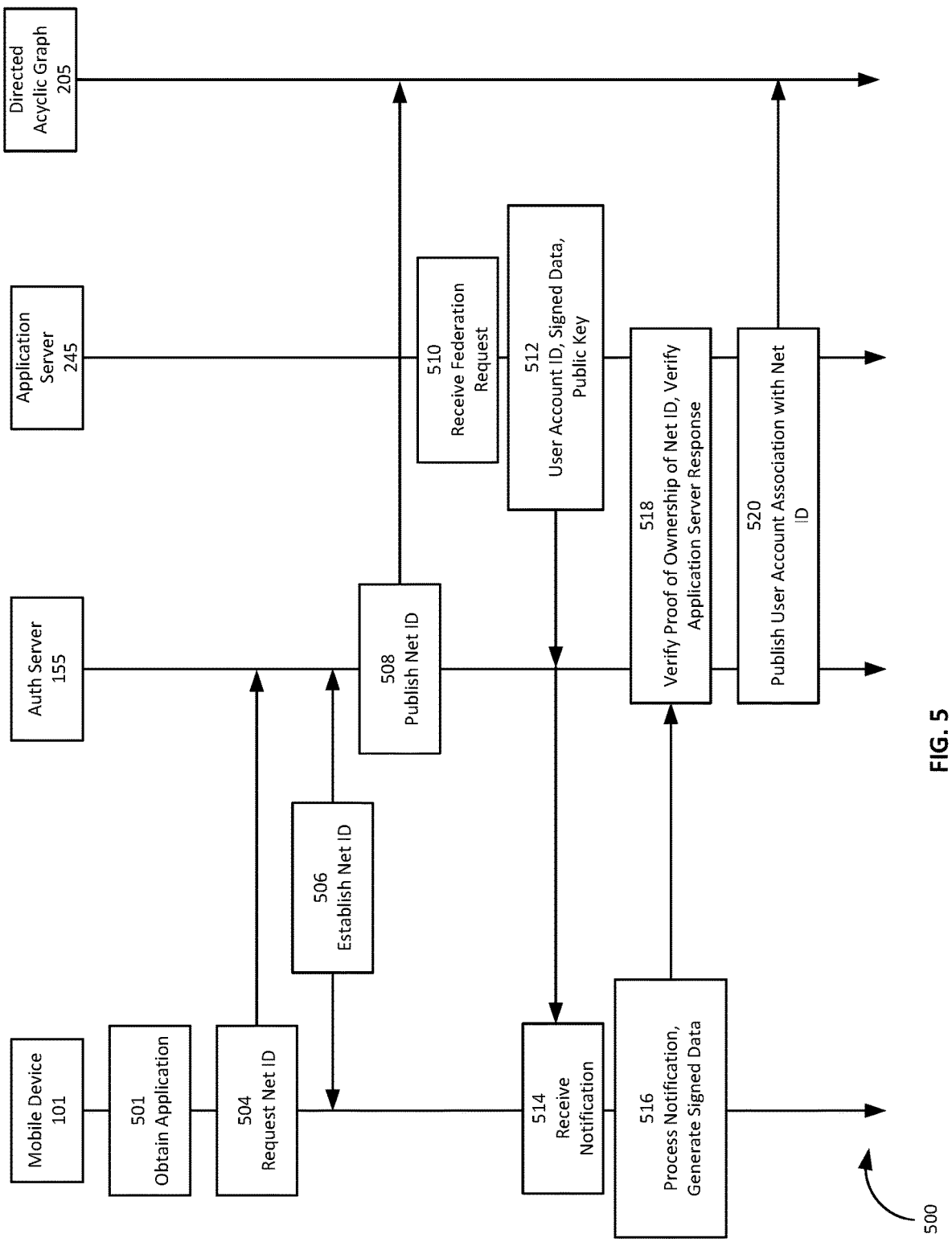
FIG. 5 is a diagram showing example processes for establishing an identity and optionally federating a user account on a decentralized computing platform.

FIG. 5 is a diagram showing an example of a process 500 for establishing an identity on a decentralized computing platform. The process 500A may occur within an example computing environment, such as the example computing environment 200 illustrated in FIG. 2.

The process 500 of FIG. 5 illustrates various operations performed by a device, such as a mobile device 101, which may include an application like an authentication application 220 or relying party application 225 configured to perform at least some of the operations, according to at least some embodiments described herein. In addition, the mobile device 101 may include a trusted execution environment operable to collect and process at least some of the data described below, according to at least some embodiments described herein. The authentication server 155 and application server 245 are alternately shown as performing some operations but not others. Some or all of these operations may be implemented by a smart contract, iterations of which may be called by different ones of the servers and verified as authentic to disparately execute processes comprising same operations according to the smart contract. In some embodiments, the authentication server 155 or relying party application server 245 may be a computing node, or otherwise include computing node functionality, such as being configured to access data or store data within a directed acyclic graph 205 or process data for publication within the directed acyclic graph 205. Alternatively, a server 155 or 245 may interface with a computing node configured to store, access, and process data within a directed acyclic graph 205. Although just one directed acyclic graph 205 is illustrated, many entities may store authoritative representations of the directed acyclic graph 205 according to a consensus process whereby a plurality of computing nodes agree on authoritativeness of records and data structure of the directed acyclic graph 205 and verification according to those authoritative records within the data structure.

The process 500 may begin with the obtaining 501 of an authentication application on the mobile device 101. Examples of obtaining the authentication application on the mobile device may include a preloading of the authentication application on the mobile device 101 or downloading of the authentication application to the mobile device from an application repository. Further, step 501 may include executing the authentication application on the mobile device 101, which may include loading the authentication application in a memory of the mobile device and executing the authentication application by a processor of the mobile device. The memory and processor of the mobile device 101 may be configured for the execution of applications within a client execution environment (CEE), which may be isolated from a trusted execution environment (TEE) of the mobile device. The TEE may include a secure memory and co-processor not accessible by applications within the CEE.

In some embodiments, the authentication application is configured to interface with the TEE of the mobile device 101, such as via an application programming interface (API) configured to exchange data between the CEE and the TEE. The exchange of data via the API may occur by way of one or more requests and responses, each of which may contain data. In some embodiments, to increase security of communications between the TEE and the authentication application within the CEE, the authentication application is configured to establish a secure session, e.g., a secure channel of communications, with the TEE. The secure session may be considered secure by way of encryption of data communicated between the authentication application 120 and the TEE.

The authentication application may be configured to request 504 establishment of a net ID within the identity management system. For example, upon execution of the authentication application within the CEE, the authentication application may prompt the user indicate whether the user desires to create a Net ID. If the user desires to create a Net ID, the authentication application may generate a request 504 for transmission by the mobile device 101 to a server, such as authentication server 155. For example, the request 504 may indicate that the user desires to establish a Net ID. In some embodiments, the request 504 also includes an encryption key such that the authentication server 155 may encrypt data for decoding only by the mobile device 101, like within the TEE of the mobile device 101, which may generate the encryption key. An encryption key may also be used to establish a secure connection, such as by HTTPS, TLS, etc., to afford secure communication of data between the mobile device 101 and the authentication server 155.

The mobile device 101 and authentication server 155 may exchange data for establishing 506 the Net ID. In some embodiments, an authentication application interfaces with the TEE of the mobile device 101 to obtain the data transmitted to the authentication server 155 and stored or process information received from the authentication server 155. For example, the authentication server 155 may generate a private key, digital certificate, or other data pertaining to the establishment of the Net ID for the user of the mobile device 101 and encrypt that data by an encryption key provided by the TEE of the mobile device such that the data may be decrypted, stored, or processed securely within the TEE. The authentication server 155 may also convey similar data over a secure connection to the mobile device 101. Similarly, the mobile device 101 may securely generate data within the TEE for transmission to the authentication server 155. Additionally, the mobile device 101 may securely sign data within the TEE of the mobile device and output the signed data and a public key by which that signed data may be verified by the authentication server 155. Similarly, the authentication server 155 may sign data and output signed data and a public key by which that signed data may be verified by the mobile device 101 within the TEE.

In some embodiments, the authentication application may receive data output from the TEE, which may include representations of credentials collected or generated within the TEE, signed data corresponding to those representations, and signature key (e.g., a public key) for verifying signed data output by the TEE. The signature key of the TEE may be operable to verify that representations of credentials and other data were collected or generated within the TEE based on the signed data, correspond public key, and data. Some of the representations of credentials may include another public key, for which the TEE stores a corresponding private key. This public key may be associated with the Net ID, although that should not suggest the public key of the TEE may not be used. Rather, multiple public keys may be used to verify data signed by different corresponding private keys retained by the user or stored within the TEE.

In some embodiments, the authentication application performs one or more steps similar to those previously described with reference to FIG. 3A to establish data within the TEE and receive data from the TEE, and transmit that data to the authentication server 155 during step 506. For example, the mobile device, TEE, and authentication application may perform one or more steps, like steps 320-328, as described with reference to FIG. 3A. Those steps may also include the exchange, storage, and generation of the addition data discussed above and discussed elsewhere throughout the application, such as with reference to FIG. 2, for the establishment of a Net ID 506 including that information.

Subsequent to receiving the information for establishing a Net ID for a user, such as from the mobile device 101, the authentication server 155 may authenticate the information. For example, the authentication server 155 may authenticate the information by one or more signature verification functions to ensure the validity of received representations of credentials, public keys, and the like. The authentication server 155 may organize at least some of the information according to a schema of a smart contract and structure a request, like a transaction, including the information according to the schema, results of the authentication of the information, and specifying the smart contract. The request may be published 508 to cause one or more computing nodes to receive the request and execute the smart contract to process the request. The smart contract may be configured to output a user identity information as a record of the transaction, like a user identity record in a unified schema, and the plurality of computing nodes may agree, by a consensus protocol, on the authoritative version of the user identity record and the data therein for authoritative publication within the directed acyclic graph 205 (e.g., recordation within a blockchain).

In some embodiment, an application server 145 of a relying party may receive a federation request 510. The federation request may be received from the mobile device 101, such as via a relying party application executing on the mobile device, or via a web interface of the application server 245 (which may originate from another client or the mobile device 101 of the user). The request 510 may include information about the Net ID with which a user desires to federate their account with the application server 245 under. The information may be operable to identity a user identity record corresponding to the Net ID such that a notification may be issued to the mobile device 101, or other device identified within the user identity record, by which the user may approve the activity. The notification may include a user account ID of the user account to federate, signed data by the application server 245, and a public key of the application server 245 operable to verify the authentication of the signed data and thus the authenticity of the notification. In some embodiments, the notification may be a transaction published to a blockchain. In some embodiments, the notification may be a push notification to the mobile device of the user, which may be identified from user account information of the relying party, authentication server 155, or the user identity record. Other example notification options are also contemplated. Moreover, a user may use a relying party application to exchange data with the application server 245 which may include the request, notification, and data processed in response to the notification as discussed below.

In some embodiments, the mobile device 101 receives 514 a notification pertaining to a request to federate a user account. An application, like the authentication application, may obtain and process 516 the notification. Processing of the notification may include the processing of at least some data within the TEE of the mobile device 101 to generate signed data by which user confirmation of the request and user proof of ownership of the Net ID the user account is to be federated under may be verified. The authentication application may obtain the signed data 516 indicative of the user approving the request to federate a user account and indicative of user ownership of the Net ID (e.g., a zero knowledge proof).

The application server 245 or authentication server 155 may receive the signed data 516 and associated the user account with the Net ID responsive to a verification 518 of proof of ownership of the Net ID by the signed data. The verification 518 may also include verification of application server response by signed data, which may be received from the application server or the mobile device 101 if the authentication server 155 authenticates the federation request. In some embodiments, the application server 145 may authenticate the federation request.

If the request is authenticated the authentication server 155 or the application server 245 may publish 520 the user account association with the Net ID to federate the user account. For example, subsequent to receiving the information for federating a user account with an established Net ID, the authentication server 155 may authenticate the information. For example, the authentication server 155 may authenticate the information by one or more signature verification functions to ensure the validity of received representations of credentials, public keys, and the like. The authentication server 155 may organize at least some of the information according to a schema of a smart contract and structure a request, like a transaction, including the information according to the schema, results of the authentication of the information, and specifying the smart contract. The request may be published 520 to cause one or more computing nodes to receive the request and execute the smart contract to process the request. The smart contract may be configured to output a user identity information as a record of the transaction, like a user identity record including the association with the user account ID or public key of the application server 245 in a unified schema, and the plurality of computing nodes may agree, by a consensus protocol, on the authoritative version of the user identity record indicating the association and the data therein for authoritative publication within the directed acyclic graph 205 (e.g., recordation within a blockchain).

Example Process for Authenticating a User to a User Identity

Figure 6:
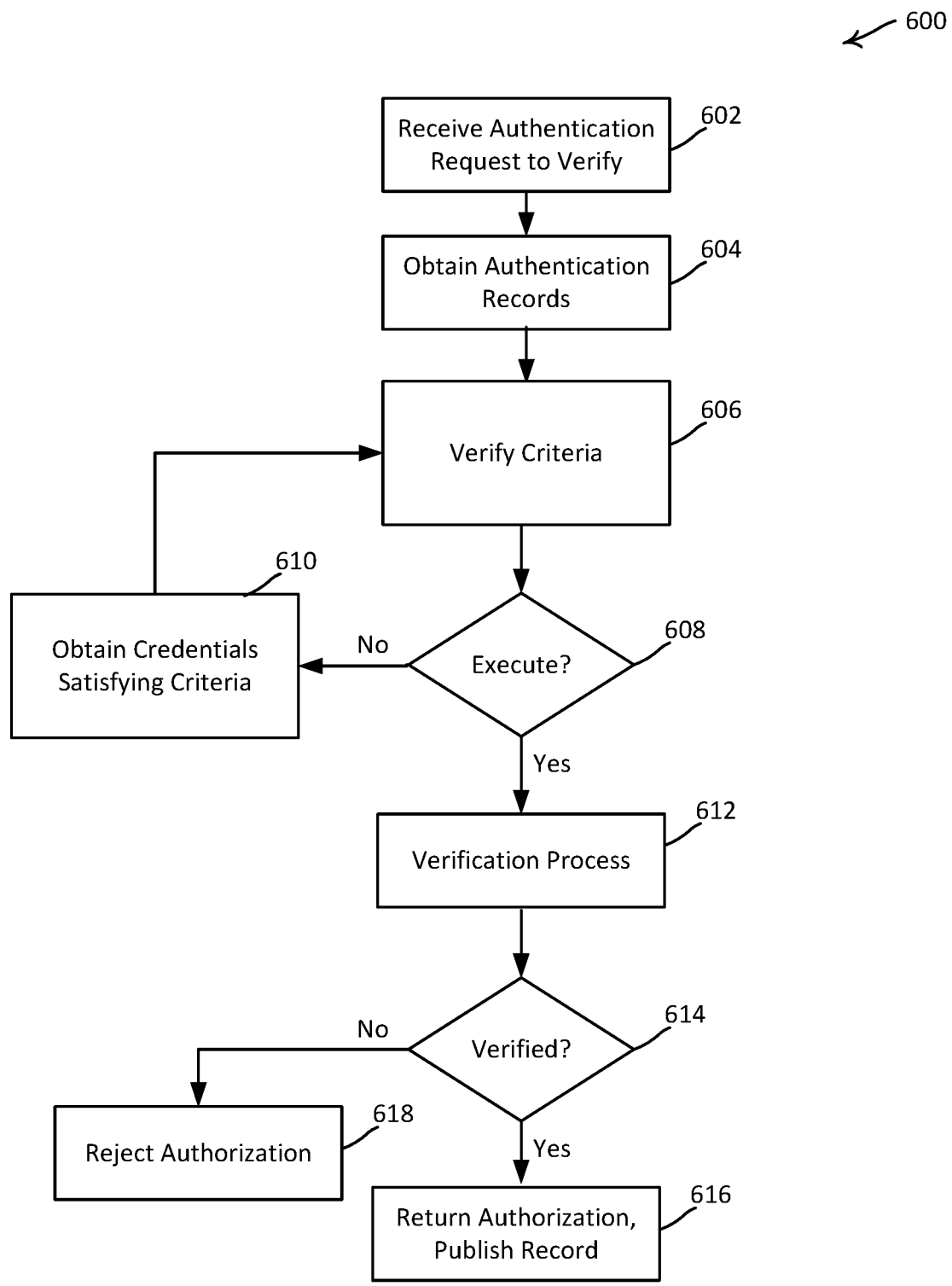
FIG. 6 is a diagram showing an example of a process for authentication of a user to an identity established on a decentralized computing platform within example computing environments described in the present application.

FIG. 6 is a diagram showing an example of a process for authentication of a user to an identity established on a decentralized computing platform within example computing environments described in the present application. In some cases, the process 600 is executed by one or more computing nodes 201 of the decentralized data store or a server 155, 245, though embodiments are not limited to that implementation, which is not to suggest that any other description herein is limiting. For example, in some cases one or more servers 155, 245 may operate as, or include, a computing node 201, and in some cases, some steps may be performed by an authority 130 and some steps by a computing node 201 executing a smart contract.

In some embodiments, the process 600 includes receiving, with one or more processors, an authentication request 602 to verify based on on-blockchain records. On-blockchain records may include user identity records and authentication records. In some embodiments, an address of a smart contract may be called with an API call including the information described below. In some embodiments, the smart contract may respond to the API call by executing a transaction on the blockchain that records information in a schema of an authentication record to the blockchain. In some embodiments, the smart contract may perform one or more API requests to other entities to retrieve some of the information described below for processing. For example, a request may specify storage locations of some information and the smart contract may be configured to retrieve that data, such as by a reference, like a cryptographic hash pointed to a prior authentication record or a user identity record. All or a subset of the information may also be provided in a request.

An example request may include one or more credentials, which may be representations of credentials, identifiers of records to access, which may be addresses of those records, and signed data as proof of secret knowledge for asserting ownership of a Net ID, such as a net ID established by a user identity record on a blockchain. Additionally, the request may include criteria by which the user must authentication. In some embodiments, the criteria are accessed by or included in the smart contract.

At step 604 the process may include obtain a prior record of authentication. For example, the request may identify the prior record of authentication by address. Some embodiments may include a search for a prior record of authentication based on a value provided in the request, such as a token value or identifier associated within the user identity. The search may be restricted to only those authentication records published within a threshold period of time, such as specified by the criteria, as authentication records published outside the threshold period of time may not be counted as satisfying any of criteria. If a prior authentication record is identified within the threshold period of time, it may be considered as satisfying some criteria for authentication of the request. For example, the prior authentication record may indicate which criteria were previously satisfied by the user during authentication of a prior authentication request. The prior authentication record may also indicate any other prior authentication record which may be considered, and that record and any other additional record may be accessed in a similar fashion, up to a threshold number of prior authentication records to consider. In some embodiments, if any prior authentication record was considered in authentication of a user, that information is published in the record of authentication of the request such that all active criteria (at least at the time of authentication) by which the user has authenticated is indicated. A timestamp may be associated with the different criteria such that it may be considered or discarded according to criteria for authentication of the request. The prior record of authentication and any additional authentication records may be verified as authoritative by the computation of cryptographic hash values based on the record and other records within the blockchain.

The process may include verification 606 of the criteria for authenticating the request. Some of the criteria may be satisfied by a prior authentication record according to which credentials a user supplied for the prior authentication. Some of the criteria may be satisfied by signed data provided within the request. For example, the signed data may include a token of the prior authentication record signed by a private key of the user and verifiable by a public key of the user. Information like public keys of the user and representations of the credentials may be stored within the prior authentication record, or, they may be accessed based on an address of a provided user identity record or identifier of a user identity record provided within the request. If a user identity record is accessed, it may also be verified. First, however, the process may include verifying 606 that the request data and any criteria accepted from a prior authentication record satisfy the criteria by which the request 602 is to be authenticated. If criteria are not satisfied, the next verification process may not execute 608 until additional credentials satisfying the criteria not met are obtained 610. For example, a notification may be generated and transmitted to the user to provide additional credentials satisfying the criteria, which may be obtained 610 and verified against the criteria 606. However, in some embodiments, the process may start again at 602, such as by the requesting entity obtaining credentials for the criteria not met and submitting a new request. If the criteria are met, execution 608 may continue.

At step 612, the process may include verifying, such as by a verification process, any authentication record obtained at step 604 or any user identity record obtained 604 (e.g., if no prior authentication record is obtained). For example, the process may include verifying, on the blockchain, any authentication record obtained at step 604 or any user identity record obtained 604 (e.g., if no prior authentication record is obtained). The verification process 612 may include the computation of cryptographic hash values based on the records and other records within a blockchain-based data structure (e.g., like the above noted blockchain or other acyclic graph of cryptographic hash pointers) to determine that the records relied upon, obtained, or referenced are authentic (e.g., have not been tampered with subsequent to their publication). If the records relied upon have not been tampered with, and the criteria are satisfied, the request may be authenticated by virtue of the user proving ownership of the user identity record (which may be conveyed by prior authentication records deemed authoritative as public keys and credential values are verified by consensus according to the process for publication).

If the records are verified 614, the process may continue to step 616, which may include the publication of a record of the authentication result for the request and the criteria by which the request was authenticated. In some embodiments, a token is generated and included in the authentication record. Step 616 may also include a return of authorization of the authentication request, which may be provided as authentication results for publication or other result response, depending on the embodiment.

If the records are not verified 614, authorization is rejected 618 and no record of authentication may be published. The authorization is rejected 618 when the records are not verified 614 as it indicates the records were improperly modified and thus the criteria cannot be considered to have been properly satisfied.

Results published at step 616 or the returned authorization of the authentication request (e.g., returned results) may be used in a variety of different ways as discussed herein. For example, a relying party server may permit a client device access to a secure asset based on those results derived from user authentication via a different device as described previously, such as in an out-of-band authentication. In another example, a relying party server may permit a mobile device access to a secure asset based on those results in an in-band process, by which the mobile device may pre-authenticate or have authenticated previously with a different relying party. In another example, some results may be returned to a mobile device, which the mobile device may process and present to access a secure asset. In some embodiments, those results are structured and signed by private signature of an authority (or controlling relying party) as proof of authentication, by which a terminal or electro-mechanical device may perform an action subject to signature verification based on the results and signed results when presented by the mobile device. In some embodiments the mobile device signs at least some data such that signature verification may also confirm timeliness of presentation by the same mobile device that the authentication results pertain for physical access or payments.

Example Process for Registering a User for Mobile Initiated Authentication

Figure 7:
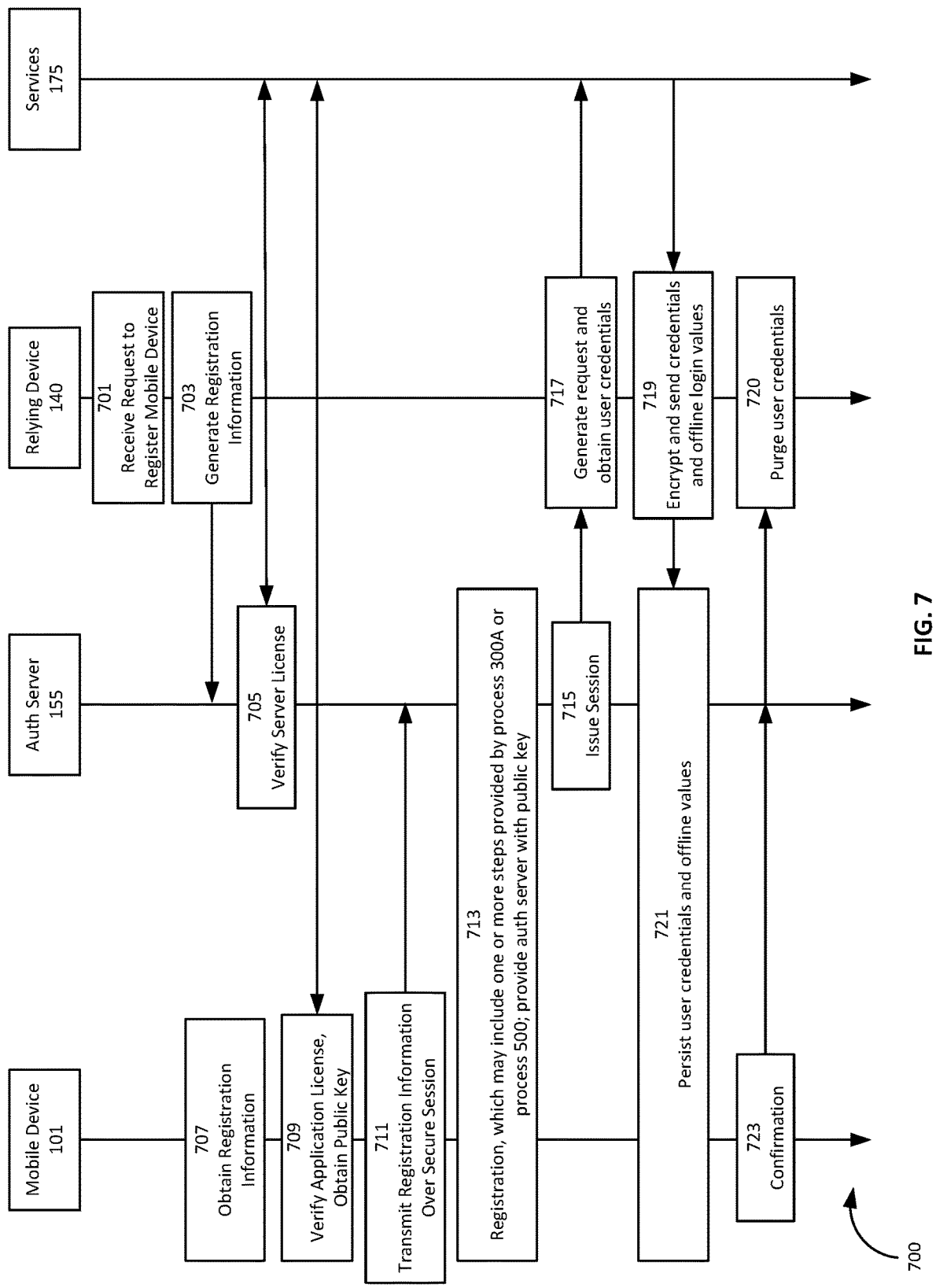
FIG. 7 is a diagram showing an example process for registering a mobile device with a relying device to permit mobile initiated authentication within example computing environments described in the present application.

FIG. 7 is a diagram showing an example process 700 for registering a mobile device with a relying device to permit mobile initiated authentication within example computing environments described in the present application. Embodiments of the process 700, which may include one or more of the illustrated steps, may occur within an example computing environment, such as the example computing environment 100A illustrated in FIG. 1A, the example computing environment 100B illustrated in FIG. 1B, or the computing environment 200 illustrated in FIG. 2. The process 700 of FIG. 7 illustrates various operations performed by devices of a computing environment, such as one of the computing environments discussed with reference to FIG. 1A, FIG. 1B, or FIG. 2.

An example mobile device 101 is shown. Examples of a mobile device 101 may include an application like an authentication application 120, 220 or relying party application 225, or other native application 125 configured to perform at least some of the disclosed operations, according to at least some embodiments described herein. In addition, the mobile device 101 may include a trusted execution environment operable to collect, store, or process at least some of the data described below, according to at least some embodiments described herein.

An example authentication server 155 is shown. Examples of an authentication server 155 may include various services and application programming interfaces by which authentication information and other data may be communicated between the authentication server and other entities. Additionally, the authentication server 155 may be configured to perform at least some of the disclosed operations, according to at least some embodiments described herein. An example services 175 is also shown. In some embodiments, the authentication server 155 may include one or more services, such as authentication services, which may include services 175. In some embodiments, the authentication server 155 may include one or more services 175, but not others. For example, services 175 may include services external to the authentication server 155. In various embodiments, use of services may be comingled, for example, authentication server 155 may provide a first service and services 175 may provide one or more other second services. An authentication server 155, as described herein, may be implemented in a variety of ways and optionally by different parties. For example, the authentication server 155 may be implemented by a $3^{rd}$ party authentication service which provides authentication services to various parties managing relying devices, by a party managing relying devices (such as to manage user access to relying devices and other resources), or by other parties managing various other resources, like online resources, which relying devices (that may be operated by other parties) or users may authenticate with to access. In various embodiments, an authentication result may confer one or more privileges, such as user access to a relying device, which may extend other privileges to the user, such as user access to one or more resources via the relying device, either natively or via extension (e.g., obtaining permissions based on the authentication result which may include forwarding of the authentication result or other credentials in response to the authentication result).

An example relying device 140 is shown. Examples of a relying device 140 may include a workstation which one or more users may access, such as to access one or more resources the workstation is configured to or permitted to access for authenticated users. Thus, for example, the relying device 140 may be a client-type device (e.g., like a client device 135), and the relying device may be configured to access one or more online resources provided by a relying party. A relying device 140 may be associated with the relying party, an example of which may include an employer issued workstation where the online resources may include one or more internal resources of the employer. The disclosure, however, is not so limited. The relying party may provide $3^{rd}$ party services (e.g., $3^{rd}$ party online resources) to the employer, which employees may be permitted to access, such as via an employer issued workstation (or other device which relies on or is permitted to access the $3^{rd}$ party services). In some cases, the resources may be locally stored and executed by the relying device 140, like an application 110, but which may implement one or more DRM controls to permit user access. For example, the relying device 140 may be a device of a relying party, such as within a corporate environment. Alternatively, the relying device 140 may be a controller or communicatively coupled to a controller which governs physical user access to areas or functions (e.g., valves or machinery or panels) via electrical signals.

Although not shown, the process 700 of FIG. 7 may begin with the obtaining of an authentication application on the mobile device 101. Examples of obtaining the authentication application on the mobile device may include a preloading of the authentication application on the mobile device 101 or downloading of the authentication application to the mobile device from an application repository. The mobile device 101 may execute the authentication application, such as by loading the authentication application in a memory of the mobile device and executing the authentication application by a processor of the mobile device. In some embodiments, a memory and a processor of the mobile device 101 may be configured for the execution of applications within a client execution environment (CEE), which may be isolated from a trusted execution environment (TEE) of the mobile device. The TEE may include a secure memory and co-processor not accessible by applications or processes executing within the CEE. For example, an application executing within the CEE may be required to securely communicate with an interface of the TEE to request data from and request processing of data within the TEE, and the interface may respond to various requests based on verification of certain criteria.

Accordingly, an application (or other process) within the CEE may be prevented from accessing the TEE other than by communications over a secure session via the interface, and the TEE may restrict which values may be returned in a response. For example, actual user credential values may not be divulged but rather a representation of credential, such as cryptographic representation, like a cryptographic hash of a credential or encrypted credential (via either symmetric or asymmetric encryption protocol) indicative of the credential may be provided in a response. Similarly, an authentication result on a credential may be provided in a similar fashion, such as by returning a representation of the credential on which the user authenticated and a signed result (or other data, such as a signature of the representation by which the user authenticated) indicative of the authentication result. In some embodiments, the authentication application is configured to interface with the TEE of the mobile device 101, such as via an application programming interface (API) configured to exchange data between the CEE and the TEE. The exchange of data via the API may occur by way of one or more requests and responses, each of which may contain data. In some embodiments, to increase security of communications between the TEE and the authentication application within the CEE, the authentication application is configured to establish a secure session, e.g., a secure channel of communications, with the TEE. The secure session may be considered secure by way of encryption of data communicated between the authentication application 120 and the TEE.

In some embodiments, process 700 begins with a step 701 that includes a relying device 140 receiving a request to register a mobile device (e.g., of a user) to the relying device. In some cases, the relying device 140 includes a user interface by which a request to register the mobile device may be received in step 701. For example, the relying device 140 may be a workstation which the user desires to access, and the workstation may present a user interface by which a user may select a registration option. A relying device 140 may include other interfaces, for example, a relying device may include a physical button, or other human interface element with which a user may interact. The human interface element may be indicative of the registration process, and the relying device 140 may detect the user interaction in step 701 to receive a request to register a mobile device. In other embodiments, a relying device 140 may receive a request by virtue of detection of the mobile device, such as by a connection attempt via a wireless near-field communication protocol or other wireless connection, e.g., a WiFi connection attempt. In other embodiments, a relying device 140 may receive a request by virtue of detection of a signal emitted by a mobile device, such as via a wireless near-field communication protocol. In either instance, the relying device 140 may determine a user is requesting to register a mobile device.

In response to receiving a request to register a mobile device, the relying device 140 may generate registration information 703. For example, the relying device 140 may generate a registration information including a registration value. Registration information may include multiple components, such as an identifier of the relying device and a registration value (which may change for different registration requests, and thus be tied to a specific request in time). The relying device 140 may pass the registration information, such as the registration value, to an authentication server 155. For example, authentication server 155 may maintain a secure connection, or tunnel, such as via TLS/SSL over HTTP, Web Socket, SSH, or other protocol, with the relying device 140 (or vice versa) to facilitate the secure exchange of data between the relying device 140 and the authentication server 155. The authentication server 155 may store information about the relying device 140, such as in a device record corresponding to the relying device, which may include information pertaining to a network address of the relying device, corresponding secure connection information, and associated identifier.

In step 705, the authentication server 155 may, in some embodiments, verify (or renew) a license with one or more service 175. The authentication server 155 may verify a license in response to receiving registration information from a relying device 140. For example, in various implementations, relying devices 140 and authentication servers 155 may be deployed by businesses which utilize software licensed by other developers of computer program code. In turn, a deployed authentication server 155 may verify a license with a certificate authority service through the developer or through which the developer licenses use of the computer program code executed by the authentication server 155 to the business. Accordingly, example services 175 may include one or more certificate services, like an active directory service, X.509 certificate service, or other trust service.

The relying device 140 may also transmit or display registration information, such as the registration value, or a deterministic value associated with the registration value, such that the mobile device 101 may obtain registration information. The registration information may also include an identifier corresponding to the relying device 140 (e.g., such that the authentication server 155 may match a registration information received from a relying device 140 to registration information received from the mobile device 101). In some embodiments, the relying device 140 may generate a code, like an optical code (e.g., a QR code or barcode), which includes the registration value or deterministic value (e.g., like an encrypted registration value, or hash of a registration value), which the relying device may display within a user interface (e.g., on a display associated with the relying device). In some example embodiments, the relying device 140 may transmit registration information to the mobile device 101. For example, the relying device 140 may generate a signal indicative of the registration information or transmit, over a connection with the mobile device, data including the registration information, such as via a near-field communications protocol. In some embodiments, the relying device 140 may provide a first portion of registration information via first source (e.g., within an interface of a display) and a second portion of registration information via a second source (e.g., by a wireless interface), where the first source and second source differ and correspond to different interfaces or protocols by which the portions are provided. In some embodiments, the relying device 140 may provide an encrypted registration value to the mobile device 101, such as by wireless transmission, and display another value or code by which the mobile device 101 may decrypt (e.g., after reading the value or the user inputting the value) the encrypted registration value (e.g. within the TEE of the mobile device which may sign the output) to obtain the registration values (e.g., in plaintext). In some embodiments, the relying device 140 may transmit an encrypted value via first wireless interface and transmit the value or code by which a mobile device may decrypt the value over another interface.

In step 707 of the process, the mobile device 101 obtains the registration information. The registration information may be obtained by an authentication application executing on the mobile device 101, and may include multiple components, such as an identifier of the relying device and a registration value (which may change for different registration requests, and thus be tied to a specific request in time). The mobile device 101 may obtain displayed registration information, such as by user input, a scan of a code, like an optical code, or obtaining a value of a signal. For example, a user of the mobile device 101 may key in information displayed by the relying device 140 to an interface of an authentication application, such as a generated code. Alternatively, the user of the mobile device 101 may scan the code, such as by positioning the code within view of an imaging device by which the code may be captured. An interface of an authentication application may include a user interface element which a user may select to scan an optical code, like a QR code, by positioning the QR code in view of an image sensor of the mobile device, like a camera. Alternatively, an interface of an authentication application may include a user information element which a user may select to cause the mobile device 101 to obtain a signal generated by the relying device, such as a beacon signal indicative of the registration information or communication data including the registration information. Such as beacon signal may be broadcast via sound waves or electromagnetic waves. In some cases, the user may position the mobile device 101 proximate to an NFC device associated with the relying device by which the mobile device may obtain the signal. In some cases, such as whether the user caused the mobile device 101 to request a connection to the relying device 140, the mobile device may obtain the registration information over a connection with the relying device.

In some example embodiments, an authentication application may cause the mobile device 101 to search for one or more signals on one or more wireless interfaces of the mobile device when executed, or in response to the user navigating to a registration interface. In some cases, such a registration interface may display information about nearby detected relying devices based on respective beacon broadcasts, and the user may select one of the devices to transmit a signal which the relying device may receive as a registration request in step 701, and which may cause the relying device to transmit a signal by which the mobile device may obtain the registration information in step 707. Additionally, in some embodiments, the mobile device 101 may obtained registration information from multiple sources, such as an encrypted value from one source and a key or portion of a key for decrypting the value from another source. In some embodiments, the mobile device 101 is configured to obtain registration information or a portion thereof within the TEE of the mobile device, such as via a component (e.g., image sensor, touch interface keyboard, wireless interface like an NFC sensor, or other sensor) configured to securely pass data to the TEE. Accordingly, in some embodiments, the TEE may process at least some registration information, such as to obtain a registration value, and the TEE may sign the registration value, to indicate that the registration value was determined by the TEE.

In some example embodiments, in step 709, the mobile device 101 may verify a license, such as a license associated with the authentication application. For example, in a step 709 the mobile device 101 may transmit a request to a service 175, such as the service 175 with which the authentication server 155 is verified, to verify a license associated with the authentication application. In some embodiments, the service 175, such as a certificate service, may provide one or more public keys (e.g., upon request) to a first entity that correspond to another entity registered (or active) with the service such that the first entity may securely transmit data. Thus, for example, the mobile device 101 may obtain one or more public keys associated with the authentication server 155 from the service 175. In some embodiments, obtaining a public key for the authentication server 155 may be dependent upon whether the authentication application is licensed. Additionally, in some embodiments, the authentication application may be licensed in association with a given application server 155 such that revocation of the certificate for the authentication application may revoke privileges of the mobile device (e.g., if lost, stolen, or otherwise).

In step 711, the mobile device 101 may transmit registration information corresponding to the relying device 140, such as a registration value and identifier of the relying device, to the authentication server 155. The mobile device 101 may establish a secure session with the authentication server 155, such as based on the obtained public key, for the secure transmission of registration information. For example, the mobile device 101 and authentication server 155 may establish a secure session by the mobile device 101 transmitting a session key encrypted by the obtained public key to facilitate the exchange of information. The secure session may be HTTP over TLS/SSL, SSH, Web Socket over TCP, or other secure connection type by which the mobile device and authentication server 155 may exchange data, like registration information. In some cases, the mobile device 101 may encrypt the registration information, such as a registration value, with the obtained public key of the authentication server 155. In some cases, the mobile device 101 may sign data transmitted to the authentication server 155, such as by a private key stored within the TEE for which the authentication sever may obtain a public key for verifying the signature (e.g., the private key may correspond to a public key associated with the license of the authentication application which the authentication server may request from a service 175 to verify the signature).

In step 713 the mobile device 101 and authentication server 155 may participate in a registration operation. The registration operations may include the secure exchange, such as over the secure session, of a public key corresponding to a private key stored within the TEE of the mobile device. In some embodiments, the authentication server 155 may be configured to retrieve a public key corresponding to a license authentication application of the mobile device 101 from a service 175, like a certificate service, and may challenge the mobile device to a proof of knowledge, such as knowledge of the corresponding private key, like in a challenge-response. For example, the mobile device 101 may sign specific data within the TEE by the private key and the signed data may be transmitted to the authentication server for verification based on the public key (e.g., according to a signature verification algorithm). The mobile device 101 may also provide other information over the secure session established with the authentication server 155, such as representations of credentials. One or more steps of the registration operation discussed below may be optional, such as in instances where the mobile device 101 is already registered with the authentication server 155, in which case the authentication server 155 may maintain a record for the user which may include one or more representations of user credentials, public keys, etc., for authentication operations. In some case these representations and public keys may be used for multiple relying devices or other authentication operations, however, some of the representations or public keys may be reestablished in some instances, or by default, depending on implementation.

Additionally, some registration operations discussed at step 713 may occur in a variety of different ways depending on the embodiment, and some registration operations of step 713 may occur prior to the process of FIG. 7. For example, after obtaining an authentication application on the mobile device 101 and prior to the process of FIG. 7, a user may have registered or established an identify according to a process 300A described with reference to FIG. 3A or a process 500 described with reference to FIG. 5, or a comingling of some steps of those processes. For example, registration may be performed in association with establishing an identify of a user which may be utilized in a process like that described with reference to FIG. 7 or other processes described herein. Likewise, user credentials established within a TEE of the mobile device 101 in association with such a registration process may be subsequently utilized. In some cases, a user may have a registered net ID or other federated identity to which the user may authenticate to in the registration process. Thus, in some cases, the mobile device 101 may submit a knowledge proof (e.g., signature of some data in step 711 or 713) or respond to a challenge for a knowledge proof (e.g., in step 713) to bypass some or all of the steps described below or with reference to process 300A or process 500.

In some embodiments, such as in association with a registration step 713 or prior to the illustrated process 700, an authentication application may be configured to cause the mobile device 101 to request establishment of a net ID within an identity management system, which may correspond to the authentication server 155 and optionally one or more other services 175 and which may include operations like those described in FIG. 5 (e.g., in process 500) with reference to steps 504, 506, 508, 510 of process 500 performed by the respective entities and information like that described in step 512 may be provided to the mobile device 101 by the authentication server 155 (e.g., rather than application server, although such variations are not disclaimed). For example, upon execution of the authentication application within the CEE, the authentication application may cause the mobile device 101 to prompt the user indicate whether the user desires to create a Net ID. If the user desires to create a Net ID, the authentication application may cause the mobile device 101 to generate a request for transmission by the mobile device to a server, such as authentication server 155.

In some embodiments, such as in association with a registration step 713 or prior to the illustrated process 700, the authentication application performs one or more steps similar to those previously described with reference to FIG. 3A (e.g., in process 300A) to establish data (e.g., credentials or private keys) within the TEE and receive data (e.g., representations of credentials or public keys) from the TEE, and transmit the received data to the authentication server 155 during step 506 of FIG. 5, or step 713 of FIG. 7. For example, the mobile device, TEE, and authentication application may perform one or more steps, like steps 320-328 of process 300A, as described with reference to FIG. 3A. Those steps may also include the exchange, storage, and generation of the addition data discussed above and discussed elsewhere throughout the application, such as with reference to FIG. 2, for the establishment of a Net ID 506 including that information. Or in some embodiments, once executed, such as within the CEE, the authentication application may cause the mobile device to perform one or more operations in a registration process, which may correspond to steps 321-328, without performing steps discussed with reference to FIG. 5.

Accordingly, embodiments of step 713 of process 700 may include operations like those described with reference to FIG. 3A in association with steps 320-328 (and others in other steps of FIG. 7) and may also include operations like those described with reference to FIG. 5 in association with steps 504-512 (and others in other steps of FIG. 7), or combinations thereof. In other words, various aspects of disclosed registration and identity establishment techniques and variations on such techniques are applicable to a registration process like that described below in reference to step 713 of process 700. For example, operations like those described with reference to FIG. 3A and FIG. 5 may be utilized to establish a federated identity, such as net ID, but should not suggest that other federation technique may not be utilized. Examples of which may include FIDO and FIDO2 standards, and those standards may be similarly augmented with techniques like those disclosed herein.

The mobile device 101, as described above, such as over the secure session, may communicate registration information to the authentication server. An authentication application may cause the mobile device 101 to transmit information indicative of the mobile device or user, such as in cases where the mobile device has previously registered with the authentication server. For example, the authentication server may store a record corresponding to the user and which includes information about the mobile device, such as device information and a public key corresponding to a private key stored within the TEE of the mobile device. The user record may additionally include one or more representations of credentials established within the TEE of the mobile device 101. The authentication application may cause the TEE to sign, within the TEE, data which may be transmitted to the authentication server 155, by which the authentication server may verify the mobile device as a registered mobile device. In order to generate the signature, the user may be required to authenticate on the mobile device 101, such as by providing one or more credentials for verification within the TEE. Accordingly, the authentication server 155 may verify the signed data in accordance with a signature verification algorithm based on the public key and the data which was signed, such as a representation of a credential on which the user authenticated with the mobile device. The authentication server 155 may access a user record, such as by mobile device identifier, indicate user record, or by a public key provided by the mobile device 101. The authentication server 155 may access a record based on the received information, such as to obtain the public key associated with the record (or ensure a match thereof) and obtain a stored representation of the credential for performing the verification of a previously registered device. The data which was signed may include a timestamp which may be communicated to the authentication server 155 (or other temporal data, like challenge data, provide by the authentication server) and by which the authentication server may verify temporality of the signed data to a current system time (or a timestamp associated with the receipt of registration information from the relying device 140).

If the mobile device 101 is not previously registered, e.g., there is no record of the device for a user record, the authentication server 155 may request the mobile device 101 provide information like that described above. In instances where no record of the user exists, additional information may be requested, such as to establish a user record, and verify privileges associated with the user to access the relying device 140. In either instance, the authentication server 155 may request the mobile device 101 provide a public key and representations of credentials by which a record of the device may be established for the user. The authentication application executing on the mobile device 101 may request, to the TEE, establishment of a private key within the TEE, or request a public key which may cause the generation of a private key within the TEE, or the TEE may provide a public key corresponding to a private key already established within, stored, or otherwise of the TEE. In each case, the TEE maintains the private key within a secure memory and not divulge the private key. In some cases, the TEE may output a generated result (e.g., a generated public key corresponding to a generated private key) from within the TEE, and provide a public key associated with a secure processor (or other secure element) of the TEE (which may output signed data) such that secure processing of data on which the result is based may be verified (e.g., that the public key may be verified as corresponding to a securely generated private key that is maintained within the TEE). In some embodiments, the authentication application may verify the public key output by the TEE as securely generated. In turn, the authentication application may cause the mobile device 101 to transmit the public key to the authentication server 155, and optionally include data by which the authentication application may verified the public key as securely generated. With a public key established for the mobile device 101, for which the corresponding private key is secure within the TEE, the authentication server 155 may verify other data received from the mobile device 101, such as by signature verification, and encrypt data which may be transmitted to the mobile device 101 for processing within the TEE. In some embodiments, different public keys are utilized for the different operations, in which case multiple public keys may be generated in accordance with the above processes.

The authentication server 155 may request the mobile device 101 generate representations of credentials corresponding to the user. In some cases, the user may establish one or more credentials from which the representations are generated, such as where those credentials differ from ones already established within the TEE, are more secure, or otherwise. For example, the authentication server 155 may request a set of representations, each representation corresponding to a different credential in a set of credentials. The authentication application may request, to the TEE, establishment of one or more credentials (e.g., the set of credentials) within the TEE. The authentication server 155 may provide a policy with which one or more of the credentials must comply, e.g., a pin length greater than 4 digits, alphanumeric password requirements, whether one or more biometric credentials (or a combination) are permitted, and the like. The authentication application may provide the policy requirements to the TEE in association with respective credentials for establishment within the secure memory of the TEE. In turn, the authentication application may request a representation of an established credential, such as a cryptographic hash of a credential. The TEE may output a representation of the requested credential, and may also provide a result indicating whether the credential complies with the policy (although in some cases the TEE may prevent the user from providing a credential which does not comply with the specified policy requirements). In some embodiments, the TEE may output signed data such that the authentication application or authentication server 155 may verify the secure generation of data output by the TEE. For example, after establishment and verification of the private key within the TEE, the TEE may sign outputs, such as results (e.g., a representation) or other processed data, with the private key. In turn, the authentication application or authentication server may verify data as being processed or securely generated within the TEE based on corresponding signed data by processing the data, the signed data, and public key by a signature verification algorithm which indicates whether the signing key (e.g., the private key of the TEE) was used to sign the data, and whether the signed data correspond to the data. Thus, the authentication server 155 may receive representations of credentials from the mobile device 101, which may be verified by the above public key or another public key (e.g., that corresponds to a private key of the TEE and which was exchanged in a process like that described above) according to a signature verification technique. In other words, embodiments should not be construed to be limited to a single key-pair, as multiple key-pairs may be created in accordance with techniques like those described above, or that embodiments preclude use of a symmetric encryption protocol with shared key encryption. The authentication server 155 may determine whether the user is authorized to access the relying device, such as based on associations between users and relying devices, verification of the registration value, and determine whether to issue a session in step 715 based on the results.

In some cases, the relying device 140 may maintain a Web Socket tunnel, or other secure tunnel or connection, like a heartbeat between the relying device and an authentication server 155 (or vice versa). For example, a secure session may be established between the relying device 140 and the authentication server 155 (as well as services) for the transmitting of credentials, like public keys, certificates, offline values, or the exchange of other data. The secure session may be HTTP over TLS/SSL, SSH, Web Socket over TCP, or other secure connection type by which the relying device 140 (or applications thereon) can exchange data with a server. The secure session may be held open by the authentication server 155 or relying device 155 for a preconfigured amount of time (e.g., 1-180 seconds, or 1-5 minutes) before timing out, and refreshed upon a heartbeat signal, like receipt of a packet indicative of a heartbeat (e.g., that a connection is alive) or refresh request. Thus, for example, the authentication server 155 may determine an availability of a relying device 140 for online authentication based on the status of the session (e.g., whether the session is active). The authentication server 155 may issue a user session by transmitting data received from the mobile device to the relying device 140 based on an agreement of information received from the relying device 140 (e.g., registration information in 703) and the information received from the mobile device 101 (e.g., matching registration information in 711), and verification of authentication information received from the mobile device (e.g., for a user). In some embodiments, the authentication server 155 may additionally verify permissions associated with a record of the user or the relying device, such as to determine whether the user is permitted to access the relying device prior to issuing a session 715 for the user to the relying device 140. Additionally, the authentication server 155 may push an offline authentication policy to the relying device 140, which may govern generation of offline values by which a user may access the relying device when networked communications between the relying device (or the mobile device) and authentication server are unavailable.

In a step 717, such as responsive to a session issued by the authentication server to the relying device 140, the relying device may generate a request to a service 175, such as a certificate service. The service 175 may differ from other certificate services (e.g., those utilized in steps 705 or 709), or may be the same. In some cases, the certificate service utilized in steps 705 and 709 is a trust certificate service associated with a developer which licenses server 155 instances and utilization of authentication applications on mobile devices (e.g., may permit 1 active server instances and 100 authentication applications instances, or 1-10 server instances and 0-1000, or 0-10,000 application instances, or many more such as in the case of a $3^{rd}$ party service, and different entities, like relying parties, may be permitted different amounts of instances of servers and associated authentication application instances by which users may access relying devices). In step 717, the request for a certificate may be to an active directory service, or other service which governs credentialing of relying devices, such as user accounts on such relying devices and the like, such as for examples in which a relying device is a workstation or server executing an operating system or modules configured to utilize the respective service. Other relying devices in accordance with other embodiments may transmit requests to other services, which may optionally be provided by the authentication server 155 or other server or other service provider. The relying device 140 may also generate a key-pair, such as a public-private key pair, for signing data transmitted to one or more entities, such as one or more services 175 or servers (e.g., like the authentication server). For example, the relying device 140 may generate a public-private key pair in association with the registration process, such as responsive to the session being issued by the authentication server to the relying device 140 in step 717 (e.g., to register a mobile device/user not previously registered to the relying device 140). In turn, the relying device 140 may provide the public key to one or more services, servers, or other entities by which those entities may verify data signed by with relying device with the private key (which the relying device retains). In another example embodiment, the relying device 140 may receive a private key, such as over a secure connection (and optionally provide the public key or distribute the public key to one or more entities). For example, the relying device 140 may receive a key pair from the authentication server, or a service, and store the private key of the key pair for singing data transmitted to one or more entities to which the public key of the key pair is distributed.

In some embodiments, the request generated in step 717 may be a request to sign or create a signed certificate to obtain credentials corresponding to the user for which the authentication server 155 issued the session 715. The request to the service in step 717 may include information based on data received over the session with the authentication server 155, which may include information provided by the mobile device 101 to the authentication server or based on information provided by the mobile device to the authentication server in the preceding steps. For example, the request may be a certificate signing request for an active directory compatible SSL certificate or other certificate or token from a service 175 which generates or signs a certificate (e.g., as a signing authority) and returns the certificate. The signed certificate may be tied to the user, e.g., as a user identifier or authenticator or both. For example, the signed certificate may be tied to information provided by the mobile device, like a public key, certificate, or cryptographic hash, other deterministic information (e.g., such as information output by the TEE), or other credential associated with the mobile device, to establish a zero-knowledge proof of ownership. In some cases, the certificate signing request may correspond to a public key of the mobile device or certificate based on a public key of the mobile device, such as the public key provided to the authentication server. Other embodiments may associate the certificate with the user within one or more databases, such as based on an association of the user certificate with a public key, or cryptographic hash, or other deterministic information provided by the mobile device, thus tying the user certificate to the mobile device.

In step 719 of the process, the relying device 140 may receive a response from the service 175, such as a signed certificate or token returned in response to the request 717, like a user certificate, for user credentials corresponding to a user account which may be accessed on the relying device. The user account which may be access based on the credentials may correspond to a user-level account (e.g., which may be an existing user account) of the user of the mobile device 101. For example, within a corporate environment, the user account may be an account which the user has permission to log into on the relying device 140. In some cases, such as where multiple such accounts exist, like a user-level account, or an administrative-level account, a user certificate may be obtained for each account. In some cases, the user certificate is specific to a given relying device, and the user may register with other relying devices, or the user certificate may be valid across a collection of relying devices. The relying device 140 may transmit 719 the signed certificate to the authentication server 155 such that the certificate may be persisted to the mobile device 101. In some embodiments, the relying device 140 may encrypt the user credentials or other data (e.g., with a public key or encryption key associated with the mobile device), like a certificate, for which the TEE of the mobile device stores a corresponding key by which the encrypted data may be decrypted (e.g., within the TEE of the mobile device).

Additionally, the relying device 140 may generate one or more offline values in accordance with an offline policy received from the authentication server 155 or stored on the relying device 140. Offline policy may provide for use of an offline value for a user login to a relying device 140 (which may communicate the offline values for persistence with the policy on a mobile device when registered and when performing an online enabled mobile initiated login). Offline values may be a PIN, numerical or alphanumeric, or other value which may be input to the relying device by the user or obtained by the relying device from the mobile device (e.g., value may be provided by NFC, Bluetooth beacon, optical code, or other communication means). A given offline value may be single use, such that is cannot be captured for reuse, and a limited number of offline values may be persisted to a user device. For example, after registration or online login, the relying device may generate 1, 5, 10, 15, 25 etc. offline values (e.g., according to a policy) which may be persisted to the mobile device. In some embodiments, the offline values are generated based on the signed user certificate, or other deterministic data, like a public key of the mobile device, or a value associated with the relying device, such as a value or values of one or more registers, or a combination of values. Offline values may be generated in other ways in other embodiments. The relying device 140 may store data, such as the offline values, or data by which a received offline value may be verified. Additionally, the relying device 140 may store the policy, which may optionally include one or more rules for offline value verification. In some cases, the rules may be based on the capabilities of the mobile device and configuration of the relying device. Additionally, the relying device 140 may sign transmitted data, such as offline values or other data described herein, and an entity receiving the data may verify a signature of the relying device 140 based on public key associated with the relying device. In some case, the private key by which the relying device 140 signs data is associated with a given mobile device or user having registered to access the relying device. Thus, for example, an entity receiving signed data from the relying device 140, which may be in association with a request, challenge, access attempt, or login pertaining to a particular mobile device of a particular user, may verify the signature based on a corresponding public key distributed by the relying device or other entity in association with registration of the mobile device of the user.

The authentication server 155 may persist data received from the relying device 140 to the mobile device 101. For example, the authentication server 155 may transmit the user credentials to the mobile device 101, along with offline values. The authentication server 155 may transmit a policy to the mobile device 101, which may specify one or more rules governing user access to the relying device to which the mobile device registered. The above information may be encrypted, such as by a key of a key-pair to which the TEE has access to the other key of the pair and by which the information may be decrypted. In some embodiments, the key may be a shared key. In either instance, data transmitted to the mobile device 101 may be encrypted, and the mobile device may obtain unencrypted data by processing the encrypted data in accordance with an encryption protocol, such as within the TEE of the mobile device, which may securely store a key by which the encrypted data may be decrypted. A policy may also be provided in association with the registration or other disclosed step, or transmitted or updated for a relying device by the authentication server 155 at another time. In some cases, the policy includes an online authentication component and an offline authentication component. The online authentication policy component may specify rules by which user access may be granted to the relying device 140 by mobile initiated authentication over a network, such as through the authentication server 155. The offline authentication policy component may specify rules by which user access may be granted to the relying device 140 by mobile initiated authentication when network access to one or more devices is unavailable.

The mobile device 101 may some or all of the received information in encrypted form within any memory, or may store some or all of the received information within the TEE in decrypted or encrypted form. In either instance, the TEE may retain a key by which the information may be decrypted, and an unencrypted version of the information may only be obtained by processing within the TEE (e.g., as opposed to a CEE) of the mobile device. In some cases, the received information may include encrypted information (like a certificate) which may by encrypted by another key (e.g., to protect the encrypted values as well as other values).

In a step 723, the mobile device may confirm receipt of received information, such as by a response to the authentication server 155, and the authentication server 155 may confirm receipt to the relying device 140. Upon receipt of confirmation, the relying device 140 may purge user credentials, such as a user certificate or other data received in association with the registration process 700 in a step 720. In some embodiments, the relying device 140 may purge user credentials after completion of a user session with the relying device. For example, upon receiving confirmation from the authentication server 155, the relying device 140 may permit user access to the relying device.

In some embodiments, the authentication server 155 or services 175 may utilize one or more local databases or networked databases, such as one or more repositories (e.g., like an authentication repository 165). In some embodiments, the authentication server 155 or services 175 may each, or individually, utilize a combination of databases. For example, many entities may store some data locally or via networked datastore and some data within a distributed datastore, like a directed acyclic graph of a decentralized computing platform, and different entities may utilize different decentralized computing platforms, and in either instance data may be stored according to a consensus process whereby a plurality of computing nodes agree on authoritativeness of records and data structure of the datastore and verification according to those authoritative records within the data structure.

In some embodiments, some operations may be implemented by a smart contract, iterations of which may be called by different ones of the devices, servers or services. Iterations of smart contracts may be verified as authentic (e.g., via signature verification or, more generally, public-private key cryptography infrastructure) to disparately execute processes comprising same operations according to the smart contract. For example, one or more of the operations performed by the authentication server 155 or services 175 may be implemented by one or more smart contracts which may be disparately executed to determine results, such as results based on records stored within a distributed datastore, which may include records like those stored within local databases. A record in a distributed datastore need not be the same as a record stored within a local database to be a like record, for example, a record within a distributed datastore may be a deterministic value or include one or more deterministic values by which one or more other values or a record may be verified. In some embodiments, the authentication server 155 or services 175 may be a computing node, or otherwise include computing node functionality, such as being configured to access data or store data within a directed acyclic graph or process data for publication within a directed acyclic graph. Alternatively, a server 155 or services 175 may interface with a computing node configured to store, access, and process data within a directed acyclic graph.

By way of example, a smart contract may be configured to verify one or more licenses based on one or more records published within a distributed data store. A smart contract may be configured to register and publish a record of user or mobile device registration within a distributed datastore. Similarly, a smart contract may be configured to publish a record of a relying device within a distributed datastore and a policy governing access to the relying device. A smart contract may be configured to issue a session based on verification of one or more records and rules of a policy, such as by issuing a token, which may be associated with a record, such as a record of a registered user or mobile device, and which may be verified as authentic by a device, such as the relying device (e.g., based on publication of token issuance). In turn, another token, or a certificate, or an encrypted or signed version of the token, or other value based on the token or verification thereof may be generated and confer privileges similar to a user certificate as discussed herein.

Example Process for Online Mobile Initiated Authentication

Figure 8:
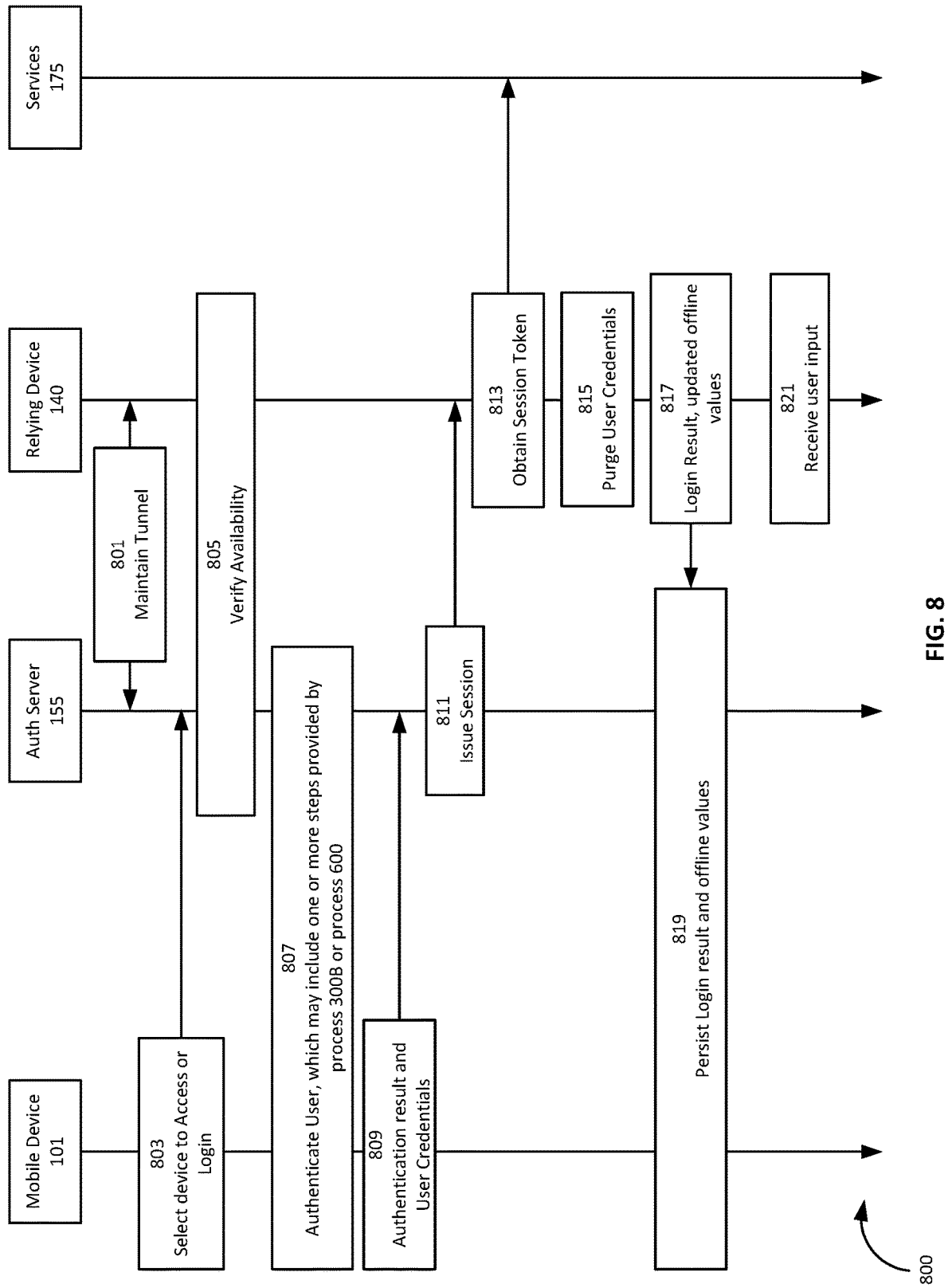
FIG. 8 is a diagram showing an example process for online mobile initiated authentication within example computing environments described in the present application.

FIG. 8 is a diagram showing an example process 800 for online mobile initiated authentication within example computing environments described in the present application. Embodiments of the process 800, which may include one or more of the illustrated steps, may occur within an example computing environment, such as the example computing environment 100A illustrated in FIG. 1A, the example computing environment 100B illustrated in FIG. 1B, or the computing environment 200 illustrated in FIG. 2. In some embodiments, the process of FIG. 8 may occur after a registration process, such as the registration process described with reference to FIG. 7, or other registration process described herein. The process 800 of FIG. 8 illustrates various operations performed by devices of a computing environment, such as one of the computing environments discussed with reference to FIG. 1A, FIG. 1B, or FIG. 2.

In FIG. 8, as shown, a relying device 140 may in a step 801 maintain a tunnel to an authentication server 155, or vice versa. In other words, process 800 may be an online enabled process. In some embodiments, a tunnel may not be maintained, but rather established in association with a verification of relying device 140 availability by the authentication server 155.

In a step 803, a user may elect to login to the relying device 140 on a mobile device 101. For example, the user may navigate a user interface of an authentication application executing on the mobile device 101 and select a relying device with which the mobile device is registered for mobile initiated authentications. In some embodiments, the user may select from a plurality of relying devices to which the user has registered the mobile device in one or more iterations of the process 700 described with respect to FIG. 7. The mobile device may store, such as within the TEE, user credentials corresponding to a user account for logging into the respective relying devices. In some cases, the credential is a token, like a user certificate, which may be signed by a certificate service, like an SSL certificate service, or other certificate or ticketing service. Thus, for example, the certificate may be an active directory SSL certificate. In some embodiments, the authentication application may obtain one or more signals, which may be associated with one or more relying devices. In turn, the authentication application may display a subset of relying device to which the user has registered based on the obtained signals. Example signals may include GPS signals, WiFi signals, or beacon signals indicative of location associated with respective relying devices or presence of a respective relying device within proximity of the user. The user may select 803 a given relying device 140 which the user desires to authenticate to access, e.g., log into under an account of the user. The mobile device 101 may transmit an access request corresponding to the selected relying device 140 to the authentication server 155. The access request may include an identifier corresponding to the relying device which the user desires to access. An example identifier may be a device identifier for the relying device obtained during a registration process. The access request may additionally include identifying information corresponding to the user of the mobile device, or the mobile device, such as an identifier associated with the mobile device or the user. An example identifier may be public key, or other identifier associated with a record of the user or mobile device. In turn, authentication of the user may occur prior to the user physically interacting with the relying device and the relying device 140 may login under the account of the user without the user physically inputting providing user credentials (such as a username, password, or both) for the account on the relying device.

In a step 805, such as in response to receiving an access request corresponding to a given relying device from the mobile device, the authentication server 155 may verify an availability of the selected relying device 140. For example, the authentication server 155 may obtain one or more records based on a received identifier associated with the relying device. The record may include information about a network address, or connection, like a Web Socket tunnel, associated with the relying device by which the authentication server 155 may determine availably of the relying device. In some embodiments, the authentication server 155 may identify a WebSocket tunnel associated with the relying device 140, such as by a network address associated with the relying device. In some cases, the authentication server 155 may determine a status associated with the WebSocket tunnel, such as whether a heartbeat signal has been received from the relying device 140. The heartbeat signal, in some embodiments, may indicate an availability status of the relying device 140, such as whether another user session is ongoing, in which case the authentication server 155 may determine the relying device to be unavailable. If the requested relying device 140 is available, the authentication server 155 may authenticate the user of the mobile device that requested access to the relying device.

User authentication may be performed according to one or more processes discussed herein. In some embodiments, the access request transmitted in step 803 may include authentication information by which the authentication server 155 may deem the user authenticated. For example, the mobile device 101 may receive a policy including one or more rules by which the authentication server 155 verifies an authentication result generated by the mobile device. Thus, the mobile device 101 may generate the authentication result and transmit the result in association with the access request. Alternatively, as illustrated by step 807, the mobile device 101 may receive a request for an authentication result from the authentication server 155 (e.g., after availability of the requested relying device 140 is determined) and the mobile device 101 may generate, such as by processing user provided credentials within a TEE of the mobile device, the authentication result. In some embodiments, the authentication result may include one or more representation of credentials which the user authenticated on with the mobile device 101, such as by providing those credentials to the TEE for verification. For example, the TEE may process credential values corresponding to one or more credentials obtained from the user to determine whether the obtained credential values match previously established credentials for the user within the secure memory of the TEE. The TEE may output a representation of a credential by which the user was deemed authenticated, and the TEE may output signed (e.g., signed by a key maintained within the secure memory) data, which may include the representation of the credential, thus verifying the TEE determined the result. A timestamp or other value may be included in the data, such that the signed data conveys a time at which the result was determined. The mobile device 101 may transmit generated authentication results to the authentication server 155 in step 809 for verification. For example, the authentication server 155 may verify signed data based on corresponding received data and a public key associated with an established record associated with the user or the mobile device.

In accordance with examples like those described above, the mobile device 101 may transmit user credentials in association with the result. The user credentials may be a certificate, or token, like a user certificate issued to the mobile device for accessing the relying device 140. In some embodiments, the authentication result may be, or include, signed data. In some embodiments, the signed data may be, or include, the user credentials. For example, a certificate may be signed within a TEE of the mobile device 101 (e.g., by a private key or signature key stored within a secure memory of the TEE) and transmitted to the authentication server 155, which the authentication server may verify (e.g., using a public key or signature verification key). In some embodiments, a policy may be enforced within the TEE to permit signing or other processing of a user certificate (e.g., release of the user credentials associated with a user account for the relying device). Accordingly, in some embodiments, release of a signed user certificate by the TEE may convey authentication of the user on the mobile device to the authentication server 155. A timestamp including in the singing of the certificate, which may be provided with the user certificate, may convey timeliness of the generation of the signature. The data and signed data may also convey other information, like one or more authentication results like those described above. These and other principle may be utilized in authentication processes, for example, the authentication server 155 may issue a challenge to the mobile device requesting signature over specific data or a value, and a successful response includes signed data incorporating the challenge response.

Examples of other or additional steps which may be performed in association with steps 807 and 809 may include one or more of the steps described with reference to process 300B of FIG. 3B or process 600 of FIG. 6. For example, the mobile device 101 may authenticate a user and process challenges in accordance with techniques described with reference to step 345 in FIG. 3B and provide results of processing in accordance with those techniques to the authentication server 155. In another example, the mobile device 101 may generate requests in accordance with techniques described with reference to step 602 and authenticate a user and process challenges in accordance with techniques described with reference to step 602 in FIG. 6 and provide results of processing in accordance with those techniques to the authentication server 155 or other entity. In the context of the process 800 of FIG. 8, such techniques may be applied to other data, like a user certificate, and signed data corresponding to such data, which may be processed within the TEE of the mobile device in accordance within a policy governing signing and release of such data, and the mobile device may transmit the data to an authentication server 155 or other entity.

As described above, successful authentication of the user on the mobile device 101 may include user authentication within a TEE of the mobile device to release a user certificate corresponding to a user account for logging into the relying device 140. The user cert may be encrypted, or stored within a secure memory of the TEE of the user device such that the CEE cannot access the certificate in unencrypted form. Additionally, singing of the user certificate may be performed with the TEE based on a private key or signature key stored within a secure memory of the TEE which the CEE may not access, and the TEE may not release the private key or signature key. This operation may occur subsequent to authentication of the user, such as by credential values stored within the TEE. Such steps may include active (e.g., specific user inputs, like a PIN, password, or biometric data, like a faceprint or fingerprint) or passive authentication (e.g., obtained biometrics, such as over time, or detection after specific user inputs that the user remains in control of a mobile device) based on policy governing passing of an encrypted version of the user certificate to the authentication server 155. Additionally, the authentication server 155 may verify such information in according with the policy, which may be associated with the relying device 140 the mobile device requests access. The authentication server 155 may access a public key or signature verification key by which received data may be verified. For example, in step 809 the mobile device may send the user certificate to the authentication server 155 based on an authentication result determined on the mobile device, which may be subject to challenge by the authentication server 155 or driven by conformance to policy on the mobile device (which may be verified by the authentication server). The authentication server 155 may verify the information received from the mobile device, such as in accordance with techniques described herein, such as on established representations of user credentials, signature verification of received data, and issue a user session in a step 811 based on results of a verification determination. For example, as described, the authentication server 155 may verify received information based on one or more records, which may include information like representations, public keys or signature keys, and the like, and thus operable to verify data received from a mobile device by signature verification of signed data and agreement of data corresponding to that which was signed with data maintained in the one or more records. The authentication server 155 may additionally verify whether the user is permitted to access the relying device 140, such as by determining whether the user certificate was revoked or based on associations of records (e.g., relying device record with a user record or record of the mobile device) and authenticity thereof.

The issued user session 811 may include communication of information by which the relying device 140 may obtain one or more tokens or tickets for establishing a user session on the relying device 140 (e.g., by login to a user account, and optionally other accounts with other entities, such as for one or more application) or performing other operations. For example, the authentication server 155 may issue a user session by passing a user certificate to the relying device 140. In some embodiments, the authentication server 155 may sign the user certificate, such as in response to verifying the information received from the mobile device. The signature of the authentication server 155 may convey the verification of the issuance of the user session, such as to a service 175. In some embodiments, the relying device 140 may sign the user certificate. Thus, for example, presentation of the certificate to the service 175 may convey the provenance, like a chain of tile, of the certificate and the entities which handled it, e.g., by nested signatures, and which the service 175 may verify based on public keys or signatures keys maintained for the respective entities. In either instance, the relying device 140 may obtain 813 a token, or ticket, by transmitting the user certificate (which may be signed by one or more entities) in association with a request for a token or ticket to the service 175. The service 175 may authenticate the relying device 140, such as by issuing one or more challenges to the relying device 140, which may be signature challenges. The relying device 140 may sign data, such as the token, and other data to convey temporality of a request (e.g., like a timestamp) and possession of a private key by which the data was signed. The relying device 140 may sign data in response to challenge, like a unique challenge issues by a service 175 or other entity, thus conveying possession of a private key by which the data was signed. For example, the private key by which the data is signed may be a private key of a public-private key pair and the public key of the pair may be distributed such that other entities may verify signed data as being signed by the private key of the pair. The private key may be a private key retained on the relying device 140, such as a private key generated during a registration process (e.g., mobile device registration to the relying device 140) or otherwise stored on the relying device 140. For example, the private key may be generated and stored on the relying device 140 during a mobile device registration process and the corresponding public key may be exchanged with one or more servers or services for signature verification. The private key may be utilized by the relying device 140 to sign a variety of data like that discussed above and elsewhere herein.

The relying device 140 provides responses to one or more challenges to the service 175 to receive a token or ticket. In some embodiments, the service 175 in an active directory service which issues a ticket for a user account associated with the user certificate, which the relying device 140 may utilized to log into the user account, and may convey credentials associated with one or more applications. For example, one or more other application, such as active directory aware applications, based on the received ticket, may obtain other tickets from the service or other services, such as to access online resources under the same or another account of the user (e.g., one or more federated accounts or via single sign-on permissions) provided internally (e.g., by a party managing the relying device) or externally (e.g., other relying parties, like $3^{rd}$ parties).

After obtaining a user session token or ticket in step 813 the relying device 140, in some embodiments, may purge 815 the user credentials received from the authentication server 155. In some embodiments, such purging 815 may not be required in terms of providing robust security, but rather as a housekeeping measure. For example, signing of a user certificate may convey a timeliness, such as by a including a timestamp in a signature, to the service 175 for obtaining a session token or ticket, and the server 175 may tie a user session token or ticket to a given instance of a signed certificate such that it may not be presented multiple times to the service 175 to obtain other tickets.

In step 817 the relying device 140 may return a result of successfully obtaining a user token or ticket, and thus a result of a login attempt to an account of the user by the relying device. The relying device 140 may return the result, such as in a response, to the authentication server 155. Additionally, the relying device 140 may generate one or more updated offline values, such as to refresh offline values provided to a mobile device of the user. The authentication server 155 may receive the response and refreshed offline values from the relying device 140 and persist 819 the information to the mobile device, such as over a secure communication session, which may be a session utilized in step 803, 807, or 809.

In some embodiments, the relying device 140 may wait for user input prior to altering a display or performing other operation. Thus, for example, the relying device 140 may not exhibit or perform an action prior to a user input (or action), such as for a configurable amount of time, such as to permit the user the convenience of authenticating via the mobile device 101 without indicating that a user session was initiate with the relying device 140. In some embodiments, the received user input 821 may be a key press, or other interaction with an interface. For example, the user may press a key on a keypad, keyboard, or touch a touchscreen associated with the relying device 140 to access the relying device 140 (which may otherwise not display or indicate that user access is permitted prior to receiving the input). In some embodiments, the relying device 140 may receive an input via wireless signal, such as from the mobile device 101 of the user, which the mobile device 101 may emit subsequent to receiving the result and offline values in step 819. In some embodiments, user input may be a combination or sequence of inputs, like Control-Alt-Delete, Esc-Esc-Esc, Konami Code, etc., or a specific input, like Esc or Del or 1 or A or a symbol, etc. In some embodiments, the combination or sequence of inputs may be specified by the user of the mobile device 101, such as during a registration process or otherwise associated with a record of the mobile device or the user. In some embodiments, the combination or sequence of inputs may be determined by the relying device 140 and persisted to the mobile device of the user with the offline values or other result. In some embodiments, the mobile device 101 may wireless emit a signal indicative of the combination of sequent of inputs or a specific input, such as based on the received information. In various example embodiments, the combination or sequence of inputs (like a specific input) may be reduced in complexity over a username or password requirement (or combination thereof) to which user access may otherwise require omit a requirement for a multi-factor authentication (e.g., such as an out-of-band authentication process in response to access attempt) as the user already authenticated via the mobile device.

In some embodiments, the relying device 140 operates within a VDI environment. Thus, for example, rather than providing access to a local OS, a virtual machine executes a desktop image and the relying device 140 receives data (e.g., the virtualized desktop) for display over a network session with the VM. In such example embodiments, steps 803 and 811, for example, may include one or more additional operations and the authentication server 155 may provide authentication to the network enabled VDI session between the relying device 140 and a VM executing a desktop image. As noted previously, a virtualized desktop may be persistent or not. In a persistent configuration, a desktop images which a user accesses retains (e.g., includes) user configured or stored data during a session, like installed applications, files, settings, etc. and in a non-persistent configuration an assigned desktop image may be clean-slated on logout or selected from a pool of desktop images and user configured or stored data during a session is not saved or periodically wiped.

In an example VDI environment, a user may utilize a mobile device 101 to scan a code, like an optical code, like a QR code, or otherwise obtain a code as described herein that corresponds to a VDI or workstation session. The mobile device 101 may parse the code, which may indicate information about a relying party 145 which hosts one or more virtual machines within the VDI environment. For example, the code may indicate server information and a domain, such as for the relying party 145 or a relying party server. The code may also indicate information corresponding to a public key unique to the relying device 140, and other identifying information for requesting authentication to login. In some embodiments, information may be provided for the authentication server 155, rather than a relying party 145 server. For ease of explanation, an example is provided with respect to the illustrated authentication server 155 in reference to FIG. 8. After obtaining information from a code, which may be a code associated with a relying device 140 or a virtual desktop, or virtualized application, which may be displayed by the relying device, the mobile device 101 parses the code to obtain identifying information corresponding to a server, like the authentication server 155, and identifying information corresponding to the asset which the user desires to access (e.g., a virtualized desktop, a virtualized application, or the relying device 140, which may display a login screen to access a virtualized desktop, application, or one or more thereof). Based on the server information, such as in step 803, the mobile device 101 may transmit a request to the server, like the authentication server 155. For example, the mobile device 101 may transmit the identifying information for the asset which the user is attempting to access and request a policy governing access to the asset. In turn, the authentication server 155 may return an authentication policy for that asset. In some cases, the authentication server 155 may obtain the policy from a relying party 145, or, as noted above, the identifying information for a server may be that of the relying party 145 from which the mobile device 101 may request the policy.

Upon receiving the policy, the mobile device 101 may authenticate in accordance with the policy, such as with the authentication server 155 as indicated in step 807. Additionally, the mobile device 101 may transmit an encrypted user certificate, such as encrypted with the public key obtained via the code. Thus, for example, the asset to which the public key corresponds, or which is hosting the asset, and which maintains a corresponding private key, may decrypt the user certificate. In turn, the user certificate may be presented to one or more services 175, and a session to a virtualized desktop or application may be issued to the relying device 140 presenting the user certificate. A server, like a relying party server 145, hosting one or more virtual machines, may select a desktop image corresponding to the user certificate (e.g., in a persistent configuration) or select a desktop image from a pool (e.g., subject to verification of the user certificate in either instance). In the example of a virtualized desktop, the public key may correspond a given relying device 140 and the private key is maintained by the relying device 140

In some embodiments, the authentication server 155 or services 175 may utilize one or more local databases or networked databases, such as one or more repositories (e.g., like an authentication repository 165). In some embodiments, the authentication server 155 or services 175 may each, or individually, utilize a combination of databases. For example, many entities may store some data locally or via networked datastore and some data within a distributed datastore, like a directed acyclic graph of a decentralized computing platform, and different entities may utilize different decentralized computing platforms, and in either instance data may be stored according to a consensus process whereby a plurality of computing nodes agree on authoritativeness of records and data structure of the datastore and verification according to those authoritative records within the data structure.

In some embodiments, some operations may be implemented by a smart contract, iterations of which may be called by different ones of the devices, servers or services. Iterations of smart contracts may be verified as authentic (e.g., via signature verification or, more generally, public-private key cryptography infrastructure) to disparately execute processes comprising same operations according to the smart contract. For example, one or more of the operations performed by the authentication server 155 or services 175 may be implemented by one or more smart contracts which may be disparately executed to determine results, such as results based on records stored within a distributed datastore, which may include records like those stored within local databases. A record in a distributed datastore need not be the same as a record stored within a local database to be a like record, for example, a record within a distributed datastore may be a deterministic value or include one or more deterministic values by which one or more other values or a record may be verified. In some embodiments, the authentication server 155 or services 175 may be a computing node, or otherwise include computing node functionality, such as being configured to access data or store data within a directed acyclic graph or process data for publication within a directed acyclic graph. Alternatively, a server 155 or services 175 may interface with a computing node configured to store, access, and process data within a directed acyclic graph.

By way of example, a smart contract may be configured to verify user permission to access a given relying device within a distributed data store. A smart contract may be configured to verify availably of a given relying device. A smart contract may be configured to verify authentication information for a user provided by a mobile device, such as based on one or more records stored within a distributed data store and publish a record of the verification to a distributed datastore. A smart contract may be configured to verify the authenticity of a record, which may indicate whether a device presenting a given credential is permitted access to a relying device. A relying device may similarly verify one or more records or request verification of one or more records based on information published within a distributed data store or request verification of information by a smart contract, such as in response to receiving an access request or information corresponding to a user session for a smart contract. A smart contract may be configured to sign results determined by the smart contract, and publication of the results within a distributed data store, such as in a record, the contents of which may be agreed upon by a consensus protocol, and an subsequently verified to confer authenticity. Thus, for example, a smart contract may be configured to issue a session based on verification of one or more records and rules of a policy, and may pass signed user credentials to a given relying device, which may be verified as authentic by a device, such as the relying device (e.g., based on publication of token issuance). In turn, the relying device may utilize the signed user credentials, like a certificate (which may also be signed by a smart contract), to obtain another token, or a certificate, such a for a user session (e.g., like in step 813), by which user (e.g., of the mobile device 101) access to the relying device may be permitted.

Example Process for Offline or Partial Offline Mobile Initiated Authentication

Figure 9A:
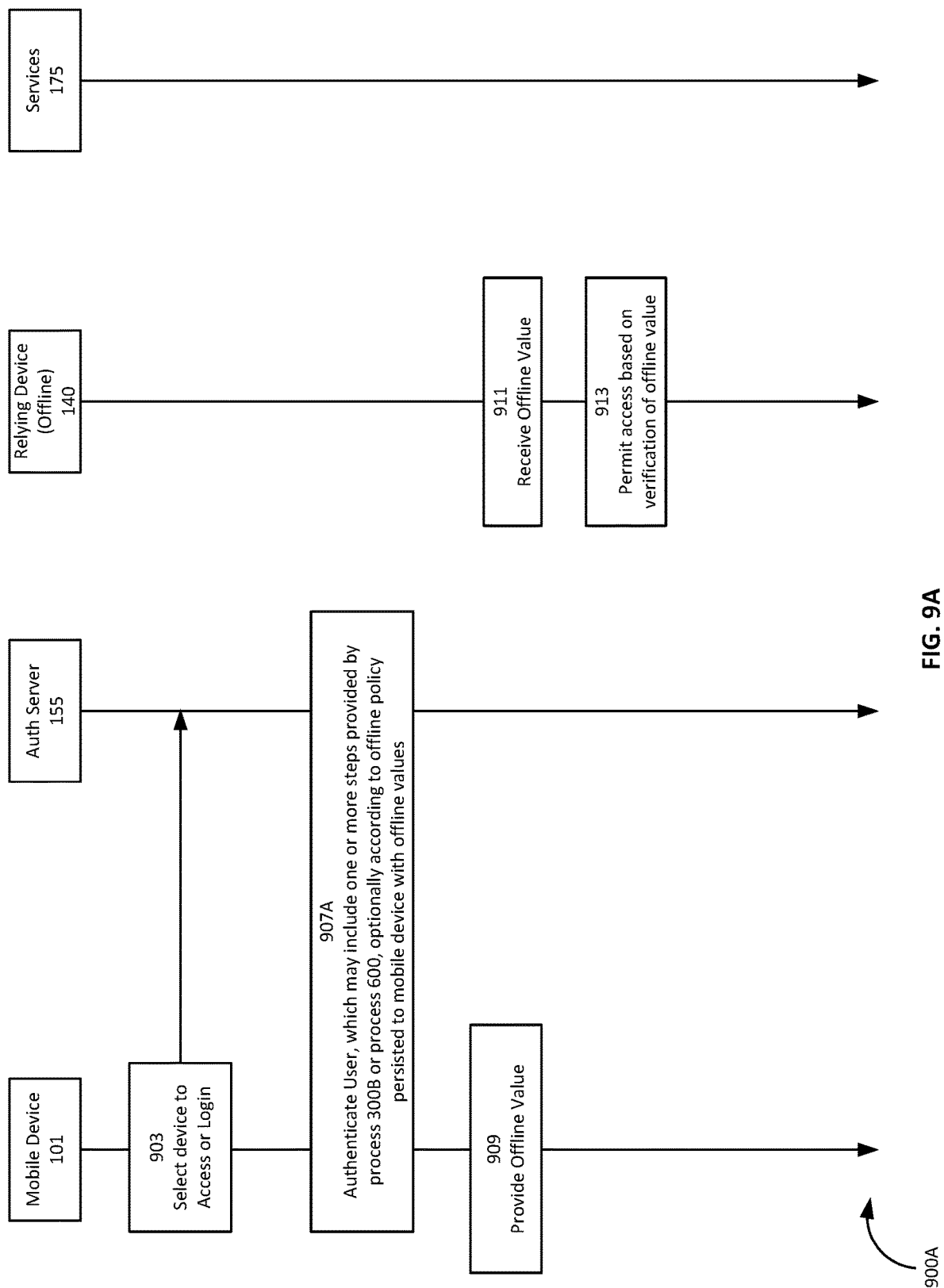
FIGS. 9A and 9B are diagrams showing an example process for offline and partial offline mobile initiated logins within example computing environments described in the present application.

FIG. 9A is a diagram showing an example process for partial offline mobile initiated authentication within example computing environments described in the present application. Embodiments of the process 900A, which may include one or more of the illustrated steps, may occur within an example computing environment, such as the example computing environment 100A illustrated in FIG. 1A, the example computing environment 100B illustrated in FIG. 1B, or the computing environment 200 illustrated in FIG. 2. In some embodiments, the process of FIG. 9A may occur after a registration process, such as the registration process described with reference to FIG. 7, or other registration process described herein, or after a mobile device receives offline values.

In FIG. 9A, as shown, a tunnel between a relying device 140 and an authentication server 155 may not be maintained, such as due to the relying device 140 not possessing a network connection. However, the authentication server 155 may be available on a network to the mobile device 101. In other words, the process of FIG. 9A may be partially offline process, such as by the authentication server 155 verifying an authentication result, and returning that result to the mobile device 101 such that the TEE of the mobile device may provide an offline value or other data described below by which the user may access the relying device 140.

In a step 903, a user may elect to login to the relying device 140 on a mobile device 101. Examples of step 903 may occur as described with reference to step 803 in FIG. 8. For example, the user may navigate a user interface of an authentication application executing on the mobile device 101 and select a relying device with which the mobile device is registered for mobile initiated authentications. In turn, the mobile device 101 may transmit an access request corresponding to the selected relying device 140 to the authentication server 155.

In some cases, the authentication server 155 may be available to the mobile device 101 but not to the relying device 140. Accordingly, in some cases, mobile device and authentication server 155 communicate some information as described in FIG. 8, but without relying device 140 participation. In some cases, this may be governed by a policy. In some cases, the authentication server 155 may similarly be unavailable to the mobile device 101, and authentication may be governed by offline policy (e.g., as described in FIG. 9B). Thus, for example, step 907A may include operations similar to those described with reference to steps 807 or 809 of FIG. 8.

In some embodiments, in a step 903, the authentication server 155 may transmit information to the mobile device based on the inability of the authentication server to communicate with the relying device 140. For example, the authentication server 155 may return user credentials to the user (optionally signed), a notification, or other response indicative of the inability to communicate with the relying device 140. In some embodiments, the receipt of such a response from the authentication server 155 by the mobile device 101 cause an authentication application executing on the mobile device to obtain an offline value corresponding to the selected relying device 140. As previously described, the TEE may process information by which the offline value may be released, such as according to a policy, such an offline policy.

In some embodiments, such as for a partial offline authentication process, the TEE may store a public key associated with the authentication server 155 by which the TEE may verify a response from the authentication server that a connection to the relying device 140 is unavailable (e.g., to pass user credentials to the relying device that corresponding to a user account of the user). The offline policy may permit use of an offline value based on the TEE verifying a response from the authentication server. For example, the policy may specify one or more rules by which the response from the authentication server is verified, such as by a public key associated with the authentication server, whether the response is received within a threshold period of time from a request (e.g., based on a timestamp, which may be includes in signed data returned by the authentication server), or other factors.

In a step 909, in response to the verification, based on compliance with the one or more rules of the policy, the TEE may provide (e.g., to the CEE) an offline value for display or transmission. For example, the TEE may decrypt, access, or otherwise return a result to the CEE indicative of the offline value. For example, the TEE may decrypt, access, or otherwise return a result to the CEE indicative of the offline value (which could be or include the offline value itself, e.g., in plaintext form). In some cases, the TEE may receive data corresponding to an offline value or set of offline values in encrypted form from the CEE, such as where the authentication application stores data corresponding to one or more offline values in encrypted form within the CEE, but for which the TEE (and not the CEE) maintains a key by which data in the encrypted form can be decrypted. In turn, the TEE may decrypt received data corresponding to an offline value, and may return a result to the CEE indicative of the offline value. The authentication application may display a returned offline value which the user may input to an interface of the relying device, or the authentication application may cause the mobile device to transmit the value, such as by a beacon signal. Alternatively, the TEE may display or transmit an offline value after decrypting, accessing, or otherwise processing data to obtain the offline value or data indicative of the offline value. For example, the TEE may utilize a secure wireless interface, like an NFC wireless interface, to transmit the offline value or data indicative of the offline value to the relying device (e.g., by a corresponding interface).

In some embodiments, a response from the authentication server 155 includes user credentials signed by the authenticate server to convey that the server verified a result, such an authentication result of the user on the mobile device. In some embodiments, the signed user credentials may be transmitted to the relying device 101 by the mobile device, such as over a near-field wireless connection, which the relying device 140 may utilize with one or more services 175 if a connection to one or more of those services is available or becomes available during a user session. In some embodiments where an authentication server 155 is available to perform such operations, the signed user credentials received from the authentication server may be an offline value (e.g., as a relying device 140 may store a public key by which the signing of the user credentials may be verified). Such operation may occur over, or in addition to, utilization of an offline value for user access to the relying device in some embodiments. For example, data signed by the authentication server and an offline value may be provided to the relying device 140.

In step 911, the relying device 140 may receive an offline value or other data via one or more interfaces. For example, the relying device 140 may receive input from the user (e.g., via keyboard, keypad, touchscreen, etc.) or from the mobile device (e.g., via a wireless interface). In step 913, the relying device 140 may verify a received offline value, such as based on a correspondence with a stored value, or value of a register, or in accordance with an algorithm by which the offline value was generated. The relying device 140 may also verify a received offline value or user credentials, which are signed, by signature verification based on a one or more stored public keys corresponding to the respective entities which signed the data. The relying device 140 may verify a timeliness of received signed data, such as by a timestamp, in accordance with a signature verification algorithm. In turn, in response to verifying received data, such as an offline value, the relying device may permit user access in step 913.

Figure 9B:
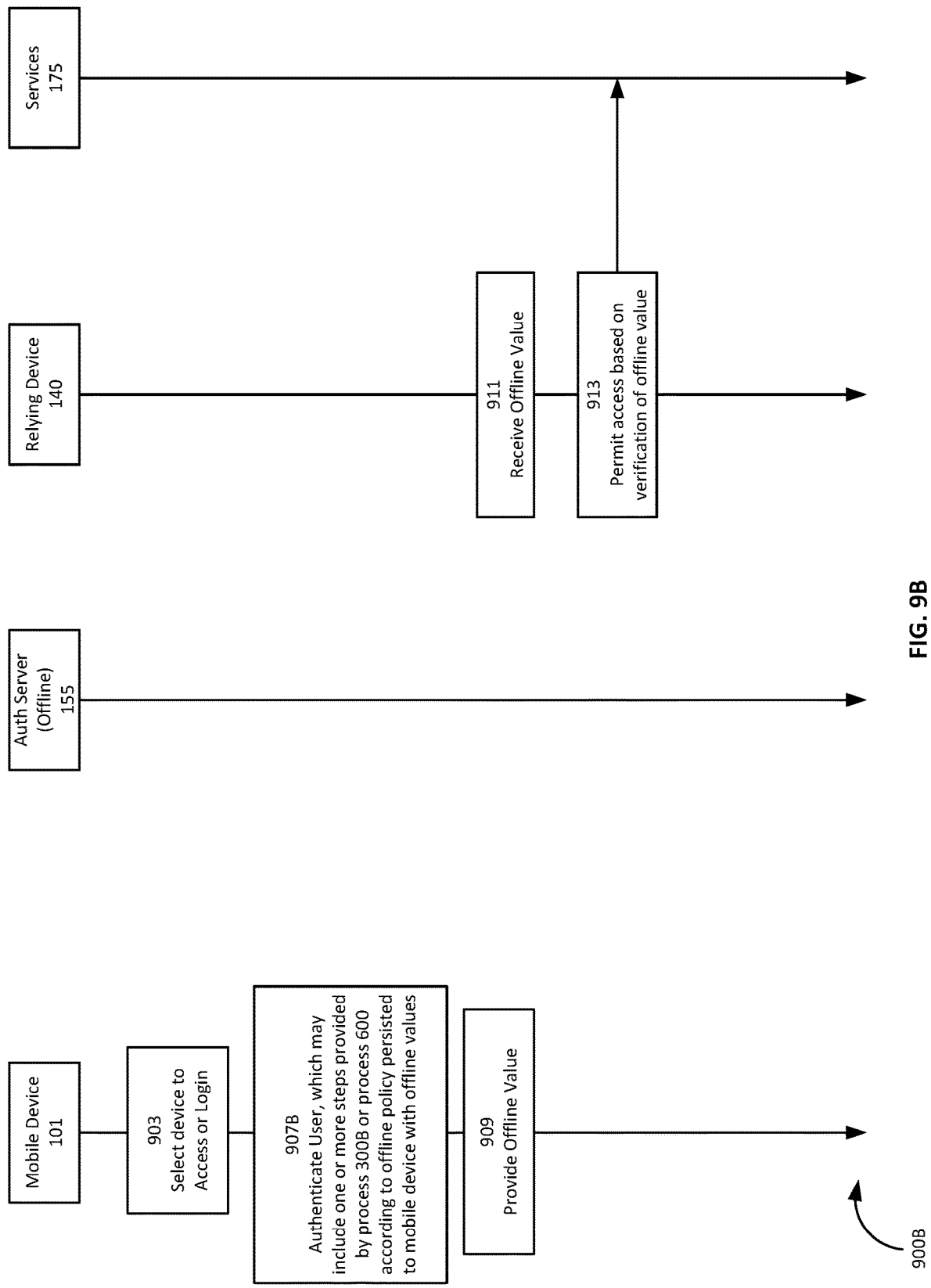

FIG. 9B is a diagram showing an example process for offline mobile initiated authentication within example computing environments described in the present application. Embodiments of the process 900B, which may include one or more of the illustrated steps, may occur within an example computing environment, such as the example computing environment 100A illustrated in FIG. 1A, the example computing environment 100B illustrated in FIG. 1B, or the computing environment 200 illustrated in FIG. 2. In some embodiments, the process of FIG. 9B may occur after a registration process, such as the registration process described with reference to FIG. 7, or other registration process described herein, or after a mobile device receives offline values.

In FIG. 9B, as shown, a tunnel between a relying device 140 and an authentication server 155 may not be maintained, such as due to the authentication server 155 not possessing a network connection. Alternatively, the mobile device 101 may be unable to access the authentication server 155, such as by not being able to obtain a network connection (in which case a tunnel between the authentication server and the relying device may be maintained but bypassed in an offline authentication process). In other words, the process of FIG. 9B may be an offline process, such as by the user authenticating with the mobile device 101 such that the TEE of the mobile device may provide an offline value or other data described below by which the user may access the relying device 140. Thus, in some cases, the authentication server 155 may be unavailable to the mobile device 101, and authentication may be governed by offline policy on the mobile device. Example steps described below may also be used instead of a partial offline process in some embodiments, or other instances when one or more participating devices lack a network connection or a network connection to another participant is unavailable. Thus, for example, step 907A may include at least some operations similar to those described with reference to steps 807 or 809 of FIG. 8, such as those user authentication operations which are performed within the TEE but in accordance with an offline policy and without communication with the authentication server 155.

As described above, an offline policy may provide for use of an offline value to login to a relying device 140 (which may communicate the offline values for persistence with an offline policy on a mobile device when registered and when performing an online enabled mobile initiated login). Offline values may be a PIN, numerical or alphanumeric, or other value which may be input to the relying device by the user or obtained by the relying device from the mobile device (e.g., value may be provided by NFC, Bluetooth beacon, optical code, or other communication means). A given offline value may be single use, such that is cannot be captured for reuse, and a limited number of offline values may be persisted to a user device. For example, after registration or online login, the relying device may generate 1, 5, 10, 15, 25 etc. offline values (e.g., according to a policy) which may be persisted to the mobile device.

In a step 903, a user may elect to login to the relying device 140 on a mobile device 101. Examples of step 903 may occur as described with reference to step 803 in FIG. 8. For example, the user may navigate a user interface of an authentication application executing on the mobile device 101 and select a relying device with which the mobile device is registered for mobile initiated authentications. However, unlike in step 803, the mobile device 101 may be unable to transmit an access request corresponding to the selected relying device 140 to the authentication server 155. In some embodiments, the authentication application prompts the user to authenticate based on an offline policy to access the selected relying device.

Various policy measures may be implemented on the mobile device to govern operations in step 907B by which the user authenticates with the mobile device without involving the authentication server 155. Examples of which are discussed previously, such as determining a status of one or more wireless interfaces of the mobile device such that a user may not obtain an offline value with one or more interfaces manually disabled. Thus, for example, the policy may specify rules by which one or more wireless interfaces of the mobile device are enabled for obtaining signals, such as beacons and the like, or a connection to a network. In some embodiments, a signal strength associated with one or more wireless interfaces may be determined, and a log associated with one or more wireless interfaces may be accessed and analysed to determine whether one or more entries indicate the interface was recently disabled (e.g., and has not yet obtained a signal) or other information indicative of whether a user (or process) is attempting to spoof the unavailability of a network connection, the authentication server, or a signal associated with a relying device. In some embodiments, a result of processing the policy in accordance with rules of the policy may be determined within the TEE, and the TEE may provide an offline value (e.g., as previous described) subject to verification of user authentication within the TEE. For example, based on the offline policy, the TEE (or the authentication application may request that the TEE) prompt the user to authenticate based on previously established credentials within the TEE of the mobile device. In response to successful authentication of the user on the mobile device, such as in accordance with rules of the offline policy, the TEE may provide (e.g., on a display of the mobile device, transmit to the relying device, or release to the CEE which may cause display or transmission to the relying device) an offline value, data indicative of the offline value, or other signed result in step 909. In some embodiments, user credentials, like a user certificate, signed by the TEE, along with an indication of verification via offline policy, may be provided to the relying device 140.

Thus, for example, in a step 909, in response to the verification, based on compliance with the one or more rules of the policy, the TEE may provide (e.g., to the CEE) an offline value for display or transmission. For example, the TEE may decrypt, access, or otherwise return a result to the CEE indicative of the offline value (which could be or include the offline value itself, e.g., in plaintext form). For example, the TEE may access data corresponding to an offline value stored within the secure memory, decrypt the data, and may return a result to the CEE indicative of the offline value. In some cases, the TEE may receive data corresponding to an offline value or set of offline values in encrypted form from the CEE, such as where the authentication application stores data corresponding to one or more offline values in encrypted form within the CEE, but for which the TEE (and not the CEE) maintains a key by which data in the encrypted form can be decrypted. In turn, the TEE may decrypt received data corresponding to an offline value, and may return a result to the CEE indicative of the offline value. The authentication application may display a returned offline value which the user may input to an interface of the relying device, or the authentication application may cause the mobile device to transmit the value, such as by a beacon signal. Alternatively, the TEE may display or transmit an offline value after decrypting, accessing, or otherwise processing data to obtain the offline value or data indicative of the offline value. For example, the TEE may utilize a secure wireless interface, like an NFC wireless interface, to transmit the offline value or data indicative of the offline value to the relying device (e.g., by a corresponding interface).

In step 911, the relying device 140 may receive an offline value or other data via one or more interfaces. For example, the relying device 140 may receive input from the user (e.g., via keyboard, keypad, touchscreen, etc.) or from the mobile device (e.g., via a wireless interface). In step 913, the relying device 140 may verify a received offline value, such as based on a correspondence with a stored value, or value of a register, or in accordance with an algorithm by which the offline value was generated. The relying device 140 may also verify a received offline value or user credentials, which are signed, by signature verification based on a one or more stored public keys corresponding to the respective entities which signed the data. The relying device 140 may verify a timeliness of received signed data, such as by a timestamp, in accordance with a signature verification algorithm. In turn, in response to verifying received data, such as an offline value, the relying device may permit user access in step 913. In some embodiments, the relying device 140 may access one or more service 175 (e.g., if available) based on received user credentials (e.g., a signed certificate) from the mobile device.

Mobile Initiated Authentication to a Web-Based Service Provider

Figure 10:
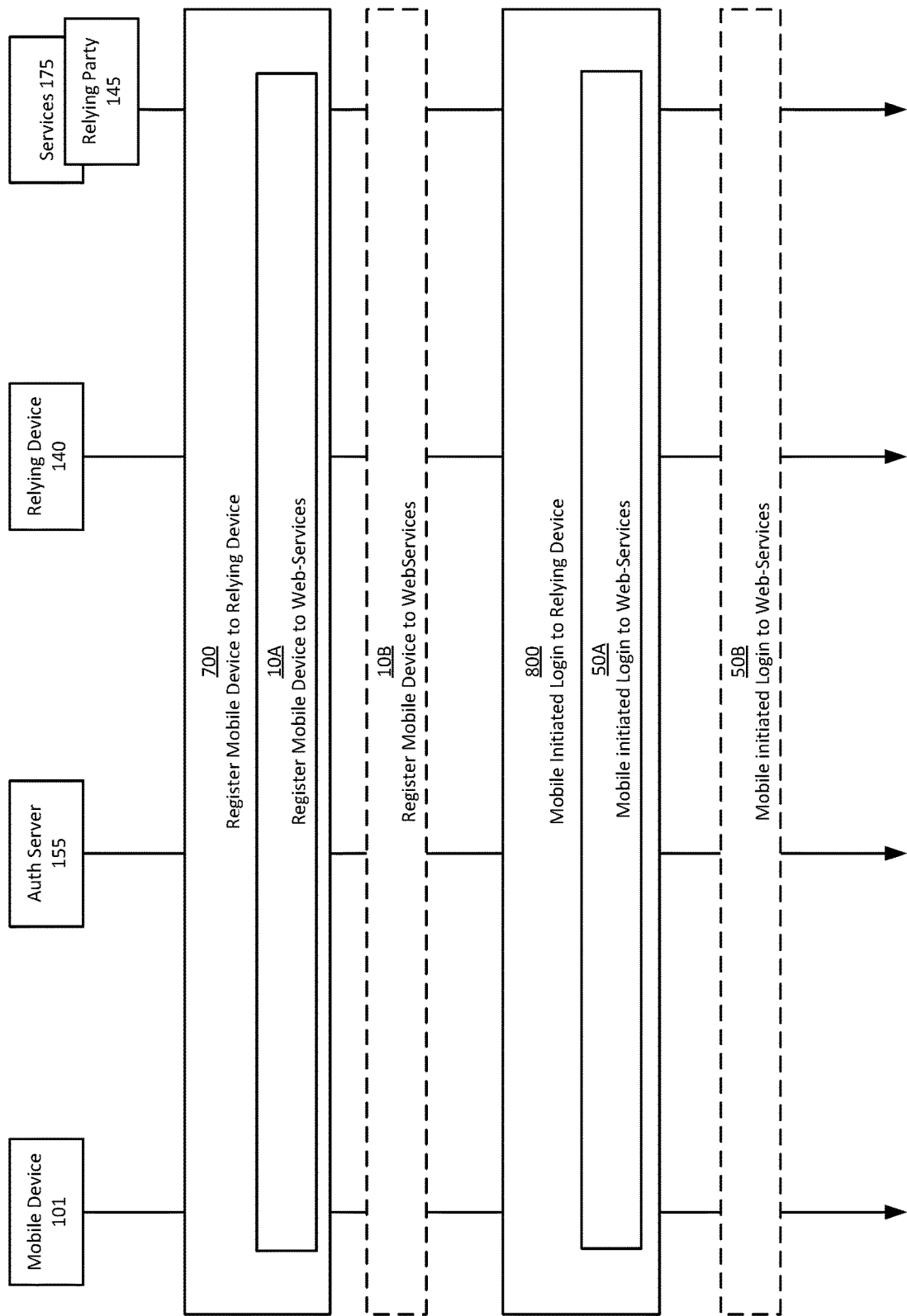
FIGS. 10 and 11A and 11B are diagrams showing example processes for mobile initiated authentication to a web-service within example computing environments described in the present application.

FIG. 10 is diagram showing example diagram for mobile initiated authentications within example computing environments described in the present application. FIG. 10 illustrates contexts within which mobile initiated authentications to web-services may be implemented within the context of mobile initiated authentications to relying devices. Embodiments of the processes illustrated in FIG. 10, which may include one or more of the corresponding processes, may occur within an example computing environment, such as the example computing environment 100A illustrated in FIG. 1A, the example computing environment 100B illustrated in FIG. 1B, or the computing environment 200 illustrated in FIG. 2. The processes shown in FIG. 10 each may include various operations performed by devices of a computing environment, such as one of the computing environments discussed with reference to FIG. 1A, FIG. 1B, or FIG. 2, and each process is described in more detail herein. FIG. 10 serves to illustrate the different processes with the context of at least some example uses as described below.

An example mobile device 101 is shown. Examples of a mobile device 101 may include an application like an authentication application 120, 220 or relying party application 225, or other native application 125 configured to perform at least some of the disclosed operations, according to at least some embodiments described herein. In addition, the mobile device 101 may include a trusted execution environment operable to collect, store, or process at least some of the data described below, according to at least some embodiments described herein.

An example authentication server 155 is shown. Examples of an authentication server 155 may include various services and application programming interfaces by which authentication information and other data may be communicated between the authentication server and other entities. Additionally, the authentication server 155 may be configured to perform at least some of the disclosed operations, according to at least some embodiments described herein. An example services 175 is also shown. In some embodiments, the authentication server 155 may include one or more services, such as authentication services, which may include services 175. In some embodiments, the authentication server 155 may include one or more services 175, but not others. For example, services 175 may include services external to the authentication server 155, such as services provided by or relied upon in some cases by various relying parties 145. The authentication server 155 may provide a relying device with authenticators by which the relying device 140 may obtain access or authenticate to other services 175 or relying parties 145. Those authenticators may be received from a mobile device or based on authenticators received from a mobile device of the user (e.g., in response to the user authenticating to the mobile device). Broadly, such a collection of relying parties 145 and services 175 may be referred to as web-services which a relying device 140 may utilize (though some or all may also be utilized by the authentication server 155 in some embodiments). In various embodiments, use of services may be comingled, for example, authentication server 155 may provide a first service and services 175 may provide one or more other second services.

An authentication server 155, as described herein, may be implemented in a variety of ways and optionally by different parties. For example, the authentication server 155 may be implemented by a $3^{rd}$ party authentication service which provides authentication services to various parties managing relying devices, by a party managing relying devices (such as to manage user access to relying devices and other resources), or by other parties managing various other resources, like online resources, which relying devices (that may be operated by other parties) or users may authenticate with to access. In some embodiments, the authentication server 155 may be permissioned to determine authentication results on which one or more relying parties 145 rely, or which are accepted by one or more other services 175 external to the authentication server. In various embodiments, an authentication result may confer one or more privileges, such as user access to a relying device, which may extend other privileges to the user, such as user access to one or more resources via the relying device, either natively or via extension (e.g., obtaining permissions based on the authentication result which may include forwarding of the authentication result or other credentials in response to the authentication result).

In some cases, the authentication server 155 may determine a first authentication result to extend user access to a relying device, and may determine one or more second authentications results to extend to the relying device access to one or more web-services of a relying party 145 or services 175. For example, services 175 may include services external to the authentication server 155, such as services provided by or relied upon in some cases by various relying parties 145. In some cases, the authentication server 155 may provide a relying device authenticators by which the relying device 140 may obtain access or authenticate to other services 175 or relying parties 145. Broadly, such a collection of relying parties 145 and services 175 may be referred to as web-services which a relying device 140 may utilize (though some or all may also be utilized by the authentication server 155 in some embodiments). In various embodiments, use of services may be comingled, for example, authentication server 155 may provide a first service and services 175 may provide one or more other second services.

Example web-services like relying parties 145 and services 175 are shown. In some cases, the authentication server 155 may be an identity provider (e.g., as a service provided by the authentication server) trusted by one or more (e.g., other, $3^{rd}$ party) web-services. In other words, one or more services 175 external to the authentication server 155 and other relying parties 145 may provide access to entities, like relying devices 140, based on authentication results determined by the authentication server. For example, one or more services 175 or relying parties 145 may accept an authenticator, like a token or ticket indicative of an authentication result determined by the authentication server 155, verify the token or ticket, and provide access to web-services responsive to the verification result. For example, a mobile device 101 may authenticate with the authentication server 155 for conferring access to one or more web-services to a relying device 140, the authentication server 155 may pass an authenticator or other information indicative of authentication results to the relying device 140 in response to a successful authentication, and the relying device 140 may present the information to the corresponding web-services provider (e.g., a service 175 or relying party 145) to access the web-services.

An example relying device 140 is shown. Examples of a relying device 140 may include a workstation which one or more users may access, such as to access one or more resources the workstation is configured to or permitted to access for authenticated users. Thus, for example, the relying device 140 may be a client-type device (e.g., like a client device 135), and the relying device may be configured to access web-services like one or more online resources provided by a relying party 145 or other services 175. Alternatively, the relying device 140 may be a controller or communicatively coupled to a controller which governs physical user access to areas or functions (e.g., valves or machinery or panels) via electrical signals. A relying device 140 may be associated with a relying party, an example of which may include an employer issued workstation where the online resources may include one or more internal resources of the employer. For example, the relying device 140 may be a device of a relying party, such as within a corporate environment. The disclosure, however, is not so limited. Other example relying parties 145 as described herein may provide $3^{rd}$ party services (e.g., 3rd party online resources) to the employer which may be utilized by a relying device 140 and example services 175 may be utilized by the relying devices 140, which employees may be permitted to access, such as via the relying device 140 implemented as an employer issued workstation (or other device which relies on or is permitted to access the $3^{rd}$ party services). Access to some of the aforementioned web-services may be conferred to a relying device 140 as the result of a mobile initiated authentication to one or more web-services, such as in lieu of a user manually entering and submitting corresponding credentials via the relying device to a respective web-service (e.g., a given relying party or service). In some cases, one or more resources may be locally stored and executed by the relying device 140, like an application 110, but which may implement one or more DRM controls to permit user access, such as by online-DRM checks to a web-service.

Although not shown, examples processes 700 or 10B of FIG. 7 may begin with the obtaining of an authentication application on the mobile device 101. Examples of obtaining the authentication application on the mobile device may include a preloading of the authentication application on the mobile device 101 or downloading of the authentication application to the mobile device from an application repository. The mobile device 101 may execute the authentication application, such as by loading the authentication application in a memory of the mobile device and executing the authentication application by a processor of the mobile device. In some embodiments, a memory and a processor of the mobile device 101 may be configured for the execution of applications within a client execution environment (CEE), which may be isolated from a trusted execution environment (TEE) of the mobile device. The TEE may include a secure memory and co-processor not accessible by applications or processes executing within the CEE. For example, an application executing within the CEE may be required to securely communicate with an interface of the TEE to request data from and request processing of data within the TEE, and the interface may respond to various requests based on verification of certain criteria.

Accordingly, an application (or other process) within the CEE may be prevented from accessing the TEE other than by communications over a secure session via the interface, and the TEE may restrict which values may be returned in a response. For example, actual user credential values may not be divulged but rather a representation of credential, such as cryptographic representation, like a cryptographic hash of a credential or encrypted credential (via either symmetric or asymmetric encryption protocol) indicative of the credential may be provided in a response. Similarly, an authentication result on a credential may be provided in a similar fashion, such as by returning a representation of the credential on which the user authenticated and a signed result (or other data, such as a signature of the representation by which the user authenticated) indicative of the authentication result. In some embodiments, the authentication application is configured to interface with the TEE of the mobile device 101, such as via an application programming interface (API) configured to exchange data between the CEE and the TEE. The exchange of data via the API may occur by way of one or more requests and responses, each of which may contain data. In some embodiments, to increase security of communications between the TEE and the authentication application within the CEE, the authentication application is configured to establish a secure session, e.g., a secure channel of communications, with the TEE. The secure session may be considered secure by way of encryption of data communicated between the authentication application 120 and the TEE.

In some embodiments, process 700 (e.g., as described in more detail with reference to FIG. 7) registers a mobile device 101 to a relying device 140 for mobile initiated authentications of the user to access the relying device. In some cases, a process 10A (e.g., as described in more detail with reference to FIG. 11A) registers a mobile device 101 to one or more web-services for mobile initiated authentications of the user to access those web-services by the relying device. In some cases, process 10A may be performed on a per-relying device 140 basis. In other words, when a mobile device 101 of the user is registered to a relying device 140 as described in the context of process 700, the user may subsequently, or as a component of the process 700, register the mobile device to one or more web-services the user desires to access with the relying device 140. In some embodiments, credentials for those web-services to which the mobile device 101 has registered by process 10A are stored in association with other data corresponding to the relying device 140 generated during process 700. In some cases, those credentials may be specific to authentications via the mobile device 101 to confer access to the web-services that relying device 140 may access.

Additionally, as shown, a process 10B (e.g., as described in more detail with reference to FIG. 11A) may register a mobile device 101 to one or more web-services for mobile initiated authentications of the user to access those web-services by a relying device 140. In some cases, the relying device 140 may be a relying device to which the mobile device 101 has registered to under process 700. In some cases, a process 10B (or process 10A) to register the mobile device 101 to one or more web-services need not be specific to a given relying device. For example, a user may utilize an authentication application of the mobile device 101 to register the mobile device to one or more web-services as indicated by process 10B, and the registration may be valid for one or more relying devices to which the mobile device 101 also registers under process 700. For example, those web-services to which the mobile device 101 is registered may be indicated as available for mobile initiated authentications for one or more relying devices 140 to which the mobile device 101 registers (e.g., later) or is already registered. In some embodiments, such as via an interface of an authentication application of the mobile device 101, the user may elect for which relying devices 140 which web-services the mobile device is registered to, or registers to, should be enabled for mobile initiated authentications.

In some embodiments, process 800 (e.g., as described in more detail with reference to FIG. 8) may authenticate a user of a mobile device 101 to access a relying device 140 (e.g., to which the mobile device is registered under process 700) by a mobile initiated login. In some cases, a process 50A (e.g., as described in more detail with reference to FIG. 11B) may authenticate a user of a mobile device 101 to one or more web-services by mobile initiated authentication of the user to access those web-services by the relying device the user has been authenticated to access. For example, a web-service (or web-services) which the user may request mobile initiated authentication to in process 50A may include one or more of the web-services for which the mobile device 101 registered in process 10. In some cases, process 50A may be performed on a per-relying device 140 basis. In other words, when a user is authenticated to access a given relying device 140, the user may subsequently, or as a component of the process 800, mobile initiate login to one or more web-services (e.g., to which the mobile device is registered under process 10) the user desires to access with the given relying device 140. In some embodiments, credentials for those web-services to which the mobile device 101 may elect to mobile initiate login to are stored in association with other data corresponding to the relying device 140. In some cases, those credentials may be specific to authentications via the mobile device 101 to confer access to the web-services that relying device 140 may access. In the context of process 800, in some embodiments, the user may elect, such as via an authentication application of the mobile device 101, which additional web-services to authenticate to by process 50A. In some embodiments, an authentication result determined by the mobile device 101 (e.g., within the TEE) in association with process 800 may be utilized in a process 50A. For example, authentication of the user by the mobile device 101 to permit generation of results for verification by the authentication server 155 or other entity may be considered valid for a process 50A when implemented in connection with process 800, and some steps of process 50A may be omitted (e.g., rather than performing redundant user authentications to the mobile device 101).

Additionally, as shown, a process 50B (e.g., as described in more detail with reference to FIG. 11B) may authenticate a user of a mobile device 101 to one or more web-services by mobile initiated authentication of the user to access those web-services by a relying device 140. For example, a web-service (or web-services) which the user may request mobile initiated authentication to in process 50B may include one or more of the web-services for which the mobile device 101 registered in process 10. In some cases, a process 50B (or process 50A) to authenticate the user of the mobile device 101 to one or more web-services need not be specific to a given relying device. For example, a user may utilize an authentication application of the mobile device 101 to authenticate via the mobile device to one or more web-services as indicated by process 50B, and the authentication results may be valid for a relying device issued a user session for the user. As described in relation to process 800, a session for the user may be issued to a relying device 140 as a result of a mobile initiated authentication. However, in many cases, a user may login to a relying device 140 by other means, such as by entering credentials into the relying device, optionally with out-of-band authentication by the mobile device (e.g., rather than mobile initiated). In either instance, a session for the user may be issued to the relying device 140 by an authentication server 155, or alternatively, such as in cases of a user providing credentials to a relying device 140, the relying device may report user login (e.g., a user session). Accordingly, the authentication server 155 may track active sessions of different users with respective relying devices 140. In turn, when a user requests mobile initiated authentication 50B to login to a web-service via their mobile device 101, the authentication server 155 may identify the relying device 140 to which an authenticator for the web-service should be transmitted. For example, the authentication server 155 may transmit over a secure session with the relying device 140 an authenticator for the web-service (e.g., to which the user authenticated to via the mobile device) and instructions for the relying device to present the authenticator to the web-service, thereby permitting the user to access the web-service via the relying device.

Examples of process 10 and 50 are discussed in more detail with reference to FIG. 11, and may be incorporated within or implemented in connection with other authentication processes described herein, such as mobile initiated authentication processes by which a user initiated authentication to access a relying device. Examples of processes 10 and 50 may also be implemented in connection with more traditional authentication techniques, such as by a relying device 140 reporting user-level accounts access events to the authentication server 155 such that the authentication server may identify which relying device to transmit authenticators for accessing web-services.

Figure 11A:
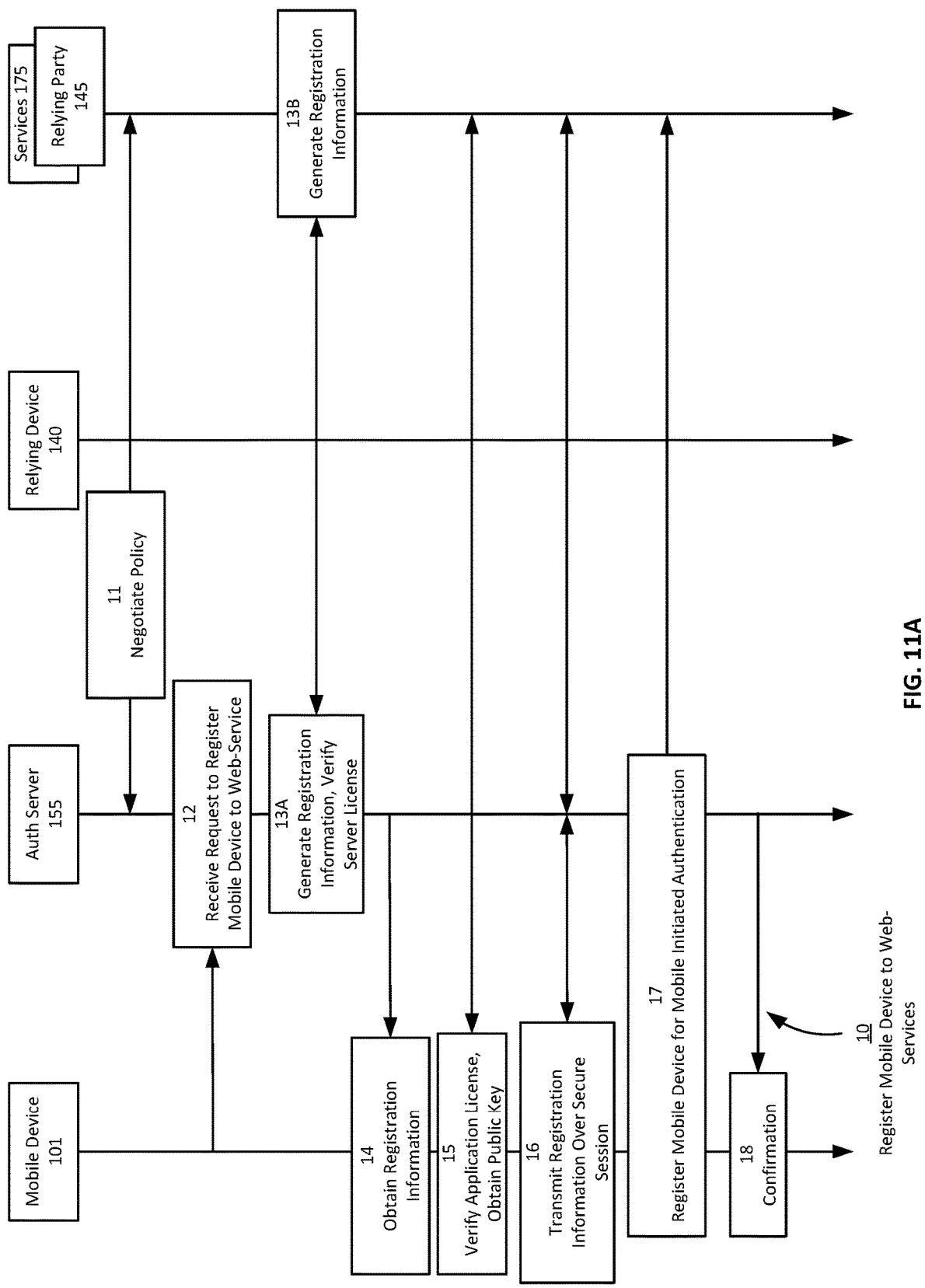

Example Process for Registering a User for Mobile Initiated Authentication to a Web-Based Service Provider FIG. 11A is a diagram showing an example process 10 for registering a mobile device with a web-service to permit mobile initiated authentications to web-services for access by a relying device within example computing environments described in the present application. Embodiments of the process 10, which may include one or more of the illustrated steps, may occur within an example computing environment, such as the example computing environment 100A illustrated in FIG. 1A, the example computing environment 100B illustrated in FIG. 1B, or the computing environment 200 illustrated in FIG. 2. Process 10 may be implemented in the context of other authentication operations as described with reference to example processes 10A and 10B in FIG. 10. Some example implementations of process 10 may share some steps with other processes described herein, like process 700 of FIG. 7. FIG. 11A illustrates various operations performed by devices of a computing environment, such as one of the computing environments discussed with reference to FIG. 1A, FIG. 1B, or FIG. 2, and examples of those computing devices are further described in reference to FIG. 10.

In some embodiments, process 10 begins with a step 11 that includes an authentication server 155 negotiating 11 a policy with a web-service, like a service 175 or a relying party 145. Policy negotiation 11 may include the establishment of a policy by which a web-service accepts authentication results determined by another entity, like the authentication server 155. For example, a policy may specify one or more rules with which determination of an authentication result must comply to be accepted by the web-service. The authentication server 155 may be "trusted" by the web-service, e.g., as an identity provider, to enforce a policy of the web-service or a policy compliant with the web-service such that the web-service may rely on those authentication results.

Authentication results may be conveyed in a variety of ways. For example, a web-service may accept an authentication value determined by the mobile device 101 or authentication server 155, and which may be signed by both entities, and accepted by the web-service upon signature verification. For example, the web-service may accept a generated token (e.g., as an authentication value) which when presented to the web-service by a relying device 140 the web-service permits the relying device access to the web-service. In some embodiments, an authentication value may also be signed by a relying device 140. A policy may specify rules by which a user may authenticate via the mobile device 101 (e.g., with the authentication server 155) to convey access to the web-service by the relying device. Examples of authenticators as described herein may include user certificates, tokens, tickets, or other credentials (or representations of credentials) to which one or more cryptographic techniques may be applied (or generated by application thereof). For example, data may be signed to generate signed data and a receiving entity may verify that the signed data corresponds to received data by signature verification, and the received data may be encrypted by a public key of the receiving entity to mitigate leakage of data (e.g., the receiving entity securely maintains the corresponding private key of the public-private key pair such that other entities cannot decrypt data encrypted by the public key). In some embodiments, policy negotiation 11 may include the exchange of one or more public keys between the public server and the web-service, or obtaining of respective public keys or certificates from another trust (or certificate service) by which the authentication server 155 and relying party 145 may securely exchange data or verify signed data. A poly 11 may also specify a service or protocol to which the exchange of authenticators, like credentials corresponding to user access of the web-service, may be communicated. For example, the exchange or conveyance of credentials may conform to or be based on protocols such as ID Connection, open ID, or SAML, and may be specified by the policy governing mobile initiated authentications to the web service.

As shown, web-services may include various services 175 and relying parties 145 for which the authentication server 155 is permitted to serve as an identity provider, and which the various web-services may trust to provide authentication results. A web-service may provide functionality to users of authorized user accounts and, in some cases, authorized user accounts on authorized relying devices (or virtual desktop images). For example, if a user utilizes multiple relying devices 140, a web-service may support only one or a subset of those relying devices, or one or a subset of desktop images executed by a relying device, and not necessarily all. Accordingly, different web-services may be associated with different policies, which may include different rules. Some rules may be similar to those described with respect to polices that are enforced with respect to relying devices 140 as previously described herein. In some embodiments, by virtue to the relying device 140 presenting authenticators to a web-service for verification, the web-service may be ensured that user access policy to the relying device 140 has been met in addition to any additional policy requirements negotiated 11 by the web-service. In may cases, the negotiated policy 11 may be valid for a plurality of users having user accounts with the web-service and provided for selection to a user of a mobile device 101 to register for mobile initiated authentications to the web-service. In some cases, a web-service may convey access to a plurality of relying parties 145 or other services 175, such as where the web-service is an identity provider for one or more other web-services. In such cases, the relying device 140 may present authenticators to authenticate to a web-service also severing as an identity provider itself which may convey privileges to those other relying web-services, and the authentication results may comply with a policy of the web-service to which those other relying web-services already trust.

As shown in process 10, the authentication server 155 may receive 12 a request to register a mobile device (e.g., of a user) for mobile initiate authentication to a web-service. In some cases, the mobile device 101 includes an authentication application that provides a user interface by which a request to register the mobile device may be received in step 12. For example, the authentication application may present an interface indicative of which services a user may elect to register the mobile device to after the mobile device is registered to at least one relying device 140. In some embodiments, the authentication application may present the interface when a user selects a given relying device 140 for which mobile initiated authentications to one or more web-services are permitted and provides a user input to register to one or more of those web-services. In some embodiments, the user may elect to register the mobile device 101 to one or more web-services prior to registering the mobile device with a relying device. For example, after the authentication application is installed and a user account is registered with the authentication server 155 an option may be provided by the authentication application for the user to register to one or more web-services. In such cases, some web-services may only be available to some relying devices 140 to which the user has access, but not all, such as based on a policy of the web-service or policy governing the relying device.

Example interface(s) generated by the authentication application for display on the mobile device 110 may include one or more human interface elements indicative of the registration process, and the mobile device 101 may detect the user interaction to transmit the request represented by step 12 that is received by the authentication server 155. In some embodiments, indications of different web-services, such as different interface elements depicting logos of the respective web-service may be provided to the mobile device 101 for presentation by the authentication application. For example, subsequent to the establishment of a policy governing a web-service, the authentication server 155 may transmit a logo or other identifier to be displayed in connection with (or as) a user interface element within the authentication application on the mobile device 101 which the user may interact with to cause the transmission of the request received the authentication server in step 12. The request of step 12 may indicate one or more web-services with which the user desires to register the mobile device 101 for mobile initiated authentications. For example, a request 12 to register the mobile device to a web-service may include an identifier associated with the web-service.

In response to receiving a request to register a mobile device, the authentication server 155 may generate registration information 13A in accordance with a policy associated with web-service indicated by the identifier. For example, the authentication server 155 may generate a registration information including a registration value. Registration information may include multiple components, such as an identifier of the mobile device 101 and a registration value (which may change for different registration requests, and thus be tied to a specific request in time). In some embodiments, the authentication server 155 may pass the registration value to the web-service such that the registration value is known to the web-service. In some embodiments, the authentication server 155 may request a registration value from a web-service, in which case the service 175 or relying party 145 may generate 13B the registration value. In turn, the authentication server 155 may receive the registration value from the web-service, which is known to the web-service (and may change for different registration requests, and thus be tied to a specific request in time). Embodiments of the registration value may be a randomly generated value or deterministic value (e.g., like an encrypted registration value, or hash of a registration value). An example of a deterministic registration value (e.g., like a cryptographic hash value) may be based on a record of the mobile device or other account information associated with the user, which may be maintained by the authentication server 155 or web-service, and identified in association with the request 12, such as by an email or username or other identifier associated with the user).

In some embodiments, the authentication server 155 may verify a server license 13A to operate as an identity provider for the identified web-service, such as with the web-service or other entity. In step 13A, the authentication server 155 may, in some embodiments, verify (or renew) a license with one or more web-services. The authentication server 155 may verify a license in response to receiving a request to register a mobile device with a given web-service. For example, in various implementations, relying devices 140 and authentication servers 155 may be deployed by businesses which utilize software licensed by other developers of computer program code. In turn, a deployed authentication server 155 may verify a license with a certificate authority service through the developer or through which the developer licenses use of the computer program code executed by the authentication server 155 to the business. Similarly, such certificate authority services may govern access of web-services (or may govern licenses to computer program code or other assets or online resources provided by web-services) utilized by relying devices. Accordingly, example services 175 may include one or more certificate services, like an active directory service, X.509 certificate service, or other trust service.

The authentication server 155 may pass the registration information, such as the registration value, to the mobile device 101. The registration information may also include policy information with which the mobile device 101 must comply to register for mobile initiated authentications to the web-service. For example, authentication server 155 establish a secure connection, or tunnel, such as via TLS/SSL over HTTP, Web Socket, SSH, or other protocol, with the mobile device 101 (or vice versa) to facilitate the secure exchange of data between the mobile device 101 and the authentication server 155. The authentication server 155 may exchange data securely in a similar fashion with web-services and relying devices 140.

In step 14, the mobile device 101 obtains registration information from the authentication server 155. For example, the mobile device 101 may obtain the registration value and other associated registration information, like a policy, or rules of the policy associated with the web-service in response to a transmitted request to register the mobile device with the web-service. In some embodiments, the registration information may also include an identifier corresponding to a relying device 140 (e.g., to which the mobile device 101 is registered such that a relying device which will be conveying an authenticator may be identified to (and later by) the authentication server 155) or devices for which the user is permitted to initiate an authentication to the web-service via the mobile device and that the relying device(s) are permitted to access. As an example, some relying devices 140 may be permitted to access a web-service providing personal email accounts and another may not be permitted to access such a service, yet both relying devices may be permitted to access some other services. Thus, for example, the authentication application may indicate which web-services for which relying devices (e.g., based on the relying device identifiers) the mobile device is registered that the user may mobile initiate authentication. Further, in some cases, a web-service may also match a registration identifier of a relying device 140 with an identifier of the relying device conveyed in association with an authenticator during a mobile initiated authentication—however, the web-service may alternatively trust the authentication service 155 to make such determinations in an authentication process based on a policy like that noted above. In some embodiments, the registration information includes a public key (e.g., that of the authentication server 155 or web-service) by which the mobile device 101 may encrypt data conveyed to the respective entities. The mobile device 101 may obtain registration information from multiple sources, such as a registration value from one source (e.g., the authentication server 155 in response to request 12) and a public key from another source (e.g., the web-service or vice versa) or from one source (but which in some cases may be conveyed by an intermediate entity). In some embodiments, the mobile device 101 is configured to obtain registration information or a portion thereof within the TEE of the mobile device and, in some embodiments, the TEE may process at least some registration information, such as to sign a registration value by a private key of the TEE, to indicate that the registration value was determined by the TEE.

In some example embodiments, in step 15, the mobile device 101 may verify a license, such as a license associated with the authentication application. For example, in a step 15 the mobile device 101 may transmit a request to a service 175, such as the service 175 with which the authentication server 155 is verified, to verify a license associated with the authentication application. In some embodiments, the service 175, such as a certificate service, may provide one or more public keys (e.g., upon request) to a first entity that correspond to another entity registered (or active) with the service such that the first entity may securely transmit data. Thus, for example, the mobile device 101 may obtain one or more public keys associated with the authentication server 155 or a given web-service from the service 175 (e.g., instead of, or to verify public keys obtained in association with registration information in step 14). In some embodiments, obtaining a public key for the authentication server 155 or web-service may be dependent upon whether the authentication application is licensed. Additionally, in some embodiments, the authentication application may be licensed in association with a given application server 155 such that revocation of the certificate for the authentication application may revoke privileges of the mobile device (e.g., if lost, stolen, or otherwise).

In step 16, the mobile device 101 may transmit registration information corresponding to the web-service, such as the obtained registration value signed within the TEE, and a public key of the mobile device 101 by which other entities may verify the signature. In various embodiments, the authentication server 155 maintains a device record of the mobile device 101 and may store the public key by which the signed data can be verified. The mobile device 101 may also transmit credentials for the web-service, such as encrypted by a public key obtained for the web-service (or authentication server). The TEE may obtain the credentials in a secure fashion, such as via user input (e.g., username and password or other expected credential) into the TEE, and sign the encrypted credential values to indicate secure processing thereof. The credentials values which are encrypted by public key may be deterministic values based on input credential values, such as by the TEE generating one or more cryptographic hashes of input credential values according to a specified hashing algorithm. In some cases, these encrypted credentials may be transmitted over a secure session with the authentication server 155, which may subsequently verify signed data and pass the credentials over a secure session to the web-service, such as in response to verifying the signed registration value and signed encrypted credentials.

As noted above, the mobile device 101 may establish a secure session with the authentication server 155, such as based on an obtained public key, for the secure transmission of registration information. For example, the mobile device 101 and authentication server 155 may establish a secure session by the mobile device 101 transmitting a session key encrypted by the obtained public key to facilitate the exchange of information. In some embodiments the session key may be the registration value, but may alternative be another value generated in accordance with a protocol for establishing the session. The secure session may be HTTP over TLS/SSL, SSH, Web Socket over TCP, or other secure connection type by which the mobile device and authentication server 155 may exchange data, like registration information. In some cases, the mobile device 101 may encrypt the registration information, such as a registration value, with the obtained public key of the authentication server 155, or may encrypt the registration value in accordance with a protocol of the secure session. In some cases, the mobile device 101 may sign data transmitted to the authentication server 155, such as by a private key stored within the TEE for which the authentication sever may obtain a public key for verifying the signature (e.g., the private key may correspond to a public key associated with the license of the authentication application which the authentication server may request from a service 175 to verify the signature). The authentication server 155 may establish a secure session with the web-services in a similar fashion to pass registration information, or vice versa in some embodiments. In some examples, the authentication server 155 may pass the encrypted credentials to the web-service for verification and receive a result of the authentication. The authentication server 155 may obtain information (e.g., over secure session from the web-service) by which credentials may be verified, such as cryptographic hashes of credentials generated by a same cryptographic function performed by the web-service as that performed by the TEE of the mobile device 101 over the input credentials. In some example embodiments, the cryptographic hashes may be generated based on hashes of input credentials and another value, like the registration value, such that the authentication server 155 may verify credentials without receiving actual credential values (cryptographic hash or otherwise) accepted by the web-service.

In some embodiments, the authentication application of the mobile device 101 may cause the mobile device to request a secure session with the web-service (e.g., instead of, or in addition to, the authentication server) by which credentials and the registration value may be provided to the web-service for verification. For example, the authentication application may cause the mobile device 101 to request a resource of the web-service, like a uniform resource locator (URL), which may include an interface via which credential values and the registration value may be provided in a secure fashion to the web-service. In some embodiments, the URL may be provided to the mobile device 101 with registration information in step 14. In some embodiments, the URL may be based on the registration value, like a domain of the web-service followed by the registration value or deterministic value based on the registration value like a cryptographic hash or token value corresponding to the registration value (or other value, such as a certificate value or deterministic value based on a certificate) which may redirect the authentication application (or a browser enabled element) to another URL including an interface by which the user may input credentials. In examples where credentials are provided to the web-service for verification, the web-service may provide (e.g., via secure session) to the authentication server 155 a verification result corresponding to the user of the mobile device based on received credential values.

In step 17, the authentication server 155 may verify received registration information and determine to register the mobile device for mobile initiated authentication. The authentication server 155 may verify all or some of the registration information received from the mobile device 101, such as by signature verification indicative of processing of the received information by the TEE of the mobile device and matching of received values from the mobile device with expected values (e.g., as determined by the authentication server or received from the web-service). For example, the authentication server 155 may verify received information by signature verification based on expected data, signed data, and the corresponding public key of the mobile device 101. In some examples, the web-service may verify a portion of the registration information, which may be passed to the web-service by the authentication server 155 or provided to the web-service by the mobile device 101. The web-service may determine an authentication result based on the received portion of the registration information and provide the result to the authentication server 155, such as by signing data, like a result, or other value by a private key of the web-service and which the authentication server may verify by signature verification based on expected data, signed data, and the corresponding public key of the web-service. Accordingly, permission of the user of the mobile device 101 to access the web-service may be verified prior to registering the mobile device for mobile initiated authentications to the web-service.

Additionally, in step 17, the mobile device 101 and authentication server 155 may participate in a registration operation. The registration operation may include the secure exchange, such as over a secure session, of a public key corresponding to a private key stored within the TEE of the mobile device. In some embodiments, the authentication server 155 may be configured to retrieve a public key corresponding to a licensed authentication application of the mobile device 101 from a service 175, like a certificate service, and may challenge the mobile device to a proof of knowledge, such as knowledge of the corresponding private key, like in a challenge-response. For example, the mobile device 101 may sign specific data within the TEE by the private key and the signed data may be transmitted to the authentication server for verification based on the public key (e.g., according to a signature verification algorithm). The above information may be received in a prior step via secure channel by the authentication server 155, verified, and need not be obtained again in step 17. In some embodiments, a new private key may be generated or obtained within the TEE for utilization in association with the web-service, and a corresponding public key may be provided via the secure channel to the authentication server.

The mobile device 101 may also provide other information over the secure session established with the authentication server 155, such as representations of credentials. One or more steps of the registration operation discussed below may be optional, such as in instances where the mobile device 101 is already registered with the authentication server 155, in which case the authentication server 155 may maintain a record for the user which may include one or more representations of user credentials, public keys, etc., for authentication operations. In some case these representations and public keys may be used for multiple web-service, relying devices or other authentication operations, however, some of the representations or public keys may be reestablished in some instances, or by default, depending on implementation. Additionally, new credentials and representations of those user credentials may be established in accordance with a policy 11 for authentications to a given web-service.

Registration operations discussed at step 17 may occur in a variety of different ways depending on the embodiment, and some registration operations of step 17 may occur prior to the process of FIG. 11A. For example, after obtaining an authentication application on the mobile device 101 and prior to the process of FIG. 11A, a user may have registered or established an identify according to a process 300A described with reference to FIG. 3A or a process 500 described with reference to FIG. 5, or a process 713 of FIG. 7, or a comingling of some steps of those processes. For example, registration may be performed in association with establishing an identify of a user which may be utilized in a process like that described with reference to FIG. 10 or other processes described herein. Likewise, user credentials established within a TEE of the mobile device 101 in association with such a registration process may be subsequently utilized. In some cases, a user may have a registered net ID or other federated identity to which the user may authenticate to in the registration process. Thus, in some cases, the mobile device 101 may submit a knowledge proof (e.g., signature of some data in step 16 or 17) or respond to a challenge for a knowledge proof (e.g., in step 17) to bypass some or all of the steps described below or with reference to process 300A or process 500.

In some embodiments, such as in association with a registration step 17 or prior to the illustrated process 10, an authentication application may be configured to cause the mobile device 101 to request establishment of a net ID within an identity management system, which may correspond to the authentication server 155 and optionally one or more other services 175 and which may include operations like those described in FIG. 5 (e.g., in process 500) with reference to steps 504, 506, 508, 510 of process 500 performed by the respective entities and information like that described in step 512 may be provided to the mobile device 101 by the authentication server 155 (e.g., rather than application server, although such variations are not disclaimed). For example, upon execution of the authentication application within the CEE, the authentication application may cause the mobile device 101 to prompt the user indicate whether the user desires to create a Net ID. If the user desires to create a Net ID, the authentication application may cause the mobile device 101 to generate a request for transmission by the mobile device to a server, such as authentication server 155.

In some embodiments, such as in association with a registration step 17 or prior to the illustrated process 10, the authentication application performs one or more steps similar to those previously described with reference to FIG. 3A (e.g., in process 300A) to establish data (e.g., credentials or private keys) within the TEE and receive data (e.g., representations of credentials or public keys) from the TEE, and transmit the received data to the authentication server 155 during step 506 of FIG. 5, or step 17 of FIG. 10. For example, the mobile device, TEE, and authentication application may perform one or more steps, like steps 320-328 of process 300A, as described with reference to FIG. 3A. Those steps may also include the exchange, storage, and generation of the additional data discussed above and discussed elsewhere throughout the application, such as with reference to FIG. 2, for the establishment of a Net ID 506 including that information. Or in some embodiments, once executed, such as within the CEE, the authentication application may cause the mobile device to perform one or more operations in a registration process, which may correspond to steps 321-328, without performing steps discussed with reference to FIG. 5.

Accordingly, embodiments of step 17 of process 10 may include operations like those described with reference to FIG. 3A in association with steps 320-328 (and others in other steps of FIG. 10) and may also include operations like those described with reference to FIG. 5 in association with steps 504-512 (and others in other steps of FIG. 10), or steps of FIG. 7 such as where registration to web-services are performed in connection with registration of the mobile device to a relying device, or combinations thereof. In other words, various aspects of disclosed registration and identity establishment techniques and variations on such techniques are applicable to a registration process like that described below in reference to step 17 of process 10. For example, operations like those described with reference to FIG. 3A and FIG. 5 may be utilized to establish a federated identity, such as net ID, but should not suggest that other federation technique may not be utilized. Examples of which may include FIDO and FIDO2 standards, and those standards may be similarly augmented with techniques like those disclosed herein. In some example embodiments of registering a mobile device 101 for mobile initiated authentication to a web-service, new or other representations of credentials may be established in association with a federated identity, such as in accordance with a policy 11 which may differ from that governing the federated identity. In turn, those representations of credentials may be verified (e.g., in addition to, instead of, or as a result of authentication to the federated identity) for authentication to a web-service.

The mobile device 101, as described above, such as over the secure session, may communicate registration information to the authentication server. An authentication application may cause the mobile device 101 to transmit information indicative of the mobile device or user, such as in cases where the mobile device has previously registered with the authentication server. For example, the authentication server may store a record corresponding to the user and which includes information about the mobile device, such as device information and a public key corresponding to a private key stored within the TEE of the mobile device. The user record may additionally include one or more representations of credentials established within the TEE of the mobile device 101. The authentication application may cause the TEE to sign, within the TEE, data which may be transmitted to the authentication server 155, by which the authentication server may verify the mobile device as a registered mobile device (e.g., previously). In order to generate the signature, the user may be required to authenticate on the mobile device 101, such as by providing one or more credentials for verification within the TEE. Accordingly, the authentication server 155 may verify the signed data in accordance with a signature verification algorithm based on the public key and the data which was signed, such as a representation of a credential on which the user authenticated with the mobile device. The authentication server 155 may access a user record, such as by mobile device identifier, indicated user record, or by a public key provided by the mobile device 101. The authentication server 155 may access a record based on the received information, such as to obtain the public key associated with the record (or ensure a match thereof) and obtain a stored representation of the credential for performing the verification of a previously registered mobile. The data which was signed may include a timestamp which may be communicated to the authentication server 155 (or other temporal data, like challenge data, provided by the authentication server) and by which the authentication server may verify temporality of the signed data to a current system time (or a timestamp associated with the receipt of registration information from the relying device 140).

If the mobile device 101 is not previously registered, e.g., there is no record of the device for a user record, the authentication server 155 may request the mobile device 101 provide information like that described above. In instances where no record of the user exists, additional information may be requested, such as to establish a user record, and verify privileges associated with the user to access or register a managed relying devices 140 from which a web-service will be accessed. Further, in some examples policy governing mobile authentication to the web-service may require the mobile device 101 to establish new credentials corresponding to the web-service. In either instance, the authentication server 155 may request the mobile device 101 provide a public key and representations of credentials by which a record of the device for registration with the web-service may be established for the user. The authentication application executing on the mobile device 101 may request, to the TEE, establishment of a private key within the TEE, or request a public key which may cause the generation of a private key within the TEE, or the TEE may provide a public key corresponding to a private key already established within, stored, or otherwise of the TEE. In each case, the TEE maintains the private key within a secure memory and not divulge the private key. In some cases, the TEE may output a generated result (e.g., a generated public key corresponding to a generated private key) from within the TEE, and provide a public key associated with a secure processor (or other secure element) of the TEE (which may output signed data) such that secure processing of data on which the result is based may be verified (e.g., that the public key may be verified as corresponding to a securely generated private key that is maintained within the TEE). In some embodiments, the authentication application may verify the public key output by the TEE as securely generated. In turn, the authentication application may cause the mobile device 101 to transmit the public key to the authentication server 155, and optionally include data by which the authentication application may verify the public key as securely generated.

With a public key established for the mobile device 101, for which the corresponding private key is secure within the TEE, the authentication server 155 may verify other data received from the mobile device 101, such as by signature verification, and encrypt data which may be transmitted to the mobile device 101 for processing within the TEE. In some embodiments, different public keys are utilized for the different operations, in which case multiple public keys may be generated in accordance with the above processes.

The authentication server 155 may request the mobile device 101 generate representations of credentials corresponding to the user. In some cases, the user may establish one or more credentials from which the representations are generated, such as where those credentials differ from ones already established within the TEE, are more secure, or otherwise. For example, the authentication server 155 may request a set of representations, each representation corresponding to a different credential in a set of credentials. The authentication application may request, to the TEE, establishment of one or more credentials (e.g., the set of credentials) within the TEE. The authentication server 155 may provide a policy with which one or more of the credentials must comply, e.g., a pin length greater than 4 digits, alphanumeric password requirements, whether one or more biometric credentials (or a combination) are permitted, and the like. For example, the authentication server 155 may convey the policy 11 associated with the web-service or one or more policy rules. The authentication application may provide the policy requirements to the TEE in association with respective credentials for establishment within the secure memory of the TEE. In turn, the authentication application may request a representation of an established credential, such as a cryptographic hash of a credential. The TEE may output a representation of the requested credential, and may also provide a result indicating whether the credential complies with the policy (although in some cases the TEE may prevent the user from providing a credential which does not comply with the specified policy requirements). In some embodiments, the TEE may output signed data such that the authentication application or authentication server 155 may verify the secure generation of data output by the TEE. For example, after establishment and verification of the private key within the TEE, the TEE may sign outputs, such as results (e.g., a representation) or other processed data, with the private key. In turn, the authentication application or authentication server may verify data as being processed or securely generated within the TEE based on corresponding signed data by processing the data, the signed data, and public key by a signature verification algorithm which indicates whether the signing key (e.g., the private key of the TEE) was used to sign the data, and whether the signed data correspond to the data. Thus, the authentication server 155 may receive representations of credentials from the mobile device 101, which may be verified by the above public key or another public key (e.g., that corresponds to a private key of the TEE and which was exchanged in a process like that described above) according to a signature verification technique. In other words, embodiments should not be construed to be limited to a single key-pair, as multiple key-pairs may be created in accordance with techniques like those described above, or that embodiments preclude use of a symmetric encryption protocol with shared key encryption. The authentication server 155 may determine whether the user is authorized to access the web-service, such as based on verification of a result of user authentication to an account with the web-service, which may be determined to be associated with other registration information received from the mobile device based on the registration value. The authentication server 155 may, in some cases, determine whether a relying device 140 which the user is permitted to access (e.g., based on records of relying devices associated with a record of the user) is permitted to access the web-service (e.g., based on a policy governing use of the relying device).

In some embodiments, in step 17, the authentication server 155 may provide information indicative of the registration to the web-service. In some examples, the authentication server 155 may convey data from one or more records established or populated as result of the registration of the mobile device. For example, the authentication server 155 may convey one or more representations of credentials or public keys to the web-service, by which the web-service may verify an authentication request. In some embodiments, the authentications server 155 may obtain a token value corresponding to the user and the mobile device. In some cases, a token value may be a representation of a credential (or combination of credential values) or generated based on a representation of a credential or combination of representations of credentials. In some cases, a token value may be generated based on account information of the user with the web-service. In some cases, a token value may be a user certificate obtained, assigned, or associated with the user account. In some cases, a token value may be generated randomly, or deterministically based on other data, or correspond to other data. Generally, a token may be based on value, certificate, certain data, or based on a combination of data, such as a cryptographic hash value. The token may be conveyed to a web-service by a relying device 140 to obtain access to the web-service. The token may be persisted or generated and signed by one or more entities, such as to indicate possession of a given private key and the token, and the signature may incorporate a timestamp by which temporality of the signature may be verified. Further, a token may incorporate a timestamp, such as in cases where the token is a cryptographic hash of some data or value and a timestamp. A token schema may be specified by the policy 11 negotiated with the web-service. The token schema may specify a format for tokens accepted by the web-service. Accordingly, a token may be generated in accordance with the schema and conveyed to the web-service, which may verify the token. In some embodiments, the web-service may verify a token by signature verification of data signed (e.g., the token) by the authentication server, thereby relying on the authentication server for determining authenticity of the token in accordance with policy (e.g., by verifying the token in accordance the token schema). In some embodiments, the web-service may verify a token in accordance with the token schema, but may additional verify data signed (e.g., the token) by the authentication server, which may sign over data signed by the TEE of the mobile device or sign a result. In one example, a token may include an identifier of a mobile device (or user account), a timestamp, and a signed cryptographic hash value, where the signed cryptographic hash value may be signed by the TEE of the mobile device and be based on the identifier, the timestamp, and a representation of a credential (e.g., of a credential that the user authenticated to the TEE and for which a representation was provided in association with registration information). As previously described, various representations of credentials may be provided by the mobile device 101 during a registration process, and which credential (or combination thereof) to which the user authenticates on to the mobile device may be specified by a policy on the mobile device (and thus expected by an authentication entity) or indicated in a challenge response process. In some embodiments, a token or value on which a token is based may be persisted amongst the mobile device 101, authentication server 155, and web-service. Thus, for example, the authentication application of the mobile device 101 may associate the token with the web-service, the authentication server 155 may associate the token with the web-service and an identity record of the user and mobile device, and the web-service may associate the token value with a user account of the user with the web-service.

In some embodiments, step 17 may include a request to sign or create a token value or certificate to establish credentials corresponding to the user. A request to a service 175 to obtain a certificate or token value may include information based on data transmitted by over a session with the authentication server 155, which may include information provided by the mobile device 101 to the authentication server or based on information provided by the mobile device to the authentication server in the preceding steps. In some cases, the authentication application of the mobile device 101 (or the web-service) may transmit the request. In some embodiments the authentication server 155 may service the request (or a service 175 of the authentication server may service the request), although certificate services 175 provided by other entities are equally applicable. An example request may be a certificate signing request for an active directory compatible SSL certificate or other certificate or token from a service 175 which generates or signs a certificate (e.g., as a signing authority) and returns the certificate. The signed certificate may be tied to the user, e.g., as a user identifier or authenticator or both. For example, the signed certificate may be tied to information provided by the mobile device, like a public key, certificate, or cryptographic hash, other deterministic information (e.g., such as information output by the TEE), or other credential associated with the mobile device, to establish a zero-knowledge proof of ownership. In some cases, the certificate signing request may correspond to a public key of the mobile device or certificate based on a public key of the mobile device, such as the public key provided to the authentication server or web-service. Other embodiments may associate the certificate with the user within one or more databases, such as based on an association of the user certificate with a public key, or cryptographic hash, or other deterministic information provided by the mobile device, thus tying the user certificate to the mobile device. The mobile device 101 may receive a response from the service 175, such as a signed certificate or token for user credentials corresponding to a user account of the user with the web-service and indicative of the permissions of the user to mobile authenticate to confer access to the web-service to a relying device 140. The user account which may be accessed based on the credentials may correspond to a user-level account (e.g., which may be an existing user account) of the user of the mobile device 101. For example, the user account may be an account on the web-service which the user has permission to log into or authenticate to from a relying device 140. In some cases, such as where multiple such accounts exist (e.g., with different web-services), like different user-level accounts, or different administrative-level accounts, credentials may be obtained for each account and each web-service. In some cases, a user certificate is specific to the mobile device 101 and a given relying device, in which case an identifier of the relying device may be associated with the credentials for utilization by that relying device, and the user may register via the mobile device to access that that web-service with other relying devices, or the credentials may be valid across a collection of relying devices (e.g., in accordance with a policy 11). In such cases, the relying device 140 may be provided with and sign credentials such that those credentials may be persisted to the mobile device 101. In some embodiments, the relying device 140 may encrypt the user credentials or other data (e.g., with a public key or encryption key associated with the mobile device), like a certificate, for which the TEE of the mobile device stores a corresponding key by which the encrypted data may be decrypted (e.g., within the TEE of the mobile device).

Various combinations of the aforementioned embodiments may be implemented, such as to facilitate compatibility with different policies of different web-services, and policies governing different relying devices to register a mobile device for mobile initiate authentications to a web-service that conveys access to a relying device. In step 18, the authentication server 155 may return a registration result to the mobile device 101. For example, the authentication server 155 may transmit a registration result confirming the registration. In some cases, the confirmation may include any data persisted to the mobile device 101 for authentication (e.g., a value for a token, certificate, or other data). In some embodiments, the authentication server 155 may also persist some or all of that data, or other data, to the web-service for authentication operations.

Figure 11B:
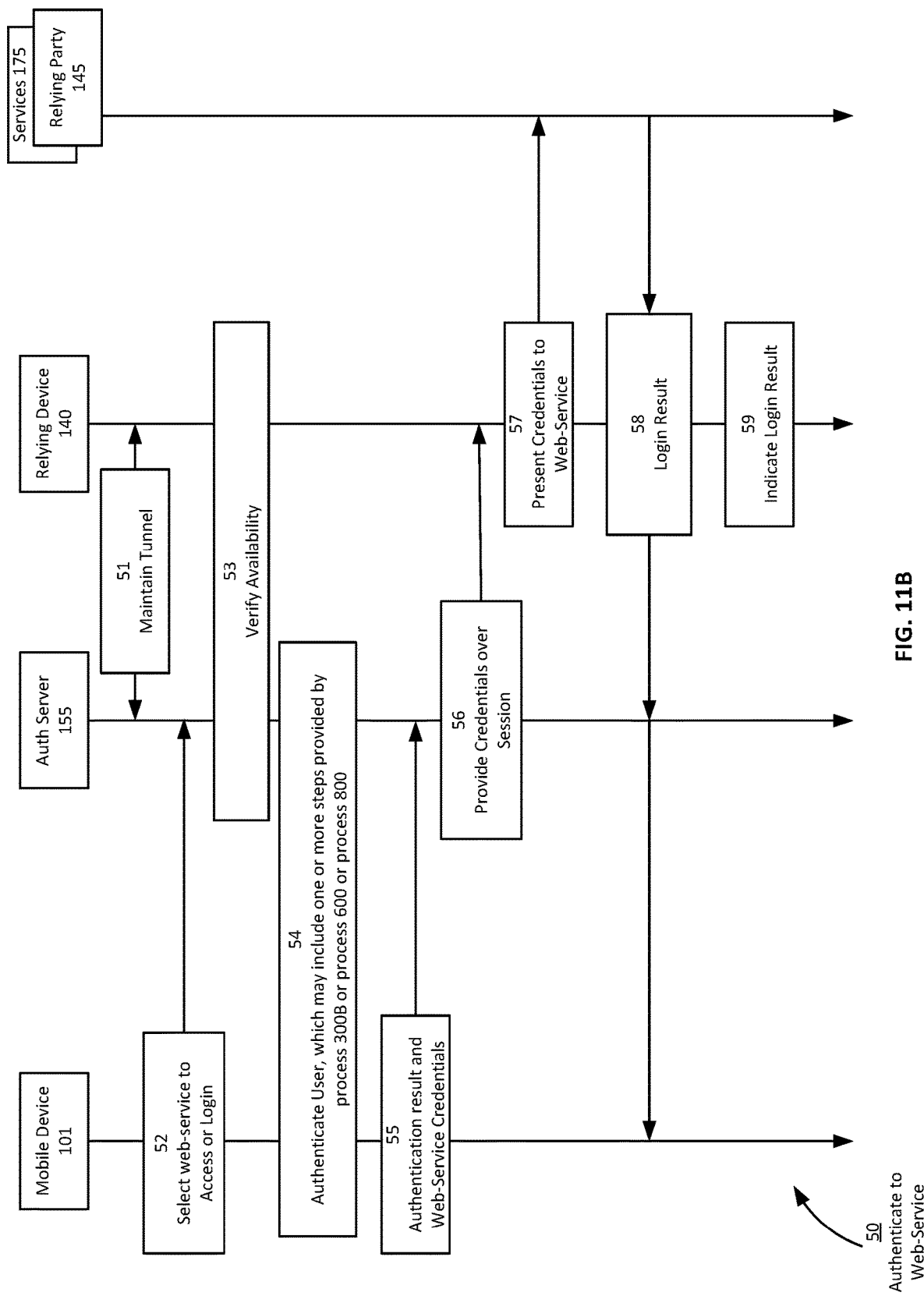

Example Process for Mobile Initiated Authentication of a User to a Web-Based Service Provider FIG. 11B is a diagram showing an example process 50 for online mobile initiated authentication to a web-service within example computing environments described in the present application. Embodiments of the process 50, which may include one or more of the illustrated steps, may occur within an example computing environment, such as the example computing environment 100A illustrated in FIG. 1A, the example computing environment 100B illustrated in FIG. 1B, or the computing environment 200 illustrated in FIG. 2. In some embodiments, the process of FIG. 11B may occur after a registration process, such as the registration process described with reference to FIG. 11A, or other registration process described herein. The process 50 of FIG. 11B illustrates various operations performed by devices of a computing environment, such as one of the computing environments discussed with reference to FIG. 1A, FIG. 1B, or FIG. 2.

In FIG. 11B, as shown, a relying device 140 may in a step 51 maintain a tunnel to an authentication server 155, or vice versa. In some embodiments, a tunnel may not be maintained, but rather established in association with a verification of relying device 140 availability by the authentication server 155. For example, the relying device 140 may maintain a WebSocket tunnel, or other secure tunnel or connection, like a heartbeat between the relying device and an authentication server 155 (or vice versa). For example, a secure session may be established between the relying device 140 and the authentication server 155 (as well as services) for the transmitting of credentials or the exchange of other data. The secure session may be HTTP over TLS/SSL, SSH, Web Socket over TCP, or other secure connection type by which the authentication server 155 and relying device 140 (or applications thereon) can exchange data. The secure session may be held open by the authentication server 155 or relying device 155 for a pre-configured amount of time (e.g., 1-180 seconds, or 1-5 minutes) before timing out, and refreshed upon a heartbeat signal, like receipt of a packet indicative of a heartbeat (e.g., that a connection is alive) or refresh request. Thus, for example, the authentication server 155 may determine an availability or status of a relying device 140 based on the status of the session (e.g., whether the session is active). The authentication server 155 may issue a user session to a relying device, such as in response to a mobile initiated login (e.g., as in process 800) or based on the user otherwise accessing the relying device (e.g., the relying device may report a user login to the authentication server 155 over the tunnel, and the authentication server 155 may issue a user session or otherwise store an indication of a user session in which user account is accessed on the relying device). Thus, for example, the authentication server 155 may determine an availability of the relying device 140 for accessing web-services associated with the user authenticated to access the relying device.

In a step 52, a user may elect to request access or login to a web-service for a relying device 140 on a mobile device 101. For example, the user may navigate a user interface of an authentication application executing on the mobile device 101, select a relying device with which the mobile device is registered, and elect to authenticate to one or more web-services to which the user registered the mobile device 101. In another example, the user may navigate to a user interface indicating web-services to which the user registered the mobile device and select one or more web-services to which the user desires to authenticate. In some cases, the list of services indicated on the interface may depend on which relying device 140 the user is currently authenticated to access, e.g., as reported to the authentication application of the mobile device by the authentication server 155. For example, upon launch of the authentication application or navigation to an interface by which web-services may be selected, the authentication application may request an indication of which web-services the user is permitted to authenticate to via the mobile device, as which services are available for selection may depend on an the availability of a relying device 140 to which the user is authenticated to access. In some embodiments, the user may select from a plurality of web-services to which the user has registered the mobile device in one or more iterations of the process 10 described with respect to FIG. 11A, and those services may be displayed in association with a relying device 140 for which the user has an actively issued or reported user session. The mobile device may store, such as within the TEE, user credentials corresponding to a user account for logging into the respective web-services. In some cases, the credential is a token, like a user certificate, which may be signed by a certificate service, like an SSL certificate service, or other certificate or ticketing service. Thus, for example, the certificate may be an active directory SSL certificate. In another example, the certificate or token may be issued by a service of the authentication server 155. Different web-services may be associated with different credential values, like different tokens or certificates, and in some cases those different tokens or certificates may be associated with a given relying device to which the user is permitted access. Upon the user authenticating to access a relying device 140, one or more web-services the user is permitted to access from the relying device may be presented for the user to select for authentication to via the mobile device. The user may select 52 a given web-service (or collection thereof) to which the user desires to authenticate the relying device 140 to access, e.g., cause the relying device to log into under an account of the user or otherwise present credentials of the user to utilize the web-service. The mobile device 101 may transmit an access request corresponding to the selected web-service to the authentication server 155. The access request may include an identifier corresponding to the web-service which the user desires to access, and which may also identify a relying device from which the user desired to access the web-service. An example identifier may be a identifier for the web-service obtained during a registration process. The access request may additionally include identifying information corresponding to the user of the mobile device, or the mobile device, such as an identifier associated with the mobile device or the user. An example identifier may be public key, or other identifier associated with a record of the user or mobile device. In turn, authentication of the user may occur without the user physically interacting with the relying device to provide credential values to the web-service (such as a username, password, or both) for utilizing the web-service via the relying device. In some cases, the providing of credential values may occur prior to the user physically accessing the relying device 140, though authentication via the mobile device is equally applicable after the user has physically accessed the relying device (e.g., using the mobile device like a wallet storing credentials by which the user is authenticated to access web-services from one or more different relying devices).

In a step 53, such as in response to receiving an access request corresponding to a given web-service from the mobile device, the authentication server 155 may verify an availability of a relying device 140 to which the user has authenticated. For example, the authentication server 155 may obtain one or more records based on a received identifier associated with the relying device. The record may include information about a network address, or connection, like a Web Socket tunnel, associated with the relying device by which the authentication server 155 may determine availably of the relying device and whether a session for the user is issued or active on the relying device 140 (e.g., the user has authenticated to access the relying device prior to attempting to convey access to the relying device to access web-services). In some embodiments, the authentication server 155 may identify a Web Socket tunnel associated with the relying device 140, such as by a network address associated with the relying device. In some cases, the authentication server 155 may determine a status associated with the Web Socket tunnel, such as whether a heartbeat signal has been received from the relying device 140. The heartbeat signal, in some embodiments, may indicate an availability status of relying devices, such as whether user sessions are ongoing. If no relying device 140 is associated with a user session for the user of the mobile device 101, the authentication server 155 may determine that no relying device is available for authentication to the web-service. If a relying device 140 is available, e.g., as indicated by an active user session of the user issued or reported for the relying device, the authentication server 155 may authenticate the user of the mobile device to convey access of the web-service to the relying device.

User authentication may be performed according to one or more processes discussed herein. In some embodiments, the access request transmitted in step 52 may include authentication information by which the authentication server 155 may deem the user authenticated. For example, the mobile device 101 may receive a policy including one or more rules by which the authentication server 155 verifies an authentication result generated by the mobile device. Thus, the mobile device 101 may generate the authentication result and transmit the result in association with the access request. Alternatively, as illustrated by step 54, the mobile device 101 may receive a request for an authentication result from the authentication server 155 (e.g., after availability of the requested relying device 140 is determined) and the mobile device 101 may generate, such as by processing user provided credentials within a TEE of the mobile device, the authentication result. In some embodiments, the authentication result may include one or more representation of credentials which the user authenticated on with the mobile device 101, such as by providing those credentials to the TEE for verification. For example, the TEE may process credential values corresponding to one or more credentials obtained from the user to determine whether the obtained credential values match previously established credentials for the user within the secure memory of the TEE. The TEE may output a representation of a credential by which the user was deemed authenticated, and the TEE may output signed (e.g., signed by a key maintained within the secure memory) data, which may include the representation of the credential, thus verifying the TEE determined the result. A timestamp or other value may be included in the data, such that the signed data conveys a time at which the result was determined. The mobile device 101 may transmit generated authentication results to the authentication server 155 in step 55 for verification. For example, the authentication server 155 may verify signed data based on corresponding received data and a public key associated with an established record associated with the user or the mobile device.

In accordance with examples like those described above, the mobile device 101 may transmit user credentials in association with the result. The user credentials may be a certificate, or token, like a user certificate or authenticator issued to the mobile device for conveying access to the web-service from another device, like the relying device 140. In some embodiments, the authentication result may be, or include, signed data. In some embodiments, the signed data may be, or include, the user credentials. For example, a certificate or token may be signed within a TEE of the mobile device 101 (e.g., by a private key or signature key stored within a secure memory of the TEE) and transmitted to the authentication server 155, which the authentication server may verify (e.g., using a public key or signature verification key). The authentication server 155 may verify and then sign the token or certificate to indicate a result of the verification. In some embodiments, a policy may be enforced within the TEE to permit signing or other processing of a user certificate or token (e.g., release of the user credentials associated with a user account for accessing the web-service). Accordingly, in some embodiments, release of a signed user certificate or token by the TEE may convey authentication of the user on the mobile device to the authentication server 155. A timestamp including in the singing of the certificate or token, which may be provided with the user certificate or token, may convey timeliness of the generation of the signature. The data and signed data may also convey other information, like one or more authentication results like those described above. Accordingly, such as in accordance with a policy governing authentication to a web-service, and which may specify a token schema by which the authentication server 155 may verify credentials received from the mobile device, the authentication server may sign a result or sign data (e.g., that also signed by the TEE of the mobile device) to indicate authentication of the user/data by the authentication server. These and other principles may be utilized in authentication processes, for example, the authentication server 155 may issue a challenge to the mobile device requesting signature over specific data or a value, and a successful response includes signed data incorporating the challenge response. As noted above, the authentication server 155 may also sign data, which may include a timestamp, such as in response to verifying signed data received from the mobile device 101 and authenticating the user of the mobile device to indicate an authentication result determined by the authentication server and when that authentication result was determined. Thus, for example, another entity, like a web-service, may verify a signature of the authentication server 155 and rely on the authentication result as determined by the authentication server, which is not to suggest that another entity, like a web-service, may not also verify data signed by the mobile device (e.g., according to a schema, like a token schema) to confirm an authentication result.

Examples of other or additional steps which may be performed in association with steps 54 and 55 may include one or more of the steps described with reference to process 300B of FIG. 3B or process 600 of FIG. 6 or process 800 of FIG. 8. For example, the mobile device 101 may authenticate a user and process challenges in accordance with techniques described with reference to step 345 in FIG. 3B and provide results of processing in accordance with those techniques to the authentication server 155. In another example, the mobile device 101 may generate requests in accordance with techniques described with reference to step 602 and authenticate a user and process challenges in accordance with techniques described with reference to step 602 in FIG. 6 and provide results of processing in accordance with those techniques to the authentication server 155 or other entity. In another example, such as in the process 800 of FIG. 8, such techniques may be applied to other data, like a user certificate or token, and signed data corresponding to such data, which may be processed within the TEE of the mobile device in accordance within a policy governing signing and release of such data, and the mobile device may transmit the data to an authentication server 155 or other entity.

As described above, successful authentication of the user on the mobile device 101 may include user authentication within a TEE of the mobile device to release a user certificate or token corresponding to a user account for accessing the web-service from a relying device 140. The user certificate or token may be encrypted, or stored within a secure memory of the TEE of the user device such that the CEE cannot access the value in unencrypted form. Additionally, singing of the user certificate or token may be performed with the TEE based on a private key or signature key stored within a secure memory of the TEE which the CEE may not access, and the TEE may not release the private key or signature key. This operation may occur subsequent to authentication of the user, such as by credential values stored within the TEE. Such steps may include active (e.g., specific user inputs, like a PIN, password, or biometric data, like a faceprint or fingerprint) or passive authentication (e.g., obtained biometrics, such as over time, or detection after specific user inputs that the user remains in control of a mobile device) based on policy governing passing of an encrypted version of the user certificate or token to the authentication server 155. Additionally, the authentication server 155 may verify such information in according with a policy governing access to the web-service by a relying device, which may be associated with the relying device 140 to which the user is issued a user session. The authentication server 155 may access a public key or signature verification key by which received data from the mobile device 101 may be verified. For example, in step 55 the mobile device may sign and send a token or user certificate to the authentication server 155 based on an authentication result determined on the mobile device, which may be subject to challenge by the authentication server 155 or driven by conformance to policy govern authentication to the web-service on the mobile device (which may be verified by the authentication server). The authentication server 155 may verify the information received from the mobile device, such as in accordance with techniques described herein, such as on established representations of user credentials, signature verification of received data, and determine to pass credential information to a relying device over a tunnel associated with a user session of the user in step 56 based on results of a verification determination. For example, as described, the authentication server 155 may verify received information based on one or more records or policy governing authentications to the web-service, which may include information like representations, public keys or signature keys, schema for verifying credential values and token or certificate to be verified by a web-service, and the like, and thus operable to verify data received from a mobile device by signature verification of signed data and agreement of data corresponding to that which was signed with data maintained in the one or more records. The authentication server 155 may additionally verify whether the user is permitted to access the web-service from the relying device 140, such as by determining whether the user certificate or token was revoked or based on associations of records (e.g., record of registration to web-service with relying device record or with a user record or record of the mobile device) and authenticity thereof. In some embodiments, an identifier of a relying device 140 the user desires to authenticate access to a web-service may be indicated by the mobile device 101 and verified by (or determined by) authentication server 155. In some embodiments, a public key associated with a user-level accounts of the relying device 140 may be included or appended as a credential value, and signed by one or more of the TEE of the mobile device and the authentication server (e.g., and subsequently the relying device 140 may sign data by a private key and the signed data may be verified by the public key indicated for the relying service, such as to prevent the interception and presentation of credentials values by a relying device (or desktop image) that does not have access to the private key).

In response to authentication of the user, e.g., based on the information received from the mobile device 101 and which may include the signing of user credentials by the authentication server 155 to convey verification thereof, the authentication server may pass the credentials to a relying device. For example, the authentication server 155 may pass credentials to the relying device 140 over an issued user session 56 associated with the user of the mobile device (e.g., the relying device identified as available in step 53). Credentials passed to the relying device 140 may include communication of information by which the relying device 140 may authenticate to a web-service. The authentication server 155 may provide credentials to a relying device 140 over an issued user session by passing a user certificate or token to the relying device. In some embodiments, the authentication server 155 may sign the user certificate or token, such as in response to verifying the information received from the mobile device. The signature of the authentication server 155 may convey the verification of the credentials as being associated with the user for which the user session was issued, such as to a web-service. In some embodiments, the relying device 140 may sign the user certificate. Thus, for example, presentation of a certificate or other data to a web-service by the relying device in step 57 may convey the provenance, like a chain of tile, of the certificate and the entities which handled it, e.g., by nested signatures, and which the web-service may verify based on public keys or signatures keys maintained for the respective entities.

In some embodiments, the authentication process may include additional tokening or ticketing for authenticating to the web-service by the relying device 140 (e.g., by authentication to a web-service, and optionally requesting other resources based on the authentication result, such as for one or more application) or performing other operations. For example, the relying device 140 may, upon receipt of credentials provided by the authentication server 155, obtain in step 57 a token, or ticket, by transmitting a user certificate (which may be signed by one or more entities) in association with a request for a token or ticket to a ticking service (which may be provided by the authentication server or other entity). The ticking service may authenticate the relying device 140, such as by issuing one or more challenges to the relying device 140, which may be signature challenges. The relying device 140 may sign data, such as the token, and other data to convey temporality of a request (e.g., like a timestamp) and possession of a private key by which the data was signed. The relying device 140 may sign data in response to challenge, like a unique challenge issued by a ticking service or other entity, thus conveying possession of a private key by which the data was signed. For example, the private key by which the data is signed may be a private key of a public-private key pair and the public key of the pair may be distributed such that other entities may verify signed data as being signed by the private key of the pair. The private key may be a private key retained on the relying device 140, such as a private key generated during a registration process (e.g., mobile device registration to the relying device 140 or user account creation on the relying device) or otherwise stored on the relying device 140. For example, the private key may be generated and stored on the relying device 140 during a mobile device registration process or user account creation process and the corresponding public key may be exchanged with one or more servers or services for signature verification. The private key may be utilized by the relying device 140 to sign a variety of data like that discussed above and elsewhere herein. In such example, the relying device 140 may provide responses to one or more challenges to a ticketing service to receive a token or ticket which the relying device 140 may then present to utilize a given web-service, and may convey credentials associated with one or more applications. For example, one or more other application, such as active directory aware applications, based on the received ticket, may obtain other tickets from the ticketing service or other services, such as to access web-service providing online resources under a same or another account of the user (e.g., one or more federated accounts or via single sign-on permissions governing the web-service and other web-services) provided internally (e.g., by a party managing the relying device) or externally (e.g., other relying parties, like $3^{rd}$ parties). In some cases, the certificate or tokening service is a trust service associated with a developer which licenses user accounts or relying devices to access a web-service provided by the developer (e.g., may permit 0-1000 relying device or 0-1000 application instances or more for a given entity, like a corporation, and different entities, like relying parties, may be permitted different amounts of instances to access a web-service). In various embodiments, a web-service may trust the authentication server 155 as an identity provider, in which case the credentials received by the relying device 140 over the session may be presented 57 (e.g., directly, or signed and presented) a corresponding web-service. For example, the relying device 140, as in other examples, may receive a token to present or sign and present to an indicated web-service. Various services or protocols may be utilized to facilitate the exchange or conveyance of credentials, such as ID Connection, open ID, or SAML, and may be specified by the policy governing mobile initiated authentications to the web service.

In some embodiment, the relying device 140 may receive instructions in step 56 for presenting 57 a credential to a web-service. For example, the relying device 140 may receive credentials and instructions for presenting the credentials. In some cases, the instructions may be encoded in a script which is executed by the relying device 140 to present the credentials. As an example, the relying device 140 may receive a credential and instructions to launch an application, navigate to a webpage, or request a session with a service for presenting a given credential to authenticate to access to the web-service. In some embodiments, such as when a user mobile authenticates to a web-service when actively utilizing the relying device, the instructions may cause the relying device 140 to present the credentials and access the corresponding web-service for display on a screen of the relying device 140.

In step 58 the relying device 140 may receive a result of successfully authenticating to a web-service or service governing access to the web-service, and thus a result of a login attempt to the web-webservice for the user by the relying device. The relying device 140 may return the result 58, such as in a response, to the authentication server 155. The authentication server 155 log the result in association with a record associated with user, mobile device, or relying device, such as in association with a user record, and indicate information about the request, the requesting device, and which relying device obtained the login result. Thus, for example, an audit trail of mobile initiated authentications may be formed and may be stored in association with records of other authentications described herein. The authentication server 155 may pass the login result tot the mobile device 101, and the authentication application may indicate the success of the login to the web-service which was selected in step 52.

After obtaining a login result 58, the relying device 140, in some embodiments, may purge the credentials received from the authentication server 155 and indicate a login result 59. In some embodiments, such purging may not be required in terms of providing robust security, but rather as a housekeeping measure. For example, signing of a user certificate or token generation may convey a timeliness, such as by a including a timestamp, to a web-service or ticketing server, and a login result 58 may tie a user session token or ticket to a given instance of authentication to web-service such that same credentials may not be presented multiple times or to obtain access to other web-services. The relying device 140 may indicate a login result 59 by virtue of authenticating to web-service, such as by accessing an online resource associated with the web-service or launching an application (e.g., which may be licensed by a web-service) or accessing DRM controlled content on the relying device 140.

In some embodiments, the relying device 140 may wait for user input prior to altering a display or performing other operation indicative of login results 59. Thus, for example, the relying device 140 may not exhibit or perform an action prior to a user input (or action), such as for a configurable amount of time, such as to permit the user the convenience of authenticating via the mobile device 101 without indicating that authentication was completed by the relying device 140. In some embodiments, the received user input may be navigating to a webpage or launching an application associated with the web-service the relying device authenticated. In some embodiments, the relying device 140 operates within a VDI environment. Thus, for example, rather than utilizing a local OS, a virtual machine executes a desktop image and the relying device 140 receives data (e.g., the virtualized desktop) for display over a network session with the VM. In such example embodiments, for example, the authentication server 155 may provide credentials over a network in association with an enabled VDI session between the relying device 140 and a VM executing a desktop image. As noted previously, a virtualized desktop may be persistent or not. In a persistent configuration, a desktop images which a user accesses retains (e.g., includes) user configured or stored data during a session, like installed applications, files, settings, etc. and in a non-persistent configuration an assigned desktop image may be clean-slated on logout or selected from a pool of desktop images and user configured or stored data during a session is not saved or periodically wiped. In the context of clean-slated virtual desktop implementations, or the desire to implement similar principals to credentialing for access to web-services, the mobile device 101 may serve to retain those credentials which might otherwise be stored on a relying device 140. Embodiments of relying devices 140 or VM implementations may elect to purge credentials and mitigate the retaining of various credentials outside of the mobile device 101 of the user, thus permitting the mobile device executing an authentication application to serve as a wallet of credentials by which the user may authenticate to access a relying device 140 and then authenticate to web-services which the user desire to access from that relying device by authentications on the mobile device which convey user-level access to relying devices and web-services by those relying devices.

In some embodiments, the authentication server 155 and web-services (like relying parties 145 and other services 175) may utilize one or more local databases or networked databases, such as one or more repositories (e.g., like an authentication repository 165). In some embodiments, the different entities may each, or individually, utilize a combination of databases. For example, many entities may store some data locally or via networked datastore and some data within a distributed datastore, like a directed acyclic graph of a decentralized computing platform, and different entities may utilize different decentralized computing platforms, and in either instance data may be stored according to a consensus process whereby a plurality of computing nodes agree on authoritativeness of records and data structure of the datastore and verification according to those authoritative records within the data structure.

In some embodiments, some operations of FIGS. 11A and 11B may be implemented by a smart contract, iterations of which may be called by different ones of the devices, servers or services. Iterations of smart contracts may be verified as authentic (e.g., via signature verification or, more generally, public-private key cryptography infrastructure) to disparately execute processes comprising same operations according to the smart contract. For example, one or more of the operations performed by the authentication server 155 or services 175 (e.g., a ticking service or web-service) or other service or relying party 145 may be implemented by one or more smart contracts which may be disparately executed to determine results, such as results based on records stored within a distributed datastore, which may include records like those stored within local databases. A record in a distributed datastore need not be the same as a record stored within a local database to be a like record, for example, a record within a distributed datastore may be a deterministic value or include one or more deterministic values by which one or more other values or a record may be verified. In some embodiments, a participating entity may be a computing node, or otherwise include computing node functionality, such as being configured to access data or store data within a directed acyclic graph or process data for publication within a directed acyclic graph. Alternatively, the entity may interface with a computing node configured to store, access, and process data within a directed acyclic graph.

By way of example, a smart contract may be configured to generate a record of user permission to access a web-service within a distributed data store. A smart contract may be configured to verify availably of a given relying device. A smart contract may be configured to verify authentication information for a user provided by a mobile device, such as based on one or more records stored within a distributed data store and publish a record of the verification to a distributed datastore. A smart contract may be configured to verify the authenticity of a record, which may indicate whether a device presenting a given credential is permitted access to a web-service. A relying device may similarly verify one or more records or request verification of one or more records based on information published within a distributed data store or request verification of information by a smart contract, such as in response to receiving an access request for user access to the relying device and subsequently to access a web-service for the user. A smart contract may be configured to sign results determined by the smart contract, and publication of the results within a distributed data store, such as in a record, the contents of which may be agreed upon by a consensus protocol, and an subsequently verified to confer authenticity. Thus, for example, a smart contract may be configured to output a result of authentication of a user to access a web-service from a relying device based on verification of one or more records and rules of a policy, and may pass signed user credentials to a given relying device. Alternatively, the relying device 140 may obtain the records from the distributed data store. In turn, the relying device may utilize the signed user credentials, like a certificate (which may also be signed by a smart contract), by presenting those credentials to a web-service (e.g., like in step 57), to login to the web-service based on authentication results determined at least in part by another entity.

In some embodiments, the described functionality of FIGS. 3-11 and elsewhere herein may be implemented with machine-readable instructions stored on a tangible, non-transitory, machine-readable medium, such that when the instructions are executed, the described functionality may be implemented. In some embodiments, notwithstanding use of the singular term "medium," these instructions may be stored on a plurality of different memory devices (which may include dynamic and persistent storage), and different processors may execute different subsets of the instructions, an arrangement consistent with use of the singular term "medium." In some embodiments, the described operations may be executed in a different order from that displayed, operations may be omitted, additional operations may be inserted, some operations may be executed concurrently, some operations may be executed serially, and some operations may be replicated, none of which is to suggest that any other description is limiting.

Figure 12:
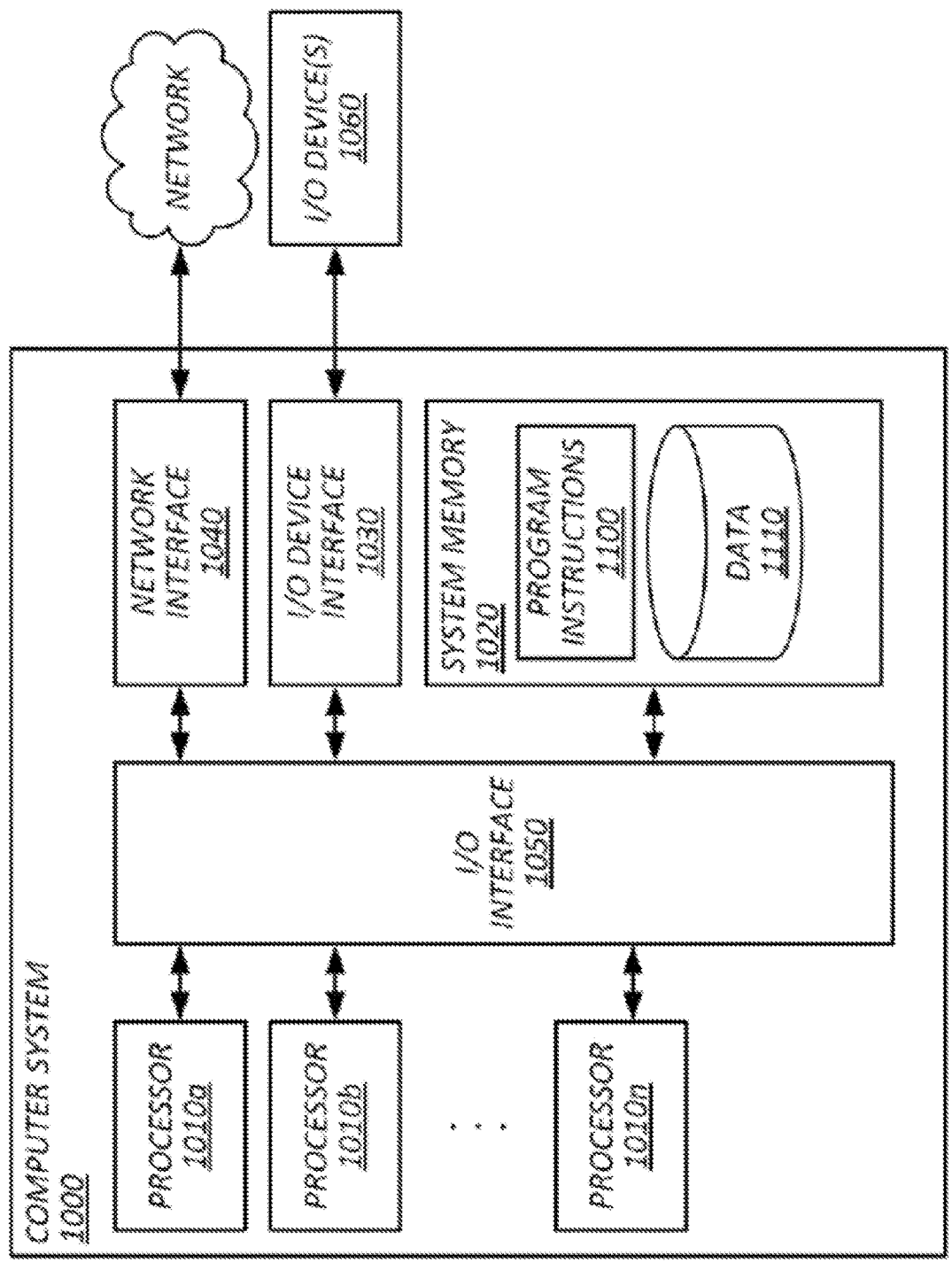
FIG. 12 is a block diagram showing an example of a computing device by which the present techniques may be implemented.

FIG. 12 is a diagram that illustrates an example computing system 1000 in accordance with embodiments of the present techniques. The various servers (e.g., 145, 155, 245) or services (e.g., 175, which may include one or more servers, like an auth server 155, providing such services), computing nodes 201, relying devices 140 or client devices (e.g., 101, 135), or repositories (e.g., 160, 165) described herein may include one or more components like those of the example computing system 1000. Various portions of systems and methods described herein, may include or be executed on one or more computer systems similar to computing system 1000. Further, functions, processes and modules described herein may be executed by one or more processing systems similar to that of computing system 1000. In some embodiments, functions and processes may be enumerated in one or more smart contracts that may be executed be one or more processing systems similar to those of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010a-1010n, system memory 1020, network interface 1040, I/O devices 1060, or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be used independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively.

In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

What is claimed is:

1. A tangible, non-transitory, machine-readable medium storing instructions that when executed by one or more processors of a computer system effectuate operations comprising:
   establishing on a first computing device:
      a set of credentials maintained on the first computing device, and
      a secret key of a key-pair, the secret key maintained on the first computing device;
   transmitting, to an authentication server to register the first computing device with the authentication server:
      a shared key of the key-pair and, for at least one credential by which a user authenticates to the first computing device in the set of credentials, a representation indicative of a value of the corresponding credential, or
      data corresponding to the representation and the shared key;
   receiving an indication of a user selection on the first computing device to register the first computing device to a web-service to be accessed from a second computing device, wherein:
      the second computing device is different from the first computing device, and
      the authentication server is configured to identify sessions of the user with the second computing device to convey credentials received from the first computing device to the second computing device for presentation to a server associated with the web-service;
   obtaining, by the first computing device, a registration value corresponding to the web-service, and data signed by the secret key, the signed data being indicative of a result of user authentication on the first computing device;
   transmitting data including the registration value and the signed data to cause the authentication server to register the first computing device with the web-service based on authentication of the signed data and the registration value; and
   establishing, on the first computing device, a credential value corresponding to the web-service.

2. The non-transitory machine-readable medium of claim 1, wherein obtaining a registration value corresponding to the web-service comprises one or more of:
   requesting the registration value from the authentication server,
   requesting the registration value from a server of the web-service, or
   authenticating to the web-service or the authentication server on a user account associated with the web-service, wherein the credential value is a certificate or token associated with the user account.

3. The non-transitory machine-readable medium of claim 1, the operations further comprising:
   obtaining a policy associated with accessing of the web-service by the second computing device, the policy comprising one or more rules; and
   enforcing, based on the policy, in response to the user selection of the web-service:
      at least a first rule indicating compliance of the at least one credential in the set of credentials by which the user authenticates to the first computing device; and
      at least a second rule indicating compliance of the second computing device to access the web-service.

4. The non-transitory machine-readable medium of claim 3, wherein enforcing the rules comprises:
   requesting the user to authenticate on the first computing device by providing the at least one credential for authentication, the signed data including the representation or data corresponding to the representation of the at least one credential; and
   registering the first computing device with the second computing device.

5. The non-transitory machine-readable medium of claim 1, wherein transmitting the representation or data corresponding to the representation to the authentication server comprises:
   transmitting one or more other representations corresponding to other credentials in the set of credentials or data corresponding to the one or more other representations.

6. The non-transitory machine-readable medium of claim 1, the operations further comprising:
   in response to receiving a user selection of the web-service, transmitting an identifier of the web-service to the authentication server;
   receiving, from the authentication server, an indication of one or more credentials in the set of credentials by which the user is to authenticate; and
   requesting the user to authenticate on the first computing device by providing the one or more credentials for authentication.

7. The non-transitory machine-readable medium of claim 1, wherein:
   an application executing within a client execution environment of the first computing device requests establishment of the set of credentials within a secure memory by a co-processor of a trusted execution environment of the first computing device, the co-processor being a different processor from a central processing unit of the first computing device; and
   the secret key of the key-pair is maintained within the secure memory on the first computing device.

8. The non-transitory machine-readable medium of claim 1, the operations further comprising:
   requesting signing of the credential value corresponding to the web-service within a trusted execution environment of the first computing device based on the secret key; and
   transmitting the signed data to the authentication server.

9. The non-transitory machine-readable medium of claim 8, wherein the authentication server:
   verifies the signed data based on the shared key associated with the first computing device, identifies the second computing device based on an active session of the user with the second computing device, and transmits data signed by the authentication server to the second computing device for presentation to the web-service.

10. The non-transitory machine-readable medium of claim 1, wherein establishing a credential value corresponding to the web-service comprises:

obtaining a user certificate or token corresponding to a user account with the web-service.

11. The non-transitory machine-readable medium of claim 10, the operations further comprising:

requesting, to a trusted execution environment of the first computing device comprising a secure memory, storage of the user certificate or token as the credential value corresponding to the web-service, wherein the credential value stored within the secure memory is stored in an encrypted form for which the trusted execution environment has access to a key for decrypting the data.

12. The non-transitory machine-readable medium of claim 10, the operations further comprising:

storing, within a client execution environment of the first computing device, the user certificate or token as the credential value in an encrypted form in a portion of memory different from a secure memory of a trusted execution environment, wherein the credential value is stored in the encrypted form for which the trusted execution environment has access to a key for decrypting the data to obtain the credential value.

13. A tangible, non-transitory, machine-readable medium storing instructions that, when executed by one or more processors of a server-side computing system cause the one or more processors of the server-side computing system to effectuate operations comprising:

registering a mobile computing device and a user of the mobile computing device to establish a record to support user initiated authentication on the mobile computing device to access a web-service from another computing device different from the mobile computing device;

receiving, from the mobile computing device, a request to authorize the user to authenticate on the mobile computing device to access the web-service from one or more of the second computing devices and, in association with the request, first data indicative of a value;

obtaining an authentication result indicative of authentication of the user to the web-service, the authentication result associated with an identifier;

in response to identifying a correspondence between the value and the identifier, determining whether the user of the mobile computing device is permitted to authenticate on the mobile computing device to access the web-service from at least one of the second computing devices based on the record;

in response to determining the user of the mobile computing device is permitted to access the web-service from the at least one second computing device, transmitting a credential value and a policy associated with the web-service to the mobile computing device;

receiving, from the mobile computing device, an authentication request to access the web-service from a second computing device and, in association with the authentication request, authentication data;

identifying a given one of the second computing devices being permitted to access the web-service and having an active user session for the user;

verifying the authentication data complies with the policy; and transmitting, to the identified one of the second computing devices, based on the verifying, second authentication data and instructions to cause the second computing device to transmit the second authentication data to the web-service.

14. The non-transitory machine-readable medium of claim 13, wherein registering a mobile computing device and a user of the mobile computing device to establish a record to support user initiated authentication on the mobile computing device to access a web-service from another computing device different from the mobile computing device comprises:

establishing record information corresponding to the user of the mobile computing device, the record comprising a user identifier associated with the user and indicating the user is permitted to access a web-service from one or more second computing devices.

15. The non-transitory machine-readable medium of claim 13, wherein registering a mobile computing device and a user of the mobile computing device to establish a record to support user initiated authentication on the mobile computing device to access a web-service from another computing device different from the mobile computing device comprises:

establishing record information corresponding to the mobile computing device in response to receiving, from the mobile computing device, a set of representations comprising a plurality of representations, each one of the representations corresponding to a credential in the set of credentials of the user being maintained by the mobile computing device and a signature verification key corresponding to a private key being maintained by the mobile computing device.

16. The non-transitory machine-readable medium of claim 15, wherein the authentication data includes signed data and the verifying further comprises:

verifying the authentication data was generated by the mobile computing device based on the signed data and the signature key.

17. The non-transitory machine-readable medium of claim 13, the operations further comprising:

transmitting, to the mobile computing device, in response to determining the user of the mobile computing device is permitted to access the web-service from at least one second computing device, identifiers of one or more respective second computing devices permitted to access the web-service;

receiving, from the mobile computing device, an authentication request to access a given second computing device and, in association with the authentication request, authentication data;

verifying the authentication data complies with a policy associated with the given second computing device; and issuing, to the given second computing device, based on the verifying, a user session.

18. The non-transitory machine-readable medium of claim 17, the operations further comprising:

obtaining a signature verification key corresponding to a private key being maintained by the mobile computing device;

receiving, in association with the authentication request to access the given second computing device, authentication data comprising signed data; and verifying the authentication data, received in association with the authentication request to access the given second computing device, was generated by the mobile computing device based on the signed data and the signature key.

19. The non-transitory machine-readable medium of claim 17, the operations further comprising:
identifying the given one of the second computing devices as being permitted to access the web-service and having the active user session for the user based on an identifying of the issued user session to the given second computing device among other user sessions with other computing devices.

20. The non-transitory machine-readable medium of claim 17, the operations further comprising:
receiving, from a given second computing device, a report of an active user session on the given second computing device, and identifying the given one of the second computing devices as being permitted to access the web-service and having the active user session for the user based on an identifying of the reported user session to the given second computing device among other user sessions with other computing devices.

21. The non-transitory machine-readable medium of claim 13, the operations further comprising:
maintaining a Web Socket tunnel with the given second computing device; and
transmitting the second authentication data and instructions over the Web Socket tunnel to cause the second computing device to transmit the second authentication data to the web-service.

22. The non-transitory machine-readable medium of claim 21, the operations further comprising:
transmitting third authentication data and instructions over the Web Socket tunnel to cause the second computing device to transmit the authentication data to another, different web-service in response to receiving another authentication request to access the different web-service from the second computing device.

23. A tangible, non-transitory, machine-readable medium storing instructions that when executed by one or more processors of a computer system effectuate operations comprising:
establishing, on a first computing device, a set of credentials and a secret key of a key-pair;
transmitting, to an authentication server to register the first computing device with the authentication server, data corresponding to a shared key of the key-pair and a representation indicative of a value of a credential by which a user authenticates to the first computing device in the set of credentials;
receiving an indication of a user selection on the first computing device to register the first computing device to a web-service to be accessed from a second computing device different from the first computing device;
obtaining, by the first computing device, a registration value corresponding to the web-service, and data signed by the secret key, the signed data being indicative of a result of user authentication on the first computing device;
transmitting data including the registration value and the signed data to cause the authentication server to register the first computing device with the web-service based on authentication of the signed data and the registration value; and
establishing, on the first computing device, a credential value corresponding to the web-service, wherein the authentication server is configured to identify a session of the user with the second computing device to convey credentials received from the first computing device to the second computing device for presentation to a server associated with the web-service.

24. A tangible, non-transitory, machine-readable medium storing instructions that, when executed by one or more processors of a server-side computing system cause the one or more processors of the server-side computing system to effectuate operations comprising:
establishing a record of a mobile computing device and a user of the mobile computing device to support user initiated authentication on the mobile computing device for accessing a web-service from computing devices different from the mobile computing device;
receiving, from the mobile computing device, a request to permit the user to authenticate on the mobile computing device to access the web-service from one or more second computing devices different from the mobile computing device and, in association with the request, first data indicative of a value;
obtaining an authentication result indicative of authentication of the user to the web-service, the authentication result associated with an identifier;
in response to identifying a correspondence between the value and the identifier, determining whether the user of the mobile computing device is permitted to authenticate on the mobile computing device to access the web-service from the one or more second computing devices based on the record;
in response to determining the user of the mobile computing device is permitted to access the web-service from the second computing device, transmitting a credential value and a policy associated with the web-service to the mobile computing device;
receiving, from the mobile computing device, an authentication request to access the web-service from a computing device different from the mobile device and, in association with the authentication request, authentication data;
identifying a given one of the second computing devices having an active user session for the user to permit access to the web-service;
verifying the authentication data complies with the policy; and
transmitting, to the identified one of the second computing devices, based on the verifying, second authentication data and instructions to cause the identified one of the second computing device to transmit the second authentication data to the web-service.

25. A computer-implemented method, the method comprising:
establishing on a first computing device:
a set of credentials maintained on the first computing device, and
a secret key of a key-pair, the secret key maintained on the first computing device;
transmitting, to an authentication server to register the first computing device with the authentication server:
a shared key of the key-pair and, for at least one credential by which a user authenticates to the first computing device in the set of credentials, a representation indicative of a value of the corresponding credential, or
data corresponding to the representation and the shared key;

receiving an indication of a user selection on the first computing device to register the first computing device to a web-service to be accessed from a second computing device, wherein:
    the second computing device is different from the first computing device, and
    the authentication server is configured to identify sessions of the user with the second computing device to convey credentials received from the first computing device to the second computing device for presentation to a server associated with the web-service;

obtaining, by the first computing device, a registration value corresponding to the web-service, and data signed by the secret key, the signed data being indicative of a result of user authentication on the first computing device;

transmitting data including the registration value and the signed data to cause the authentication server to register the first computing device with the web-service based on authentication of the signed data and the registration value; and establishing, on the first computing device, a credential value corresponding to the web-service.

26. A computer-implemented method, the method comprising:

registering a mobile computing device and a user of the mobile computing device to establish a record to support user initiated authentication on the mobile computing device to access a web-service from another computing device different from the mobile computing device;

receiving, from the mobile computing device, a request to authorize the user to authenticate on the mobile computing device to access the web-service from one or more of the second computing devices and, in association with the request, first data indicative of a value;

obtaining an authentication result indicative of authentication of the user to the web-service, the authentication result associated with an identifier;

in response to identifying a correspondence between the value and the identifier, determining whether the user of the mobile computing device is permitted to authenticate on the mobile computing device to access the web-service from at least one of the second computing devices based on the record;

in response to determining the user of the mobile computing device is permitted to access the web-service from the at least one second computing device, transmitting a credential value and a policy associated with the web-service to the mobile computing device;

receiving, from the mobile computing device, an authentication request to access the web-service from a second computing device and, in association with the authentication request, authentication data;

identifying a given one of the second computing devices being permitted to access the web-service and having an active user session for the user;

verifying the authentication data complies with the policy; and transmitting, to the identified one of the second computing devices, based on the verifying, second authentication data and instructions to cause the second computing device to transmit the second authentication data to the web-service.

* * * * *